US007607578B2

(12) United States Patent
Zimet

(10) Patent No.: US 7,607,578 B2
(45) Date of Patent: Oct. 27, 2009

(54) SYSTEM AND METHOD FOR TRACKING DISPOSITION OF ITEMS

(75) Inventor: David A. Zimet, Hightstown, NJ (US)

(73) Assignee: Hesstech, LLC, Edison, NJ (US)

( * ) Notice: Subject to any disclaimer, the term of this patent is extended or adjusted under 35 U.S.C. 154(b) by 513 days.

(21) Appl. No.: 11/181,013

(22) Filed: Jul. 12, 2005

(65) Prior Publication Data

US 2006/0049251 A1 Mar. 9, 2006

Related U.S. Application Data

(63) Continuation-in-part of application No. 10/893,580, filed on Jul. 16, 2004.

(60) Provisional application No. 60/587,351, filed on Jul. 12, 2004.

(51) Int. Cl.
*G07B 15/02* (2006.01)

(52) U.S. Cl. .................................................... 235/384

(58) Field of Classification Search ................ 235/385; 705/28

See application file for complete search history.

(56) References Cited

U.S. PATENT DOCUMENTS

| | | | | |
|---|---|---|---|---|
| 5,424,944 | A * | 6/1995 | Kelly et al. | 705/28 |
| 5,913,210 | A * | 6/1999 | Call | 707/4 |
| 5,960,402 | A * | 9/1999 | Embutsu et al. | 705/1 |
| 6,112,904 | A * | 9/2000 | Ajo | 209/523 |
| 6,663,004 | B2 * | 12/2003 | Wagner et al. | 235/385 |
| 6,758,802 | B2 | 7/2004 | Fitzgerald et al. | |
| 7,113,922 | B2 * | 9/2006 | Fowler | 705/28 |
| 2002/0019785 | A1 | 2/2002 | Whitman | |
| 2002/0091595 | A1 * | 7/2002 | Itoi et al. | 705/28 |
| 2003/0209601 | A1 | 11/2003 | Chung | |
| 2004/0143505 | A1 | 7/2004 | Kovach | |
| 2004/0177032 | A1 | 9/2004 | Bradley et al. | |
| 2005/0187834 | A1 * | 8/2005 | Painter et al. | 705/28 |

FOREIGN PATENT DOCUMENTS

| | | |
|---|---|---|
| JP | 2002-099588 A | 4/2002 |

* cited by examiner

*Primary Examiner*—Daniel A Hess
(74) *Attorney, Agent, or Firm*—Dilworth Paxson LLP; John W. Goldschmidt, Jr.; Philip J. Foret

(57) ABSTRACT

A method and system of tracking and the disposition of inventoried items is disclosed. The method and system include assigning an audit code to an incoming inventoried item, wherein the audit code comprises a manual audit code and an automated audit code; auditing the incoming inventoried item to assess the incoming inventory item as suitable for one or more selected from the group consisting of destruction, demanufacturing, resale, recondition, storage, and redeployment; sending the incoming inventoried item to one of a redeployment, a demanufacturing, a reconditioning, a resale, a storage, and a destruction in accordance with the auditing; manually updating the manual audit code in accordance with the auditing and the sending; providing, after the sending and the manually updating, redeployment or resale of at least a portion of the incoming inventoried item audited as suitable for at least one of demanufacturing, resale, recondition, and redeployment; and, finally updating the manual audit code based upon the providing. Also disclosed is a system and method for securely tracking and reporting the disposition of inventoried items from a remote location.

20 Claims, 177 Drawing Sheets

HT DISPOSITION FLOW

OPERATIONS FLOW CHART

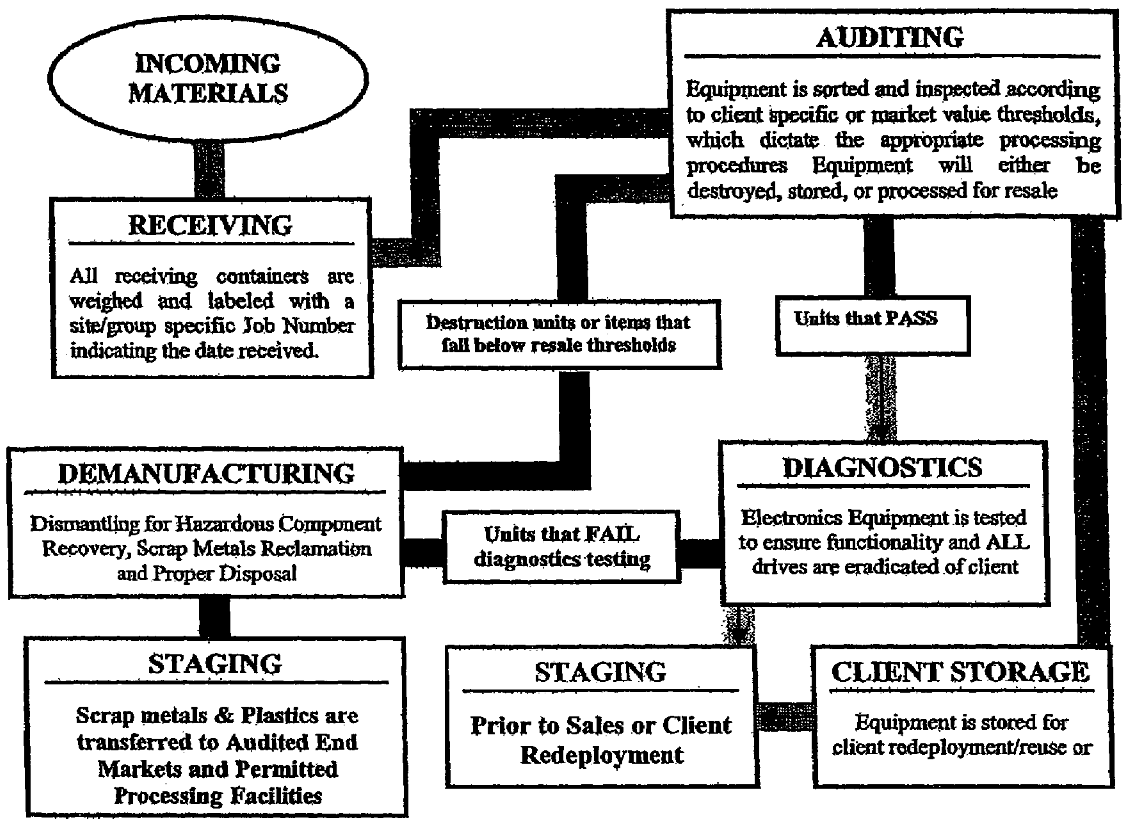

Auditing Department

Trained technicians audit all incoming materials, ensure compliance with state mandated record keeping requirements, and send obsolete or badly damaged units to be demanufactured, and equipment with potential resale value to diagnostics. Items identified for Client Storage are labeled and stored for quick retrieval and redeployment.

Diagnostics Department

- Each unit with potential system-level or component resale value is tested and per unit diagnostic results are recorded.
- Value-added services such as diagnostic and repair services are performed at no additional charge or risk to the client.
- All Client identification is removed and documented for each unit processed
- Data Eradication or Destruction services are performed for all equipment received

[illegible]

Equipment without resale value will be dismantled into its component parts and separated into clean recyclable commodities. All hazardous components (i.e. batteries, mercury switches, florescent lamps, and CRT from monitors, etc.) will be removed, packaged properly and shipped in accordance with state and federal regulations, to audited recycling or disposal facilities for final processing. Non-hazardous materials are recycled as a plastic or metal commodity. All end markets for hazardous component disposal are audited, with records available for client review.

FIGURE 2

1. Items are selected from Hesstech's STAR System inventory and designated for a PRCauctions.com sale.

2. Auction bidders will go to home page to view auction types and rules.

2a. There are open auctions where the current and minimum bid required are viewable.

2b. There are closed auctions where the current and minimum bid required are NOT viewable.

2d. There are LOT auctions where a bid is required for the entire list of items in the auction.

2e. There LINE ITEM auctions where a bid is required for each piece of equipment displayed in a list of item that make up one auction. Bidders should only bid on the items they wish to purchase.

FIGURE 6

3. Multiple LOT or LINE ITEM auctions may be running at one time and Viewed from the View Auction Inventory Page.

3a. Item #, Item Type, Manufacturing, Make and model fields can be search with individual filtering boxes.

3b. Pressing the Item # will display an Item detail page. With a description and photo in addition to the information in #3a. The bidder may submit a bid or add an item to the watch list from the item detail page 3c. The auction end date and time along with other auction detail will always be displayed at the top of the page.

3d. A default price for multiple items may be entered at one time. This will allow the bidder to filter for a list of items the bidder wishes to enter the same bid amount and update all items simultaneously. Check boxes will be used to select all or individual items to be set at a default bid amount.

3e. Items may be on from the View Auction Inventory page may be selected for a bid submission or send to a Watch list for the bidder to monitor.

3f. Items may be selected for bid or to watch will be sent to a Bid Status form which will list all the bidders submitted bids, items bidder is watching, and items that have closed.

FIGURE 7

4. The Bid Status Form will have three sections to report the status of each item on the list.

4a. The Submitted Bids section will list all items the user has bid on. A green color will indicate the bidder has currently submitted the high bid. A red color will indicate the bidder is not the highest bid. The bidder may increase his bid from the submitted bids list.

4b. The Bid Watch List section will list all items the user has selected to watch without placing a bid on. The bidder may submit a bid from the Watch list.

4c. The Completed List section will list all items the user has selected to watch without placing a bid on. A green color will indicate the bidder has currently submitted the high bid. A red color will indicate the bidder is not the highest bid.

FIGURE 8

IT/Electronic Processing

Program (Overall Grouping for Client Reporting)

Job Summary Report

- Demanufactured Inventory Job Report
- Redeployment Services Job Report
- Resale Settlement Job Report
- Software Audit Job Report

FIGURE 18

PRCauctions

Star interface forms and mockups

FIGURE 25

- The following 5 slides depict the interfaces developed within STAR to support PRCauctions.

FIGURE 26

Type a question for help esignation

Figure 28:
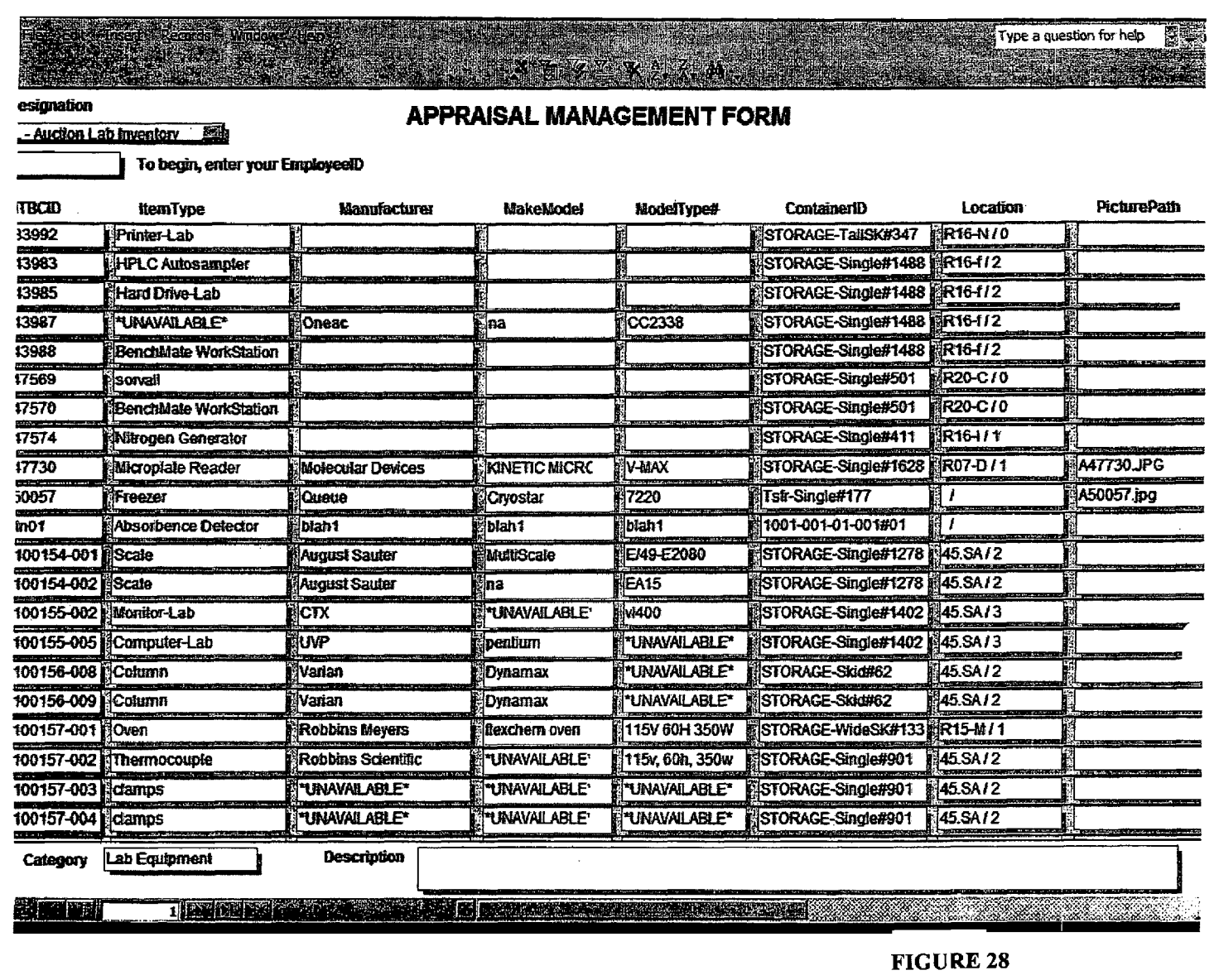

- Auction Lab Inventory

APPRAISAL MANAGEMENT FORM

To begin, enter your EmployeeID

| TBCID | ItemType | Manufacturer | MakeModel | ModelType# | ContainerID | Location | PicturePath |
|---|---|---|---|---|---|---|---|
| 33992 | Printer-Lab | | | | STORAGE-TallSK#347 | R16-N / 0 | |
| 13983 | HPLC Autosampler | | | | STORAGE-Single#1488 | R16-f / 2 | |
| 13985 | Hard Drive-Lab | | | | STORAGE-Single#1488 | R16-f / 2 | |
| 13987 | *UNAVAILABLE* | Oneac | na | CC2338 | STORAGE-Single#1488 | R16-f / 2 | |
| 13988 | BenchMate WorkStation | | | | STORAGE-Single#1488 | R16-f / 2 | |
| 17569 | sorvall | | | | STORAGE-Single#501 | R20-C / 0 | |
| 17570 | BenchMate WorkStation | | | | STORAGE-Single#501 | R20-C / 0 | |
| 17574 | Nitrogen Generator | | | | STORAGE-Single#411 | R16-I / 1 | |
| 17730 | Microplate Reader | Molecular Devices | KINETIC MICRC | V-MAX | STORAGE-Single#1628 | R07-D / 1 | A47730.JPG |
| 50057 | Freezer | Queue | Cryostar | 7220 | Tsfr-Single#177 | / | A50057.jpg |
| in01 | Absorbence Detector | blah1 | blah1 | blah1 | 1001-001-01-001#01 | / | |
| 100154-001 | Scale | August Sauter | MultiScale | E/49-E2080 | STORAGE-Single#1278 | 45.SA / 2 | |
| 100154-002 | Scale | August Sauter | na | EA15 | STORAGE-Single#1278 | 45.SA / 2 | |
| 100155-002 | Monitor-Lab | CTX | *UNAVAILABLE* | vl400 | STORAGE-Single#1402 | 45.SA / 3 | |
| 100155-005 | Computer-Lab | UVP | pentium | *UNAVAILABLE* | STORAGE-Single#1402 | 45.SA / 3 | |
| 100156-008 | Column | Varian | Dynamax | *UNAVAILABLE* | STORAGE-Skid#62 | 45.SA / 2 | |
| 100156-009 | Column | Varian | Dynamax | *UNAVAILABLE* | STORAGE-Skid#62 | 45.SA / 2 | |
| 100157-001 | Oven | Robbins Meyers | flexchem oven | 115V 60H 350W | STORAGE-WideSK#133 | R15-M / 1 | |
| 100157-002 | Thermocouple | Robbins Scientific | *UNAVAILABLE* | 115v, 60h, 350w | STORAGE-Single#901 | 45.SA / 2 | |
| 100157-003 | clamps | *UNAVAILABLE* | *UNAVAILABLE* | *UNAVAILABLE* | STORAGE-Single#901 | 45.SA / 2 | |
| 100157-004 | clamps | *UNAVAILABLE* | *UNAVAILABLE* | *UNAVAILABLE* | STORAGE-Single#901 | 45.SA / 2 | |

Category: Lab Equipment  Description:

Parent Company

- All Subsidiarys and sister companies fall under this name.

FIGURE 56

Upon request send Client Shipping Cart Software developed to keep track of equipment accumulating at the Client site. While in the Truck loading mode the software will automatically mark and count the number of items that are loaded onto the truck

- After receiving the emailed Shipping Cart, the Client will adhere a HTBCID onto each item requiring inventory services
- Inventory equipment as it is loaded into the storage/staging area prior to pick-up by scanning or typing the information for all 4 fields.
- Duplicate HTBCID are not allowed and items counts, delete and save functions are on the desktop for Client use.
- Press View Cart to View all items inventoried. A checkbox will indicate the item was loaded onto the truck.

FIGURE 60

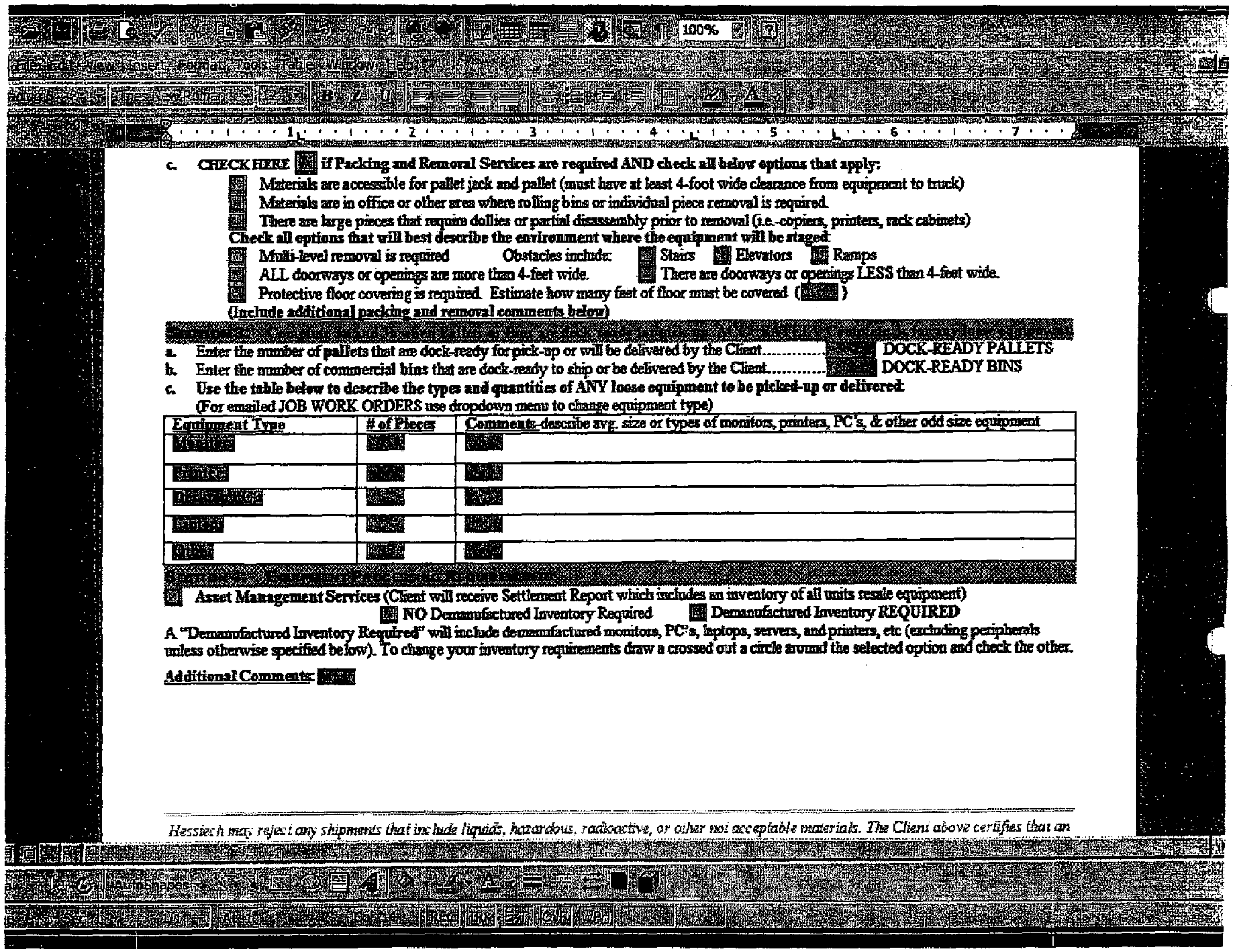

c. CHECK HERE ☐ if Packing and Removal Services are required AND check all below options that apply:

- ☐ Materials are accessible for pallet jack and pallet (must have at least 4-foot wide clearance from equipment to truck)
- ☐ Materials are in office or other area where rolling bins or individual piece removal is required.
- ☐ There are large pieces that require dollies or partial disassembly prior to removal (i.e.-copiers, printers, rack cabinets)

Check all options that will best describe the environment where the equipment will be staged:

- ☐ Multi-level removal is required  Obstacles include: ☐ Stairs ☐ Elevators ☐ Ramps
- ☐ ALL doorways or openings are more than 4-feet wide.  ☐ There are doorways or openings LESS than 4-feet wide.
- ☐ Protective floor covering is required. Estimate how many feet of floor must be covered ( )

(Include additional packing and removal comments below)

a. Enter the number of pallets that are dock-ready for pick-up or will be delivered by the Client............ DOCK-READY PALLETS b. Enter the number of commercial bins that are dock-ready to ship or be delivered by the Client............ DOCK-READY BINS c. Use the table below to describe the types and quantities of ANY loose equipment to be picked-up or delivered:

(For emailed JOB WORK ORDERS use dropdown menu to change equipment type)

| Equipment Type | # of Pieces | Comments-describe avg. size or types of monitors, printers, PC's, & other odd size equipment |
|---|---|---|
| | | |
| | | |
| | | |
| | | |
| | | |

☐ Asset Management Services (Client will receive Settlement Report which includes an inventory of all units resale equipment)

☐ NO Demanufactured Inventory Required ☐ Demanufactured Inventory REQUIRED

A "Demanufactured Inventory Required" will include demanufactured monitors, PC's, laptops, servers, and printers, etc (excluding peripherals unless otherwise specified below). To change your inventory requirements draw a crossed out a circle around the selected option and check the other.

Additional Comments:

*Hessiech may reject any shipments that include liquids, hazardous, radioactive, or other not acceptable materials. The Client above certifies that an*

FIGURE 61

Call Client to confirm receipt and enter Job into System using the Job Information Form

- Complete the Job Scheduling Tab first
  - Record job specific comments that are on JWO and other job specific info.
  - Limit access to Logistics office Staff
  - Differentiate between pallet or loose item shipments from Bins & Dollies Program
- Enter Delivery specific information on the Receiving Tab
  - Limit access to warehouse receiving and logistics office Staff
- Enter time and materials billing information
  - Limit access to Logistics office Staff
  - Enter Bin & Dollies specific information

FIGURE 65

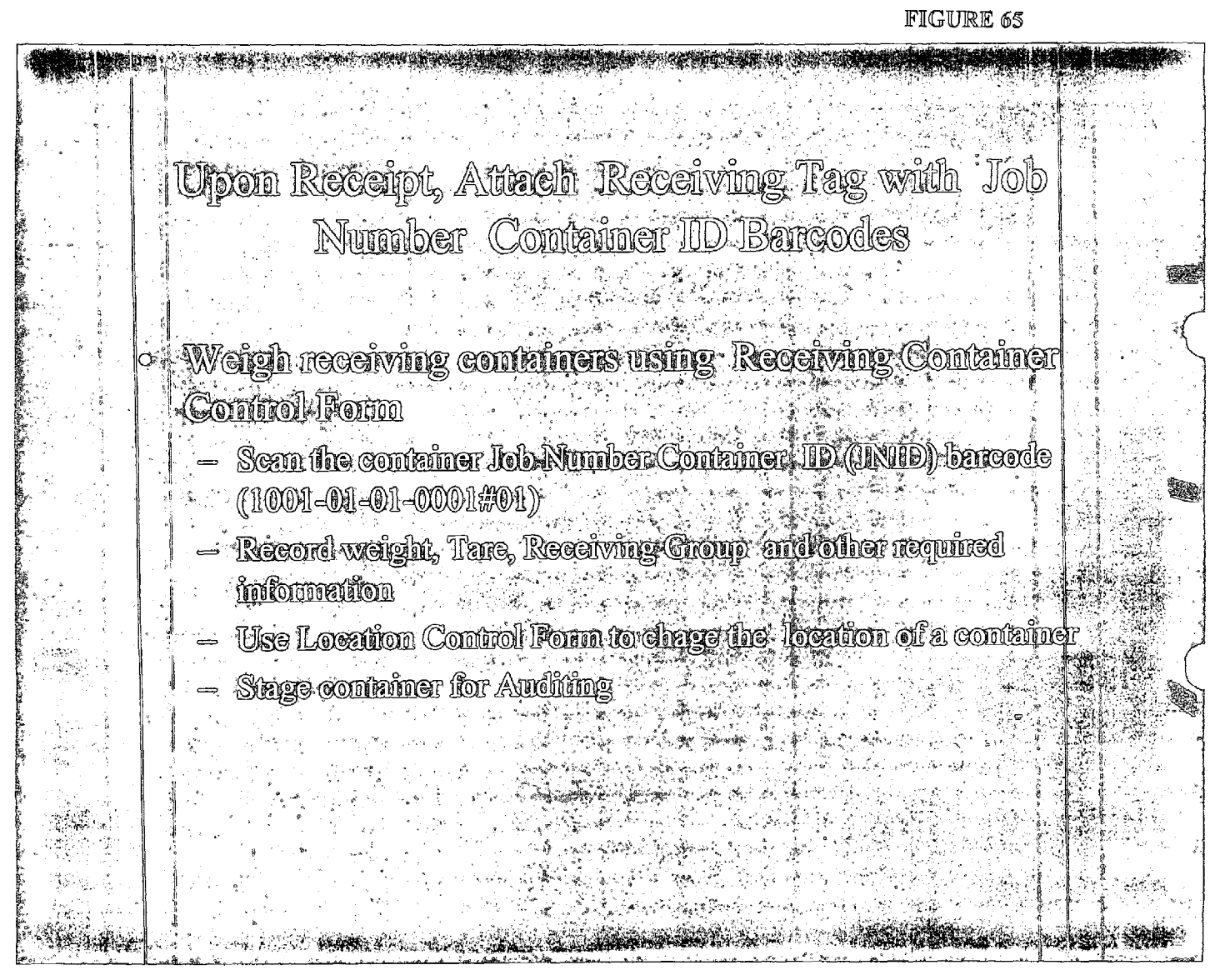

Upon Receipt, Attach Receiving Tag with Job Number Container ID Barcodes

- Weigh receiving containers using Receiving Container Control Form
  - Scan the container Job Number Container ID (JNID) barcode (1001-01-01-0001#01)
  - Record weight, Tare, Receiving Group and other required information
  - Use Location Control Form to chage the location of a container
  - Stage container for Auditing Express Audit Form
HTBCID
Category
Item Type
SourceContainer
Disposition
EmployeeID

FIGURE 72

Use Transfer Container Control Form to create, load, and disposition (Transfer containers are work in progress and are being moved to another work center)

- Process
- Attach 3 Reports
- Materials Handlers are dispatched to move disposition requests

FIGURE 80

Perform remaining auditing steps and move to the Diagnostic Steps tab on the Item Processing Form

- Enter cosmetic and other general comments on teh Visual Inspection tab.
- Revised process: Run data eradication processes first then move on to the DiagnosticTests tab and complete Form.
- Run DiagnosticTests and record or enter required information
- Complete the SystemConfig tab recording unit specifications
- Record hard drive specifications and/or hardware configuration and layout
- Use STAR's software auditing application [redacted] to record registry and license information about the software loaded on the machine just prior to shipment and/or processing
- Set the Disposition on the DiagStatus tab which provide's an overview of the history of the item at Hesstech
  - Assign Disposition
    - Ready for Sale
    - Client Redeploy
    - Storage
    - Etc.
- Place Iten tag on each item processed.

FIGURE 95

Items and Containers are stored in locations created in the Location Maintenance Form

- Facilities are organized by building/site
- Primary locations are floor areas and/or rack/section locations.
- Secondary Locations are numbered floor areas and/or shelving locations within a rack/section
- Location type will be used to red flag any item or containers that are not authorized in the area
- STAR's bar code generator allows you to print location bar codes from a drop down to preserve data integrity. Users also have the option to print and alpha-numeric bar code.

FIGURE 101

The Redeployment Management Form is used to process requests for equipment redeployment or donation by the clients

- The All Inventory tab displays all equipment including all designations and dispositions.
- View the Available for Redeploy tab for equipment that is authorized by the CLient for release
- View the Pending Redeploy tab for equipment that is still on premesis and staged for shipment
- View the Redeployed/Shipped for a list of equipment that was shipped and is no longer on premises.
- On the Available for Redeploy tab use the left column to complete link a set of items to a pick list.
  - Print the Pick List Report and forward to Warehousing for pick/pack
  - Print Packing Report that will remain with container during shipment
  - Update the Redeployment Recipient and Buyer information on the Buyer / Customer Profile
  - Redeployment or Donation Pick List requests will be located using the Redeployment Management Form.

FIGURE 105

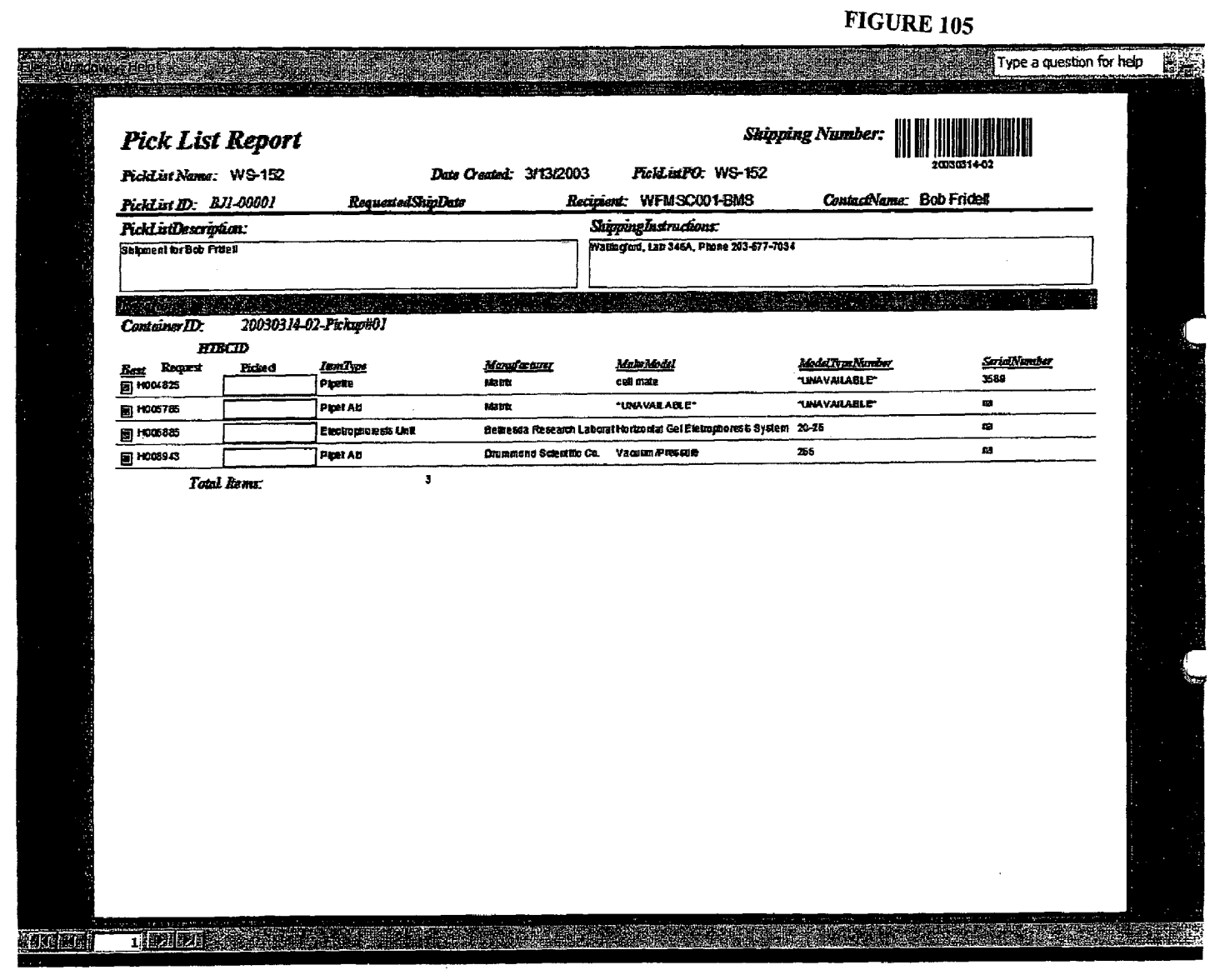

Type a question for help

Pick List Report

Shipping Number: 20030314-02

PickListName: WS-152 Date Created: 3/13/2003 PickListPO: WS-152

PickList ID: BJ1-00001 RequestedShipDate Recipient: WFMSC001-BMS ContactName: Bob Fridell

PickListDescription:
Shipment for Bob Fridell

ShippingInstructions:
Wallingford, Lab 346A, Phone 203-677-7034

ContainerID: 20030314-02-Pickup#01

HIBCID

| Rest | Request | Picked | ItemType | Manufacturer | MakeModel | ModelTypeNumber | SerialNumber |
|---|---|---|---|---|---|---|---|
| | H004825 | | Pipette | Matrix | cell mate | "UNAVAILABLE" | 3589 |
| | H005785 | | Pipet Aid | Matrix | "UNAVAILABLE" | "UNAVAILABLE" | na |
| | H006885 | | Electrophoresis Unit | Bethesda Research Laborat | Horizontal Gel Eletrophoresis System | 20-25 | na |
| | H008943 | | Pipet Aid | Drummond Scientific Co. | Vacuum/Pressure | 255 | na |

Total Items: 3

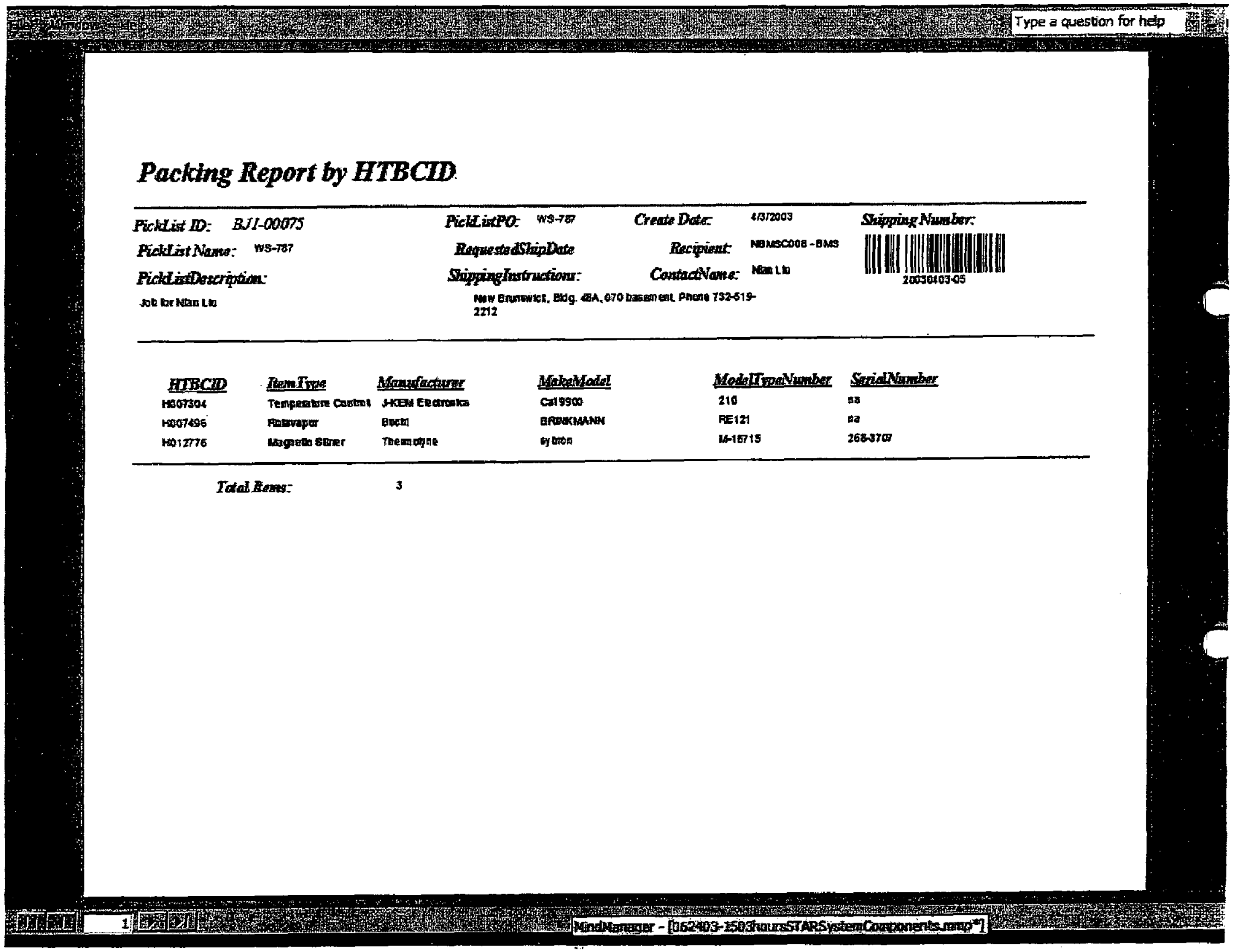

Packing Report by HTBCID

PickList ID: BJ1-00075
PickList Name: WS-787
PickListDescription:
Job for Nian Liu PickListPO: WS-787
RequestedShipDate
ShippingInstructions:
New Brunswick, Bldg. 48A, 070 basement, Phone 732-519-2212

Create Date: 4/3/2003
Recipient: NBMSC008 - BMS
ContactName: Nian Liu

Shipping Number:
20030403-05

| HTBCID | ItemType | Manufacturer | MakeModel | ModelTypeNumber | SerialNumber |
|---|---|---|---|---|---|
| H007304 | Temperature Control | J-KEM Electronics | Cal9300 | 210 | na |
| H007496 | Rotavapor | Buchi | BRINKMANN | RE121 | na |
| H012776 | Magnetic Stirrer | Thermolyne | sybron | M-16715 | 268-3707 |

Total Items: 3

FIGURE 108

The Job Status Form is used to keep track of Jobs in progress. Each record on the list is a container

- Identifies received Job Containers that need to be audited
- Shows the location and number of items remaining unprocessed at any point in time
- The Pallet Space report is used to calculate the number of storage days the client has accrued per container. The logic is coded so the client is only charged for the container once no matter how many of their items are in the container.
- The disposition report shows the reprted disposition of each piece for any job
- The Job Status Report idenifies when the processing is complete and Jobs are ready for appraisal
- The Job Number Container ID (JN / CID) report shows the locations of all containers with items associated with a particular job
- Remaining location report buttons are self explanitory

FIGURE 110

The Shipping Information Form is used to set up a shipment

- Buyer information must be present or keyed into the Buyer / Customer Profile form
- This Form is linked to the Shipping Container Control form so that the selected criteria is automatic between forms
- A Shipping Summary and Shipping Report is printed and remains with shipment

FIGURE 113

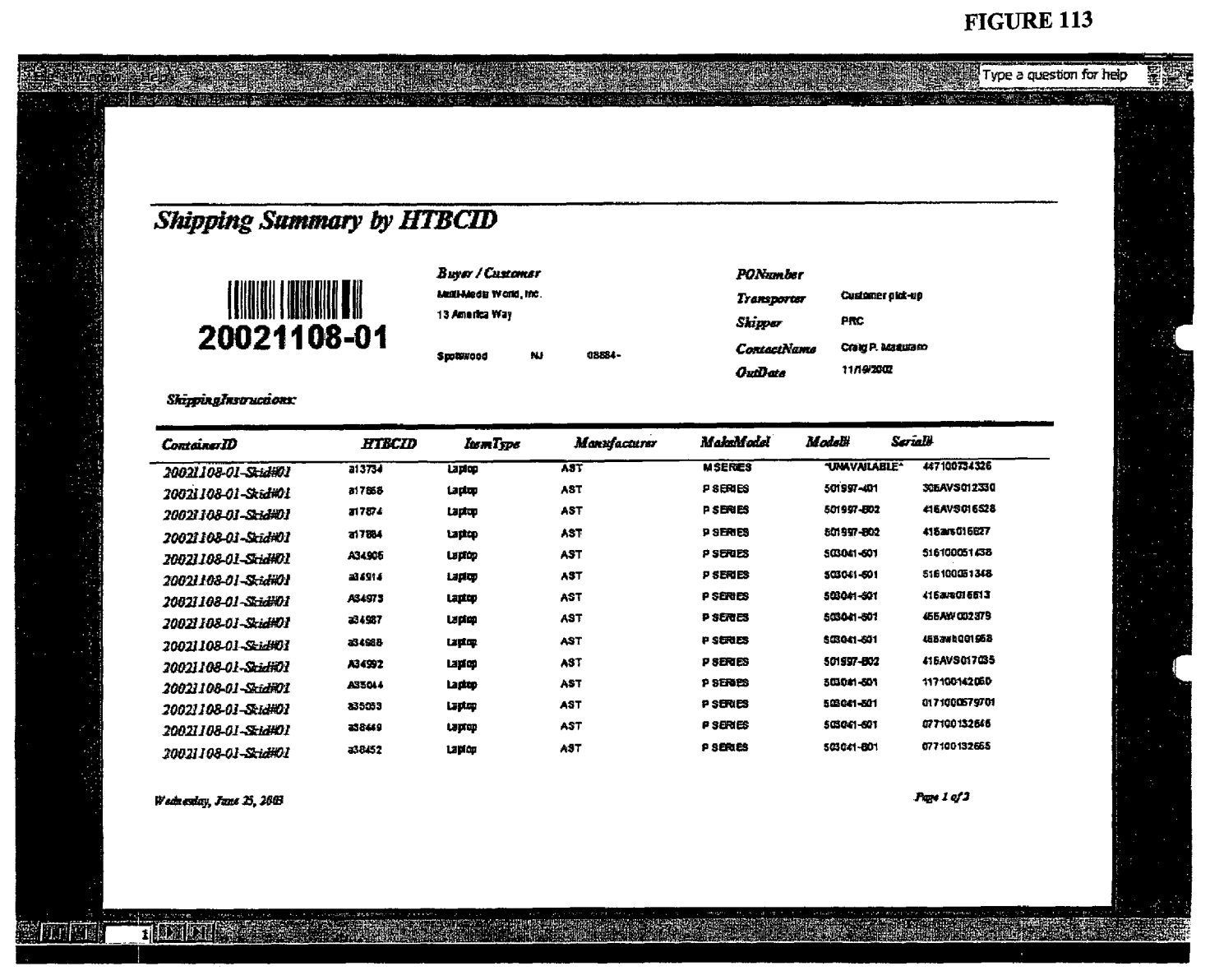

Type a question for help

Shipping Summary by HTBCID

20021108-01

*Buyer / Customer*
Multi-Media World, Inc.
13 America Way
Spotswood NJ 08884-

*PONumber*
*Transporter* Customer pick-up
*Shipper* PRC
*ContactName* Craig P. Masuramo
*OutDate* 11/19/2002

*ShippingInstructions:*

| ContainerID | HTBCID | ItemType | Manufacturer | MakeModel | Model# | Serial# |
|---|---|---|---|---|---|---|
| 20021108-01-Skid#01 | a13734 | Laptop | AST | M SERIES | "UNAVAILABLE" | 447100734326 |
| 20021108-01-Skid#01 | a17858 | Laptop | AST | P SERIES | 501997-401 | 306AVS012330 |
| 20021108-01-Skid#01 | a17874 | Laptop | AST | P SERIES | 501997-B02 | 416AVS016528 |
| 20021108-01-Skid#01 | a17884 | Laptop | AST | P SERIES | 501997-B02 | 416ars016527 |
| 20021108-01-Skid#01 | A34905 | Laptop | AST | P SERIES | 503041-601 | 516100051438 |
| 20021108-01-Skid#01 | a34914 | Laptop | AST | P SERIES | 503041-601 | 516100051348 |
| 20021108-01-Skid#01 | A34973 | Laptop | AST | P SERIES | 503041-601 | 416ars016613 |
| 20021108-01-Skid#01 | a34987 | Laptop | AST | P SERIES | 503041-601 | 455AW002379 |
| 20021108-01-Skid#01 | a34988 | Laptop | AST | P SERIES | 503041-601 | 458awh001958 |
| 20021108-01-Skid#01 | A34992 | Laptop | AST | P SERIES | 501997-B02 | 416AVS017035 |
| 20021108-01-Skid#01 | A35044 | Laptop | AST | P SERIES | 503041-601 | 117100142050 |
| 20021108-01-Skid#01 | a35053 | Laptop | AST | P SERIES | 503041-601 | 0171000579701 |
| 20021108-01-Skid#01 | a38449 | Laptop | AST | P SERIES | 503041-601 | 077100132646 |
| 20021108-01-Skid#01 | a38452 | Laptop | AST | P SERIES | 503041-601 | 077100132665 |

*Wednesday, June 25, 2003* *Page 1 of 2*

Figure 114:
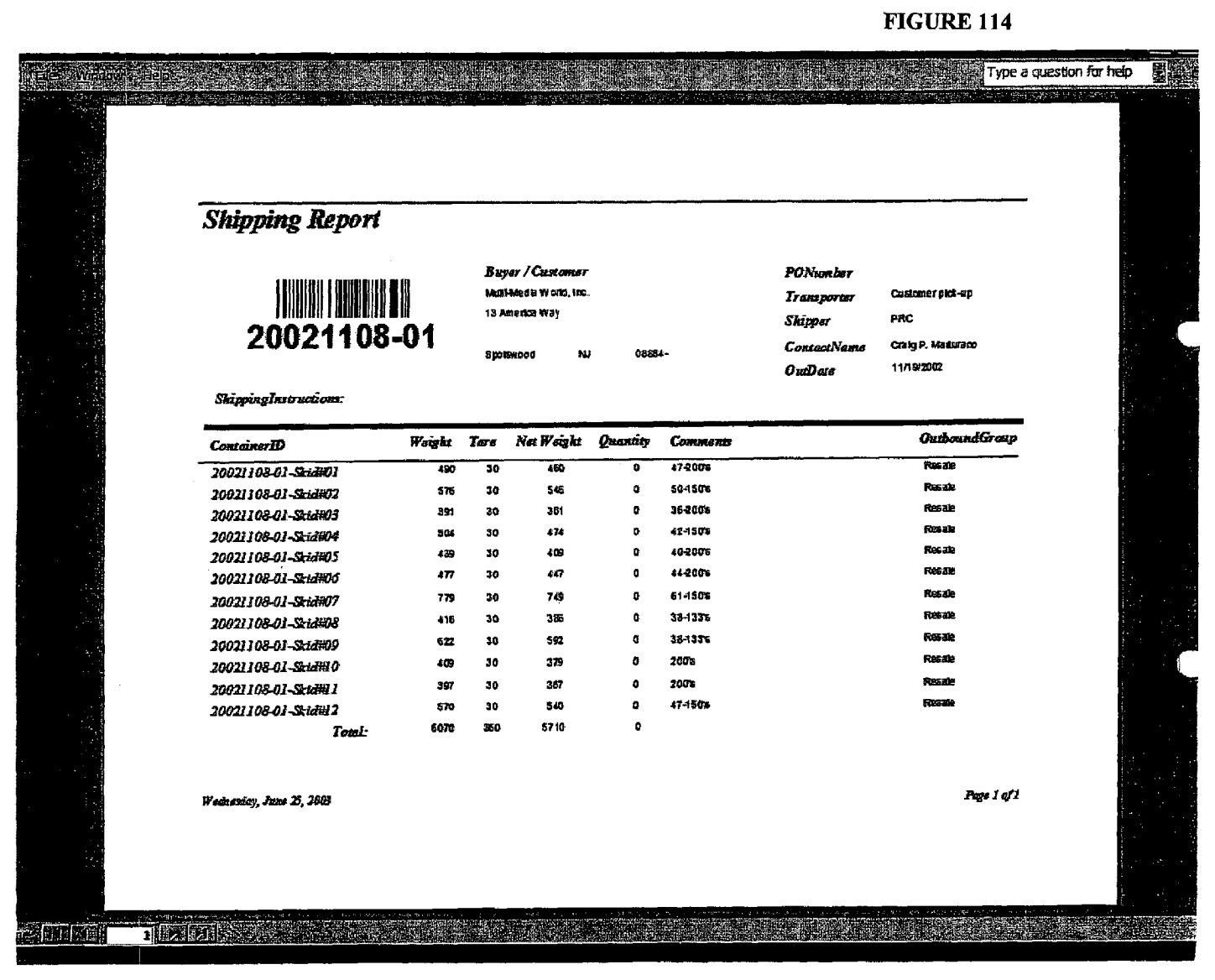

Type a question for help

Shipping Report 20021108-01

Buyer / Customer
MultiMedia World, Inc.
13 America Way
Spotswood NJ 08884-

PONumber
Transporter Customer pick-up
Shipper PRC
ContactName Craig P. Maturaco
OutDate 11/19/2002

ShippingInstructions:

| ContainerID | Weight | Tare | Net Weight | Quantity | Comments | OutboundGroup |
|---|---|---|---|---|---|---|
| 20021108-01-Skid#01 | 490 | 30 | 460 | 0 | 47-200's | Resale |
| 20021108-01-Skid#02 | 576 | 30 | 546 | 0 | 50-150's | Resale |
| 20021108-01-Skid#03 | 391 | 30 | 361 | 0 | 36-200's | Resale |
| 20021108-01-Skid#04 | 504 | 30 | 474 | 0 | 42-150's | Resale |
| 20021108-01-Skid#05 | 439 | 30 | 409 | 0 | 40-200's | Resale |
| 20021108-01-Skid#06 | 477 | 30 | 447 | 0 | 44-200's | Resale |
| 20021108-01-Skid#07 | 779 | 30 | 749 | 0 | 61-150's | Resale |
| 20021108-01-Skid#08 | 416 | 30 | 386 | 0 | 33-133's | Resale |
| 20021108-01-Skid#09 | 622 | 30 | 592 | 0 | 38-133's | Resale |
| 20021108-01-Skid#10 | 409 | 30 | 379 | 0 | 200's | Resale |
| 20021108-01-Skid#11 | 397 | 30 | 367 | 0 | 200's | Resale |
| 20021108-01-Skid#12 | 570 | 30 | 540 | 0 | 47-150's | Resale |
| Total: | 6070 | 360 | 5710 | 0 | | |

Wednesday, June 25, 2003

Page 1 of 1

Hesstech's WebSTAR Client Access offers several account management tools, reports and a summary of services. This is available 24/7 and worldwide via the internet.

- View All Inventory link
- Redeploy Requests link will open the interface designed to display only equipment the Client has authorized to be redeployed. The software will prohibit two people from requesting the same item.
- The Viewing Settlement Reports link will display all equipment that was authoirzed for resale.
- Job Summary Reports will include a multitude of Job Number (per shipment) printable electronic reports.
- Program Summary Reports will be posted each quarter. These reports will include a list of services, total charges for processing & transportation expenses, and total resale credits applied.

FIGURE 117

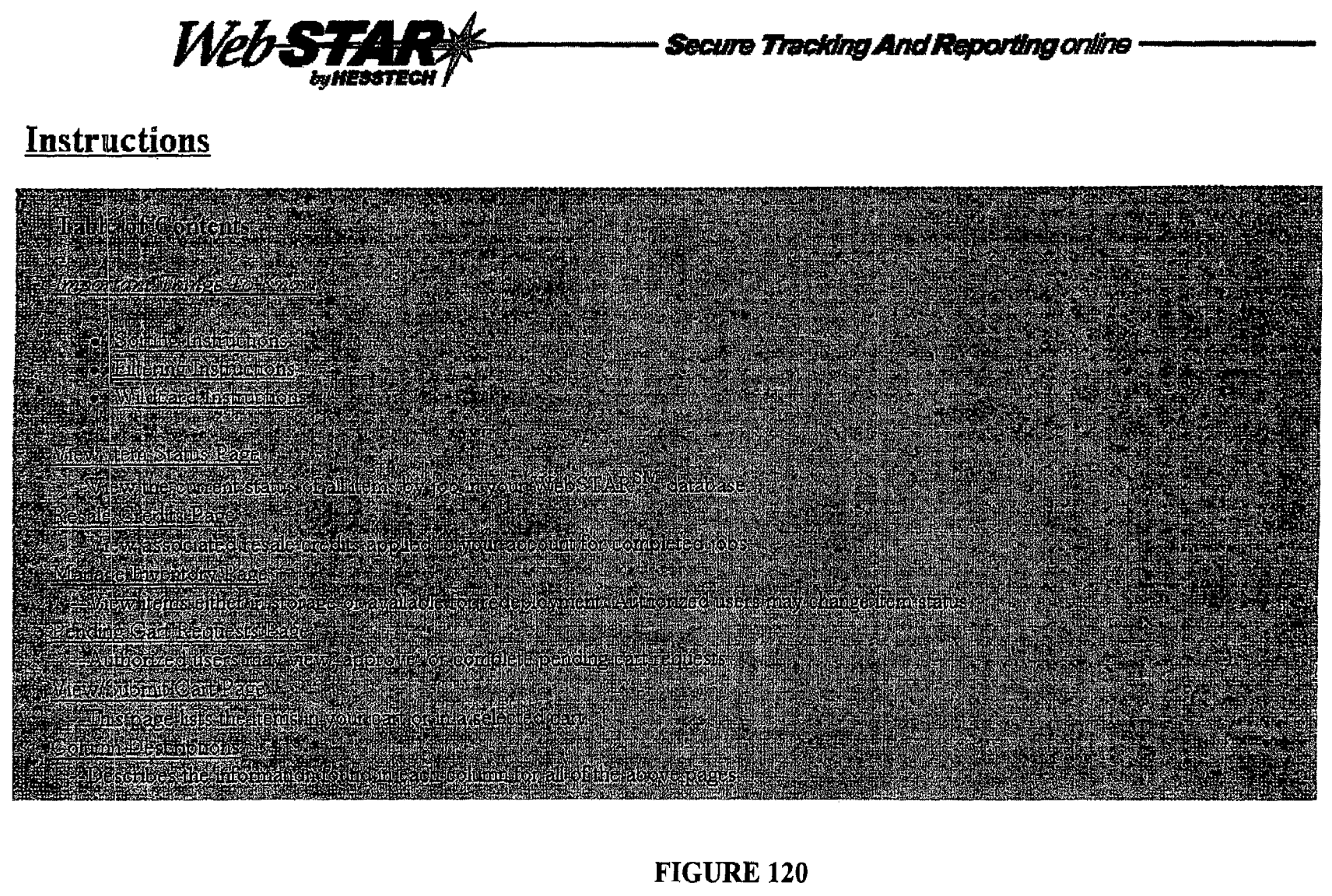

WebSTAR by HESSTECH — Secure Tracking And Reporting online

Instructions

Table of Contents

*Important Things to Know*

- Sorting Instructions
- Filtering Instructions
- Wildcard Instructions

View Item Status Page
- View the current status of all items by job in your WebSTAR℠ database Resale Credits Page
- View associated resale credits applied to your account for completed jobs Manage Inventory Page
- View items either in storage or available for redeployment. Authorized users may change item status Pending Cart Requests Page
- Authorized users may view, approve, or complete pending cart requests View/Submit Cart Page
- This page lists the items in your cart or in a selected cart Column Descriptions
- Describes the information found in each column for all of the above pages

FIGURE 120

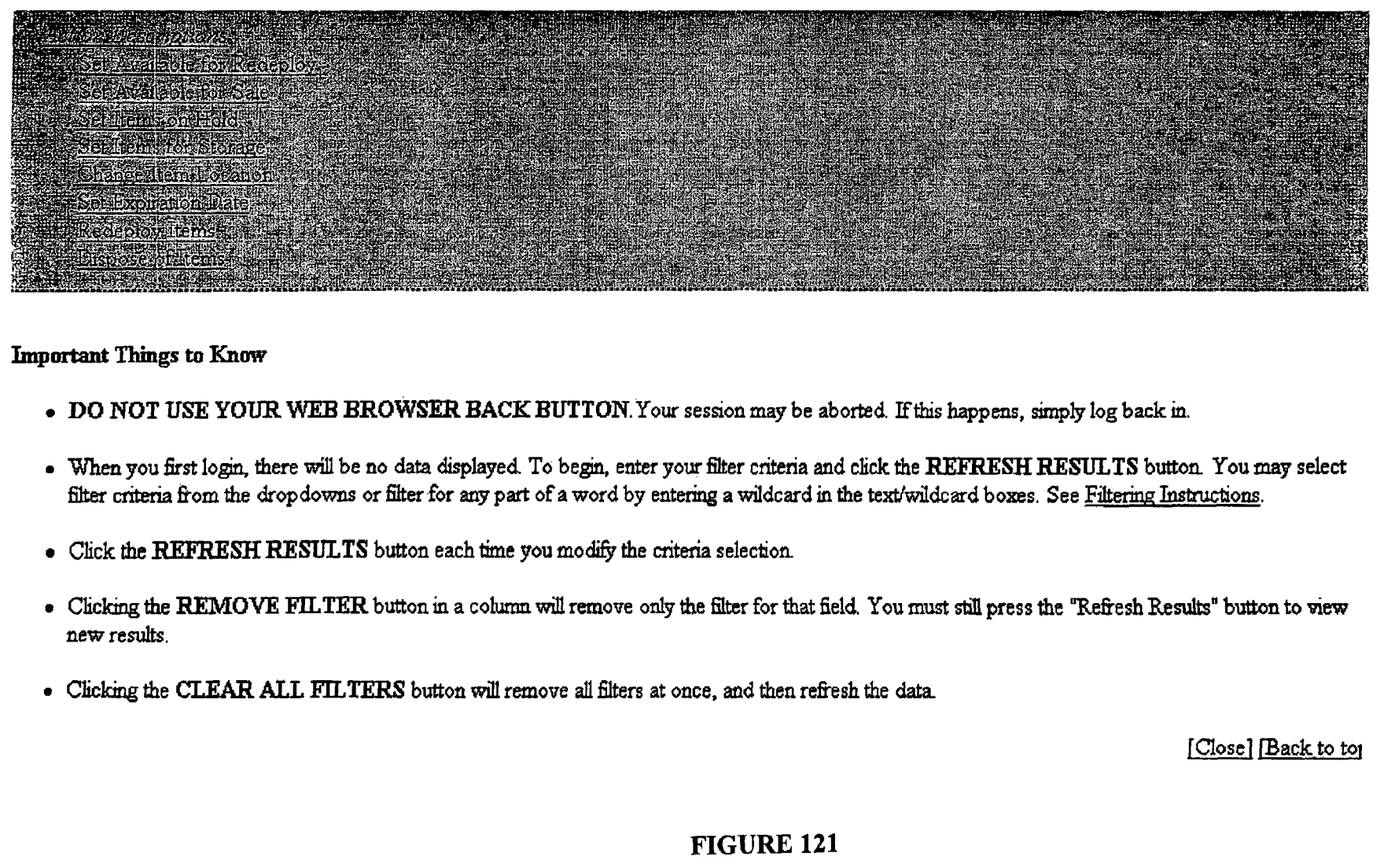

[illegible]
Set Available for Redeploy
Set Available for Sale
Set Items on Hold
Set Items for Storage
Change Item Location
Set Expiration Date
Redeploy Items
Dispose of Items

Important Things to Know

- DO NOT USE YOUR WEB BROWSER BACK BUTTON. Your session may be aborted. If this happens, simply log back in.
- When you first login, there will be no data displayed. To begin, enter your filter criteria and click the REFRESH RESULTS button. You may select filter criteria from the dropdowns or filter for any part of a word by entering a wildcard in the text/wildcard boxes. See Filtering Instructions.
- Click the REFRESH RESULTS button each time you modify the criteria selection.
- Clicking the REMOVE FILTER button in a column will remove only the filter for that field. You must still press the "Refresh Results" button to view new results.
- Clicking the CLEAR ALL FILTERS button will remove all filters at once, and then refresh the data.

[Close] [Back to to

FIGURE 121

Sorting Instructions

- To sort the data in any column, click the column title.
- Each subsequent click will alternate the sort from A to Z, then Z to A.

[Close] [Back to top]

Filtering Instructions

- You may specify filter criteria for the data by selecting from the dropdown list in each column, or by typing text with or without wildcard characters in the filter box below each dropdown.
- To apply the filter, click the "Refresh Results" button.
- You may clear a filter in one or more columns, by pressing the "Remove Filter" button in the selected column(s), and then clicking the "Refresh Results" button.
- To clear all filter criteria, click the "Clear All Filters" button, which will remove all filters at once, and refresh the data.
- The dropdown boxes are "clairvoyant". If you type the first letter of the entry it will automatically position to the first entry in the dropdown list that starts with that letter. If you click the same letter again, it will position to the next entry in the dropdown list that starts with that letter, etc.

[Close] [Back to top]

FIGURE 122

Wildcard Instructions

- Wildcard characters are "*" and "?".

- Use "?" to specify any single character.

- Use "*" to specify a group of characters.

- *Example #1:* To search for an Item Type containing the word "pump" you would specify: "*pump*"
  The returned results might include "Magnetic Pumps" or "Pump Cleaner" or "Industrial Pumping Motor"

- *Example #2:* To search for a Job Number for a specific group at any site you would specify: "1037-???-02*"
  The returned results might include "1037-001-02-001" or "1037-023-02-009"

[Close] [Back to top]

View Item Status Page

- Use this page to view the current status of all items in your WebSTAR$^{SM}$ Database. You may use the filters at the top of each column to search by specific criteria (i.e. job number, serial number, asset tag,item type, etc.) or to find items of interest.
- Shipping cart exception reports are also accessed via this page.
- You may also sort the items by a desired column by clicking the column heading.

[Close] [Back to top]

FIGURE 123

Resale Credits Page

- Use this page to view completed jobs and associated resale credits applied to your account.
- Select "Resale Credit Report" for Premium Asset Management jobs. Select "Auction Credit Report" for Auction Programs.

[Close] [Back to top]

Manage Inventory Page

- Use this page to view items available for Client Management
- Authorized Users can make requests and change Item Status.
- Though View Only users cannot directly manage items, they may export inventory lists to a Microsoft Excel format which they can modify and send to their Inventory Request Approval Contact
- Authorized Users can select items to be added to a Cart by clicking the checkbox in the "Select Item" column, and then clicking the "Add Selected Items to Cart" button.
- To view the items in your Cart, click the "View Item Cart" link.

[Close] [Back to top]

Pending Cart Requests Page

- Use this page to view the status of pending Carts.
- If you have the necessary permissions you may Approve Carts or set them to Complete.
- Select Cart ID to view items in Cart, to approve Carts, or to set Carts to Complete.

[Close] [Back to top]

FIGURE 124

View/Submit Cart Page

- This page lists the items in your cart or in a selected cart.
- To remove an item from the Cart, check the checkbox in the Remove column and the click the "Click here to remove all checked items" button.
- To submit the Cart, select and action from the dropdown and fill in the required fields necessary to process the request.
- You may approve the Cart by clicking the "Click here to Approve Request" button.
- If you have approval permission, your own carts will be approved automatically.
- You may set the cart to Complete by clicking the "Click here to Complete Request" button.
- You may also add a comment for each item that may be viewed by the person processing the request.

[Close] [Back to top]

Column Descriptions

- CLASS
  This is the equipment Class. To narrow your search choose IT Equipment, Lab Equipment, or Other.

- ITEM#
  This is the Hesstech assigned tracking number.

- JOB#
  This is the Hesstech assigned Job Number given to a client to be associated with a group of items.
  The Job Number is in the format of: <Client#> - <Site> - <Group> - <Job Counter>
  NOTE: Client# is the global corporate account number; Site is a number assigned by Hesstech for each client location; Group is a number assigned by Hesstech for a cost center, division, or purchase order number; and Job Counter is the number of jobs per group at any single site.

FIGURE 125

- DATE AUDITED
  This is the date the item was first entered into your WebSTAR[SM] Database.

- ITEM STATUS
  This is the current Status of the item.
  < li>ITEM CATEGORY
  This is the assigned Category of the item.

- ITEM TYPE
  This is the assigned Equipment Type of the item.

- MANUFACTURER
  This is the Manufacturer of the item, if available.

- MAKE
  This is the Make of the item, if available. This is typically displayed on the front side of a unit.

- MODEL NUMBER
  This is the Model Type Number of the item, if available. This is typically displayed on the back side of a unit.

- TEST RESULT
  This is the Test Result for the item, if it has been tested. Click the Legend link for more information.

- COSMETIC GRADE
  This is the Cosmetic Grade for the item, if it has been inspected. Click the Legend link for more information.

- PROBLEM CODES
  These are the Problem Codes representing problems with the item, if it has been tested. Click the Legend link for more information.

FIGURE 126

- SERIAL NUMBER
  This is the Serial Number of the item.
  < li>ASSET TAG
  This is the client assigned Asset Tag number of the item.

- CLIENT SITE LOCATION
  If the item is located at the Client's Site, these fields indicate the client assigned location of the item.

- CONTACT
  This is the last know client contact associated with the item, if applicable.

- EXPIRATION DATE
  After this date, the item will no longer be available on the View and Redeploy Inventory page.

- CART ID
  This is the CartID associated with a Cart containing items that have an action request pending.

- REQUESTOR
  This is the name of the person who created the Cart.

- EMAIL ADDRESS
  This is the email address of the person who created the Cart.

- PHONE
  This is the phone number of the person who created the Cart.

- ACTION
  This is the requested action associated with the Cart.

FIGURE 127

- CART DATE
  This is date when the Cart's status was last changed.

- SUBMITTED
  If this field = 1, then the Cart has been submitted.

- APPROVED
  If this field = 1, then the Cart has been approved.

[Close] [Back to top]

Action Descriptions

Set Available for Redeploy

- Requesting this Action will cause the Item Status for the items in the Cart to be set to "RR - Available for Redeploy".
- If you have Approval permission, your request will be processed immediately upon submission, otherwise, it will not be processed until approved by your Approver.

[Close] [Back to top]

Set Available for Sale

- Requesting this Action will cause the Item Status for the items in the Cart to be set to "RS - Available for Sale".
- If you have Approval permission, your request will be processed immediately upon submission, otherwise, it will not be processed until approved by your Approver.

[Close] [Back to top]

FIGURE 128

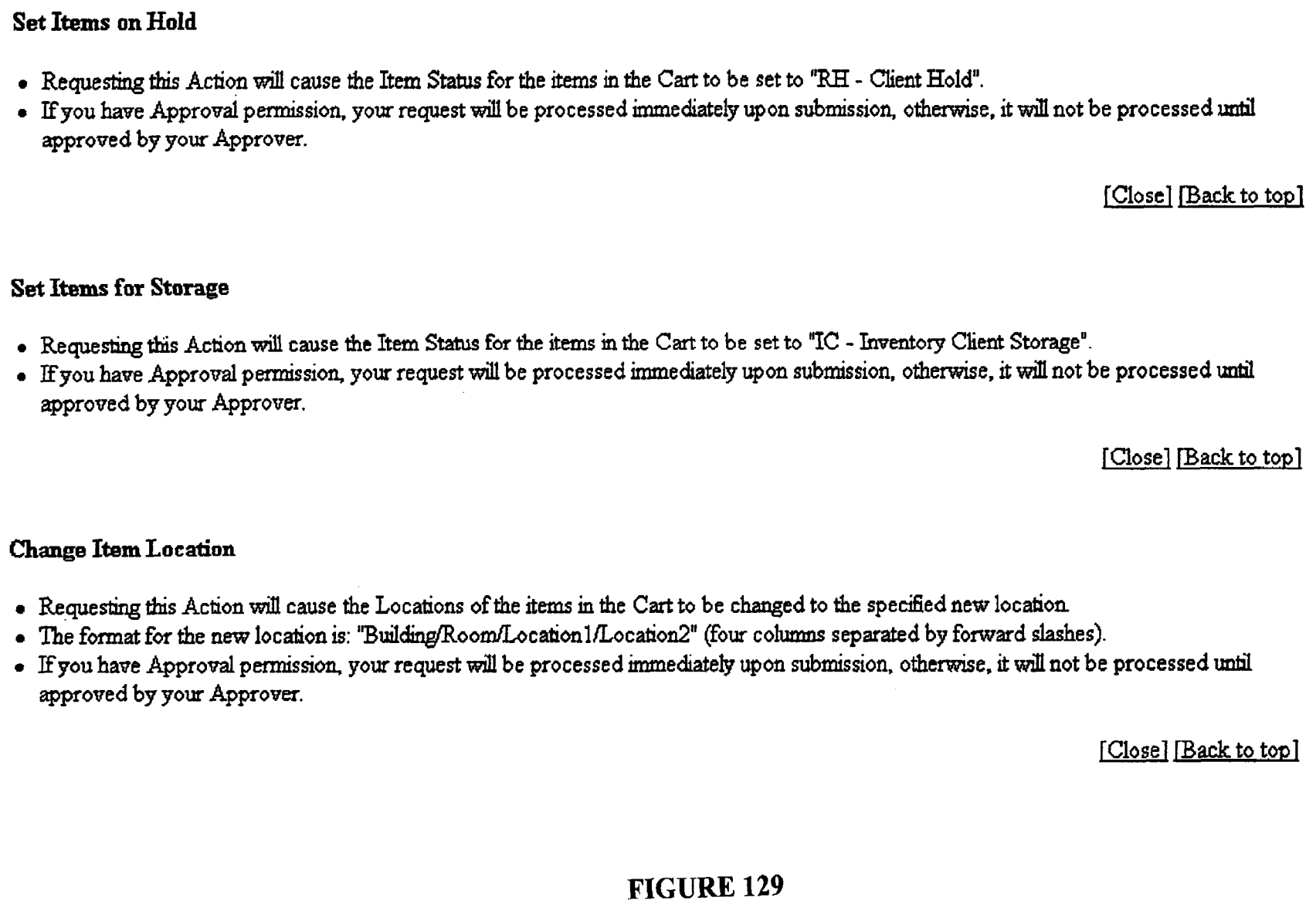

Set Items on Hold

- Requesting this Action will cause the Item Status for the items in the Cart to be set to "RH - Client Hold".
- If you have Approval permission, your request will be processed immediately upon submission, otherwise, it will not be processed until approved by your Approver.

[Close] [Back to top]

Set Items for Storage

- Requesting this Action will cause the Item Status for the items in the Cart to be set to "IC - Inventory Client Storage".
- If you have Approval permission, your request will be processed immediately upon submission, otherwise, it will not be processed until approved by your Approver.

[Close] [Back to top]

Change Item Location

- Requesting this Action will cause the Locations of the items in the Cart to be changed to the specified new location.
- The format for the new location is: "Building/Room/Location1/Location2" (four columns separated by forward slashes).
- If you have Approval permission, your request will be processed immediately upon submission, otherwise, it will not be processed until approved by your Approver.

[Close] [Back to top]

FIGURE 129

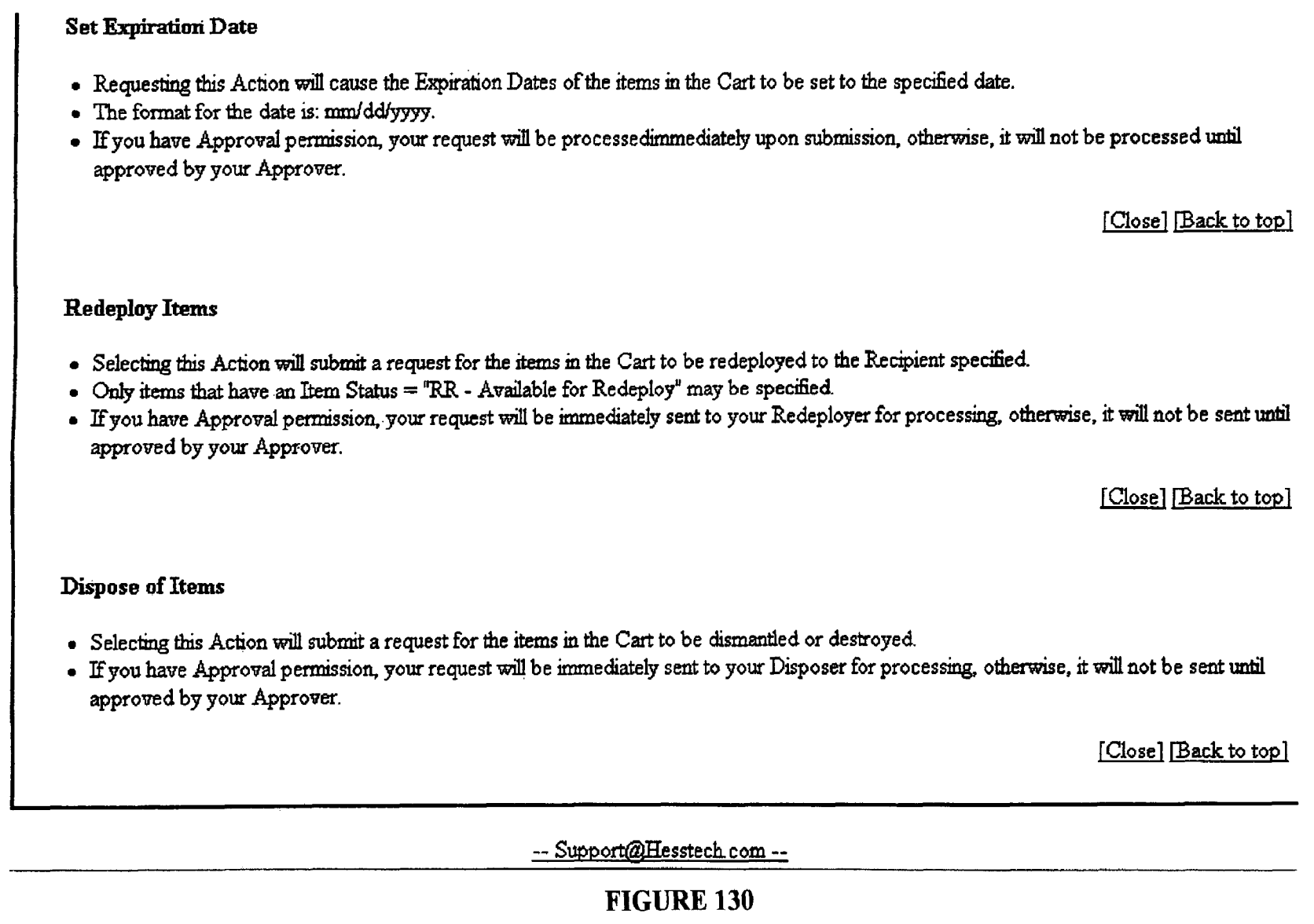

Set Expiration Date

- Requesting this Action will cause the Expiration Dates of the items in the Cart to be set to the specified date.
- The format for the date is: mm/dd/yyyy.
- If you have Approval permission, your request will be processedimmediately upon submission, otherwise, it will not be processed until approved by your Approver.

[Close] [Back to top]

Redeploy Items

- Selecting this Action will submit a request for the items in the Cart to be redeployed to the Recipient specified.
- Only items that have an Item Status = "RR - Available for Redeploy" may be specified.
- If you have Approval permission, your request will be immediately sent to your Redeployer for processing, otherwise, it will not be sent until approved by your Approver.

[Close] [Back to top]

Dispose of Items

- Selecting this Action will submit a request for the items in the Cart to be dismantled or destroyed.
- If you have Approval permission, your request will be immediately sent to your Disposer for processing, otherwise, it will not be sent until approved by your Approver.

[Close] [Back to top]

-- Support@Hesstech.com --

FIGURE 130

View All Inventory link

- General instructions outline the key features of WebSTAR
- The View Inventory option displays all equipment processed to date in the system. All dispositions are listed.
- The Legend will describe Test results, cosmetic grading, and Problem Codes.
- The View Item Counts link will display the number of items by Item Type based on the criteria selected
- Select the Print Report link to print a the list of equipment based on the criteria selected

FIGURE 131

View Item Status Page

View Item Status Page

View Item Status Page

The Manage Inventory page

The Manage Inventory page

The Manage Inventory page

The Manage Inventory page

The Item Cart

The Item Cart

The Pending Carts Page

Sales Management Form - Pick list functionality is available on all tabs of this Form

- Go to the Available for Appraisal tab when notified a Job is complete. Enter Appraisal Price/Purchase Amount per Job, based on Blue Book minus any deductions for B grade or non functional items
  - Modify the Designations of equipment that will be exclusive to one resale outlet
- Already developed and not shown is a Pricing tab next to the Item Detail tab. The Pricing tab will allow user to view historical pricing information and/or enter a current blue book price.
- The Available for Sale tab shows all items Staged and ready for sale.
  - Pick Lists are created based customer orders
  - Pick List Reports are issued for each order and sent to Warehousing for pick/pack
  - Packing Reports are printed for each container and remain with shipment
- Pending Sale tab shows all equipment where a PO has been issued
- The Sold/Shipped tab will indicate which items have been picked up and are no longer on the premesis

FIGURE 146

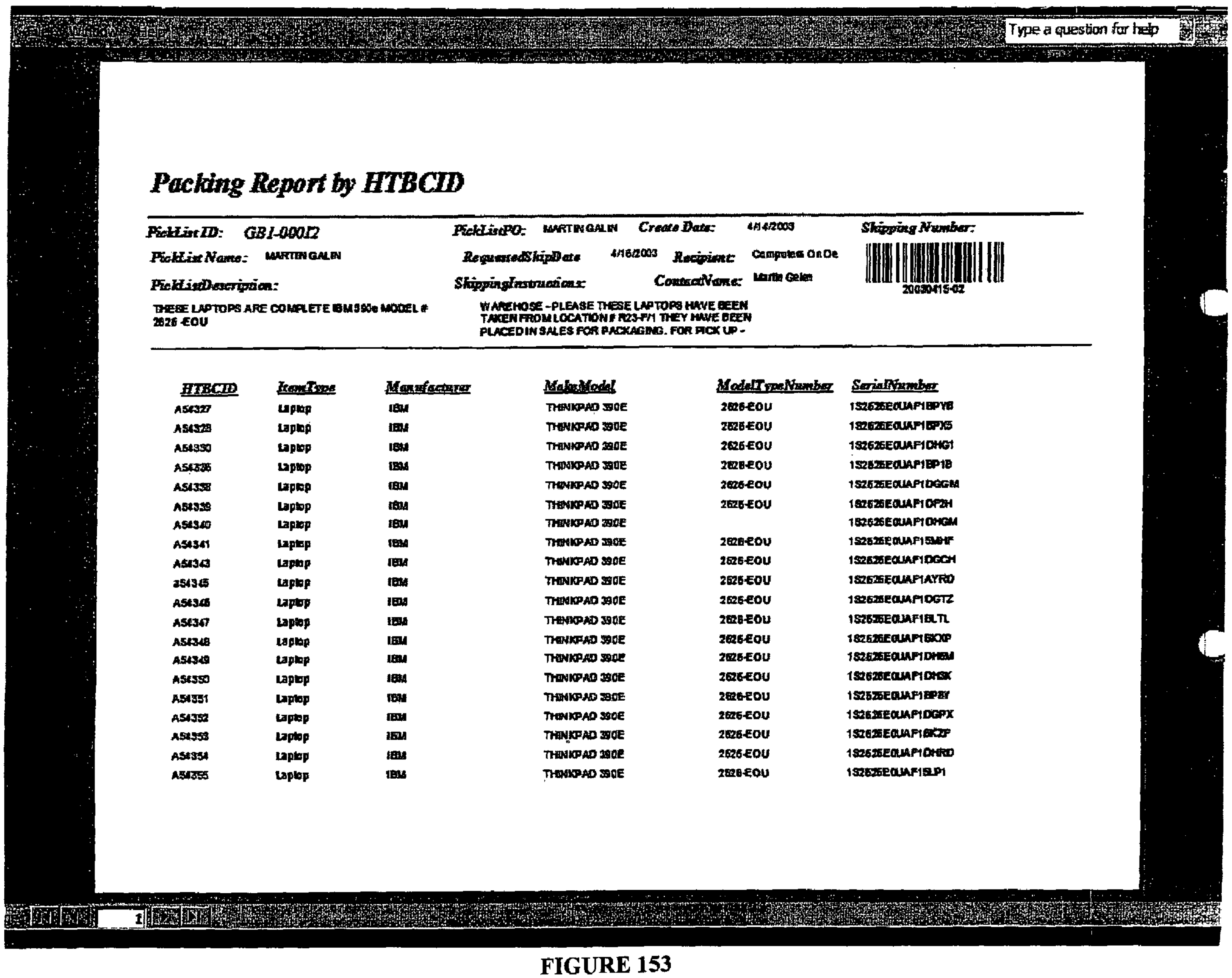

Type a question for help

Packing Report by HTBCID

PickList ID: GB1-00012

PickListPO: MARTIN GALIN Create Date: 4/14/2003 Shipping Number: 20030415-02

PickList Name: MARTIN GALIN

RequestedShipDate 4/16/2003 Recipient: Computers On De

PickListDescription:

THESE LAPTOPS ARE COMPLETE IBM390e MODEL # 2626-EOU

ShippingInstructions:

WAREHOSE - PLEASE THESE LAPTOPS HAVE BEEN TAKEN FROM LOCATION # R23-F/1 THEY HAVE BEEN PLACED IN SALES FOR PACKAGING. FOR PICK UP -

ContactName: Martin Galen

| HTBCID | ItemType | Manufacturer | MakeModel | ModelTypeNumber | SerialNumber |
|---|---|---|---|---|---|
| A54327 | Laptop | IBM | THINKPAD 390E | 2626-EOU | 1S2626E0UAP1BPYB |
| A54328 | Laptop | IBM | THINKPAD 390E | 2626-EOU | 1S2626E0UAP1BPX5 |
| A54330 | Laptop | IBM | THINKPAD 390E | 2626-EOU | 1S2626E0UAP1DHG1 |
| A54336 | Laptop | IBM | THINKPAD 390E | 2626-EOU | 1S2626E0UAP1BP1B |
| A54338 | Laptop | IBM | THINKPAD 390E | 2626-EOU | 1S2626E0UAP1DGGM |
| A54339 | Laptop | IBM | THINKPAD 390E | 2626-EOU | 1S2626E0UAP1DP2H |
| A54340 | Laptop | IBM | THINKPAD 390E | | 1S2626E0UAP1DHGM |
| A54341 | Laptop | IBM | THINKPAD 390E | 2626-EOU | 1S2626E0UAP15MHF |
| A54343 | Laptop | IBM | THINKPAD 390E | 2626-EOU | 1S2626E0UAP1DGCH |
| a54345 | Laptop | IBM | THINKPAD 390E | 2626-EOU | 1S2626E0UAP1AYRD |
| A54346 | Laptop | IBM | THINKPAD 390E | 2626-EOU | 1S2626E0UAP1DGTZ |
| A54347 | Laptop | IBM | THINKPAD 390E | 2626-EOU | 1S2626E0UAP1BLTL |
| A54348 | Laptop | IBM | THINKFAD 390E | 2626-EOU | 1S2626E0UAP1BXP |
| A54349 | Laptop | IBM | THINKPAD 390E | 2626-EOU | 1S2626E0UAP1DHEM |
| A54350 | Laptop | IBM | THINKPAD 390E | 2626-EOU | 1S2626E0UAP1DHSK |
| A54351 | Laptop | IBM | THINKPAD 390E | 2626-EOU | 1S2626E0UAP1BP8Y |
| A54352 | Laptop | IBM | THINKPAD 390E | 2626-EOU | 1S2626E0UAP1DGPX |
| A54353 | Laptop | IBM | THINKPAD 390E | 2626-EOU | 1S2626E0UAP1BKZP |
| A54354 | Laptop | IBM | THINKPAD 390E | 2626-EOU | 1S2626E0UAP1DHRD |
| A54355 | Laptop | IBM | THINKPAD 390E | 2626-EOU | 1S2626E0UAP1BLP1 |

Use the Ecommerce Management Form to set the designation of the items to be one of the resale outletst within Product Resale Company (PRC). PRC will ovesee all ecommmerce sales

- Mr2ndHand is used for all Ebay auction sales and he has a proud 3yr history with more than 5000 unique sales to date, 3300+ positive feedbacks and a 0.04 negative feedback ratio
- ITequipmentResale.com is the primary outlet for all IT related equipment. The ITequipment Resale.com inventory is setup in STAR and can be modified in the Ecommerce Management Form. Items will be sold by the piece and also by the smaller custom lot.
- LabequipmentResale.com is available for Clients or Hesstech to post items up for sale.
  - Hesstech developed MyCart to provide buyers/bidders with a convenient way to scan, view unit information, and select items they wish to bid on or purchase
- PRCauctions.com is a very flexible auction platform to be used for small or large volume sales. Auctions can be Private or Public. Private auctions will require registration and prequalifying information
  - There are two categories of auctions: (1) Open Auctions where the current bid is posted and (2) a Sealed Auction where the current bid is not visible
  - There are two types of auctions that can be viewed on the View Auction Inventory: LOT and ITEM. Bidder may select items to watch without bidding.
    - ITEM Auctions require a bid for each item bidder wishes to purchase. Bidder is not required to bid on all items in an Item Auction. You are not required to bid on all items in an Item Auction.
    - LOT Auctions require one bid for all item listed in the auction.
  - The Bid Status page is comprised of three Sections. (1)-Submitted Bids, (2)-Bid Watch List, (3)-Completed Bids
    - Each section of the Bid Status page is printer freindly. A bidder can print one or multiple sections.
  - The Item Detail page is designed to allow for quick bidding.
  - Each Column Header link is a Sort Column command.

FIGURE 154

Edit View Favorites Tools Help http://staging.pragmatyxs.com/BidStar/instruction.html

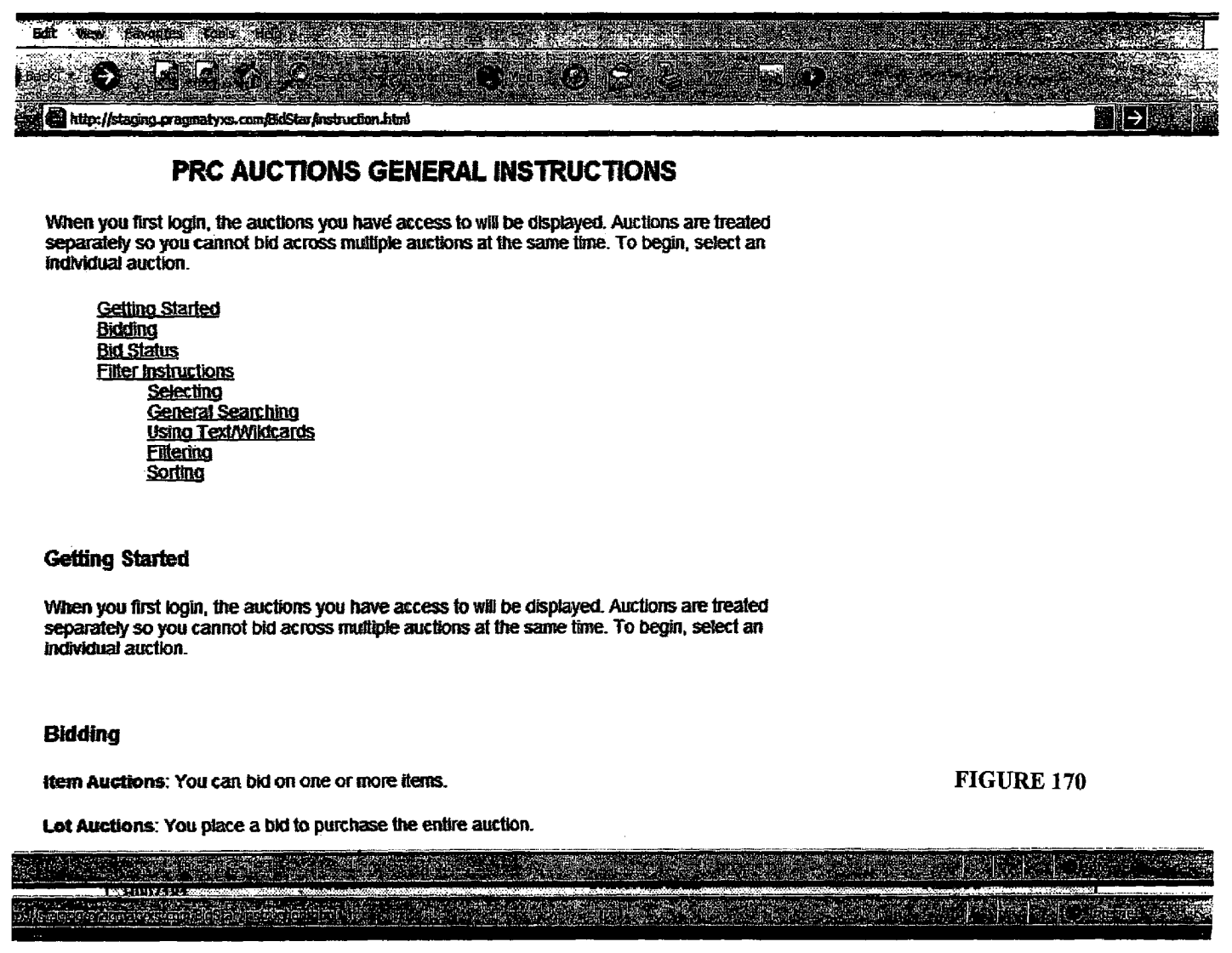

PRC AUCTIONS GENERAL INSTRUCTIONS

When you first login, the auctions you have access to will be displayed. Auctions are treated separately so you cannot bid across multiple auctions at the same time. To begin, select an individual auction.

- Getting Started
- Bidding
- Bid Status
- Filter Instructions
  - Selecting
  - General Searching
  - Using Text/Wildcards
  - Filtering
  - Sorting

Getting Started

When you first login, the auctions you have access to will be displayed. Auctions are treated separately so you cannot bid across multiple auctions at the same time. To begin, select an individual auction.

Bidding

Item Auctions: You can bid on one or more items.

Lot Auctions: You place a bid to purchase the entire auction.

FIGURE 170

SYSTEM AND METHOD FOR TRACKING DISPOSITION OF ITEMS

CROSS REFERENCE TO RELATED APPLICATIONS

This application claims priority to U.S. Provisional Patent Application Ser. No. 60/587,351, filed Jul. 12, 2004, and is a continuation-in-part of U.S. patent application Ser. No. 10/893,580, filed Jul. 16, 2004, the entireties of which are incorporated herein by reference.

BACKGROUND OF THE INVENTION

1. Field of the Invention

The present invention is directed generally to a method and apparatus for tracking the lifecycle of items and, more particularly, to a inventory tracking system and method.

2. Description of the Background

Inventory tracking is necessary in order to assess the location of items and goods that may be reused, purchased, sold, disposed of, or otherwise transferred. Inventory tracking is particularly necessary if the goods or items to be tracked may be subject to certain laws or other regulations, such as environmental and/or hazardous waste regulations. Thus, for example, hazardous and/or non-biodegradable materials may be assessed with a particular need for inventory tracking.

Items having a particular need for tracking may provide other requirements not applicable in certain inventory tracking situations. For example, in the tracking of non-biodegradable materials, certain portions of a device may be biodegradable, or may be reclaimable, and it may be useful to note those portions of a given material as such. Further, certain types of inventory that are assessed with a particular need for inventory tracking may be reconditionable, and/or redeployable. It may thus also be useful to track the ability to recondition, and/or the ability to redeploy, certain inventory items or components.

Inventory tracking systems available at the present do not provide for the strict tracking and auditing functionality, necessary for items having a particular need to be tracked and inventoried. Inability to reliably retrieve such information may lead to legal exposure for generators or disposing parties. Further, present inventory tracking systems do not allow for differentiation between certain items, or between certain parts of certain items, which may be resellable, reconditionable, or redeployable. Thus, present inventory systems do not provide an adequate audit trail to prevent legal exposure resulting from failure to track the disposal, reconditioning or redevelopment of certain items which are subject to legal regulations. Further, present inventory systems do not track the original owner and document the transfer of ownership.

For example, the disposition of hazardous waste materials is subject to very strict laws. Often those disposing of such hazardous materials hire disposal companies to handle the disposal, and hence are not privy to the final location or final disposition of the hazardous materials. Thus, an inventory tracking system which allows for the specific tracking of a disposition (including, but not limited to, whether those goods have been stored, resold, demanufactured redeployed, or reconditioned) of all items entered into the system, is necessary but not available in the present art.

Present inventory and tracking systems generally have a lack of tracking and reporting for data, software, and/or hardware eradication in one program. Further, there is generally a lack of registry information recovery when dealing with software applications, particularly for computers that have experienced an fdisk and format command.

Further, for items designated as being suitable for being resold, redeployed, or reconditioned, a mechanism may be needed wherein such items may be resold, reconditioned, or redeployed. Such a mechanism might include auctions, wherein bids are submitted for an available item, and the highest bidder wins the opportunity to purchase the item for the bid amount. An inventory tracking system that tracks the status of all items within the inventory tracking system, and tracks separately, but in communication with, the inventory tracking system, auction items, items for sale, items destroyed, and/or reconditioned items would provide a unique and efficient mechanism of tracking goods, making goods available for sale, and disposing of goods, in a single system.

Thus, the need exists for an inventory tracking system that tracks and audits the status of all items within the inventory tracking system, including disposed items, and that tracks separately, but in communication with the inventory tracking system, auction items, items for sale, items destroyed and/or reconditioned items.

SUMMARY OF THE INVENTION

A system and method of tracking and reselling inventoried items is disclosed. This method includes assigning an audit code to an incoming inventoried item, wherein the audit code comprises a manual audit code and an automated audit code; auditing the incoming inventoried item to assess the incoming inventory item as such for one or more of, for example, the destruction, demanufacture, resale, reconditioning, storage, and redeployment; sending the incoming inventoried item to one of a redeployment, a demanufacture, a reconditioning, a resale, a storage, and a destruction in accordance with the auditing; manually updating the manual audit code in accordance with the auditing and the sending; providing, after the sending and the manually updating, redeployment or resale of at least a portion of the incoming inventoried item audited as suitable for at least one of demanufacture, resale, reconditioning, and redeployment; and, finally updating the manual audit code based upon the information provided to the system.

Further, a system and method of reselling inventoried items is disclosed. This method includes auditing the incoming inventoried item to assess the incoming inventory item as suitable for resale; making the incoming inventoried item available for auction in accordance with the auditing; auctioning the incoming inventoried item by at least one of a line item auction and a lot auction; disposing of the incoming inventoried item, upon completion of the auctioning, in accordance with an outcome of the auctioning; and, tracking the disposing, wherein the tracking updates a code associated with the auditing.

A system for tracking and disposition of inventoried items is additionally included in the present invention. The system includes an audit code assigner that assigns a manual audit code and an automated audit code to the inventoried item, an auditor that audits the incoming inventoried item to assess the incoming inventory item as suitable for one or more of destruction, demanufacturing, resale, reconditioning, storage, and redeployment, at least one of a redeployer, a demanufacturor, a reconditioner, a reseller, a storer, and a destructor associated with the auditor, and at least one updator that manually updates the manual audit code at each of the audit code assignor, the auditor, and the at least one redeployer, demanufacturor, reconditioner, reseller, storer, and destructor.

Also disclosed is a system and method for securely tracking and reporting the disposition of inventoried items from a remote location.

Thus, the present invention provides an inventory tracking system and method that tracks and audits the status of all items within the inventory tracking system, including disposed items, and that tracks separately, but in communication with the inventory tracking system, auction items, items redeployed, reconditioned or for sale, or items destroyed.

BRIEF DESCRIPTION OF SEVERAL VIEWS OF THE DRAWINGS

Understanding of the present invention will be facilitated by consideration of the following detailed description of the embodiments of the present invention taken in conjunction with the accompanying drawings, in which like numerals refer to like parts, and wherein:

FIG. 2 is a flow diagram illustrating materials entering the inventory hub of FIG. 1;

FIG. 6 is a flow diagram illustrating the implementation of an auction module of FIG. 1 of the present invention;

FIG. 7 is a flow diagram of an embodiment of the present invention providing for multiple line item or lot auctions running concurrently;

FIG. 8 is a flow diagram of an embodiment of the present invention illustrating a bid status form;

FIG. 18 illustrates a list of potential job summary reports which may be generated by the present invention;

FIGS. 25-31 are illustrative of exemplary interfaces of the present invention;

FIGS. 46-54 illustrate aspects of the client profile sub-hierarchy of FIG. 45;

FIGS. 56-66 illustrate aspects of the receiving sub-hierarchy of FIG. 55;

FIGS. 68-77 illustrate aspects of the auditing sub-hierarchy of FIG. 67;

FIGS. 80-89 illustrate aspects of the diagnostic testing sub-hierarchy of FIG. 79;

FIGS. 91-114 illustrate aspects of the warehousing and logistics sub-hierarchy of FIG. 90;

FIGS. 116-155 illustrate aspects of the client services (job tracking) sub-hierarchy of FIG. 115;

FIGS. 169-176 illustrate an exemplary auction interface for use in the present invention.

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in a typical inventory tracking system. Those of ordinary skill in the pertinent art will recognize that other elements are desirable and/or required in order to implement the present invention. However, because such elements are well known in the art, and because such elements do not facilitate a better understanding of the present invention, a discussion of such elements is not provided herein.

Figure 1:
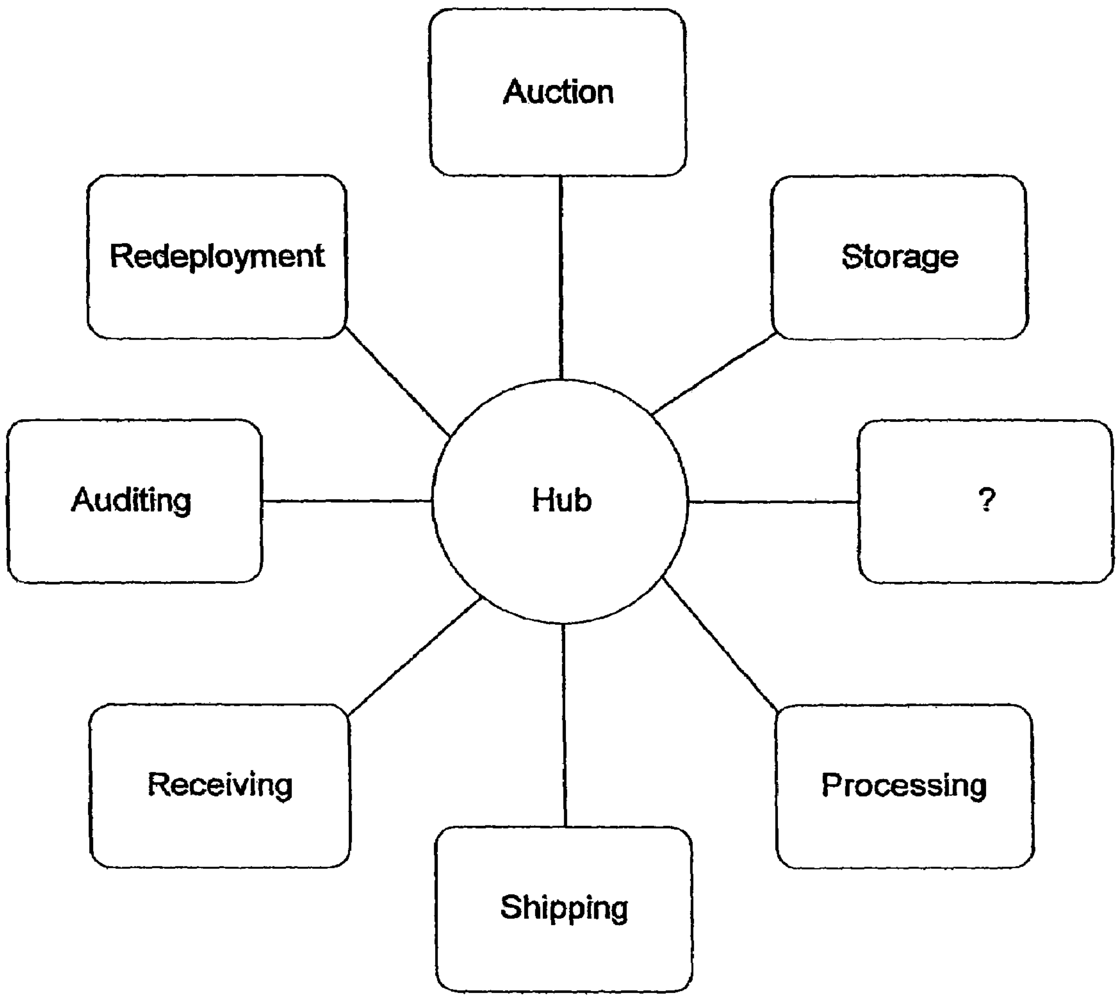
FIG. 1 is a flow diagram illustrating the organization of an inventory tracking system of the present invention.

FIG. 1 is a flow diagram illustrating the organization of an inventory tracking system. The organization may include, for example, a hub mechanism, wherein the hub mechanism tracks substantially all inventory present in the system, and a series of spoke mechanisms or modules, wherein each of the spoke mechanisms may operate to dispose of inventory items in the hub in a specific manner.

FIG. 2 is a flow diagram illustrating the flow of materials or items entering the inventory hub of FIG. 1, and operations performed upon those materials. Incoming materials, which may be, for example, materials that may be physically inventoried, may exist only in computers, or that may be maintained in another location, such as at a client location, and tracked by computer, enter a receiving system in the hub of FIG. 1. Information may be received via computer for remotely inventoried items, or may include receiving containers, or like-physical equipment, which may be physically mapped upon receipt. For example, received containers may be weighted and labeled with the site number, a group number and a job number, by way of non-limiting example only, and further the date received may be indicated. Likewise, for non-physical inventory, the hub system may include the actual physical location, or computing location, of the inventory to be tracked, and/or a tracking number and a date received, by way of non-limiting example only.

Once received, inventory may be audited, for example. Auditing may include sorting and/or inspecting received physical inventory, such as equipment. Auditing may assess the received inventory using client specific, or market value thresholds, for example, with the appropriate processing procedures determined based on the received inventory. Received inventory may be, for example, destroyed, stored, demanufactured, or processed for resale, by way of non-limiting example only.

Once inventory is audited, inventory that falls below resale thresholds, storage thresholds, or items specifically designated for destruction, may proceed to demanufacturing. Demanufacturing may include, for example, the dismantling of hazardous components, such as for recovery, reclamation, and/or proper disposal. Further, following demanufacturing, recoverable or reclaimable materials, such as scrap metals and plastics, may be transferred to an audited end-market, and permitted to be processed within end market facilities tracked by the auditing. Units that pass, and are to be made available for storage or processed for resale, may proceed either to diagnostics, or to storage. Diagnostics may include testing to insure proper functionality of a device, and or to ensure proper security, such as the removal of all identifying information from a computer hard drive. Items that fail the diagnostic stage may proceed to demanufacturing or disposal. Items that pass the diagnostic stage may proceed to staging, where the diagnosed items may be cleared for sale or redeployment. Alternatively, units that pass may proceed to client storage, where equipment or inventory is prepared for storage, and/or stored for reuse, redeployment, or resale.

Figure 3:
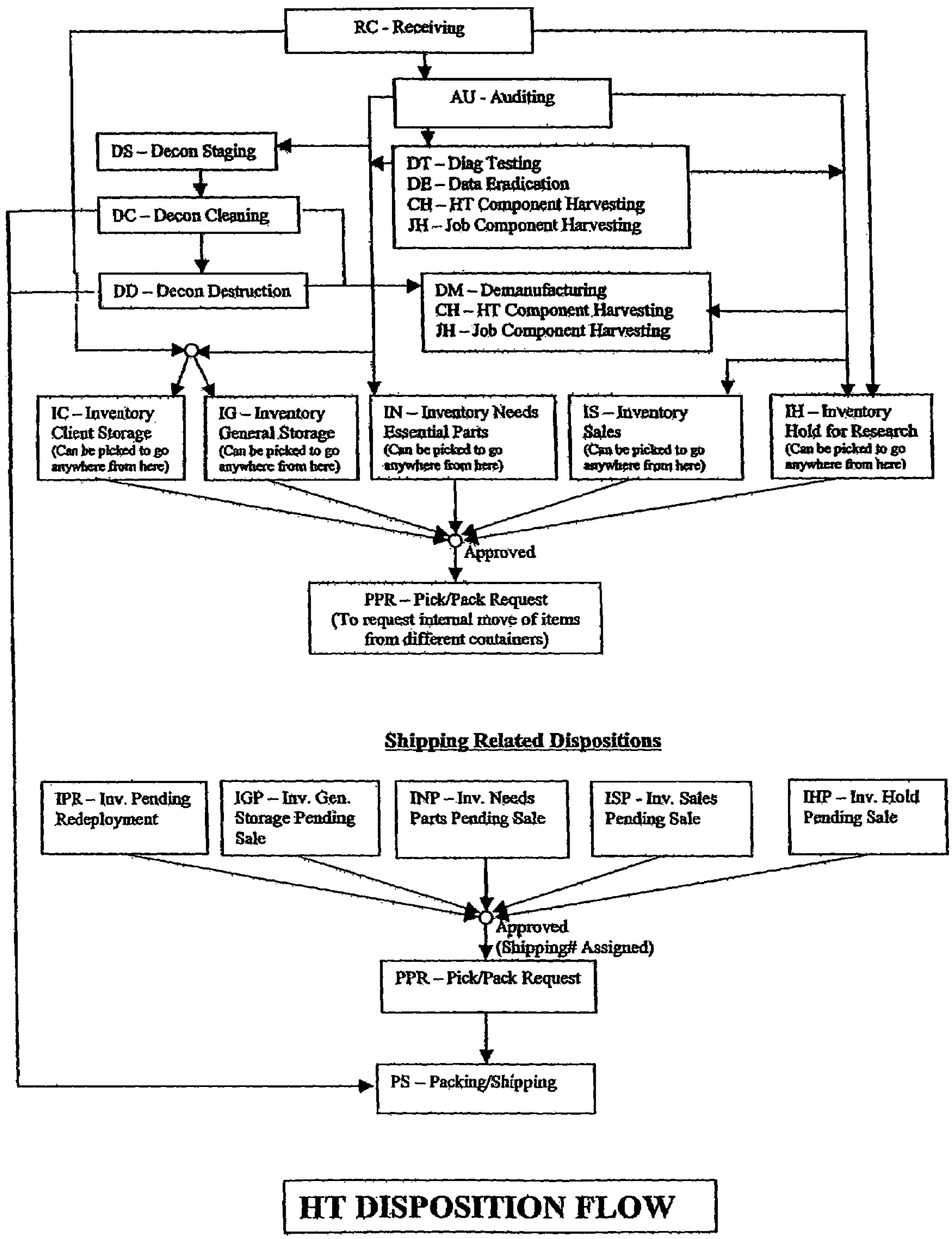
FIG. 3 is a flow diagram illustrating, an embodiment of an inventory receipt and tracking system of FIG. 2 of the present invention.

FIG. 3 is a flow diagram illustrating, with more specificity, an inventory receipt and tracking system as illustrated in FIG. 2. FIG. 3 additionally illustrates a series of two-to-three letter codes that, at each stage of the flow process, track the status of the inventory goods. In an embodiment of the present invention, the two-to-three letter codes may be assigned manually, and may thereby be changed in accordance with a change in inventory status. Further, each of the manually input codes may be appended with a computer generated code, wherein the computer generated code uniquely tracks each item within the inventory. Of note, it will be apparent to those skilled in the art that each of the computer generated, and manually generated, codes may be a series of either letters, numbers or other symbols. In accordance with this tracking system, both off-site and on-site inventory may be disposed of in accordance with instructions determined by a user or controller of the inventory. For example, off-site inventory may be tracked by the present invention, and a controller of the off-site inventory may elect to auction-off certain of the items in the inventory. At that time, the controller of the off-site inventory may change the inventory code manually from one of stored goods to one of goods eligible for auction. The system of the present invention, in accordance with the change in the code by the controller of the off-site inventory, may manually change a manual code associating the randomly generated computer code from one for stored goods to one for auctioned goods, and may, in accordance with this change, post the desired inventory for auction to the auction spoke of the central hub in FIG. 1.

FIG. 3 illustrates a receiving step and an auditing step, in accordance with FIG. 2. FIG. 3 additionally illustrates that the receiving step may or may not flow to the auditing step. Consequently, in certain circumstances, the auditing step may be skipped in accordance with the present invention, such as instances wherein a previously acceptable certification has been obtained prior to placement of goods into the inventory system of the present invention. The auditing step, when performed, may include, for example, diagnostic testing, data clearing/irritation, such as for security purposes, and component or job component harvesting. Dependent upon the outcome of the auditing, inventory may be destroyed, stored, demanufactured into parts, or processed for resale. If material is designated to be destroyed, it may proceed through a variety of stages, such as staging, cleaning and/or destruction. Cleaning and destruction may include, for example, demanufacturing, such as breaking a device into components, which components may be reused, stored, or destroyed individually, rather than as part of a whole. If goods are designated as approved in auditing, or parts of a particular inventoried good are approved following demanufacturing of an inventoried item, items may be inventoried in accordance with a series of codes. These codes may include, for example, storage at a client facility, storage at an on-site facility, general storage, storage for a specific purpose, storage for essential parts and purposes, and or storage for research, for example. Further, items approved for sale or resale, either as parts of an initial whole or the whole itself, may pass to inventory sales, which may include, for example, direct sales and/or auction sales Goods may flow from inventory, directly from receiving, or from destroyed item demanufacturing, to packing and shipping of those goods for transport outside. In accordance with a pick item, pack item, or ship item request, audit information is inserted to the audit trail of the inventory goods, in accordance with the unique manual and computer generated tracking code generated hereinabove, to allow an auditor to assess precisely where, when, and to whom goods were delivered, packed and/or shipped. Thus, the present invention may allow, in accordance with the unique tracking code, a complete audit trail from the moment goods enter the inventory tracking to the moment goods exit the inventory tracking, whether those goods are on-site or off-site. This audit trail further may include the party from whom each manual instruction was received to engage in the unique activities throughout the tracking process, i.e. those events tracked by the manually input audit code discussed hereinabove.

As illustrated in FIG. 3, inventory pending sale may be tracked by a variety of manual input codes, including whether the inventory is for sale pending redeployment, whether the inventory is in the general inventory merely pending sale or resale, sales received and pending approval, or sellable goods on hold. Items that are sold may additionally receive specific audit codes, such as corresponding to the method of shipping, such as shipped pending payment, shipped C.O.D., shipped FedEx, shipped U.S. Mail, or shipped via freight, for example. Further, codes may be included to identify the packing personnel, or the packing methodology, such as wherein goods must be packed, and or shipped, in multiple boxes, on multiple palates, or the like. Further, the audit trail of the present invention allows for tracking of specific circumstances, such as wherein client goods remain stored, but are pending resale or redeployment, such as wherein goods are up for auction, or wherein goods are subject to contract negotiations. To the extent inventoried goods are available on-site, those goods may, for example, be physically marked or tagged with information correspondent to hallmarks of the audit trail, such as by placement of stickers having information thereon, or other trackable, identifiable, readable, scannable, or like-type identifying technologies having information correspondent thereto, as will be apparent to those skilled in the art in light of the disclosure herein, or the scanning of all or parts of the goods themselves, such as of information resident thereon. Such tracking, identifying, reading, scanning, or the like may then have associated therewith a listing in a computer of the hallmarks of the audit trial in accordance with each tracking, identification, scanning, reading, or the like of the particular item.

Figure 4A:
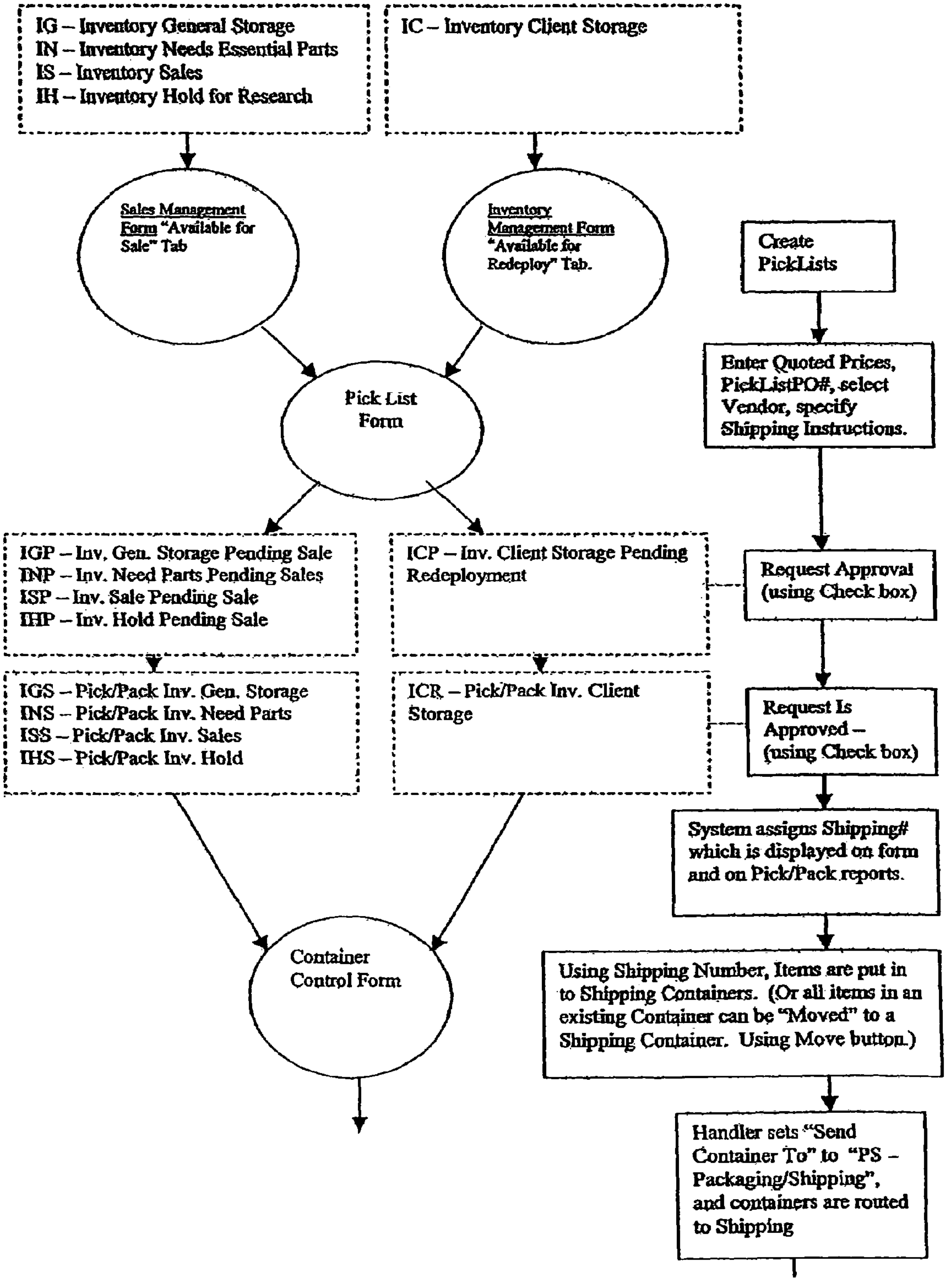
FIG. 4 (which figure comprises 4A and 4B) is a flow diagram illustrating an embodiment of the present invention of the inventory management system of the present invention wherein items may be sold, inventoried, contained, shipped or to-be shipped.
Figure 4B:
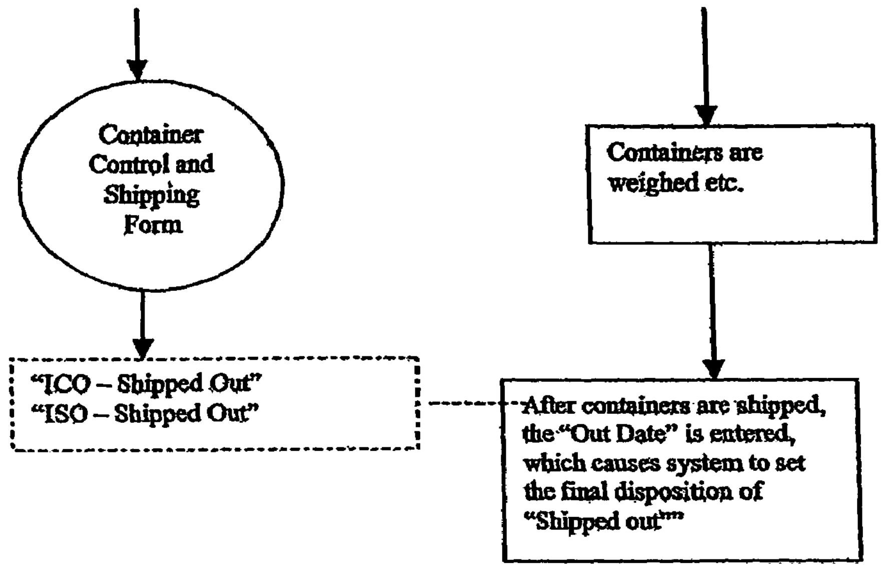

FIG. 4 is a block diagram illustrating inventory management of sold, inventoried, contained, shipped and/or to be shipped goods. Each item, as illustrated, may be tracked by a tab, wherein the tab may be a physical element placed upon the item, or wherein the tab may be correspondent to a tab within the user interface of the inventory tracking system. For example, as illustrated, certain types of goods may be made available for sale, or may be made available for sale under particular circumstances, such as when a necessary essential part is obtained. Other inventoried items may be made available for redeployment, such as for return to a client.

For example, as illustrated in FIG. 4, a pick list of available inventory may be created. Certain of the inventoried items on the pick list may have entered therefore quoted prices, purchase order numbers, vendors, and/or shipping instructions, or a flag as items picked from the pick list. Other options may be made available for items on the pick list corresponding to sale, redeploying, or storing, as will be apparent to those skilled in the art. Approval may be requested, such as from administrators or third parties, for goods made available for sale, redeployment, or storage, and, upon receipt of the requested approval, the making of the request and receipt of the approval may be entered into the audit trial of the inventoried item. The system may assign, for example, a shipping number, which may be displayed on the item, on forms relating to the item, and/or on packing reports, for example. Dependent upon the issuance and identity of the shipping number, items may be put into shipping containers, where necessary. For example, certain computer assigned shipping numbers, or manually entered shipping codes, may require particular shipping criteria, such as insertion into a box, a drum, a safety wrap, or onto palates, by way of non-limiting example only. The inventory tracking system of the present invention may automatically identify the packing steps, required or desired, for shipping in accordance with the manually entered or computer generated audit code, for example. The handler, or packer, of the goods to be shipped may send the container to shipping, and may enter the action as such into the inventory system. Before shipping the goods out, the goods may be inspected, or may be weighed, such as to assess proper postage, or to assess best shipping methods, prior to shipping. The goods may then be shipped, and entered as such into the audit trail of the inventory tracking system.

Thus, the present invention may provide a computerized interface solution suitable for viewing, and operations upon, inventory, and the destruction, deployment, redeployment, and/or sales of inventory. This inventory interface may be localized, or may be available over a network, such as the internet, an intranet or an extranet, for example. This remote interface may allow for operations on remotely stored inventory, which remotely stored inventory may nonetheless be tracked at the local site through the use of the inventory system of the present invention. Further, for example, the availability of the inventory interface over a remote connection, such as network interface, may allow for interaction by third parties, such as those desiring to contract for the purchase of, or enter into an auction for, inventoried goods.

In an embodiment wherein remote sales, and/or auctions are available, a third party accessing the inventory system of the present invention may have available only certain aspects of the inventory tracking system, such as the criteria of goods desired for purchase.

Figure 5:
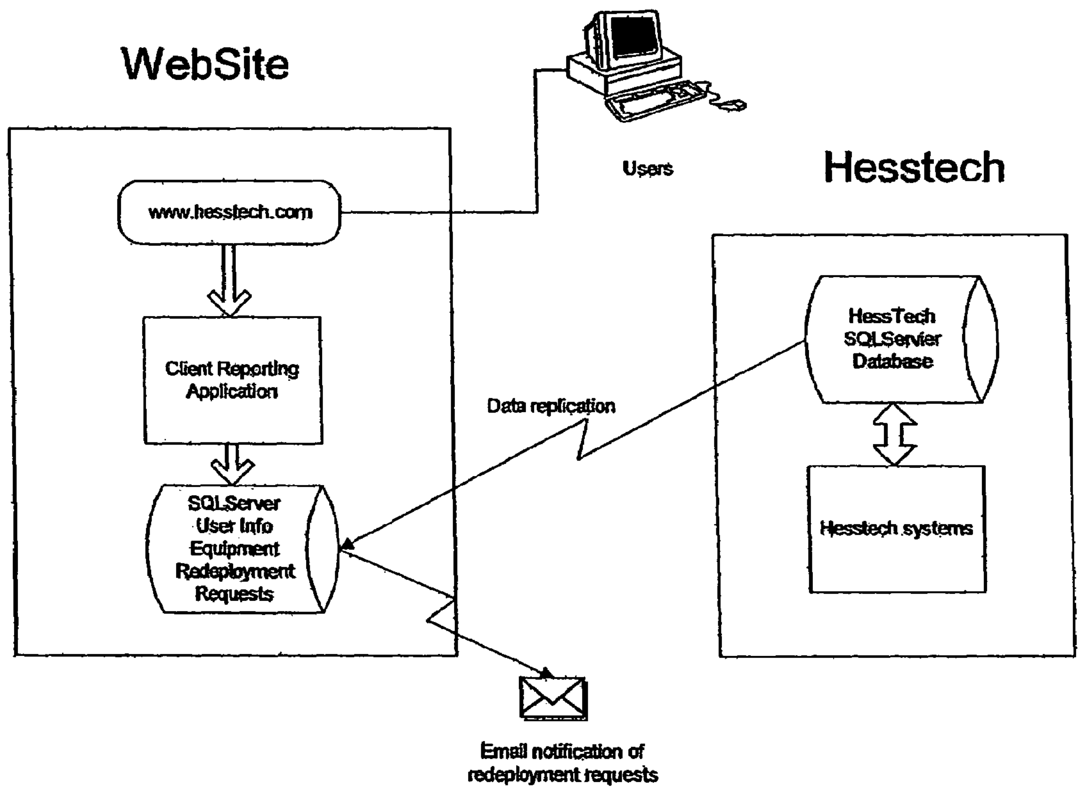
FIG. 5 is a flow diagram illustrating an embodiment of the interaction of a remote user with the inventory tracking system of the present invention.

FIG. 5 is a flow diagram illustrating the interaction of a remote user with the inventory tracking system of the present invention. The remote nature of the inventory tracking server/database from the SQL server allows the user to request information, sale, and/or redeployment, and may provide security. This security may preclude the remote user from accessing more information than is desired or necessary from the inventory tracking site. For example, a predefined filter component may apply filters relevant to a client and/or a user privilege, as well as to the desired action and/or the desired view of the user.

More specifically, the SQL server which may be used as a database may be any SQL server known to those skilled in the art, such as, but not limited to, an SQL 2000 server. The database may be populated, and accessible to outside users, via a one way SQL server replication from the internal inventory tracking database. Replication to the user-accessible server may occur automatically, such as periodically, or, for example, may occur transactionally. Transactional replication may occur upon request for information, and may provide increased security over automated periodic replication. Requested information, such as redeployment requests, may be maintained in a database and/or table at the user accessible server, and may be replicated back to the internal inventory tracking database, on an agreed upon schedule, or per transaction.

Security may be provided within the user interface, such as by a client login screen. Such a client login screen may require entry of user name and password for example. After the identifying information is input to the system, the system may assess, or identify, the user. By directly or indirectly identifying the user, a determination may be made as to whether the remote user is a client, such as one that has inventory present, or is a regular user, such as one that may only purchase or bid on auctions. User names and passwords may be set up by the internal database server, and may be replicated to the remotely accessible database as part of the replication scheme discussed hereinabove. Access to application information and/or data may be controlled by the client's level of access, as stored in the client login table. Access may be, for example, at a client level, a site level, a group level, or a user level, such as by determination through a security mask placed, upon each individual request, upon the correspondent requesting entry in the client login table. Of note, encrypted login, such as SSL, may be used in order to increase client security.

Multiple views may be provided in the present invention, and the information displayed in each view may be consistent with the requesting user's access level. For example, certain users may be eligible to view all equipment that is available for sale and/or auction. Certain users may be able to view equipment which is available for redeployment. Other users, such as those who have made a purchase, may be able to view equipment which is pending shipment. Still other users, such as those who have made a purchase and viewed a pending shipment, may additionally be able to view shipped items. A job summary may be provided to users having a login. The job summary may provide all information relevant to that user which that user is eligible to see. Further, particular elements within the audit trail may be available to certain users, dependent upon those users' security clearance.

For example, redeployment requests may be made with the present invention. Users may enter a category, an item type, a manufacturer, make, model, and/or a quantity requested. Filtering, or other search mechanisms known to those skilled in the art, may query and check quantity for the availability of the items requested for redeployment. The recipient of the redeployment may, for example, be selected from a drop down list of known recipients, or a new recipient may be entered by completing a recipient information form. The redeployment request may be submitted, such as by clicking a submit button, which may cause the sending of an e-mail to the internal inventory tracking data base. Such an email may detail that forms have been filled out and a redeployment request has been remotely generated.

Figure 19:
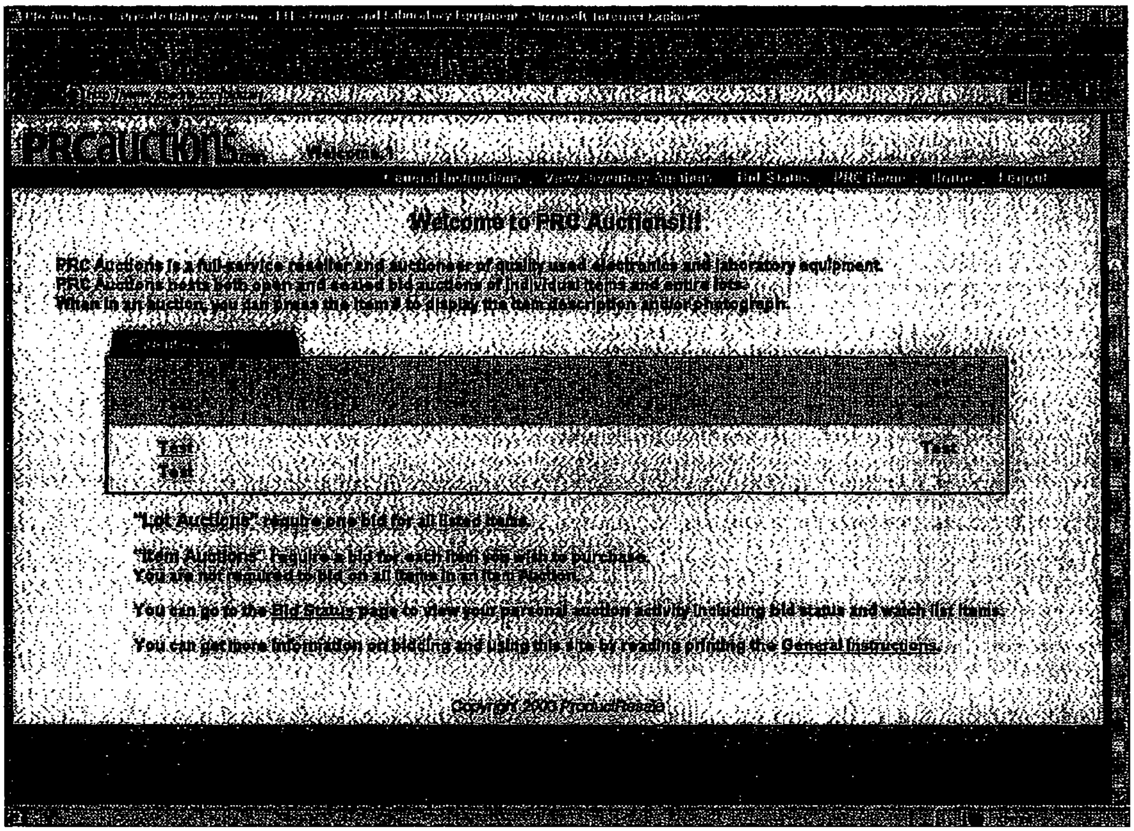
FIG. 19 is a screen representation of an aspect of the present invention.

Referring now to FIGS. 19-24, there are shown embodiments of screen representations according to an aspect of the present invention. In FIG. 19, for example, there is shown an entry page to an auction site identifying the user and the types of auctions that the user has access to.

Figure 20:
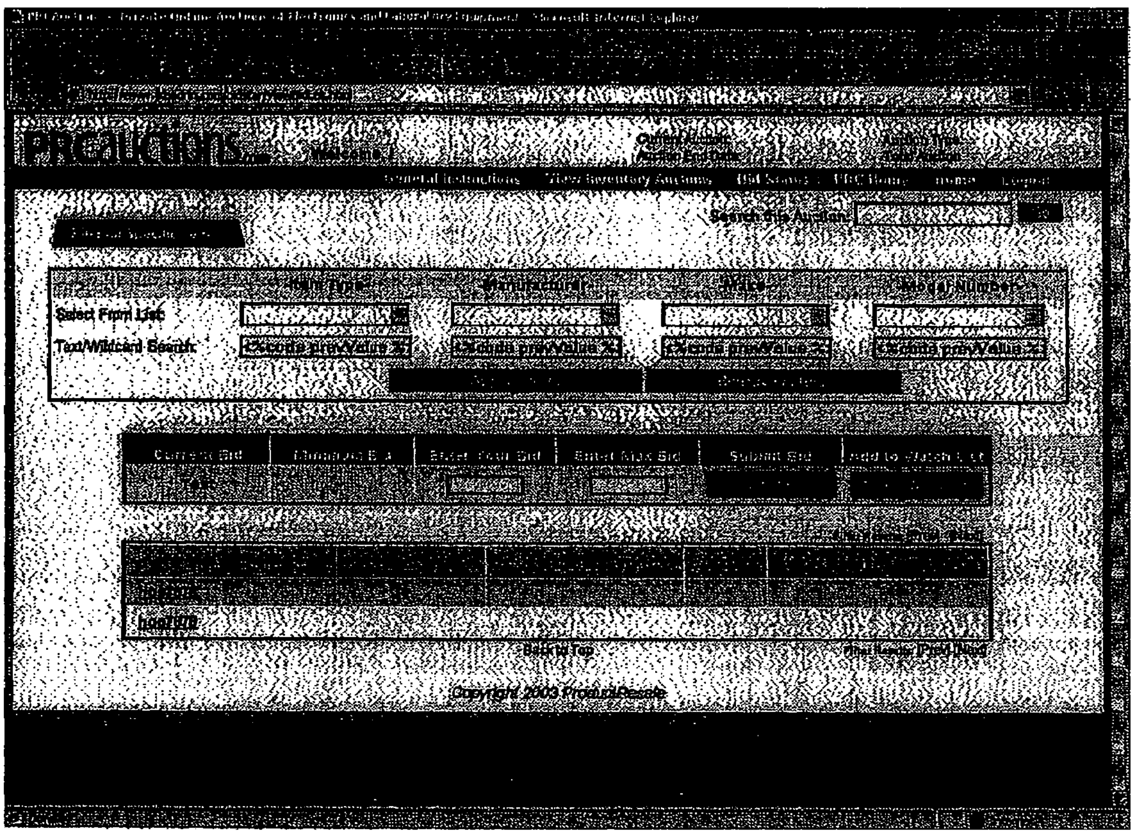
FIG. 20 is a screen representation of the an aspect of the present invention.
Figure 21:
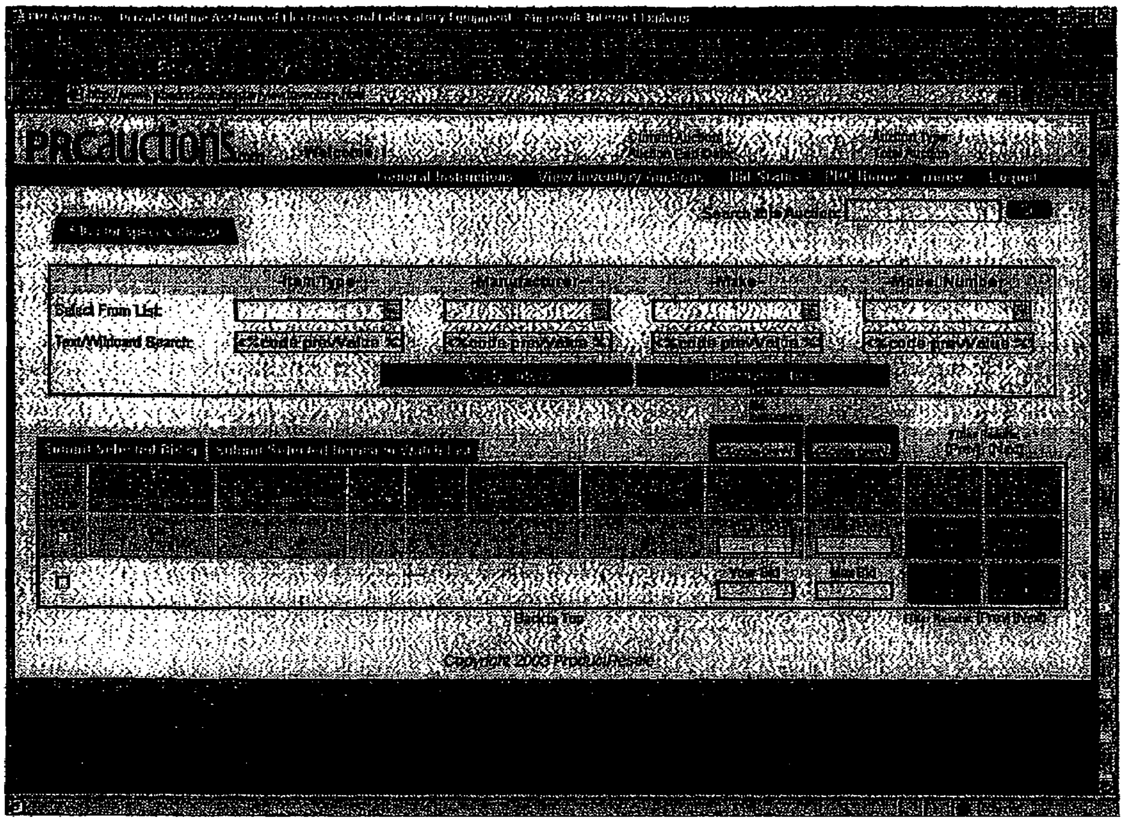
FIG. 21 is a screen representation of the an aspect of the present invention.

Different types of auctions and access may be shown in FIGS. 20 and 21. In FIG. 21 there is shown a screen available to a user with required access to bid on items identified by lots. As may be seen in FIG. 20 various information on the lot is provided to the user, as discussed hereinabove. In FIG. 21, there is shown a screen available to a user with required access to bid on individual items, such as line item auctions, for example. As may be seen in FIG. 21, individual items and the items pertinent information may be identified as a line item on the screen.

Figure 22:
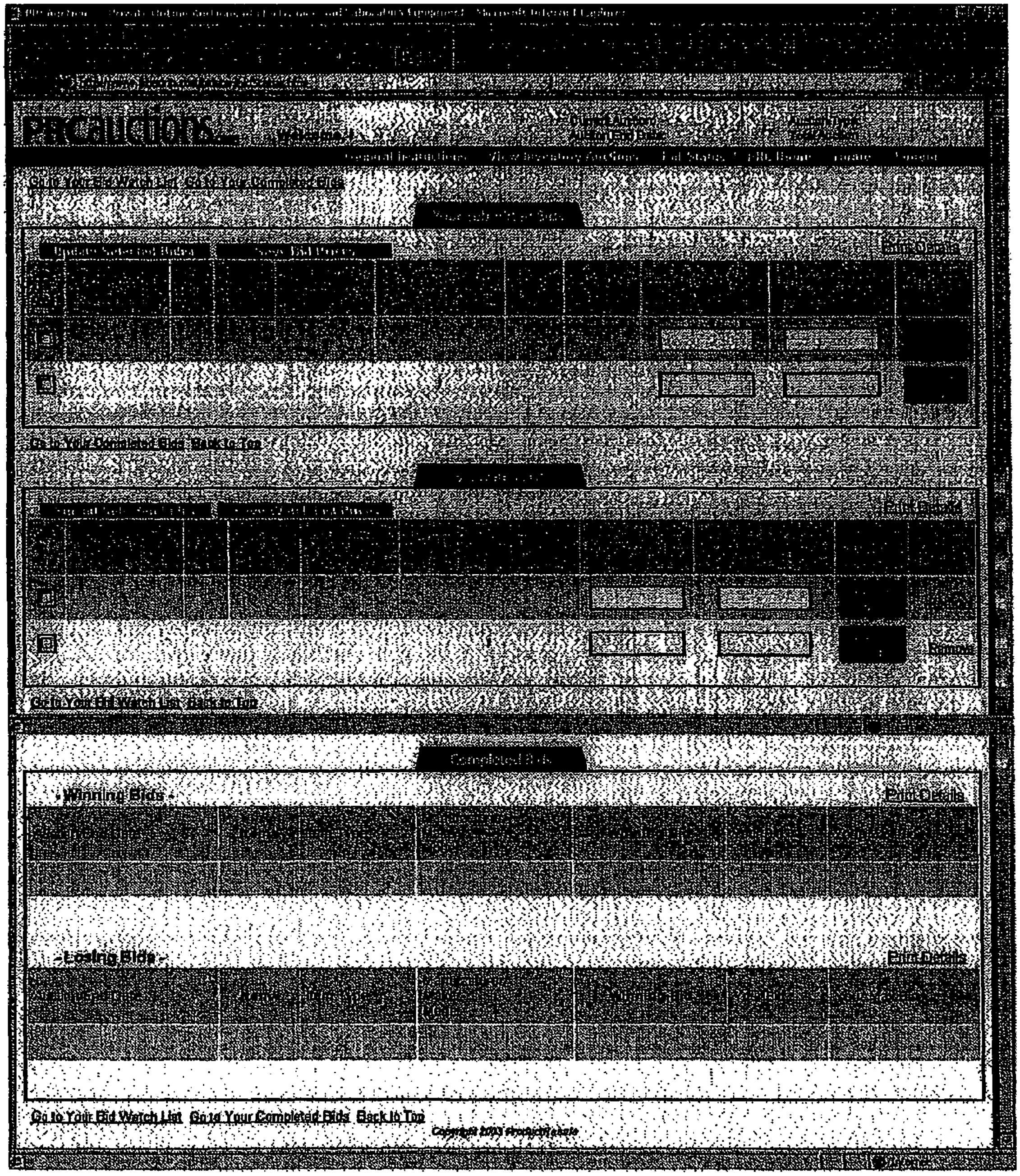
FIG. 22 is a screen representation of the an aspect of the present invention.

FIG. 22 illustrates a screen shot according to an aspect of the present invention. In FIG. 22, there is shown a bid status page configured to allow the user to view various bids, such as on-going and completed bids, and further identify each bid as currently the highest or not, as discussed hereinabove.

Figure 23:
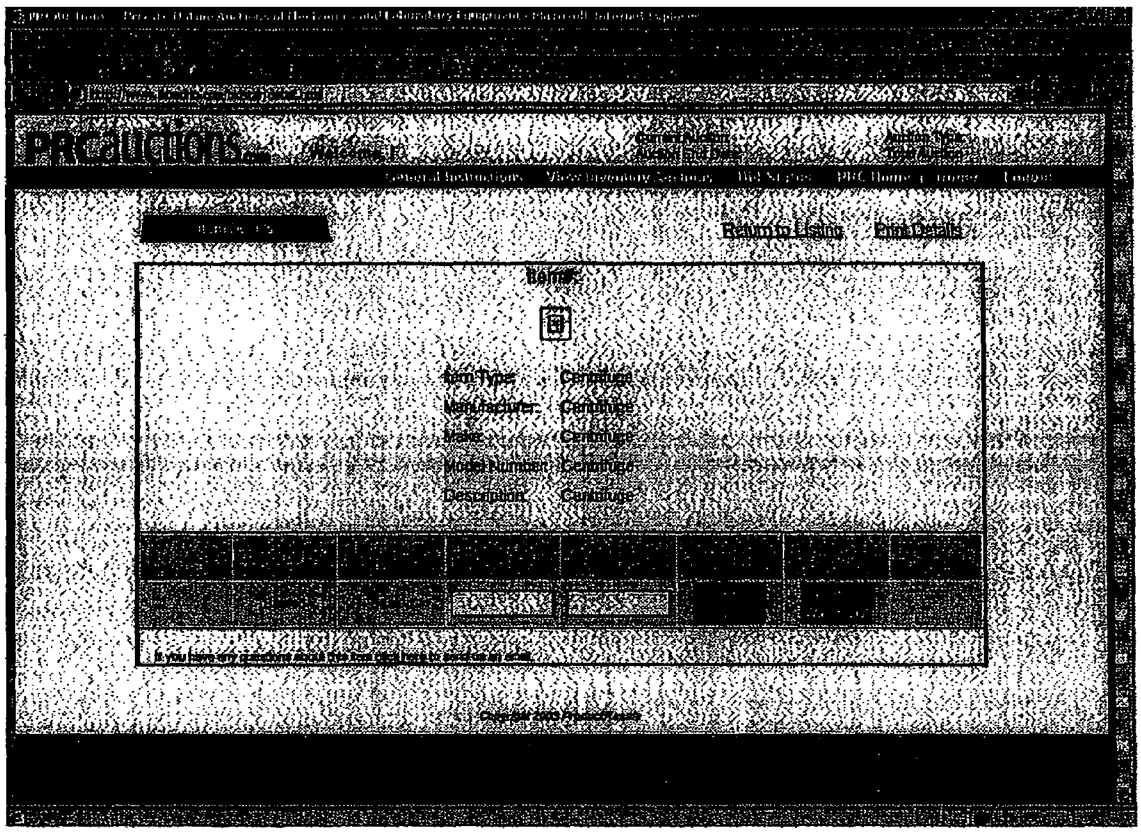
FIG. 23 is a screen representation of the an aspect of the present invention.

FIG. 23 illustrates a screen shot demonstrating the types of information available within the inventory system of the present invention. As is shown in FIG. 23, line items may be identified and further information may be determined corresponding to the particular identified line item.

Figure 24:
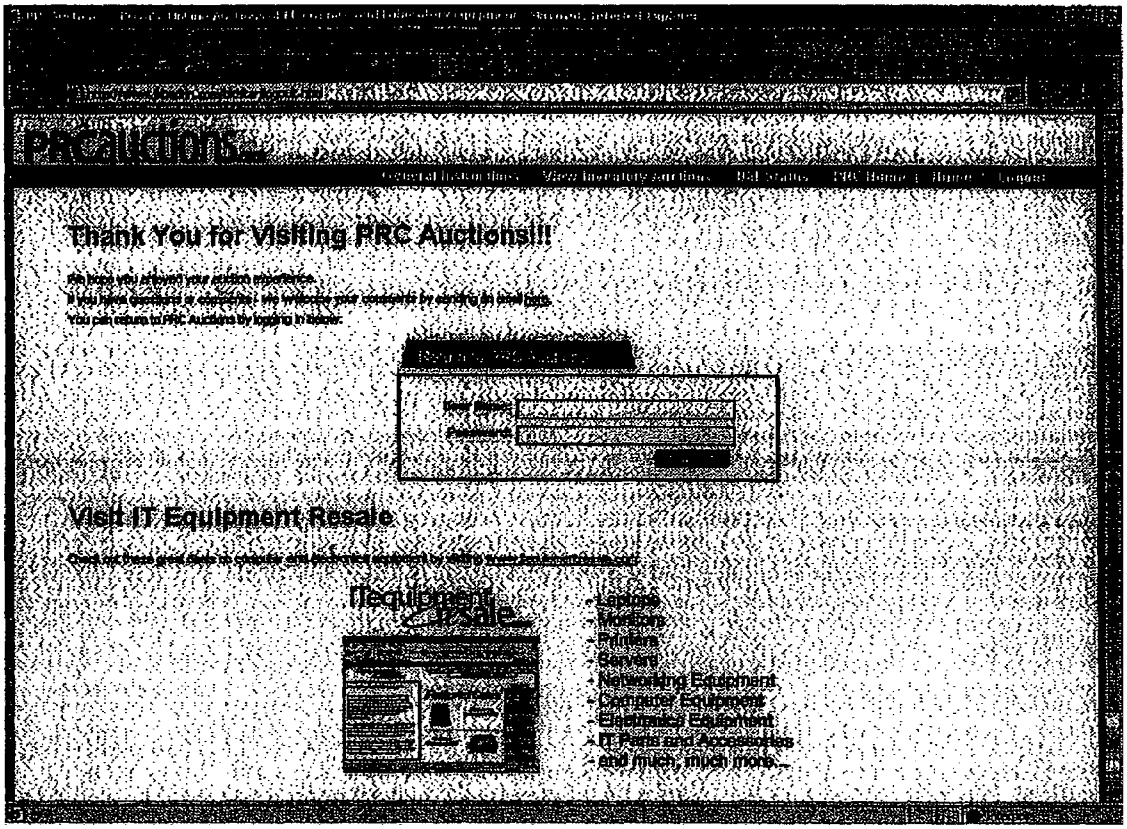
FIG. 24 is a screen representation of the an aspect of the present invention.
Figure 27:
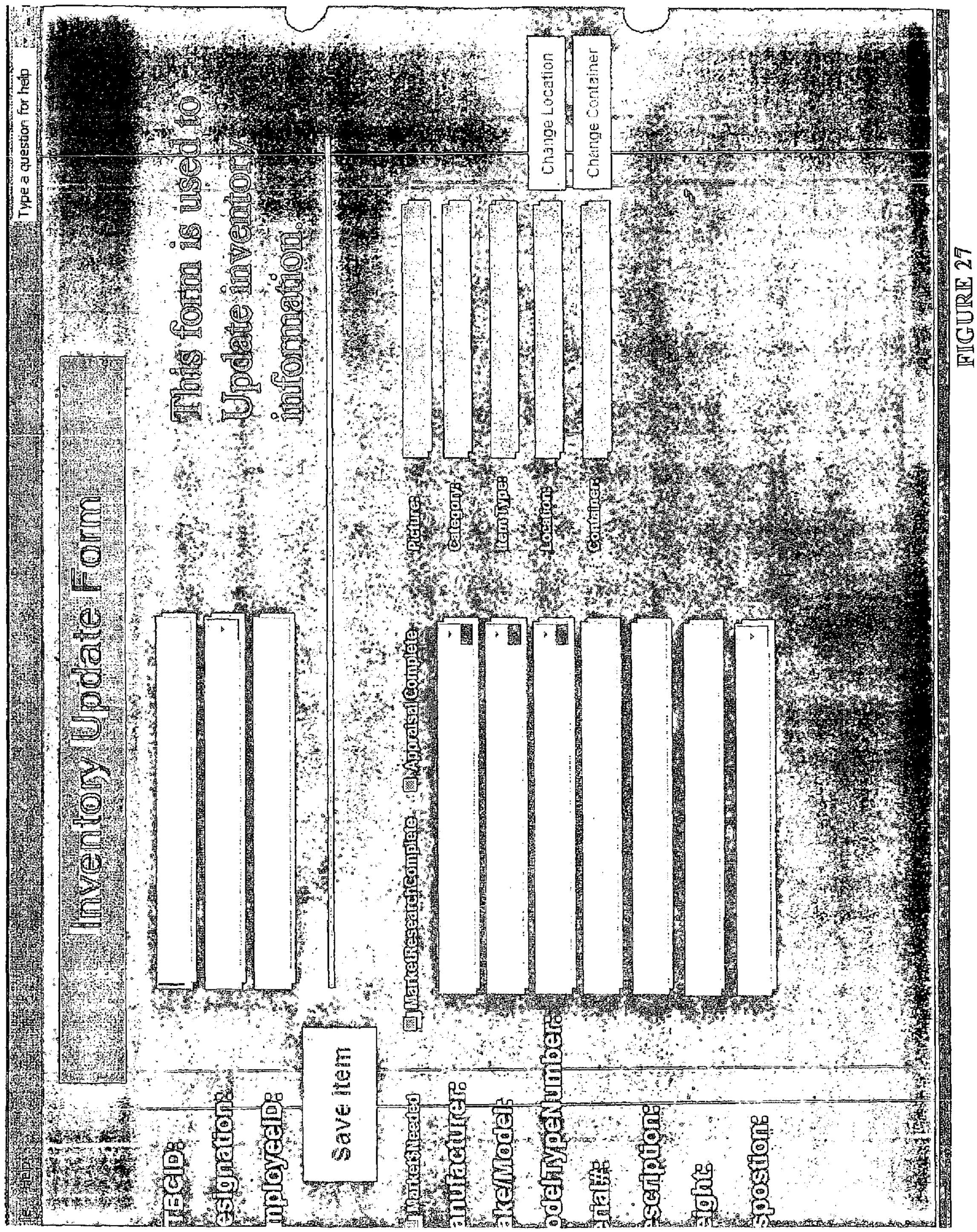
Figure 29:
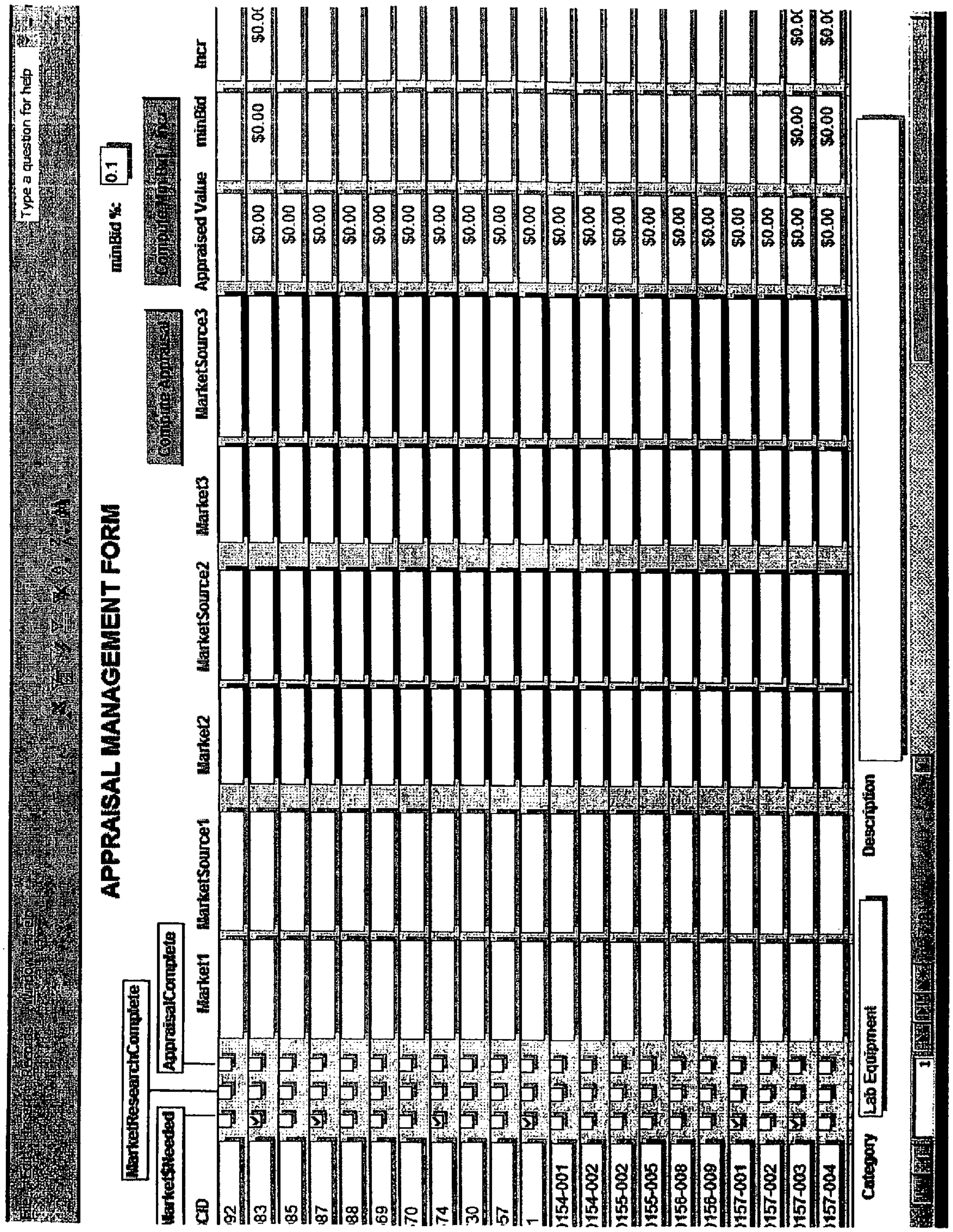
Figure 30:
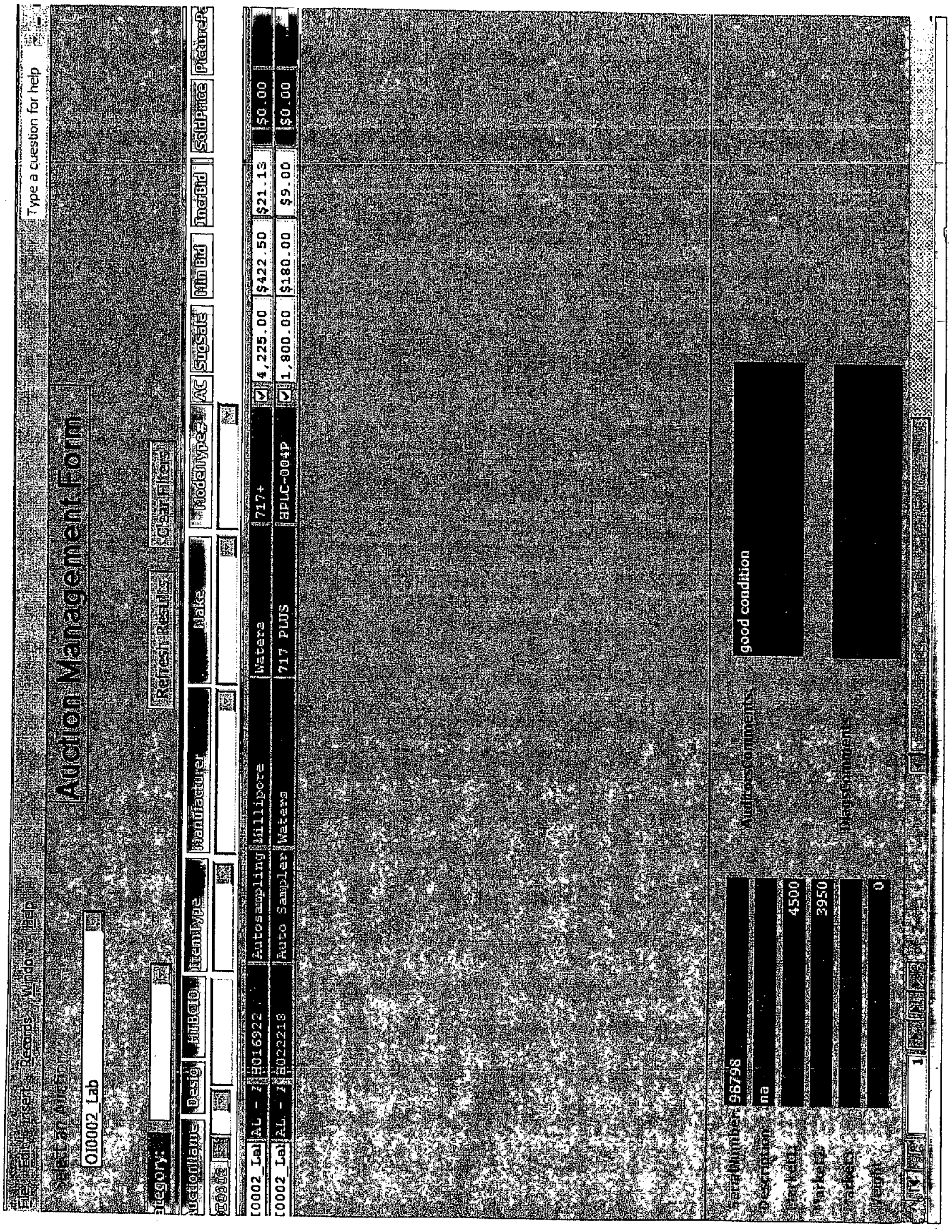
Figure 31:
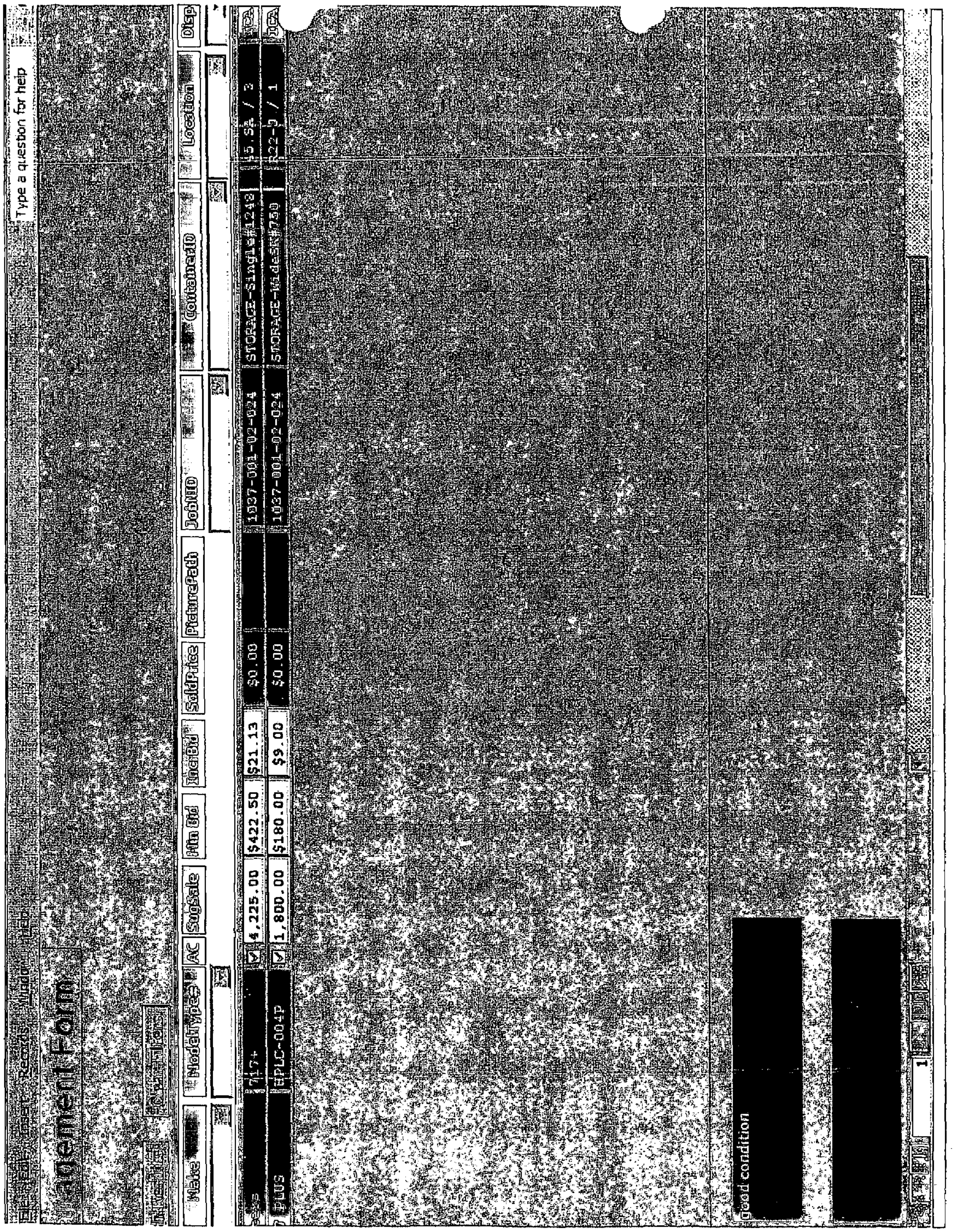
Figure 32:
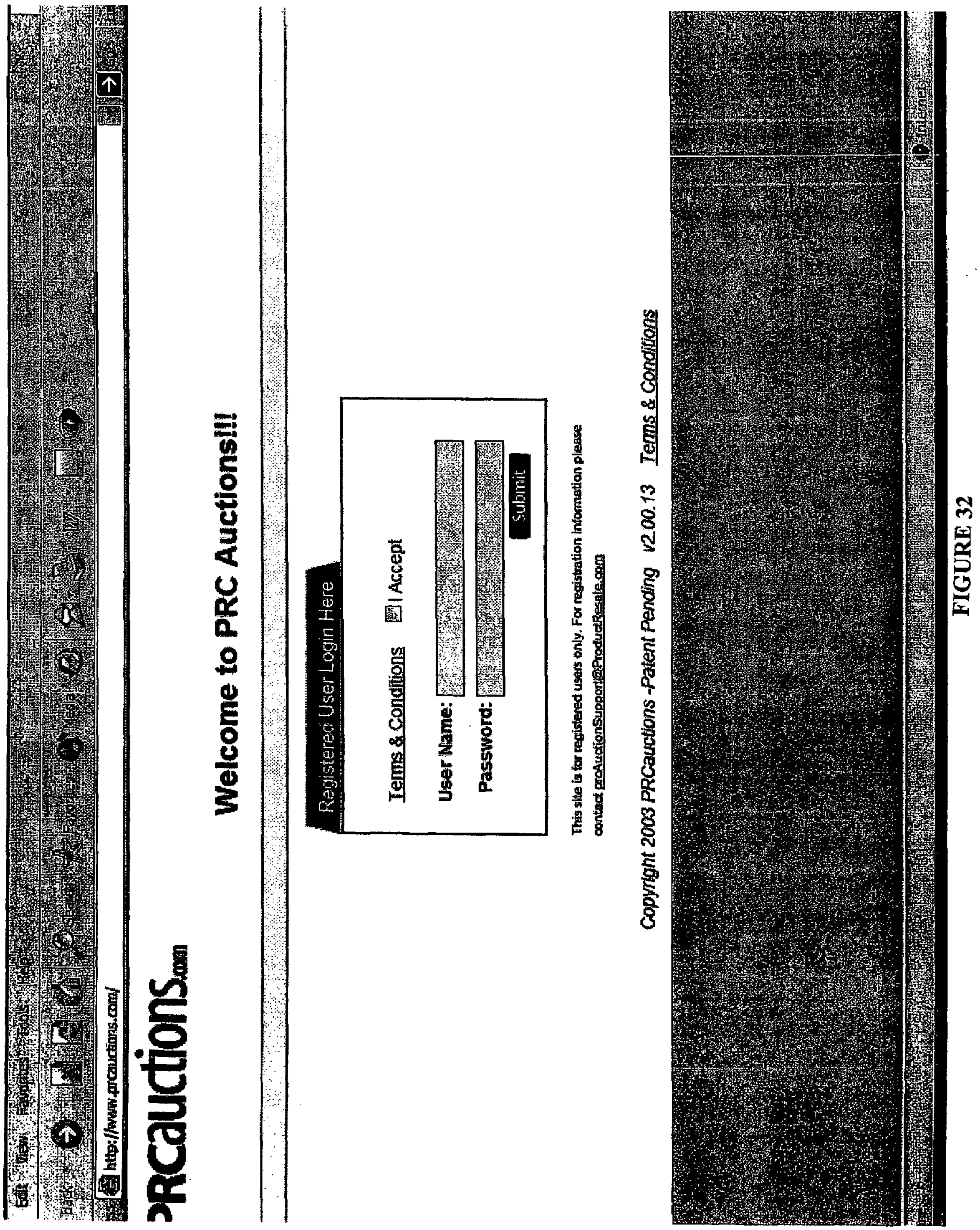
FIGS. 32-41 are screen shots illustrative of aspects of the present invention.
Figure 33:
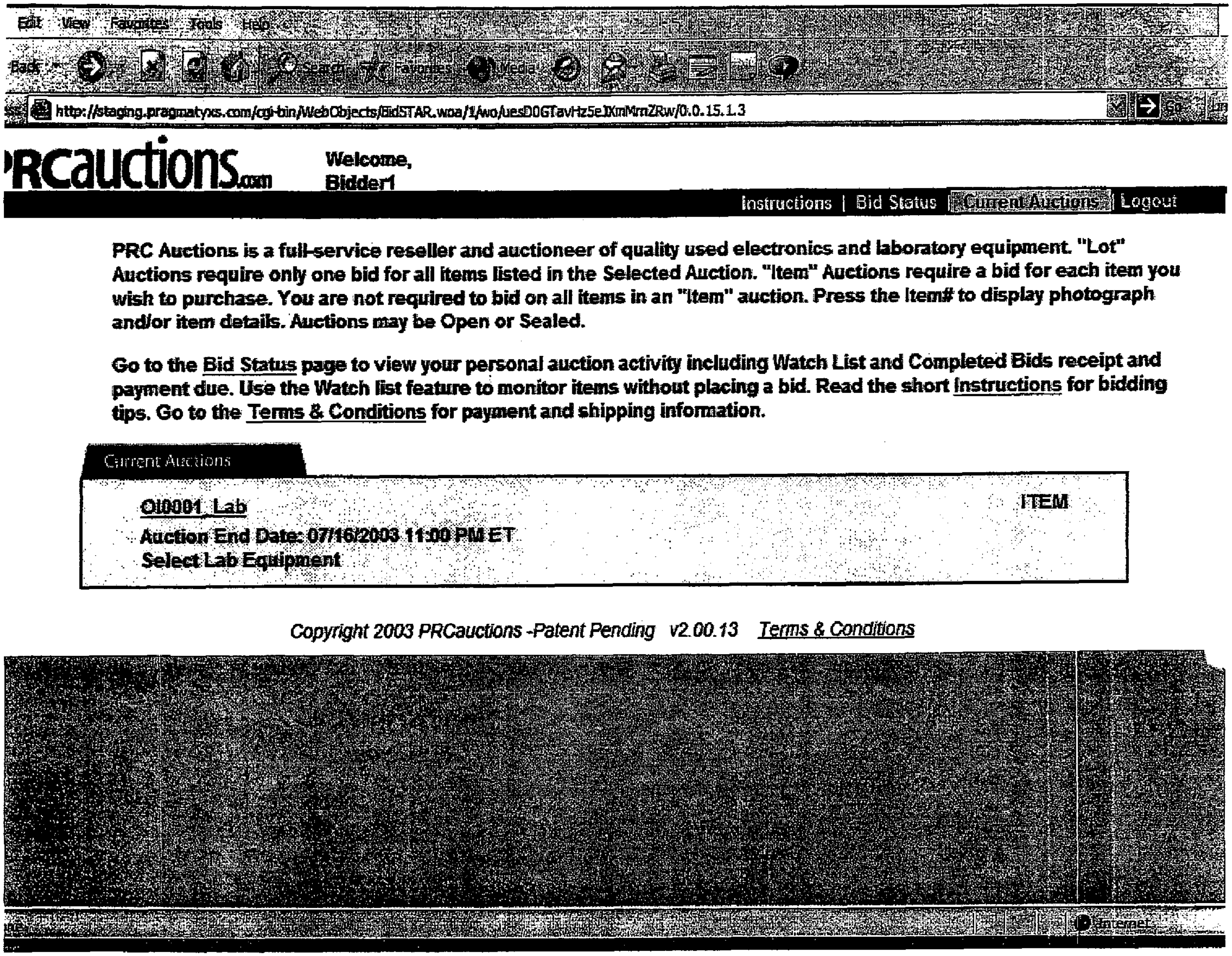
Figure 34:
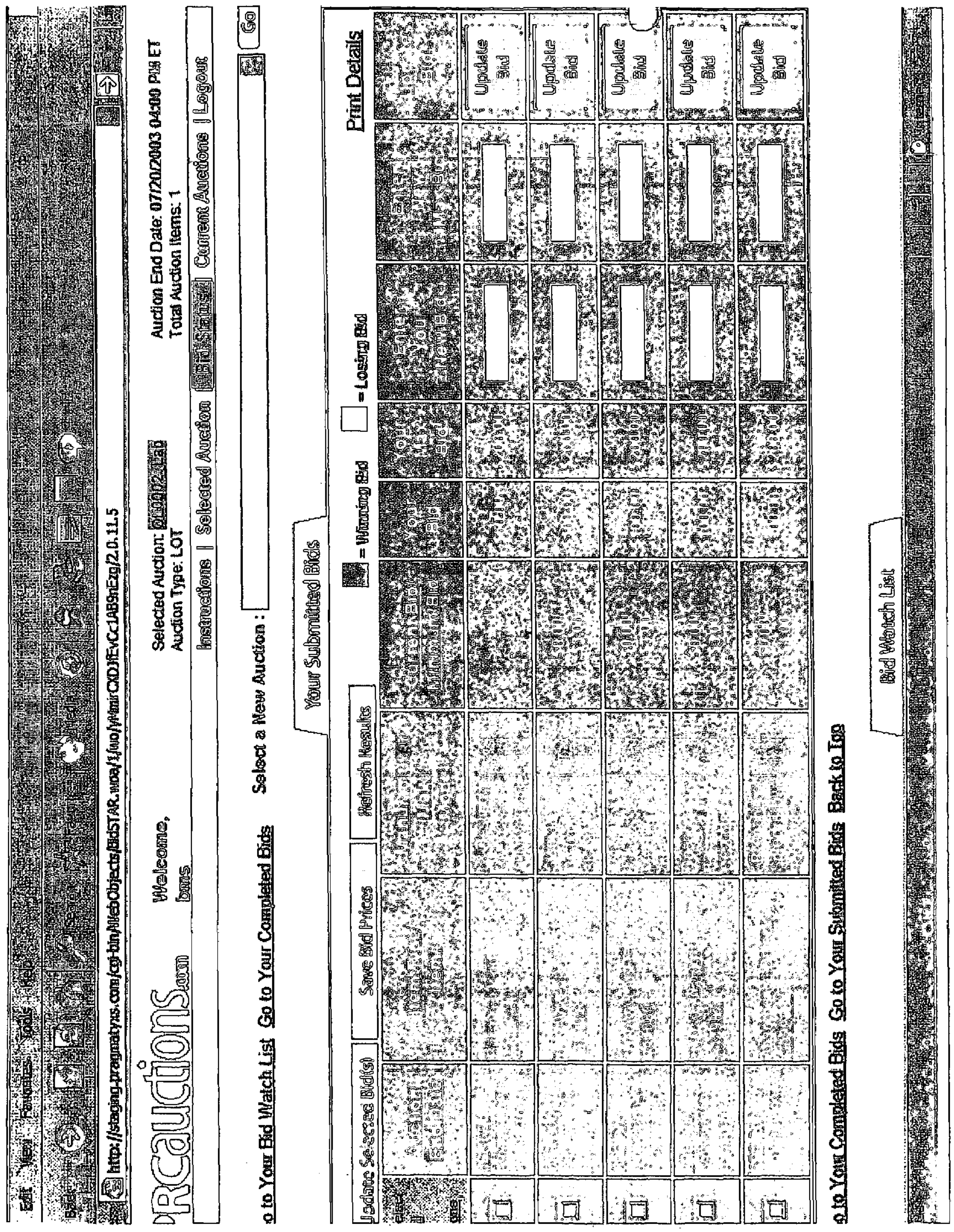
Figure 35:
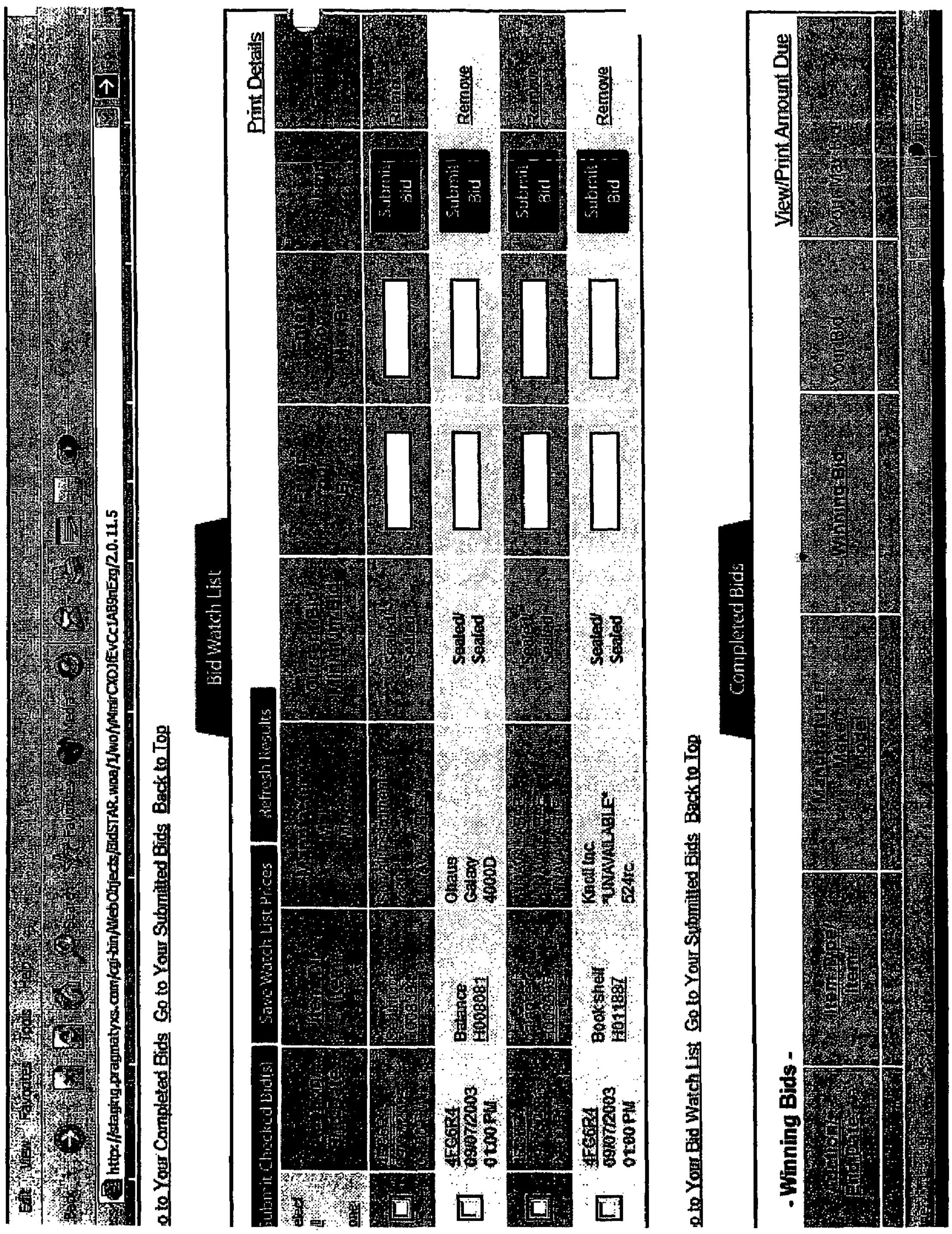
Figure 36:
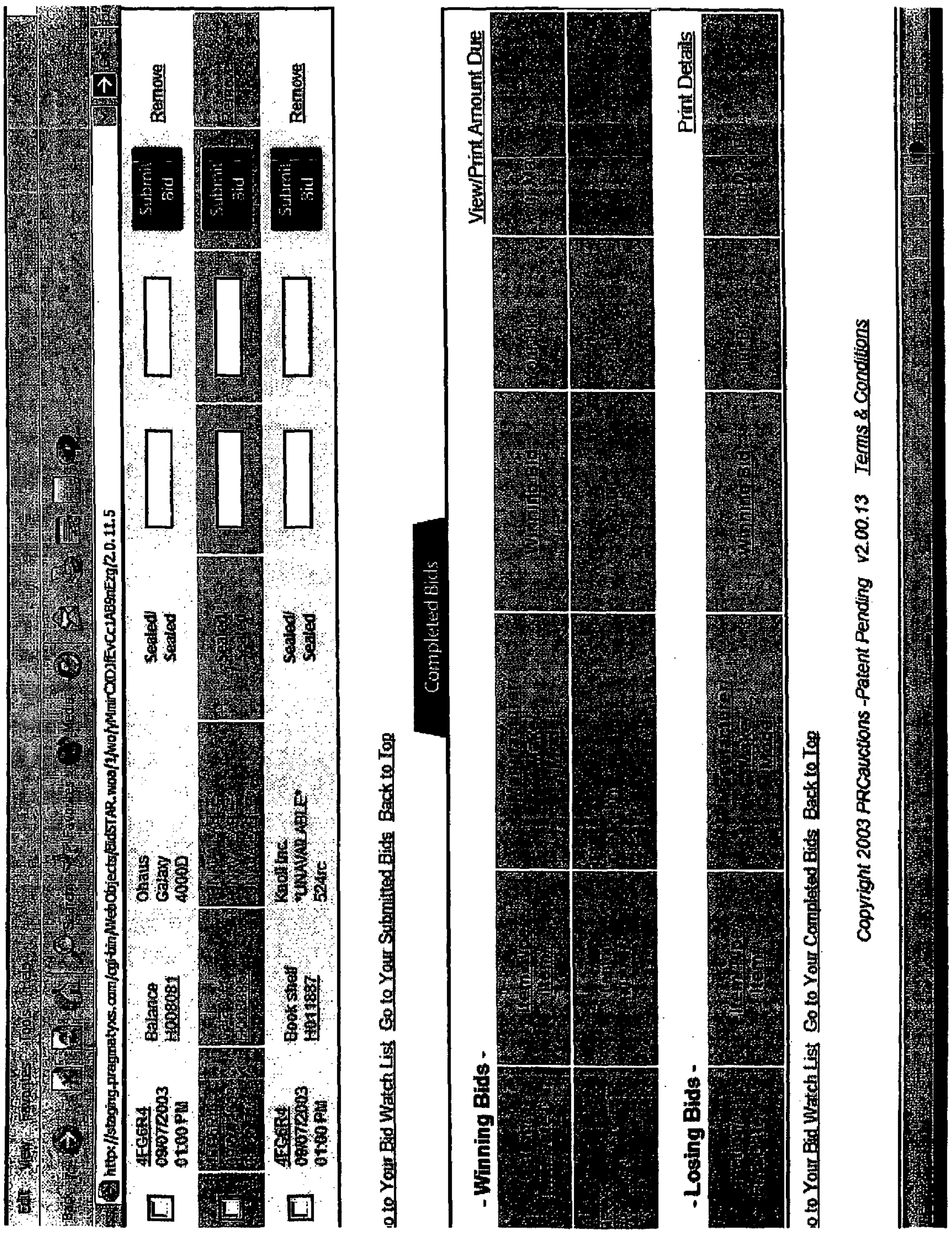
Figure 37:
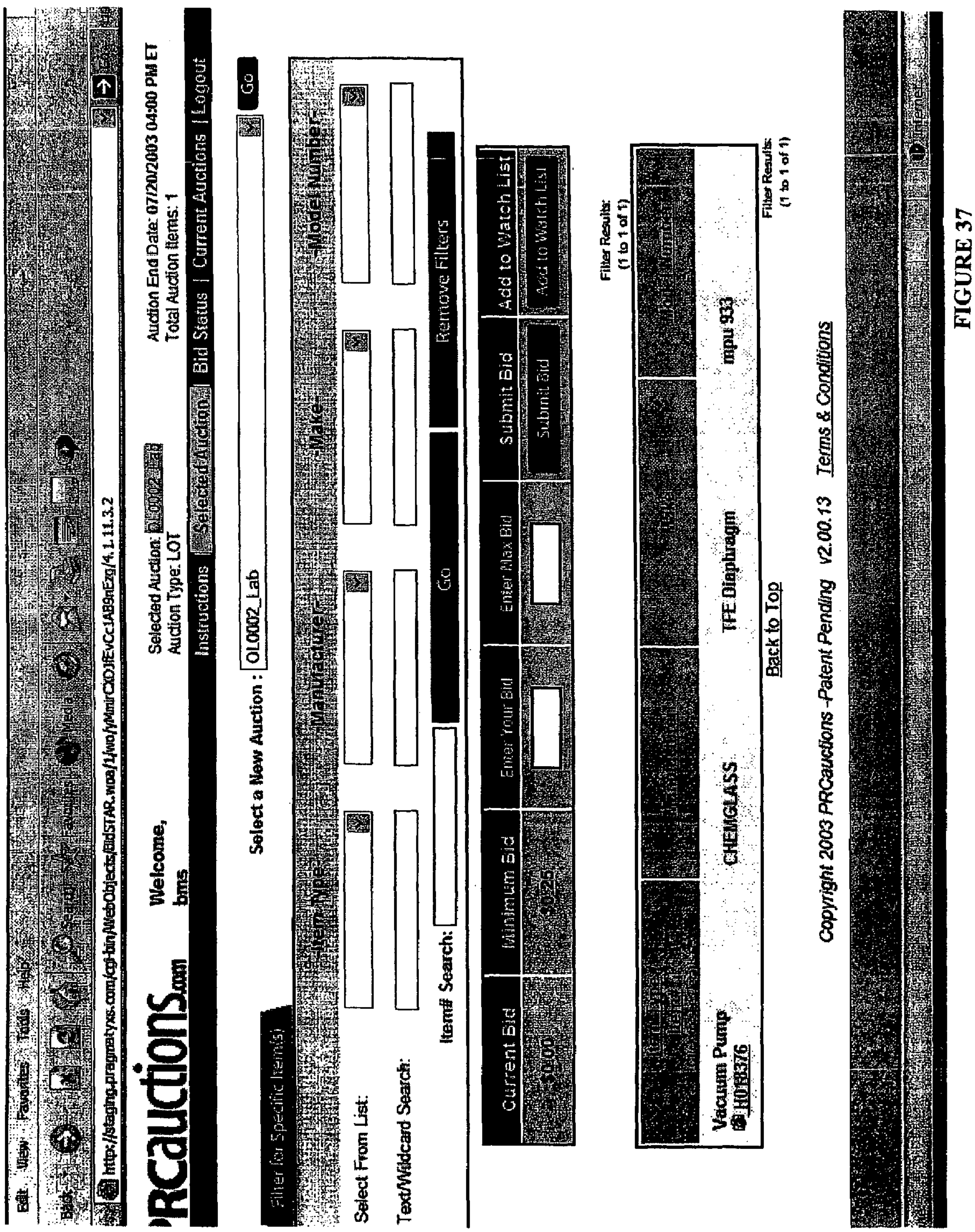
Figure 38:
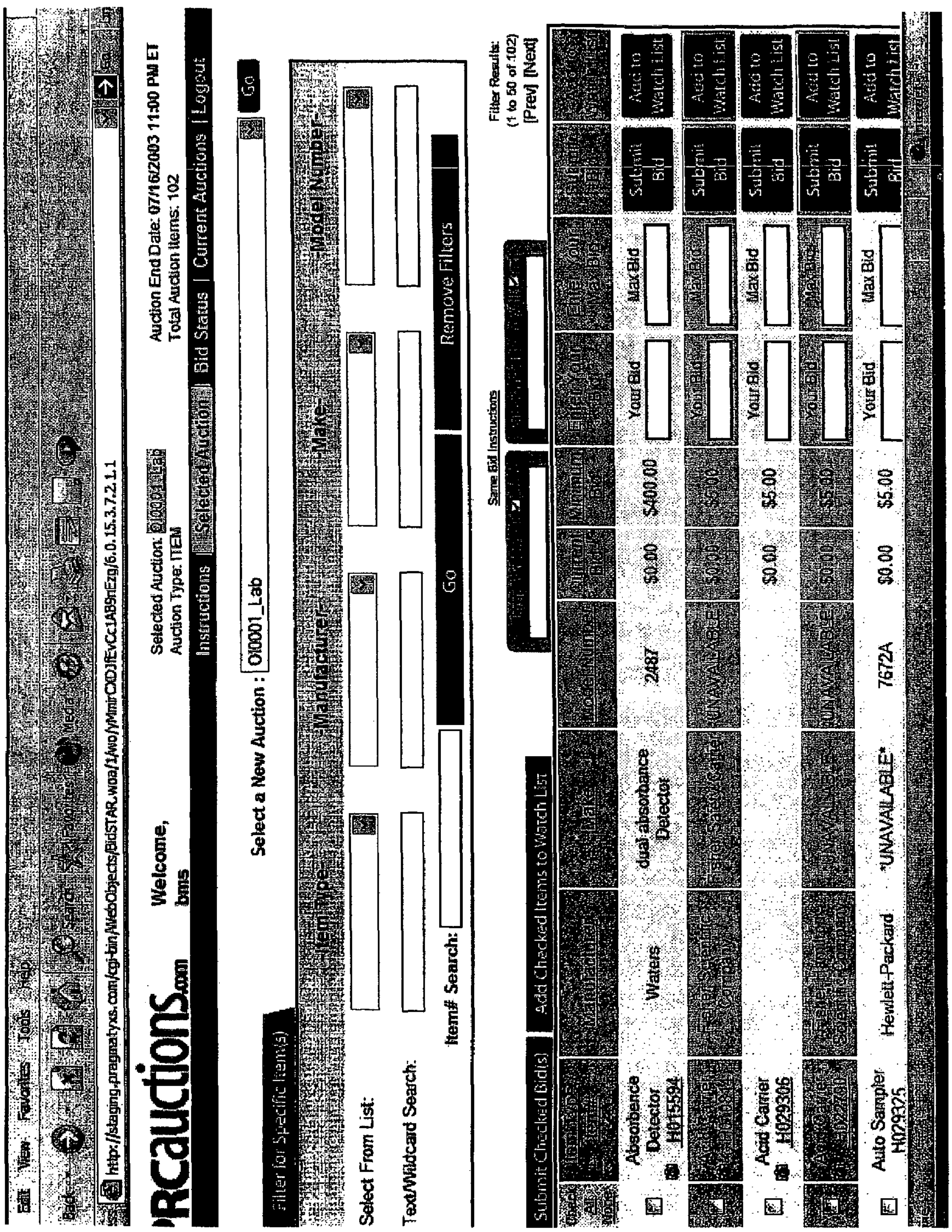
Figure 39:
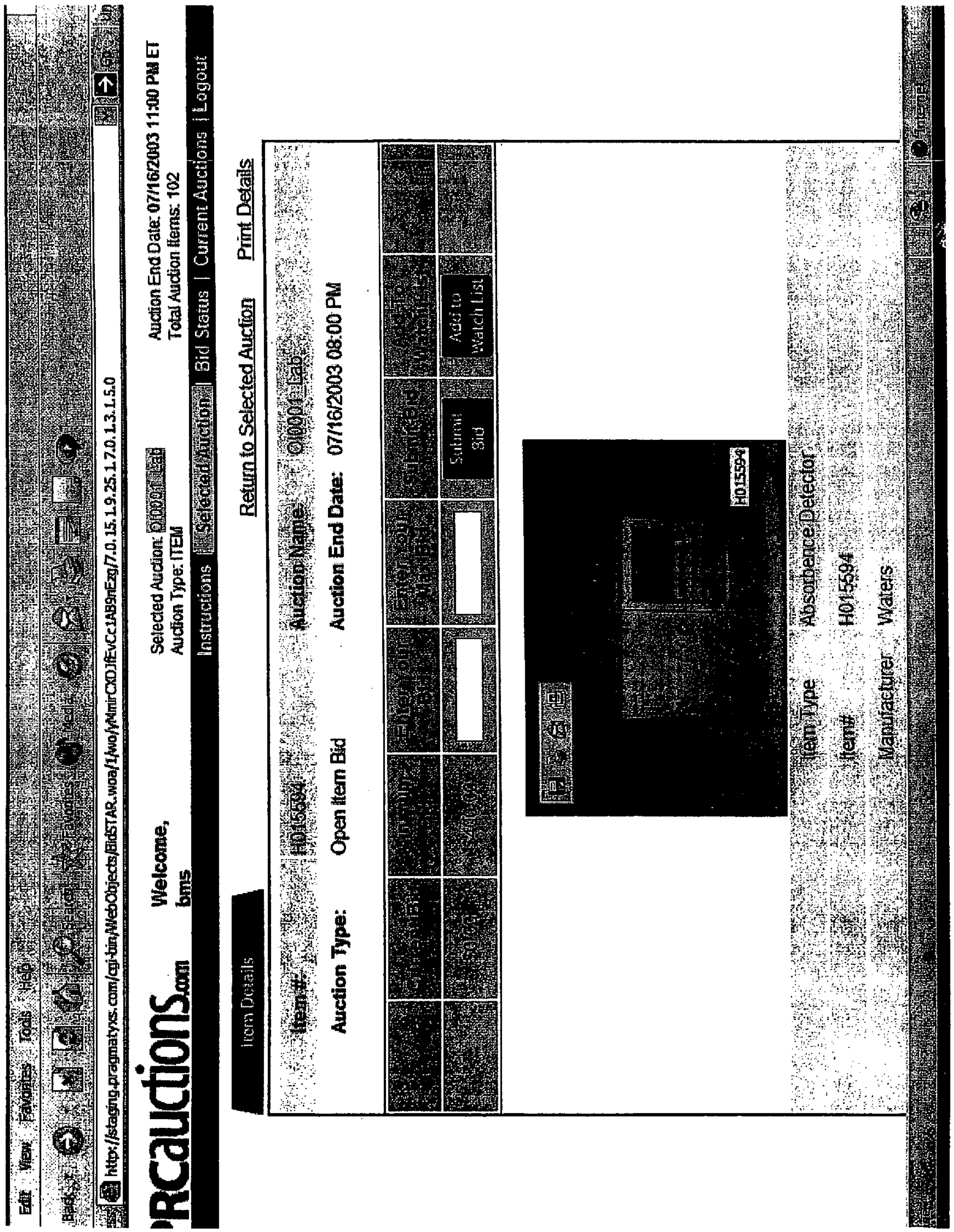
Figure 40:
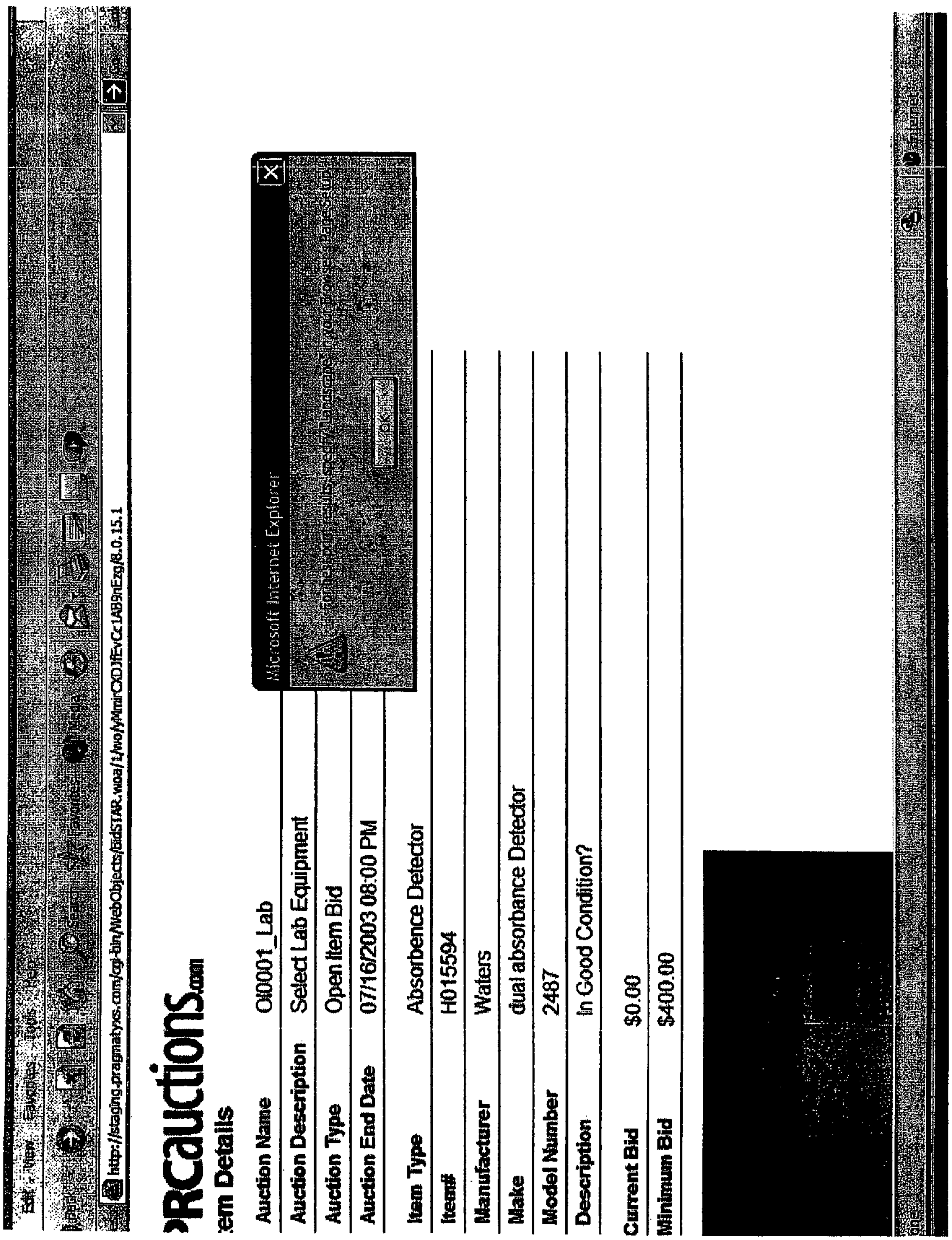
Figure 41:
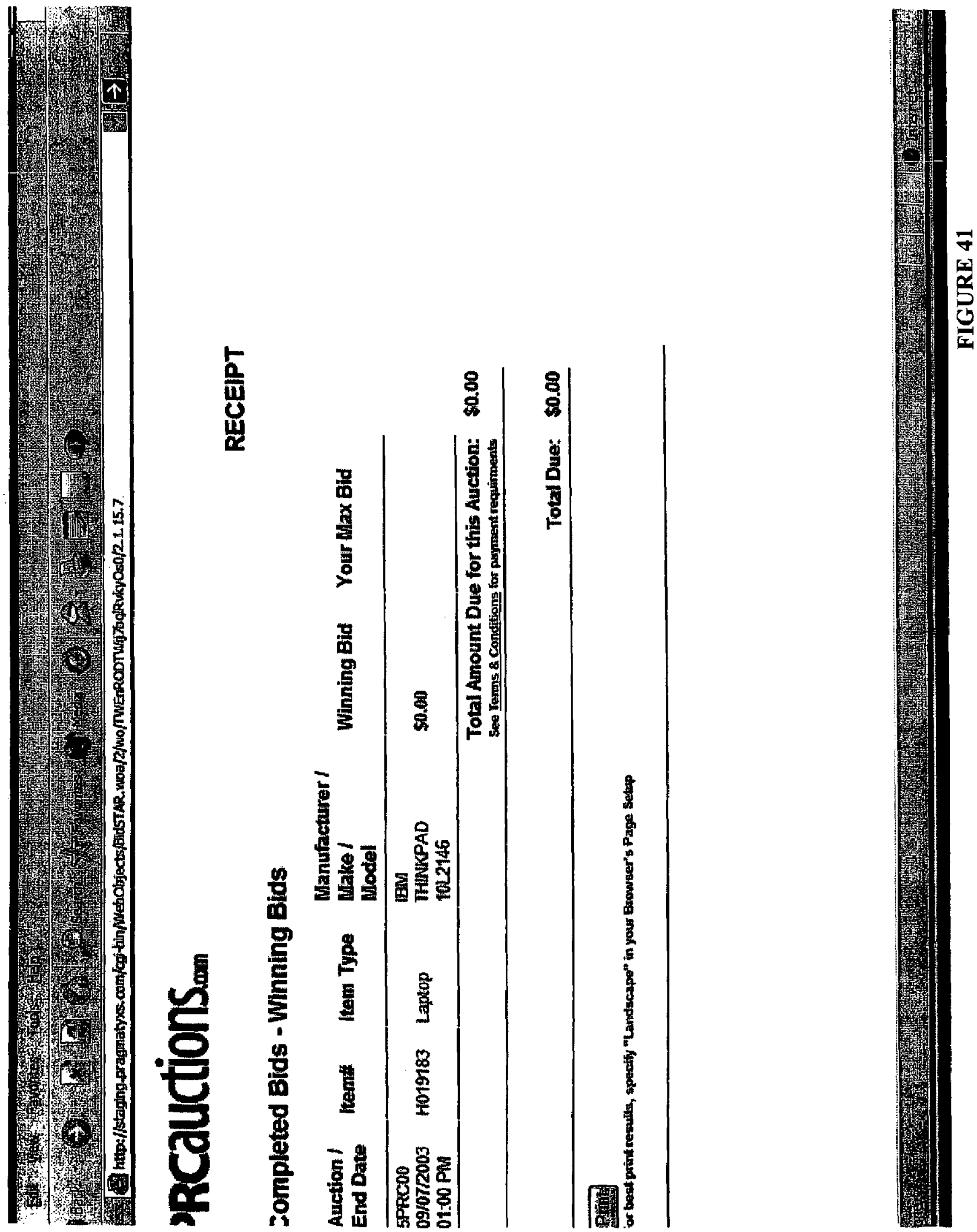
Figure 42:
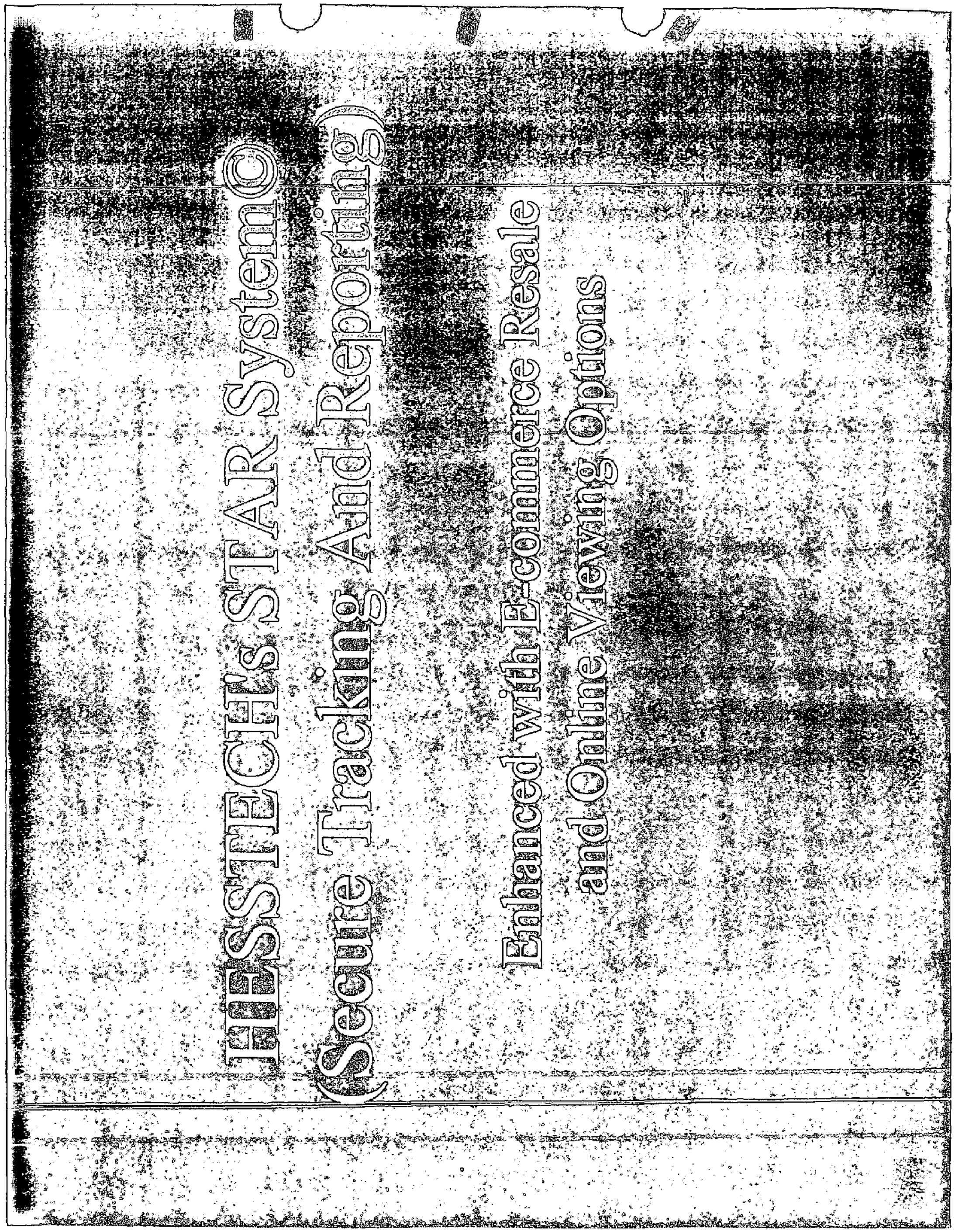
FIG. 42 illustrates resale and viewing aspects of the present invention.

In FIG. 24, there is shown a logout screen according to an aspect of the present invention. This login screen denotes the required information to access certain levels of the inventory system disclosed herein.

FIG. 6 is a flow diagram illustrating the implementation of an auction module from the inventory hub of FIG. 1. Items may be selected from the system inventory and designated for auction sale. Auction bidders may enter user information to acquire a list of items available for auction, or may be required to enter user information only upon entry of an auction bid. Further, the home page may be accessible to external users and may provide, for example, auction types and/or rules. Upon gaining access to the auction page, open auctions and closed auctions for requested items may be presented. Further, the requested items may be requested utilizing any search engine, as will be apparent to those skilled in the art. Open auctions are those wherein the current and minimum bid required are viewable to the user having that user's security level. Closed auctions are those wherein a current and minimum bid are not viewable to that particular user.

Lot auctions may be available, wherein a bid is required for the entire list of items in a given auction, and wherein one or more of the items are responsive to the users searched for item. Alternatively, line item auctions may be available, wherein a bid is required for each equipment item, or part of a piece of equipment, displayed in a list of equipment items, but wherein the sum of the lists, and/or the sum of the items, and/or the sum of the bids, may make up a single auction. Alternatively, in a line item auction, bidders may bid only on the items they wish to purchase. Alternatively, a line item lot auction may be available, wherein bids may be accepted for individual items, or for all items in the line item lot. However, in such line item lot auctions, the bidding closes for all items in the line item lot at the same time.

Referring now to FIG. 7, there is shown a flow diagram illustrating multiple line item or lot auctions running concurrently. Numerous lot or line item auctions may be available at any given time, and for any given item, and may be viewed by the user from an auction inventory page, for example. Further, items may be searchable not only by item type, but by lot or line item type, for example. In an embodiment, an item number, an item type, a manufacturer, a make, and/or a model may serve as the search term, and may be individually filtered, such as for security reasons. Clicking on an item number, which may be, for example, a hyperlink, may cause the display of an item detail page. The item detail page may include, for example, the audit trail of the selected item, or selected portions thereof. A description and/or photograph of the item may be provided to the prospective bidder. The prospective bidder may then submit a bid, or add the item to, for example, a watch list, from the item detail page. The auction start date, end date and end time, along with other auction detail, may be persistently provided, such as at the top of each page of a selected auction or item. A default, or a reserve, price for single or multiple items may be entered at one time. This may allow the bidder to filter for a list of items on which the bidder wishes to bid the same amount, and to have all items updated simultaneously. Check boxes may be used to select all, or individual items, to be set at the default bid amount.

Items may be selected for bid, or bid watch, and a bid status form, unique to each user, may be sent. The bid status form may list all items on which the bidder has submitted bids, the items the bidder is watching, current bid status, and items that have been won, lost, or closed in the course of bid.

FIG. 8 illustrates a flow diagram of a bid status form. The bid status form may have, in an exemplary embodiment, three sections that report on the status of each item on a bid list. For example, the submitted bid section may list all items on which the user has bid. A particular color or signifier, such as a green color, may indicate that the bidder has currently submitted the high bid.

A different color or signifier, such as a red color, may indicate that the bidder does not currently have the highest bid in that particular auction. The bidder may then increase the current bid from the submitted bids list, and have that bid update entered into the auction system. The bid watch list section may list all items that the user has selected to watch without actually bidding. The current bid price may be available from the bid watch list section. Further, the bidder may enter a bid from the watch list section. The completed list section may list all items the user has selected to watch without actually bidding. Further, this section may list all completed auctions, including those on which the bidder has bid, and the status of each. A green color, or other color, or other differentiating factor, may signify that the bidder has won that auction. A different color, or a different differentiation, may signify that the bidder has lost that auction.

Figure 9:
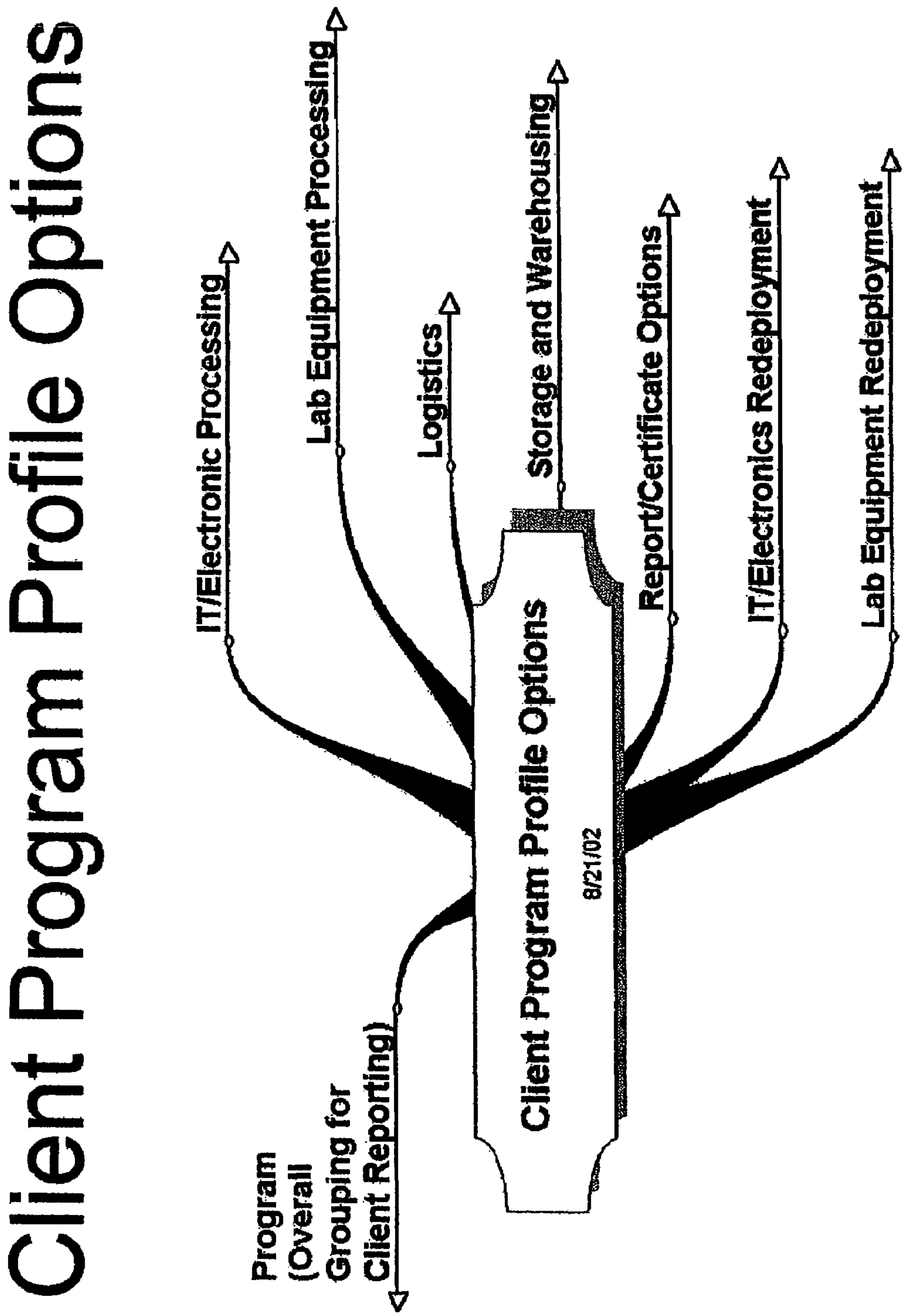
FIG. 9 is a flow diagram of an embodiment of the present invention illustrating client profile options implementing the hub and spoke system of FIG. 1.

Referring now to FIG. 9, there is shown a flow diagram of an exemplary client profile options implementing the hub and spoke system of FIG. 1, such as in the auction system of FIGS. 5 through 8. As may be seen in FIG. 9, the client program profile options link various aspects, such as the spokes of FIG. 1, for example, with the client reporting function. As shown in FIG. 9, the program or overall grouping for client reporting may be linked to the client program profile options. Also linked to the client program profile options are the various spokes which may be utilized, such as the IT/Electronic Processing, Lab Equipment Processing, Logistics, storage and warehousing, report/certificate options, IT/electronics redeployment and lab equipment redeployment.

Figure 10:
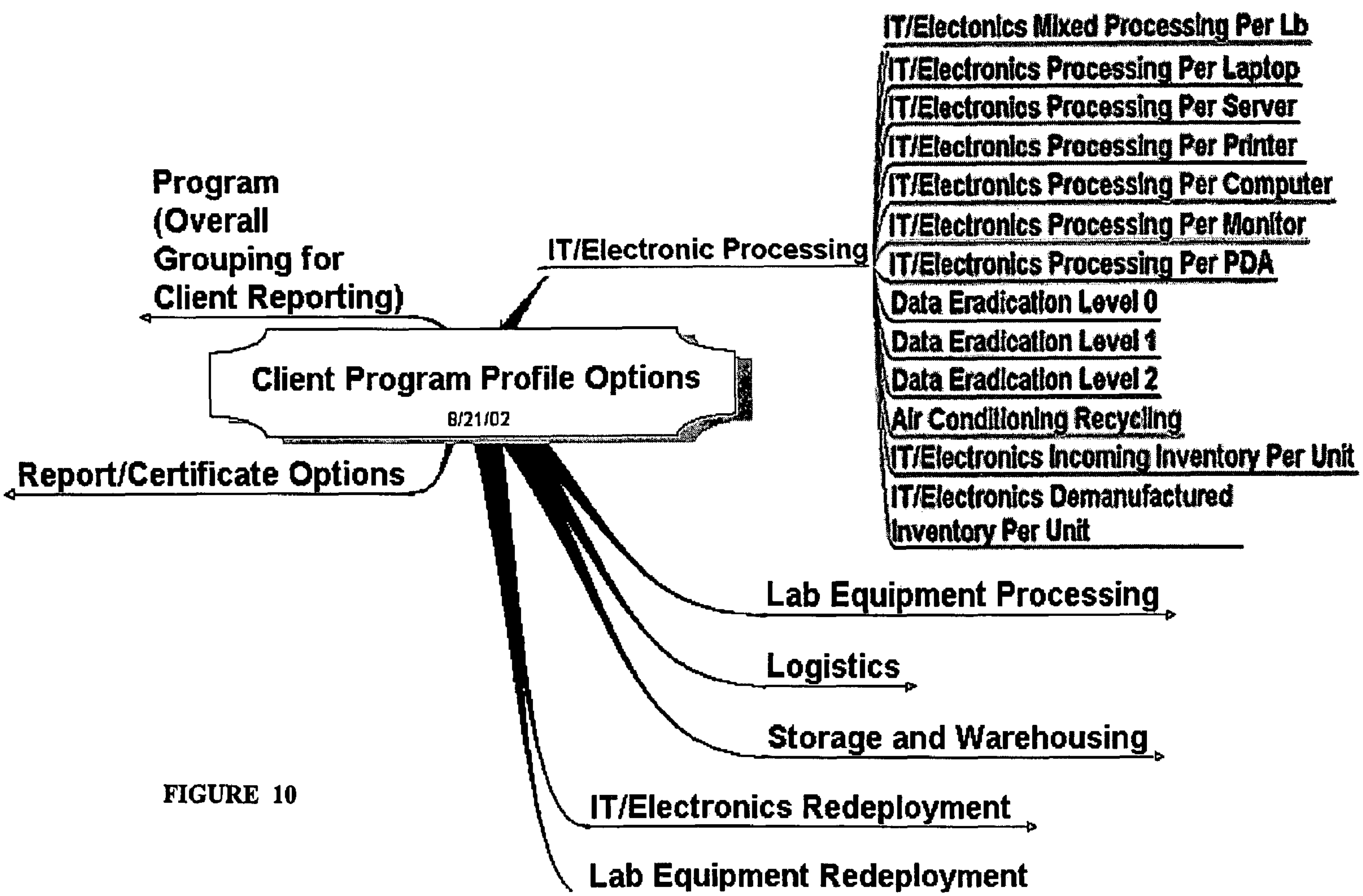
FIG. 10 is a flow diagram of an embodiment of the present invention illustrating the IT/electronic processing of FIG. 9.

Referring now to FIG. 10, there is shown a flow diagram of the IT/electronic processing module of FIG. 9. As may be seen in FIG. 10, the IT/Electronic Processing may include, by way of non-limiting example only, electronics mixed processing per pound, processing per laptop, per server, per printer, per computer, per monitor, and per PDA. Further, the electronic processing may include accounting for data eradication levels indicative of the processing, such as level 1, 2, or 3. Further, the processing may include accounting for each incoming inventory unit.

Figure 11:
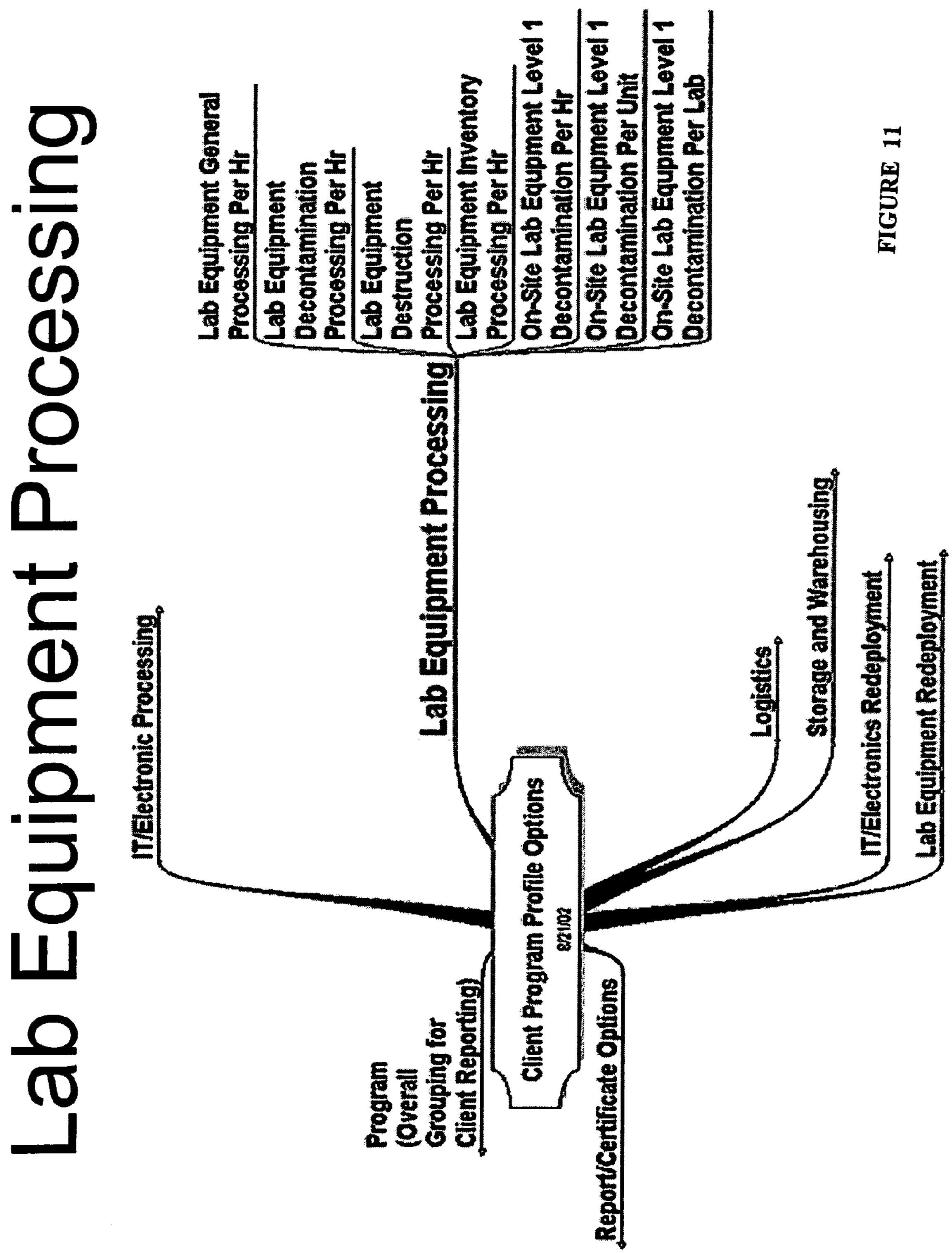
FIG. 11 is a flow diagram of an embodiment of the present invention illustrating Lab Equipment processing module of FIG. 9.

Referring now to FIG. 11, there is shown a flow diagram of the Lab Equipment processing module of FIG. 9. As may be seen in FIG. 11, the lab equipment processing may include general processing per hour, decontamination processing per hour, destruction per hour and inventory processing per hour.

Figure 12:
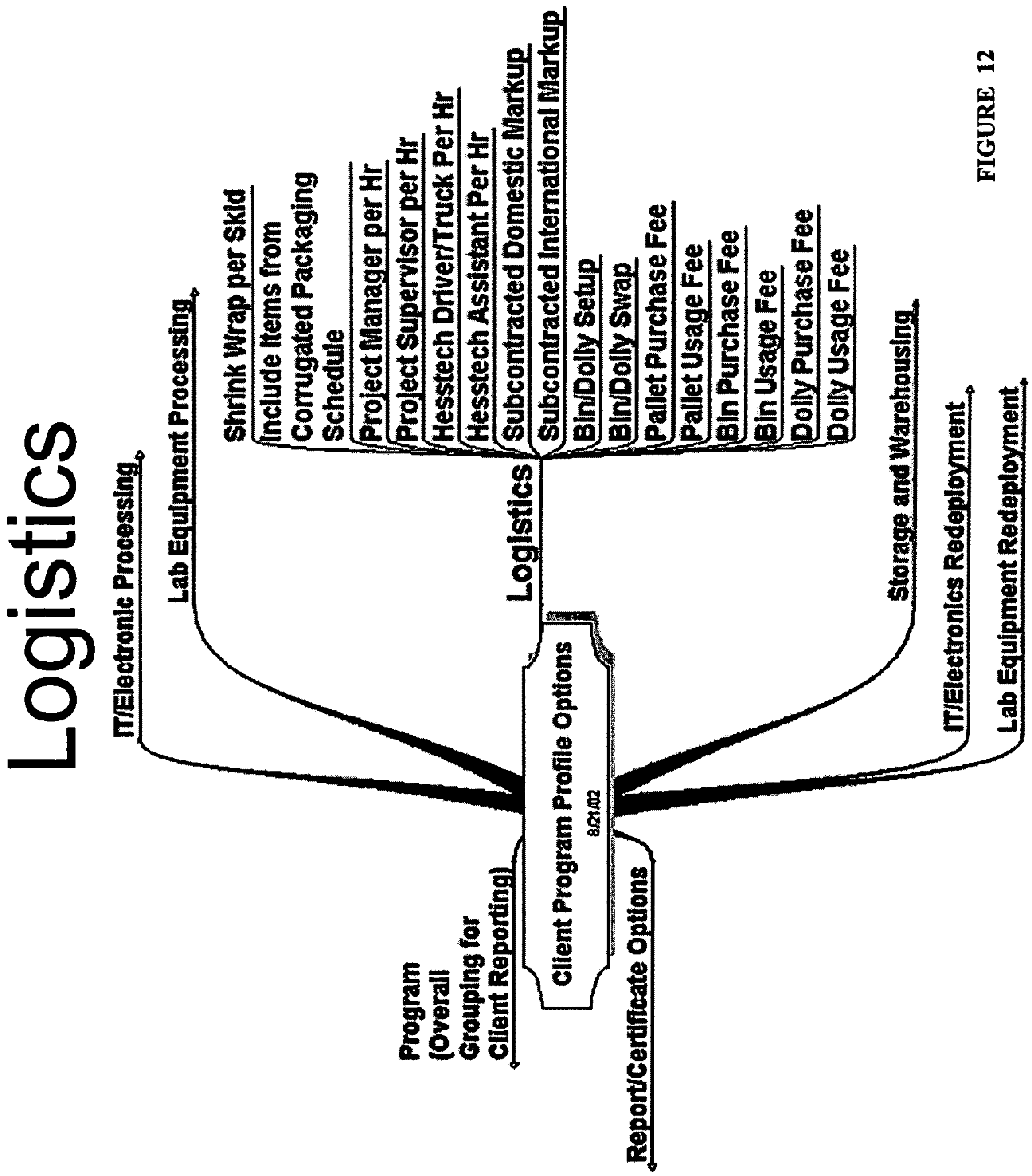
FIG. 12 is a flow diagram of an embodiment of the present invention illustrating of the Logistics module of FIG. 9.

Referring now to FIG. 12, there is shown a flow diagram of the Logistics module of FIG. 9. As may be seen in FIG. 12, the logistics module may include shrink wrap per skid, accounting for personnel such as a manager, supervisor or other required personnel. Other setup fees and cost may be itemized such as bin or dolly setup fees, pallet fees, and other necessary charges.

Figure 13:
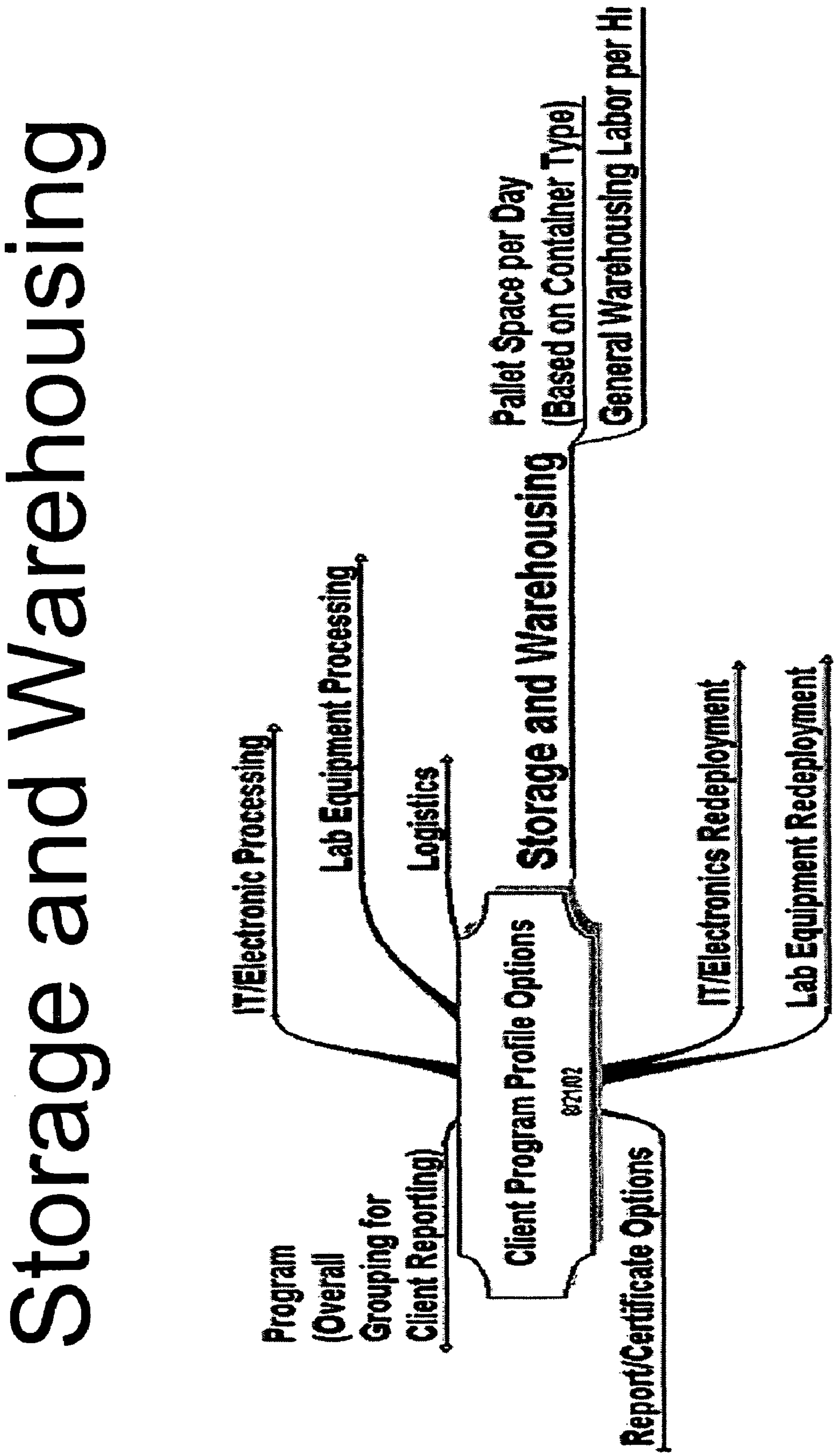
FIG. 13 is a flow diagram of an embodiment of the present invention illustrating the storage and warehousing module of FIG. 9.

Referring now to FIG. 13, there is shown a flow diagram of the storage and warehousing module of FIG. 9. Such storage and warehousing may include itemization of pallet space per day identified for selected container types and additional general warehousing costs per hour such a labor.

Figure 14:
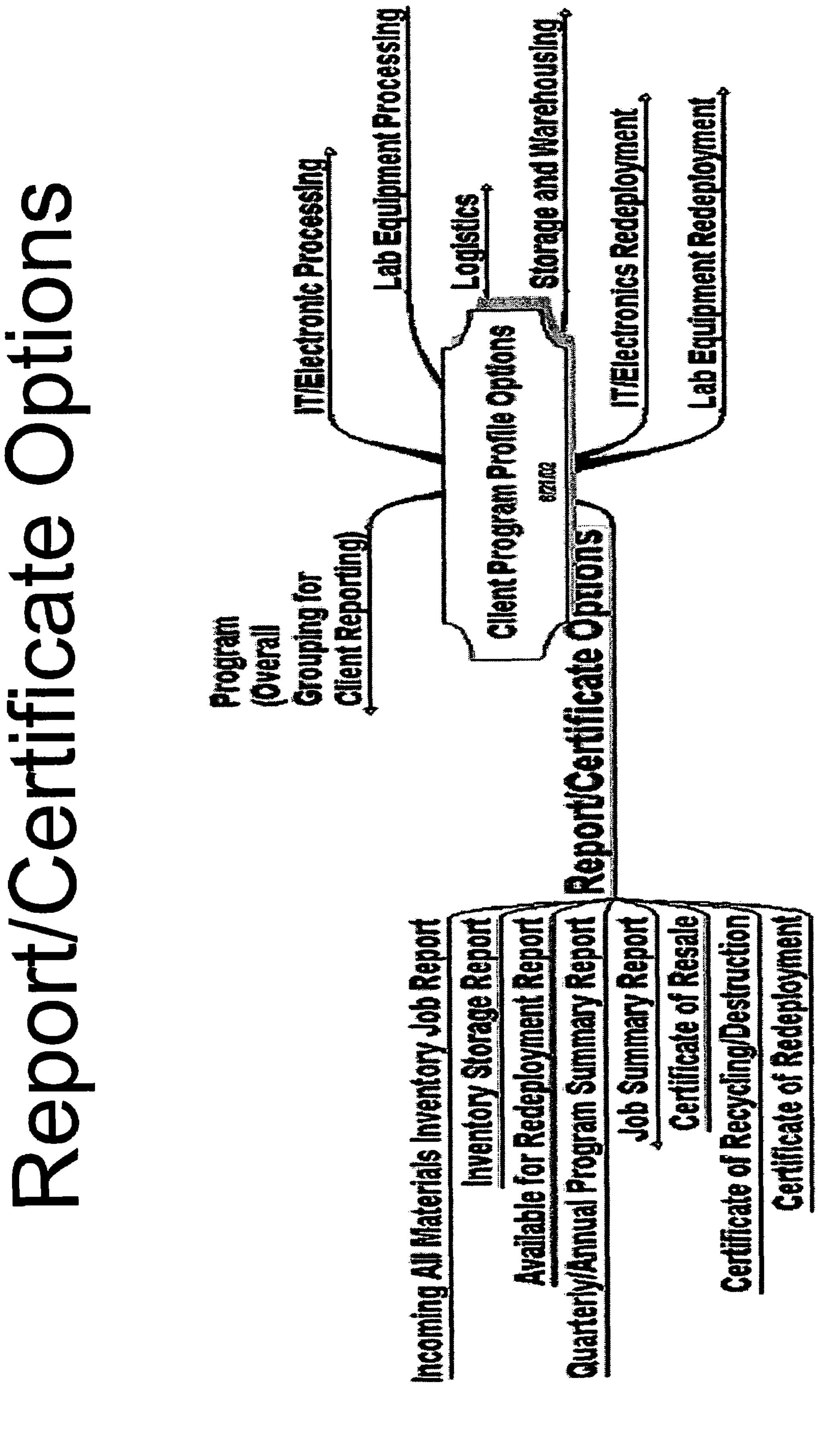
FIG. 14 is a flow diagram of an embodiment of the present invention illustrating the report/certificate options module of FIG. 9.

Referring now to FIG. 14, there is shown a flow diagram of the report/certificate options module of FIG. 9. The report certification options may include itemization of all materials inventoried for a job, a storage report, identification of materials or parts identified for redeployment, job summaries, and various certificates.

Figure 15:
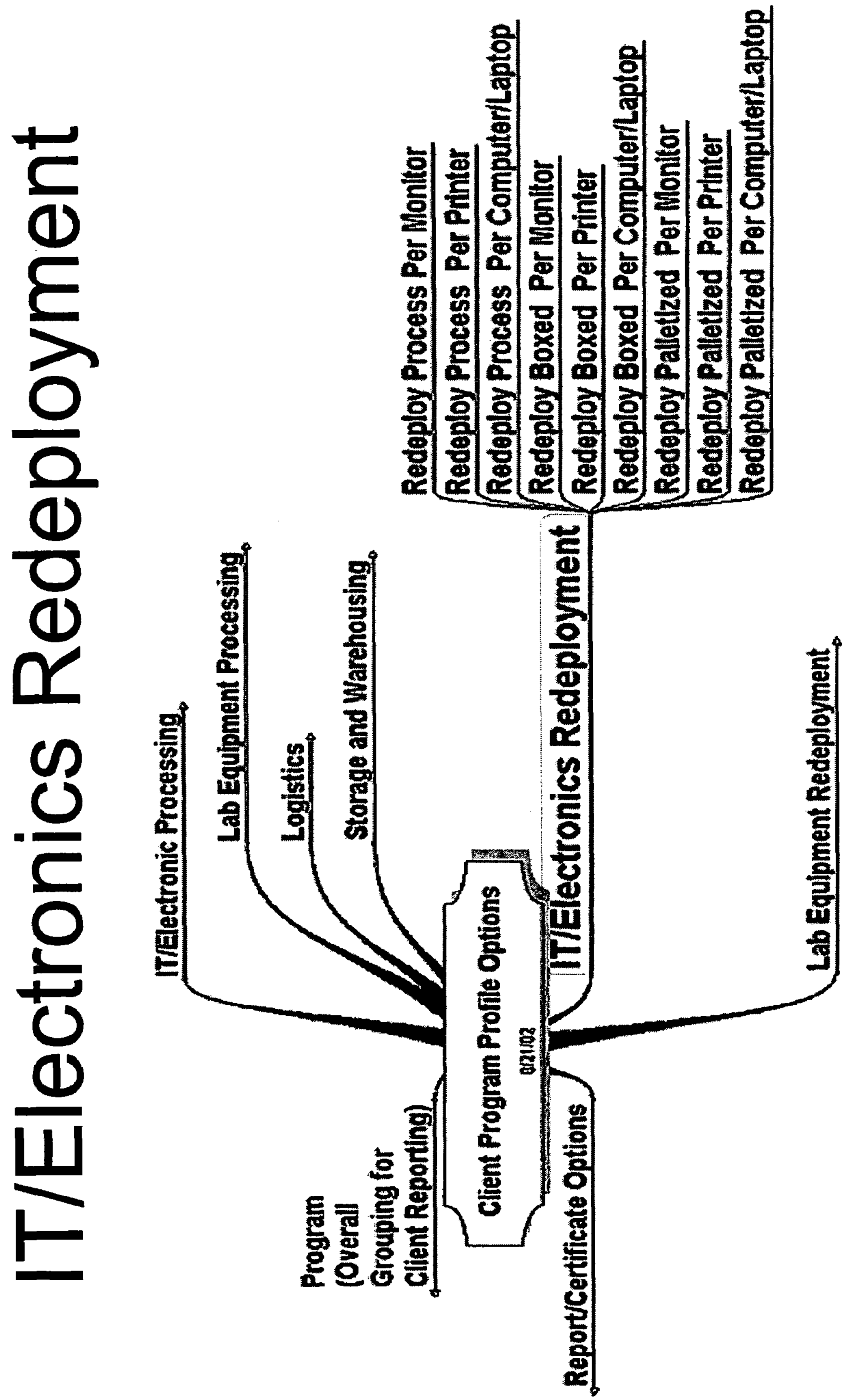
FIG. 15 is a flow diagram of an embodiment of the present invention illustrating the electronics redeployment module of FIG. 9.

Referring now to FIG. 15, there is shown a flow diagram of the electronics redeployment module of FIG. 9. As may be seen in FIG. 15, electronics redeployment may be itemized by monitor, printer and computer/laptop in such increments as process, box and pallets.

Figure 16:
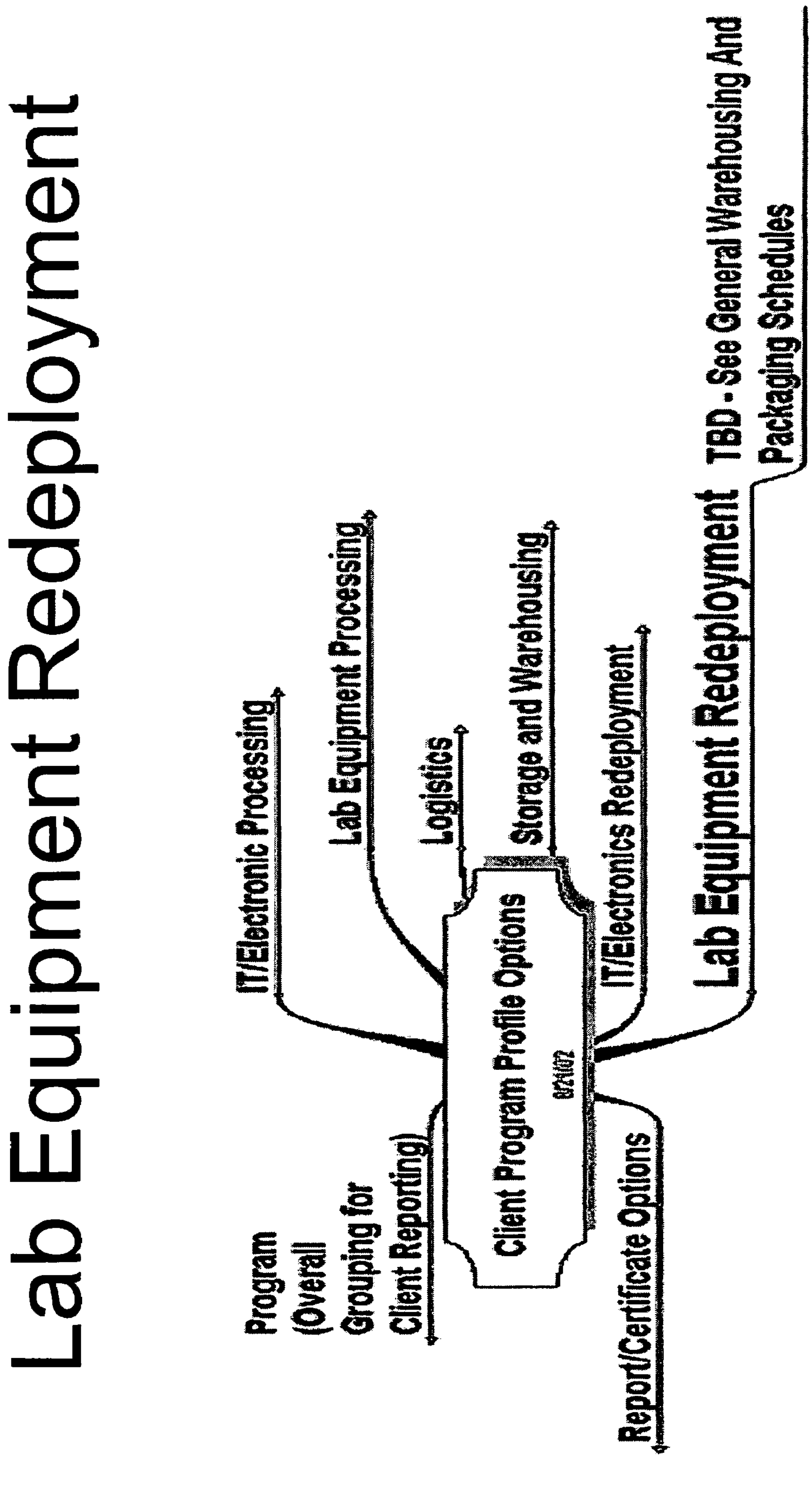
FIG. 16 is a flow diagram of an embodiment of the present invention illustrating an exemplary lab equipment redeployment module of FIG. 9.

Referring now to FIG. 16, there is shown a flow diagram of an exemplary lab equipment redeployment module of FIG. 9.

Figure 17:
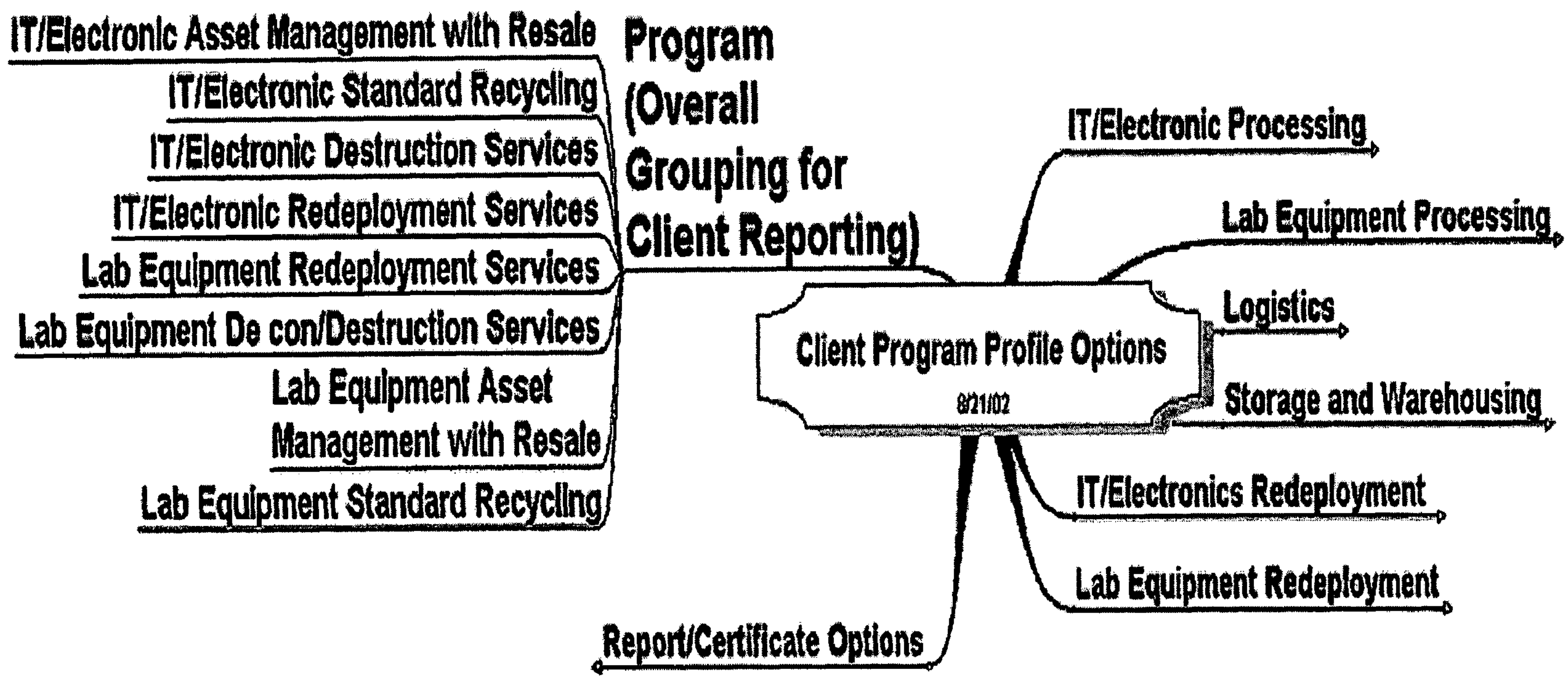
FIG. 17 is a flow diagram of an embodiment of the present invention illustrating the overall grouping module for client reporting of FIG. 9.

Referring now to FIG. 17, there is shown a flow diagram of the overall grouping for the client reporting of FIG. 9. As may be seen in FIG. 17, the client reporting may include groups such as asset management with resale, standard recycling, destruction services, redeployment services for electronics and/or lab equipment.

Referring now to FIG. 18, there shown a list of potential job summary 10 reports which may be generated by the present invention including demanufactured inventory, redeployment, resale settlement and software audit reports.

In addition, there may be a need or requirement to track and report information regarding data, software, and/or hardware eradication in one program. The present invention may incorporate each of these elements. For example, as discussed above, individual hardware items may be tracked and inventoried. Additionally, software may be identified on a computer system and tracked similarly to the component level tracking of hardware. Further, data components may be tracked.

For example, the registry information on a computer may be tracked. This provides assurances to those involved, such as the original owner of the computer, that data and software are being eradicated such as by fdisk or disk formatting before sending the computer to the inventory system. The present invention is capable of interrogating the computer system to determine which software applications were previously resident on the machine even after such a disk format. This may provide ownership and separates licenses, such as software licenses, from the hardware in which they reside. This may allow for example, a computer owner to discard a computer system while accounting for the software licenses, thereby permitting the licensed software to be added to another machine without purchasing a new software license.

Figure 43:
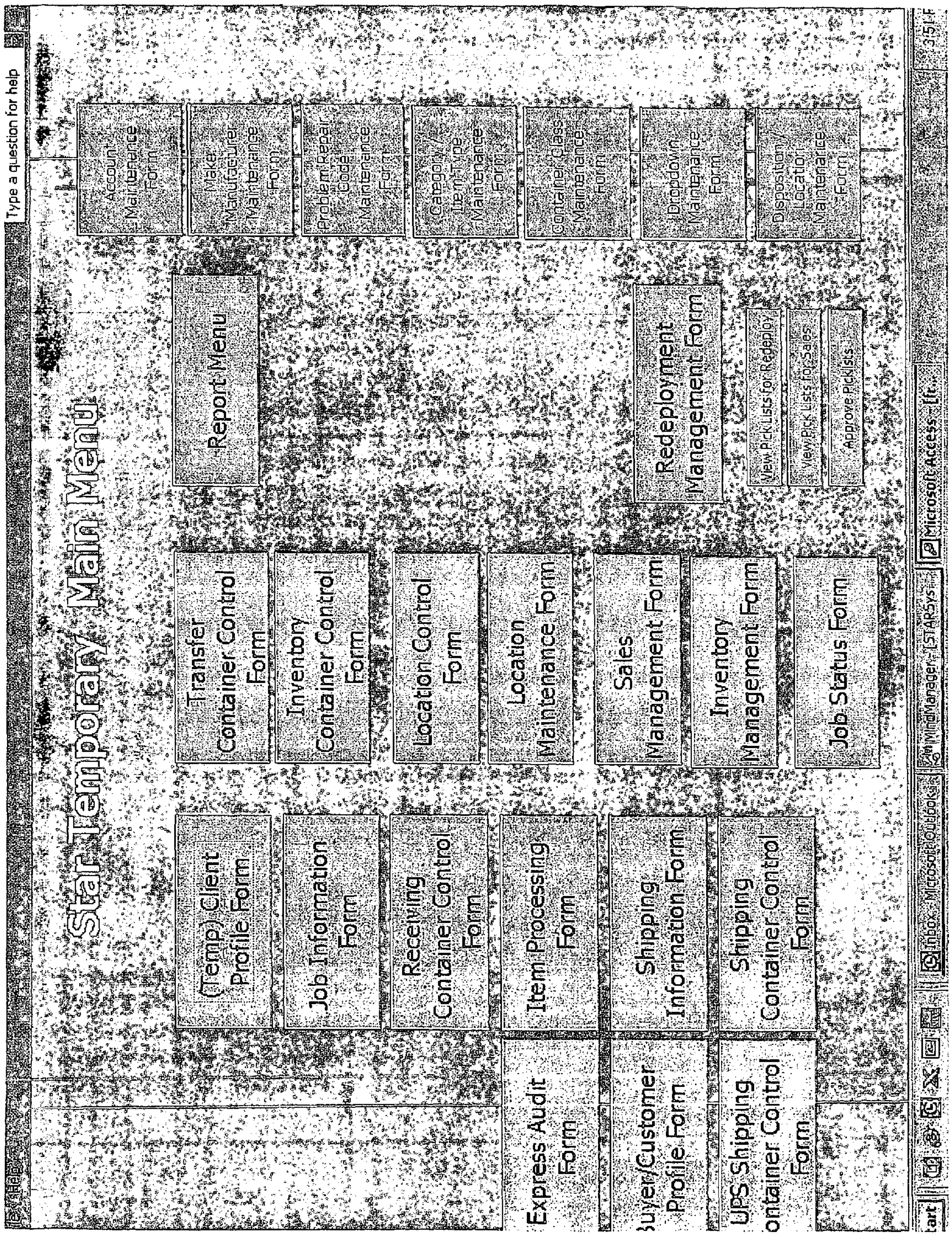
FIG. 43 is a screen shot illustrative of a main menu of the present invention.

FIGS. 25-54 are illustrative of aspects of the present invention. FIGS. 25-31, are illustrative of interfaces used in the tracking system of this invention to support reselling functions such as inventory updating, searching, managing and/or appraising. Screen shots of FIGS. 30-41, illustrate, for example, the management of an auction, including the entry and searching of item information, logging in to an auction, searching auction items and bidding, including bid breakdowns and watch items. FIG. 43 illustrates a screen shot of an exemplary main menu entry screen for entry to the network of the present invention.

Figure 44:
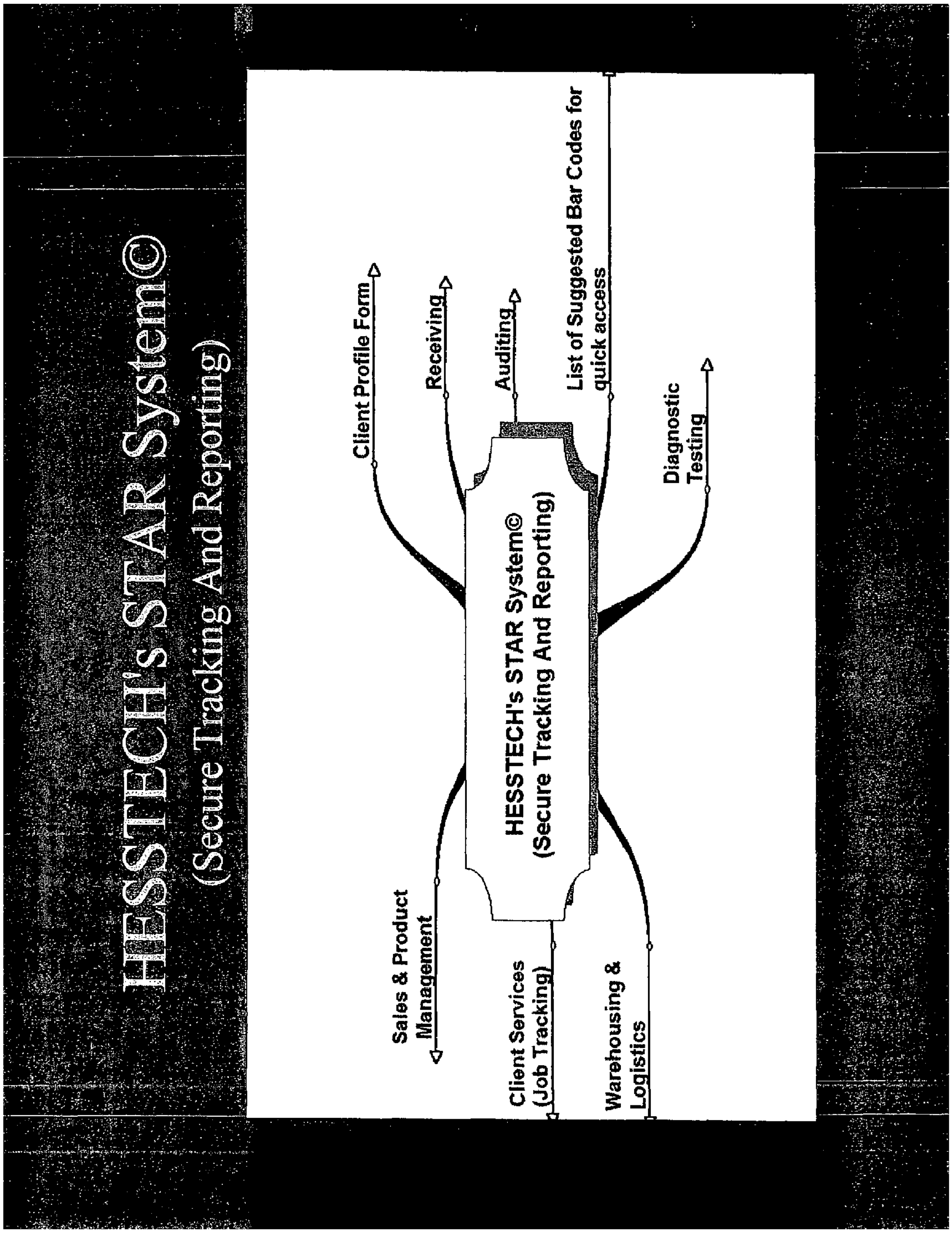
FIG. 44 is an hierarchical diagram illustrative of the organizational hierarchy used in an exemplary embodiment of the present invention.
Figure 45:
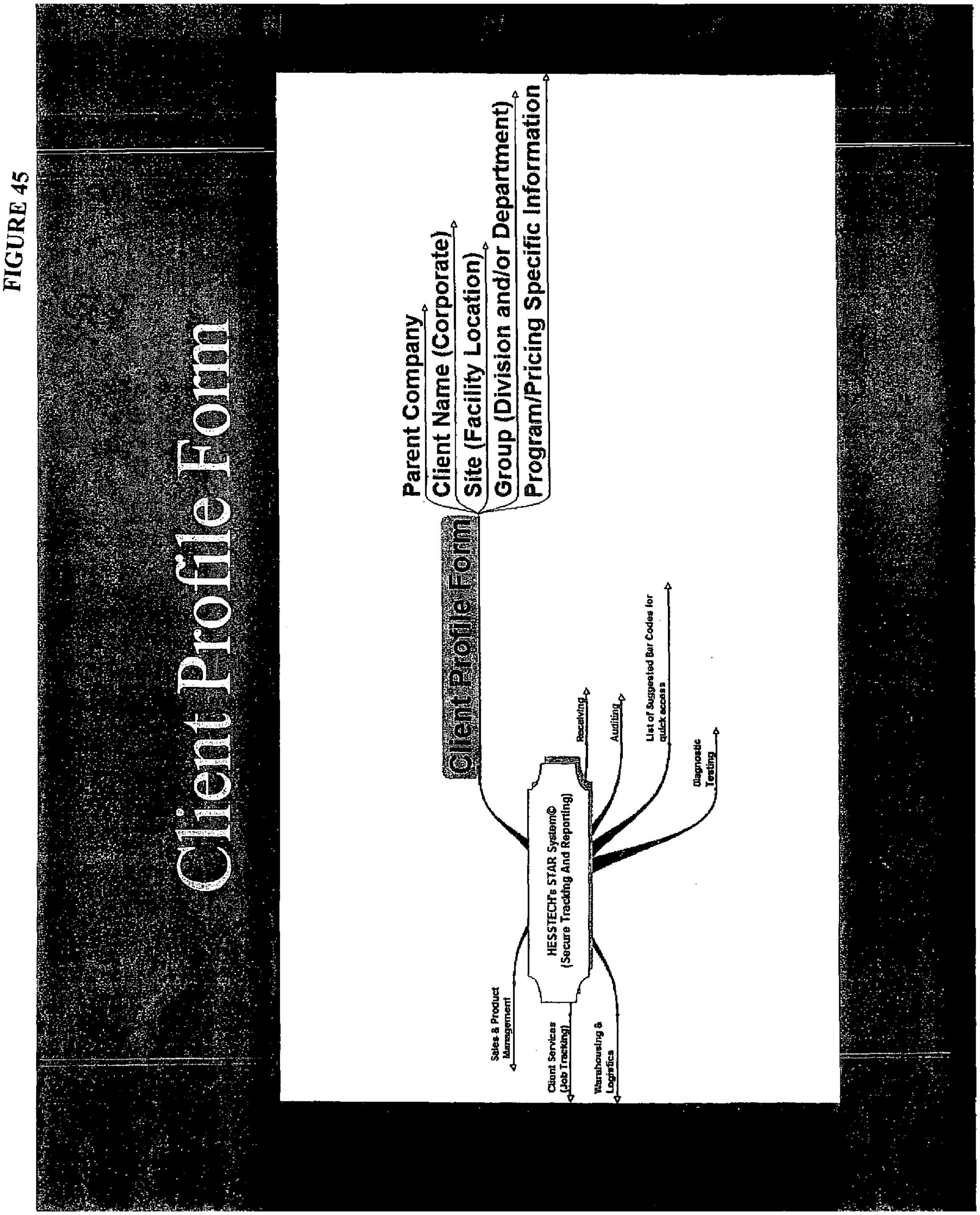
FIG. 45 is an hierarchical diagram depicting aspects of a client profile sub-hierarchy of the exemplary embodiment of FIG. 44.
Figure 47:
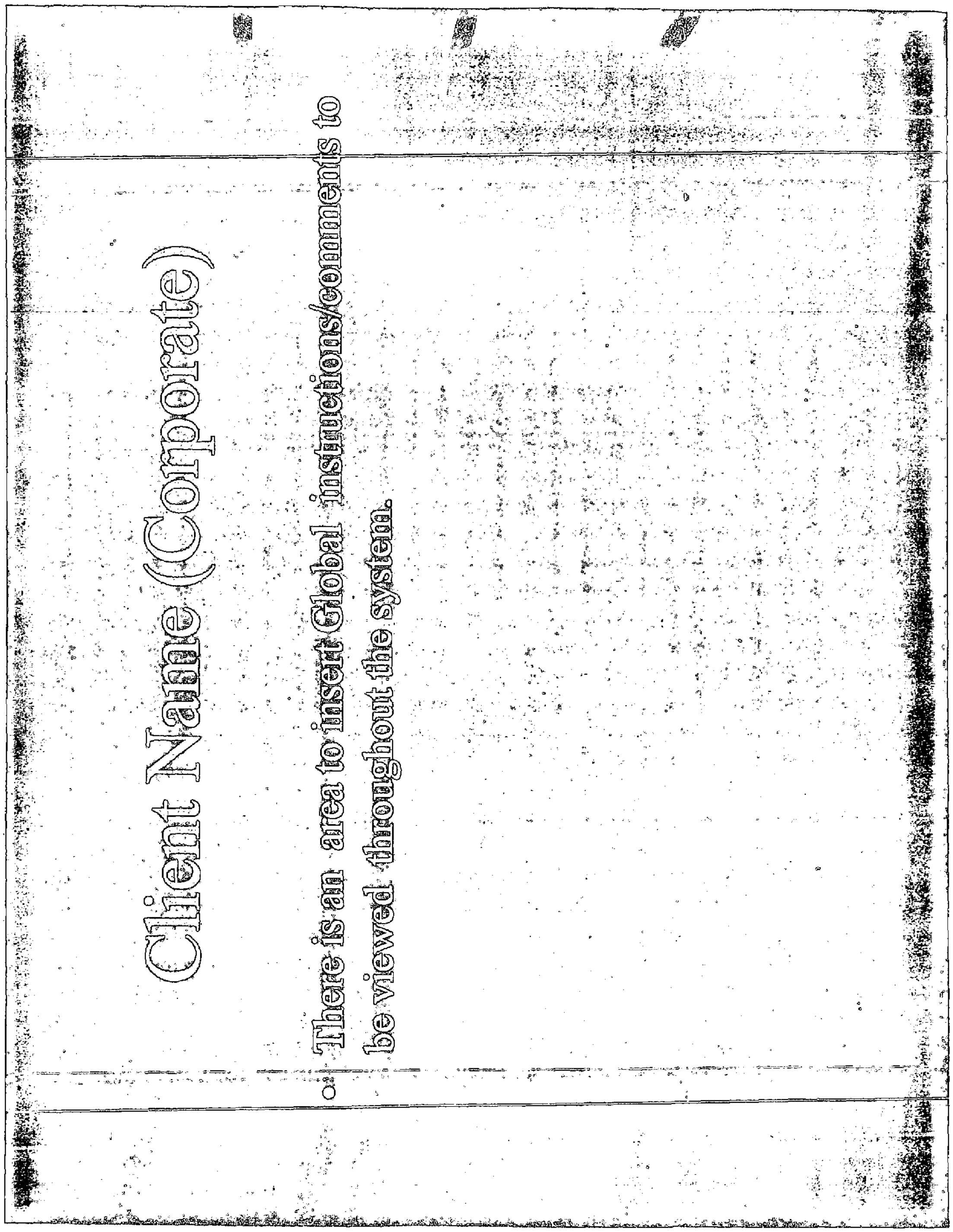
Figure 48:
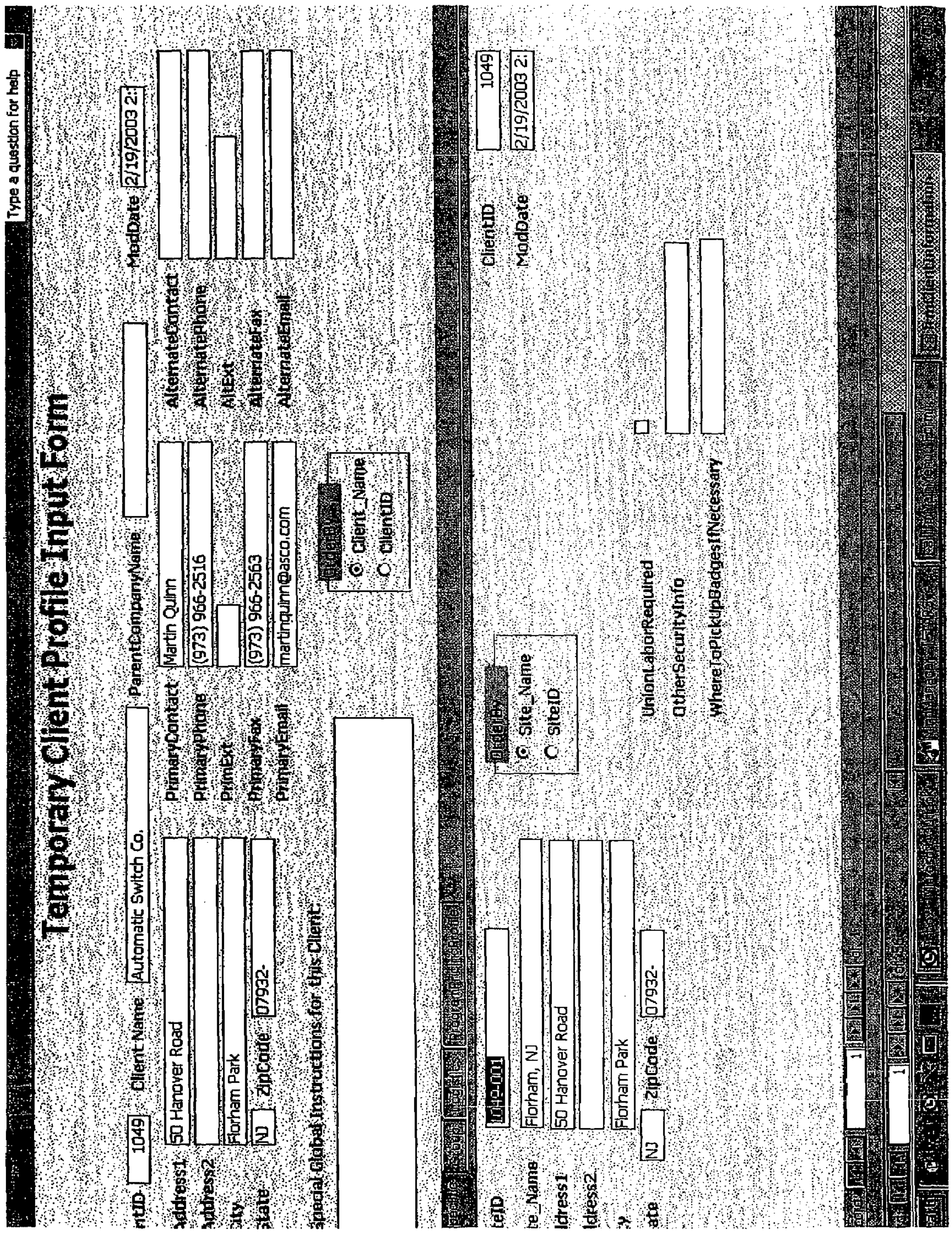
Figure 49:
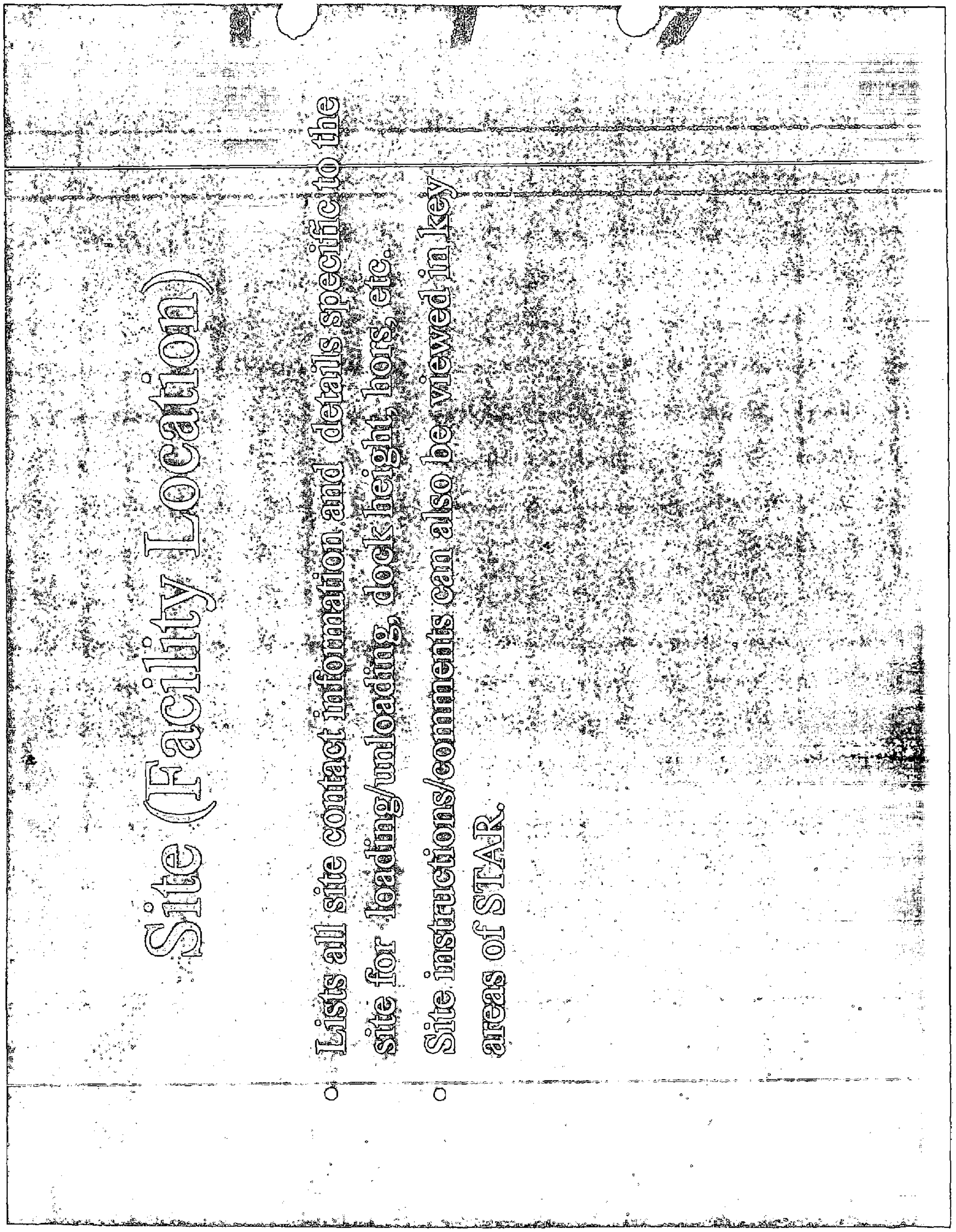
Figure 50:
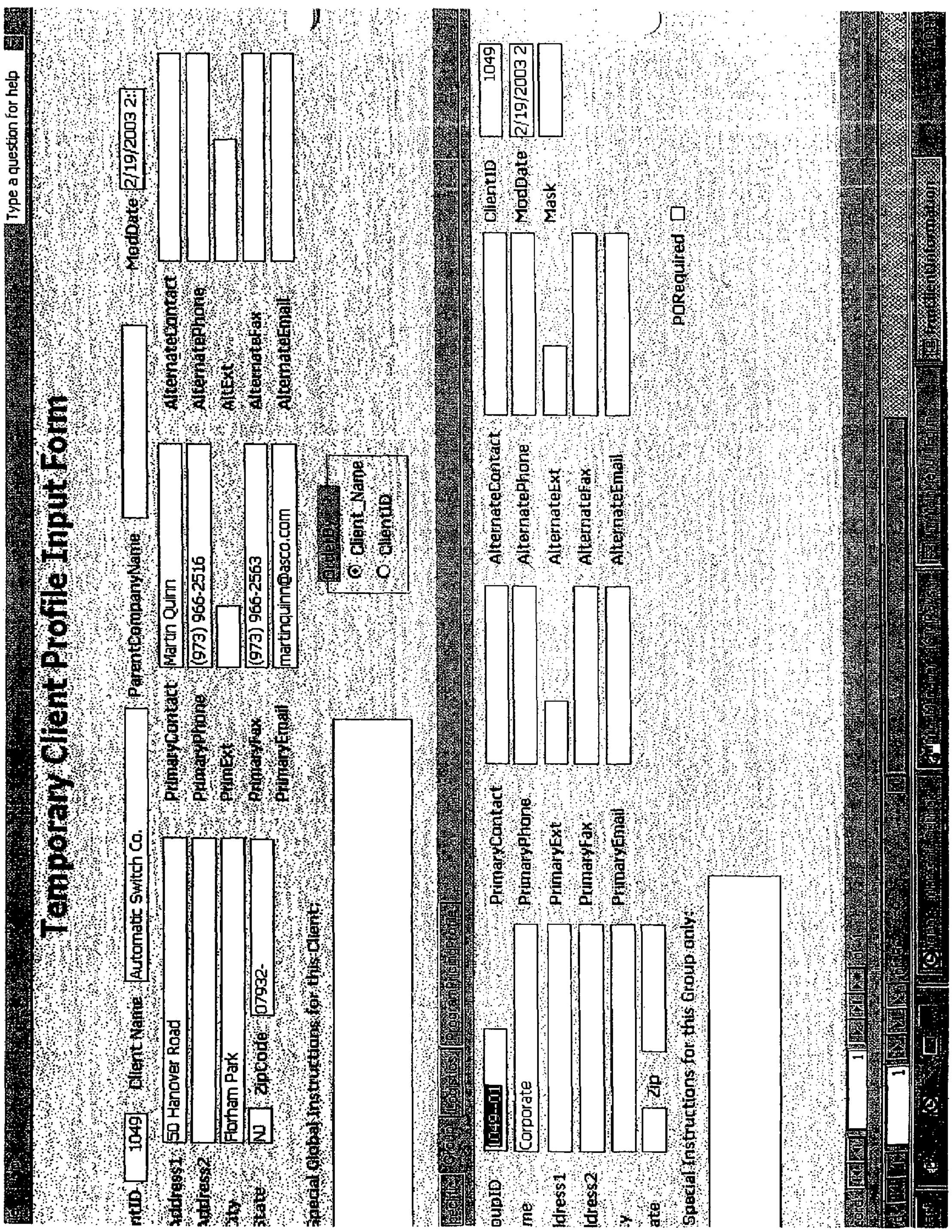
Figure 51:
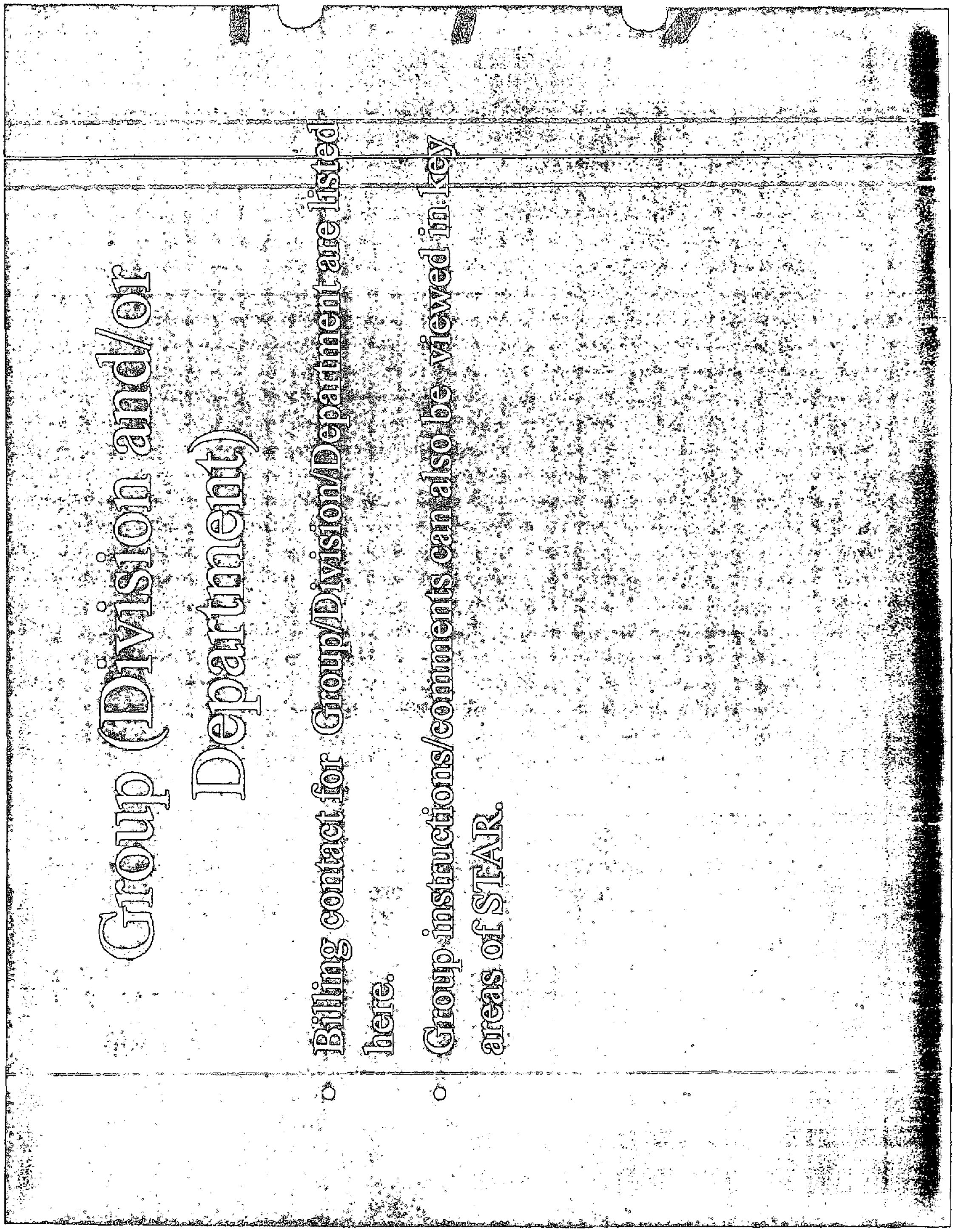
Figure 52:
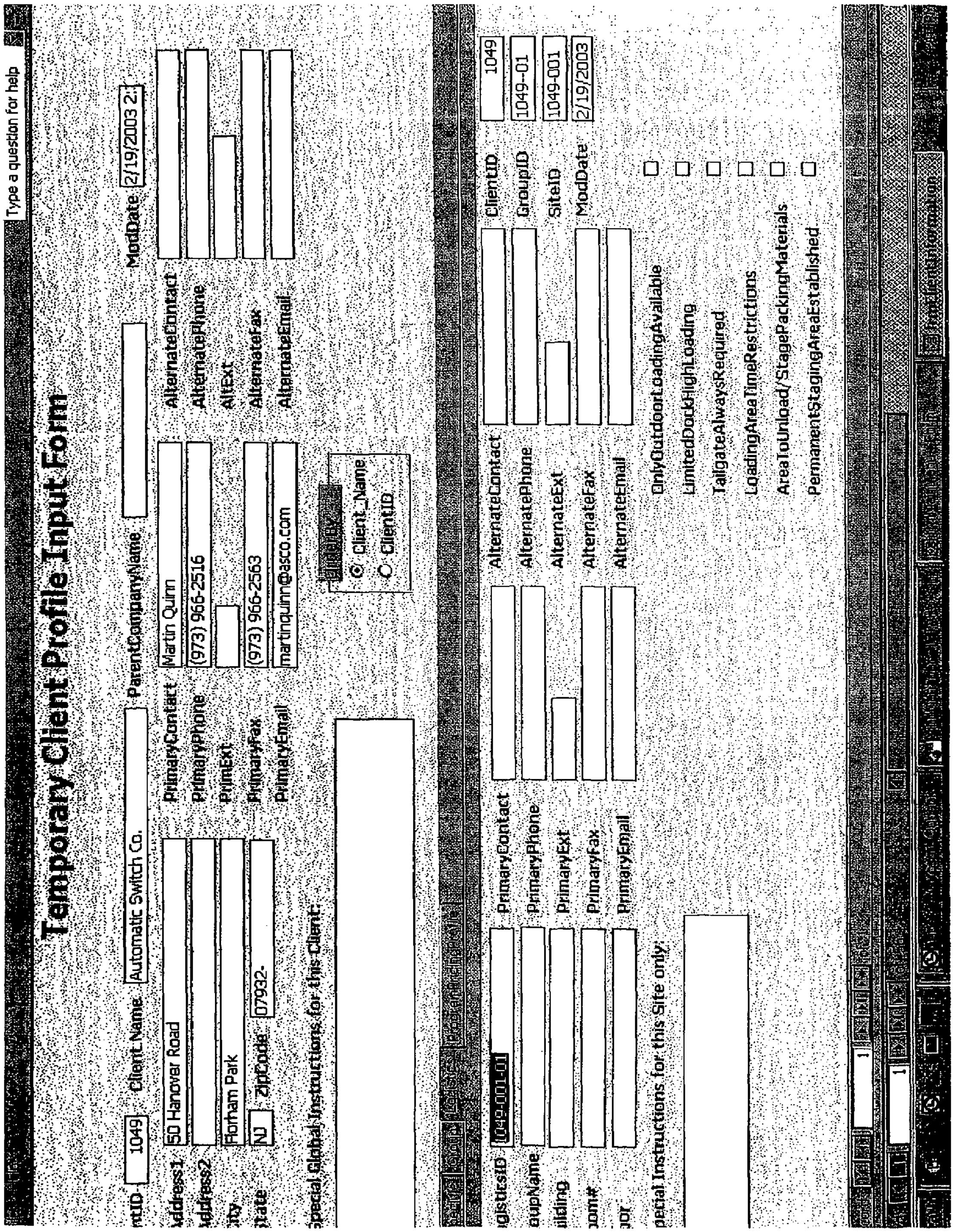
Figure 53:
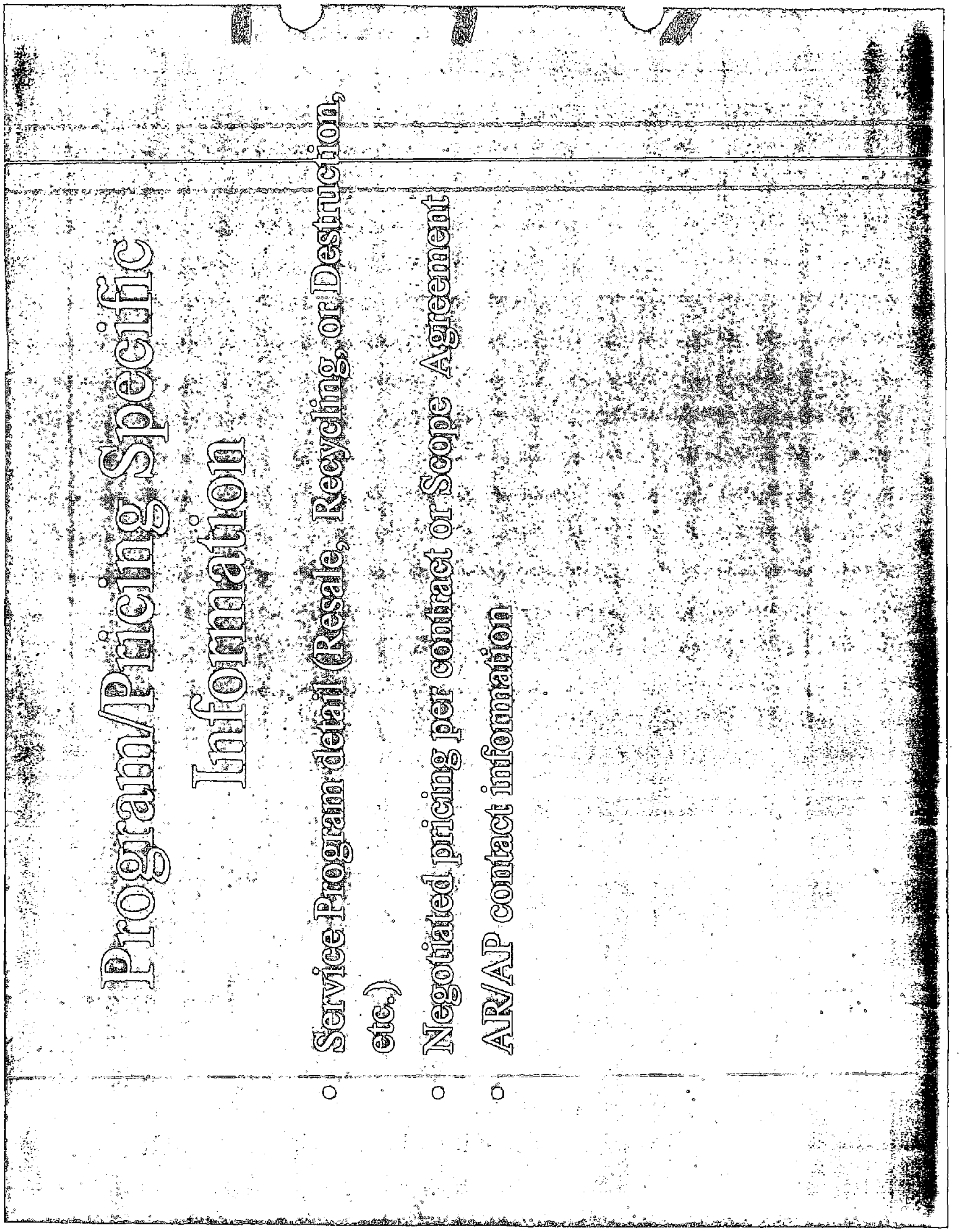
Figure 54:
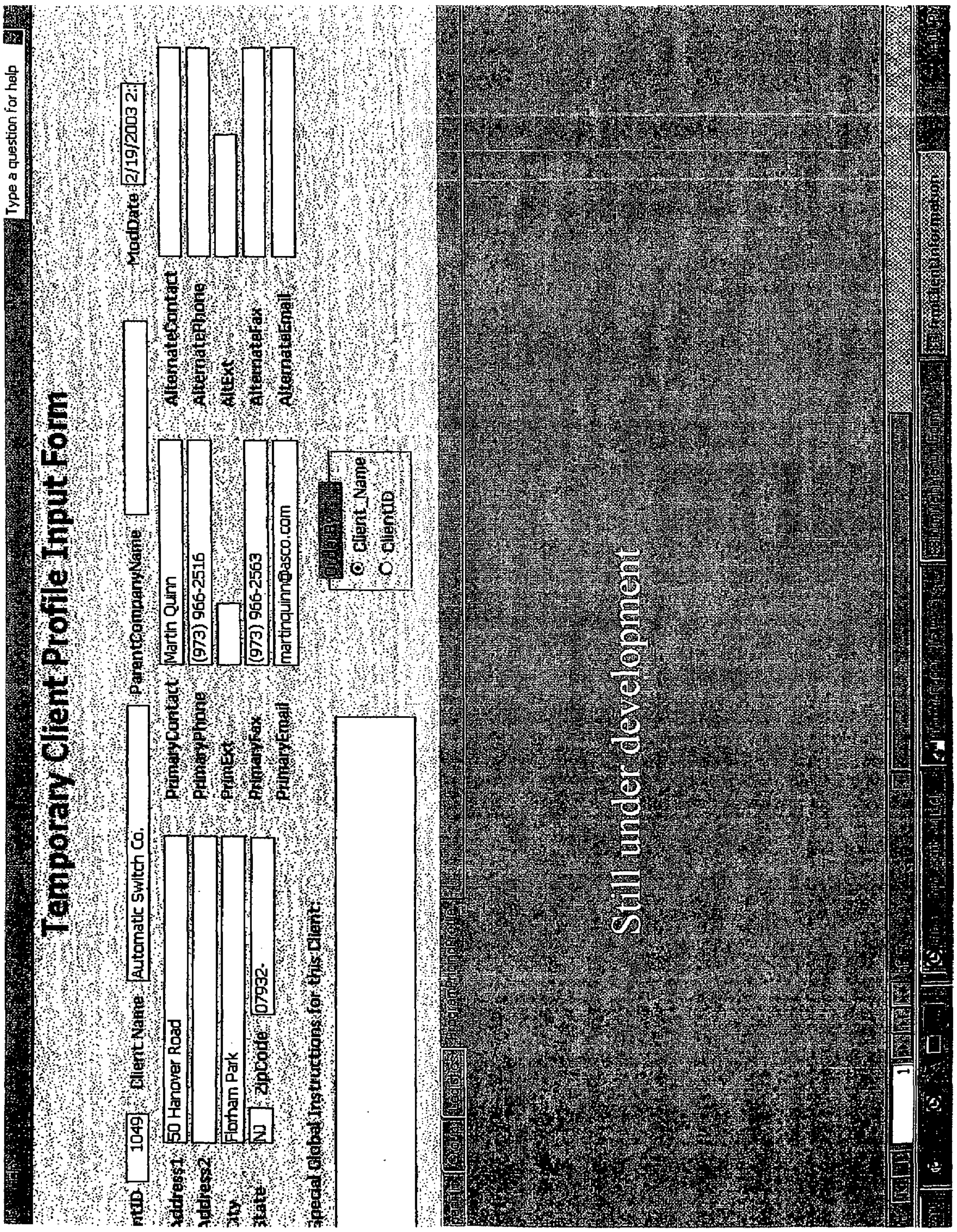
Figure 55:
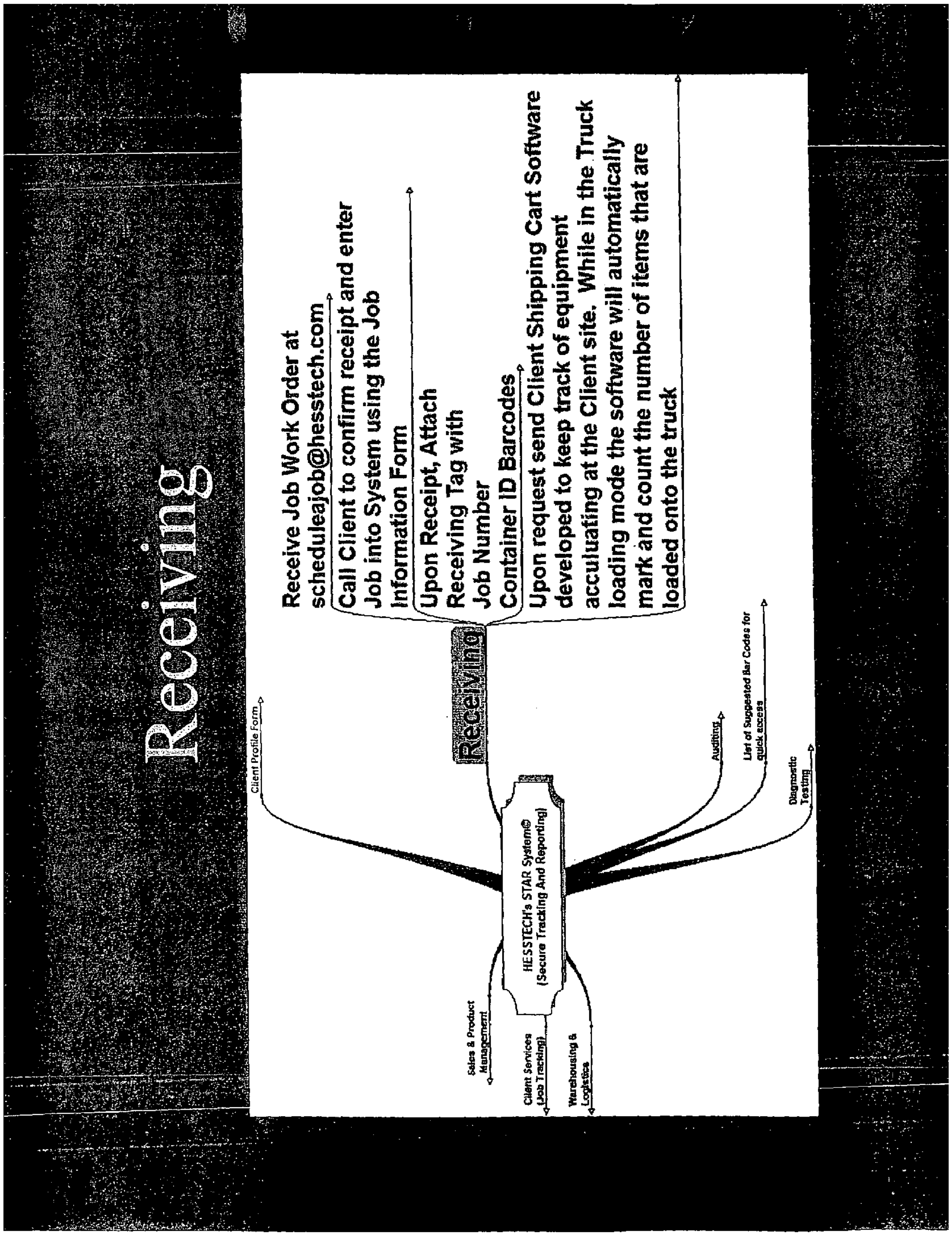
FIG. 55 is an hierarchical diagram depicting aspects of a receiving sub-hierarchy of the exemplary embodiment of FIG. 44.
Figure 57:
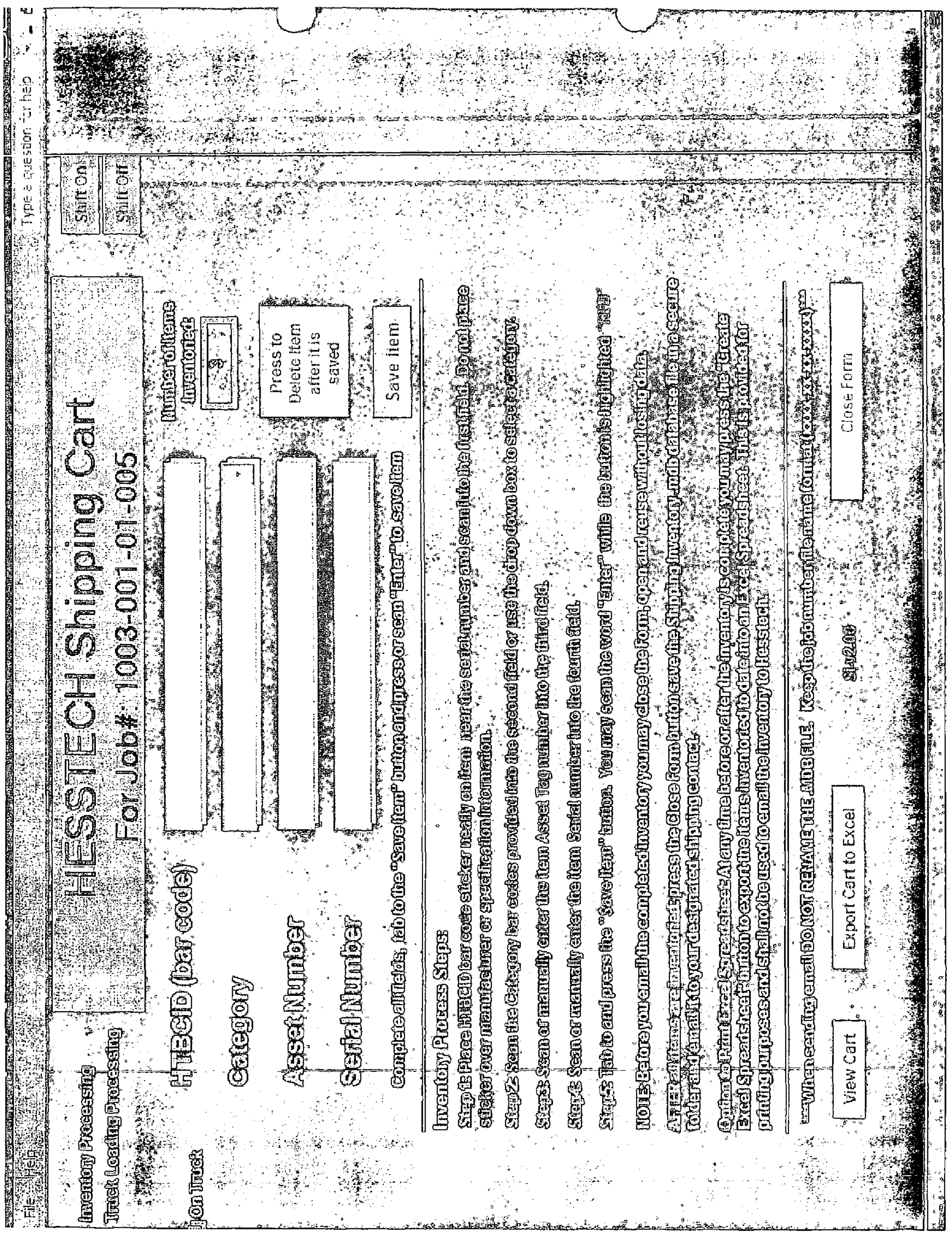
Figure 58:
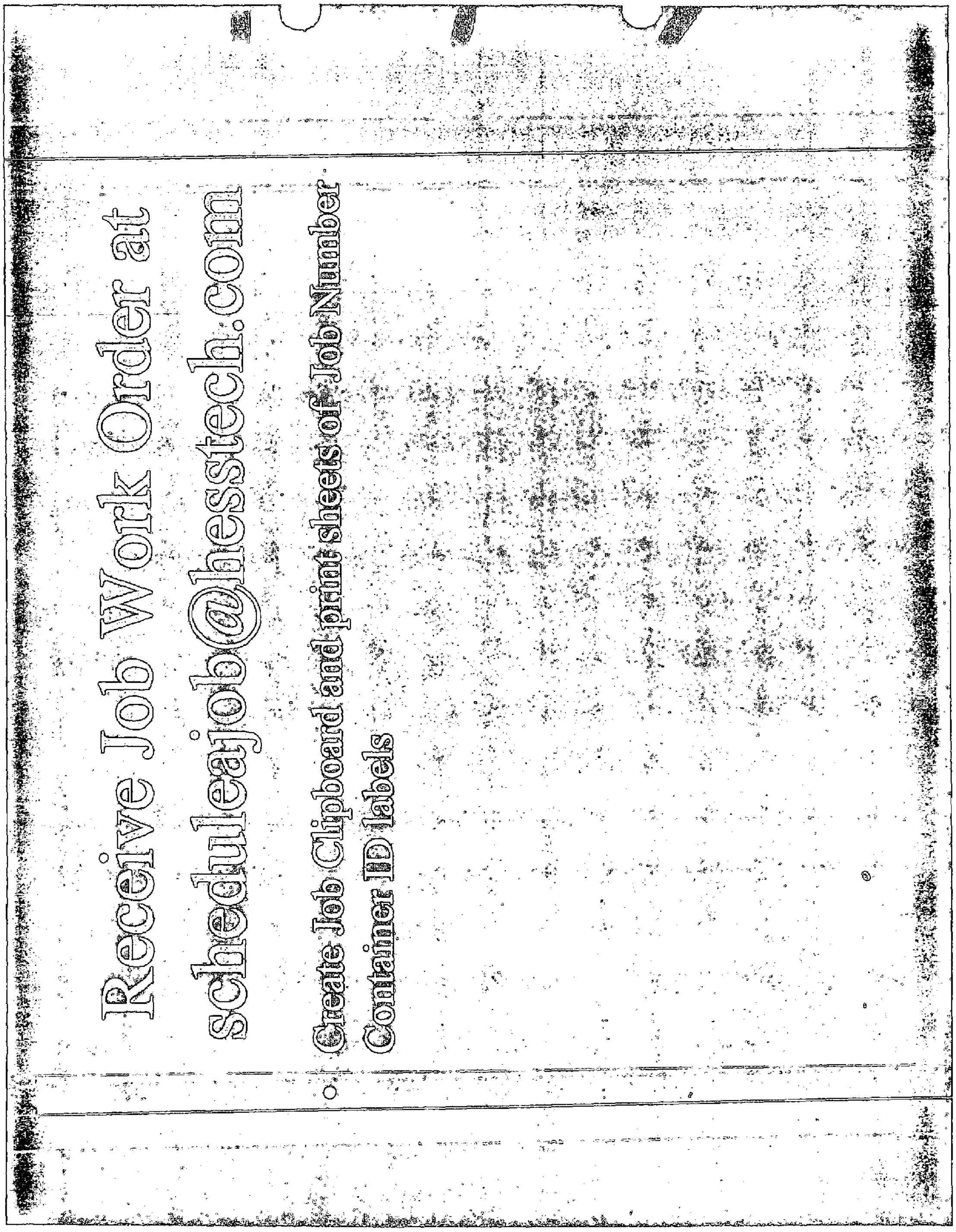
Figure 59:
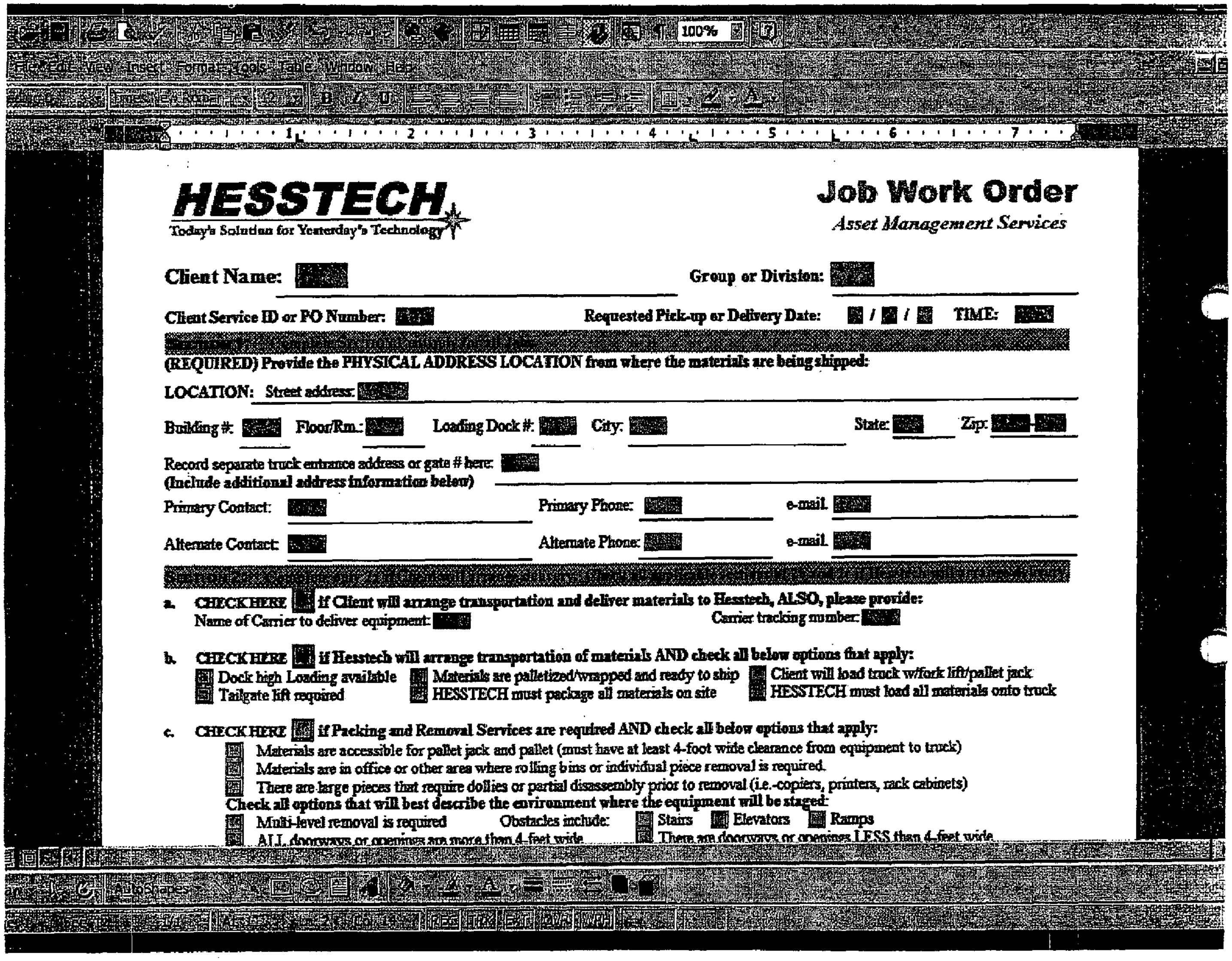
Figure 62:
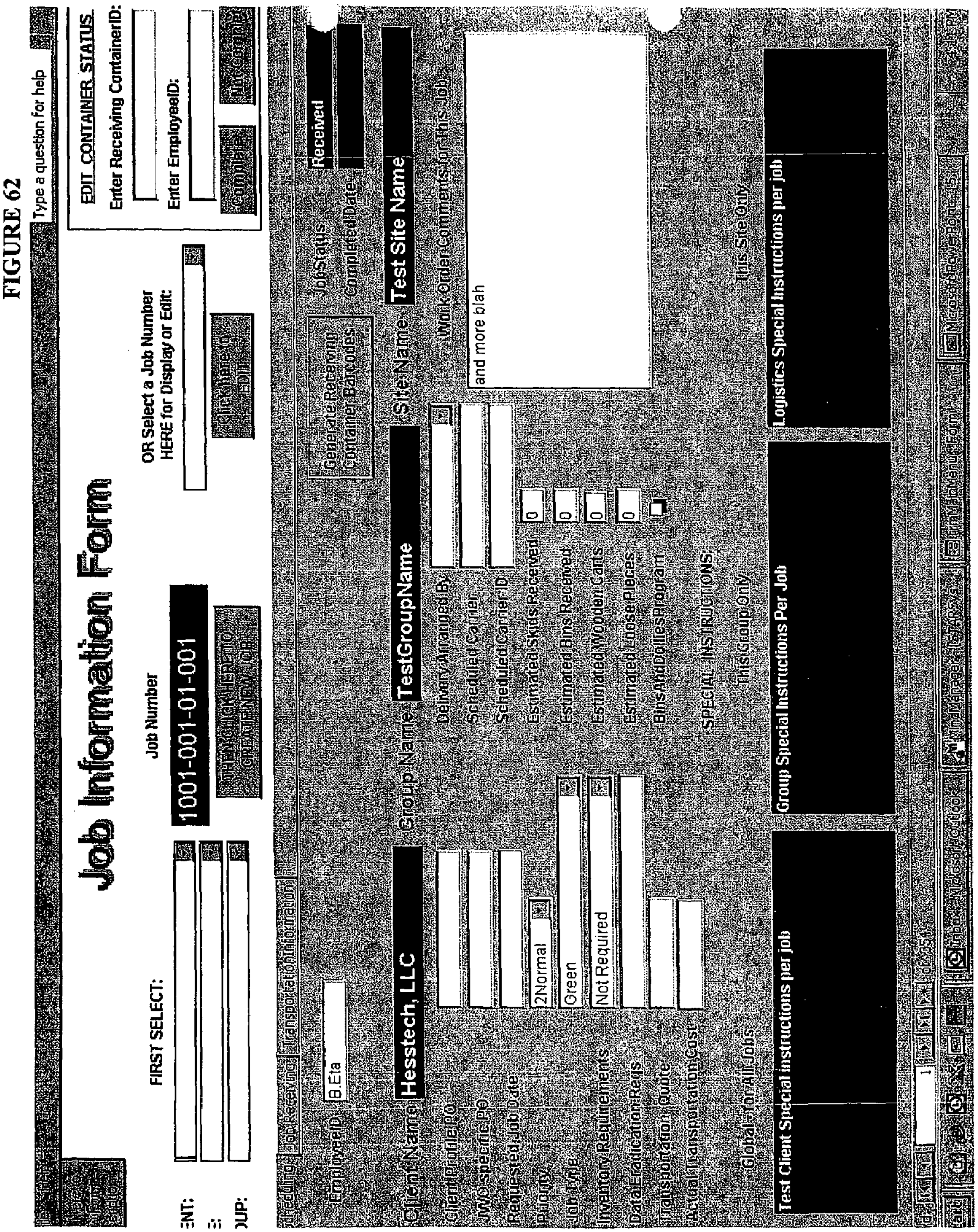
Figure 63:
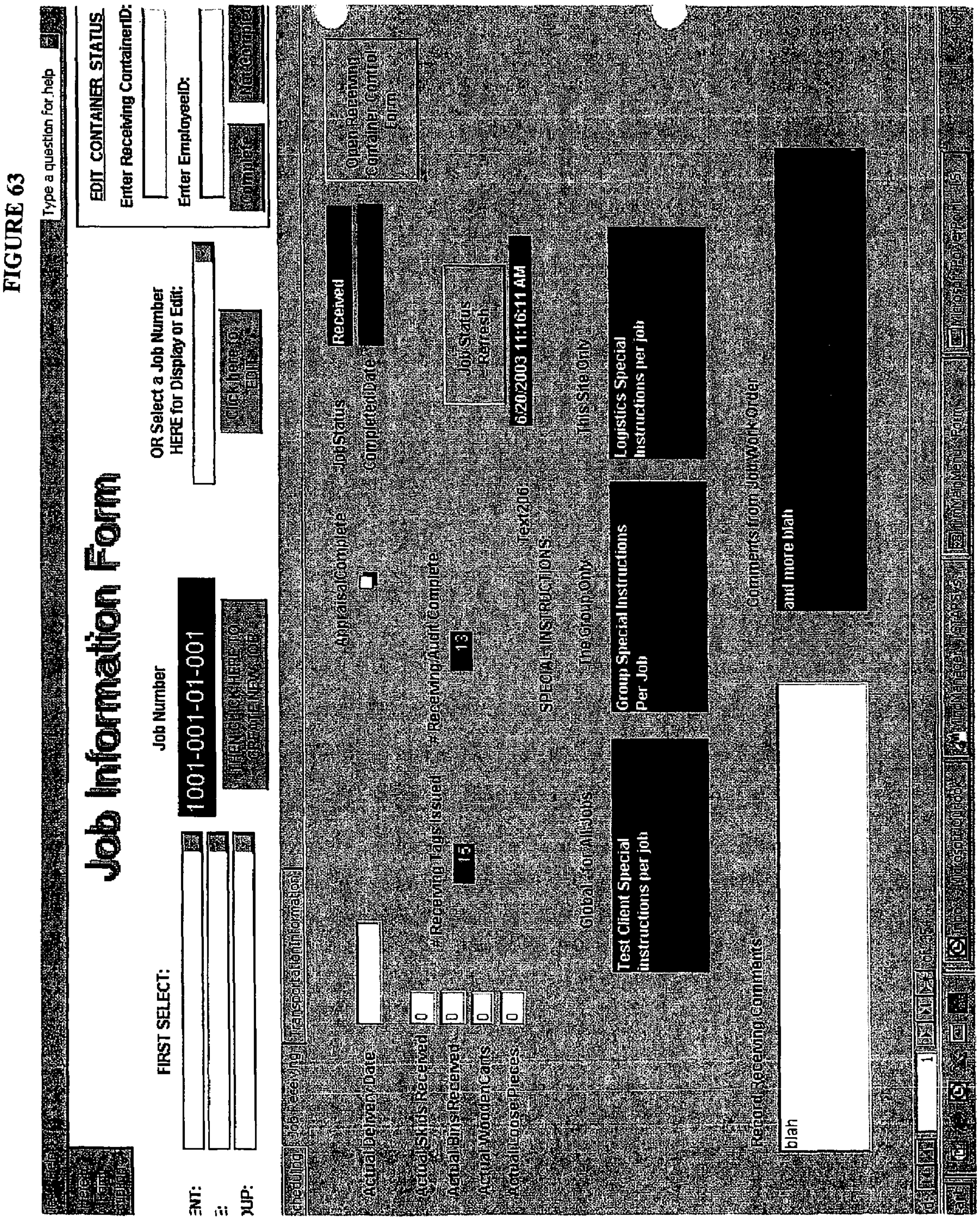
Figure 64:
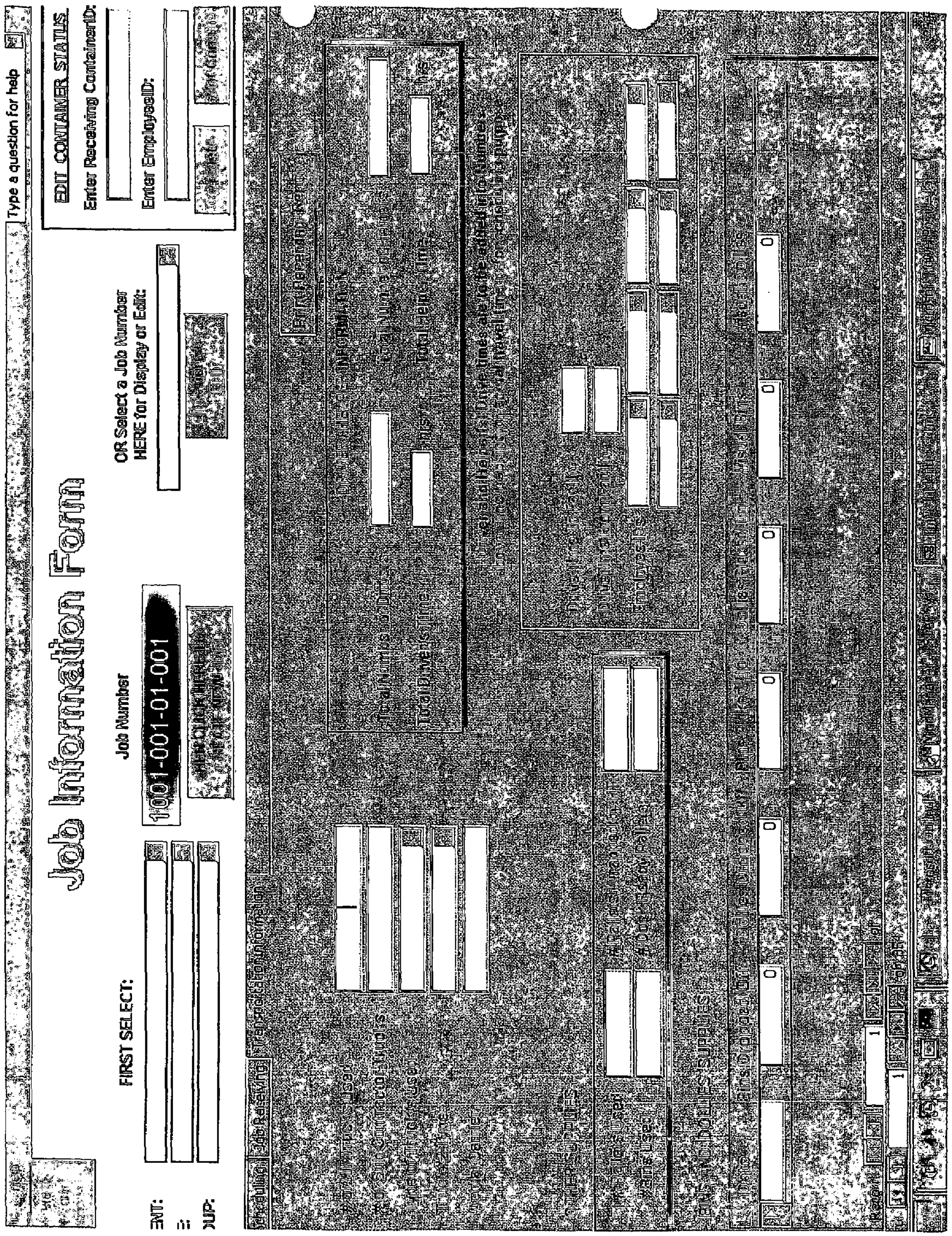
Figure 66:
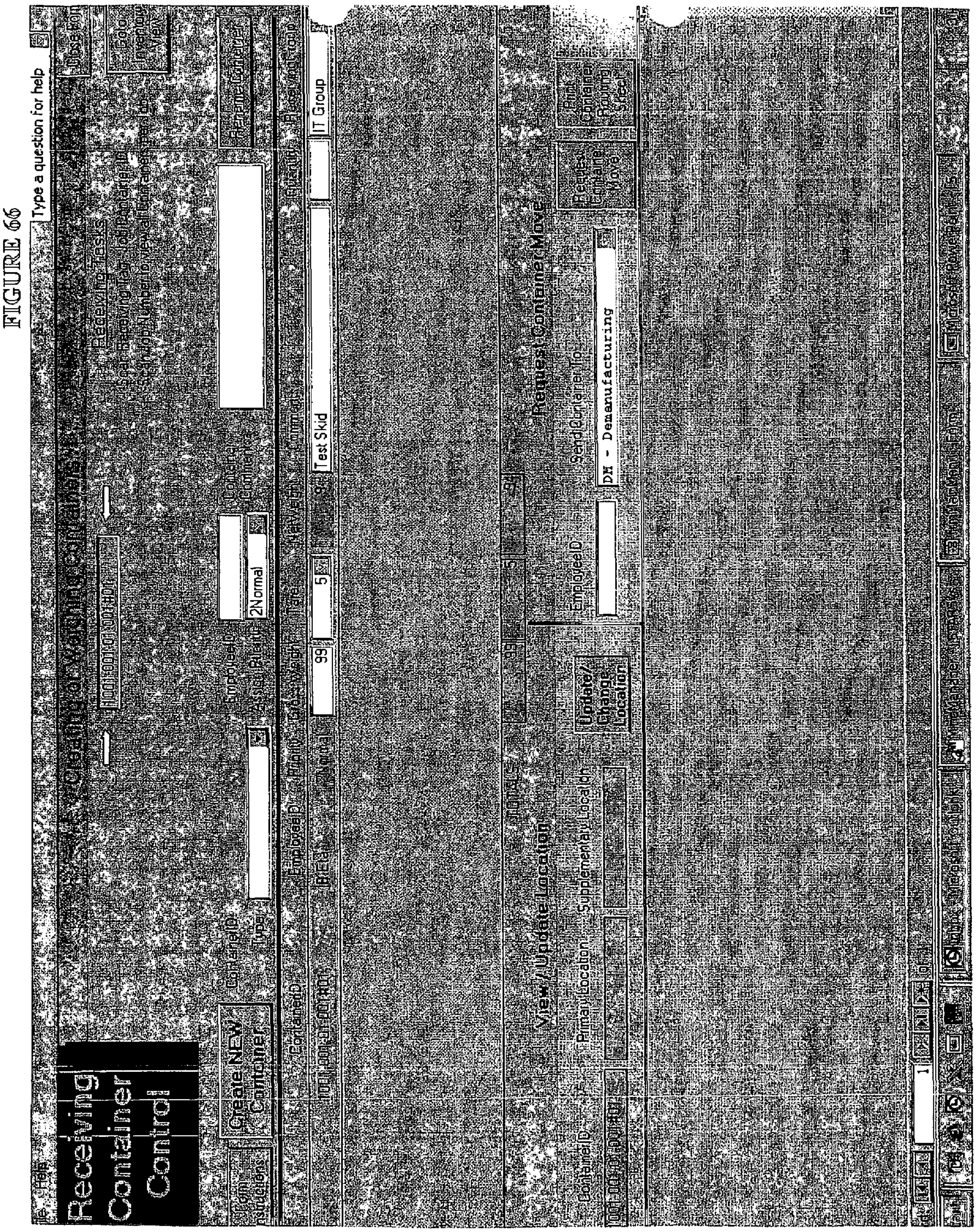
Figure 67:
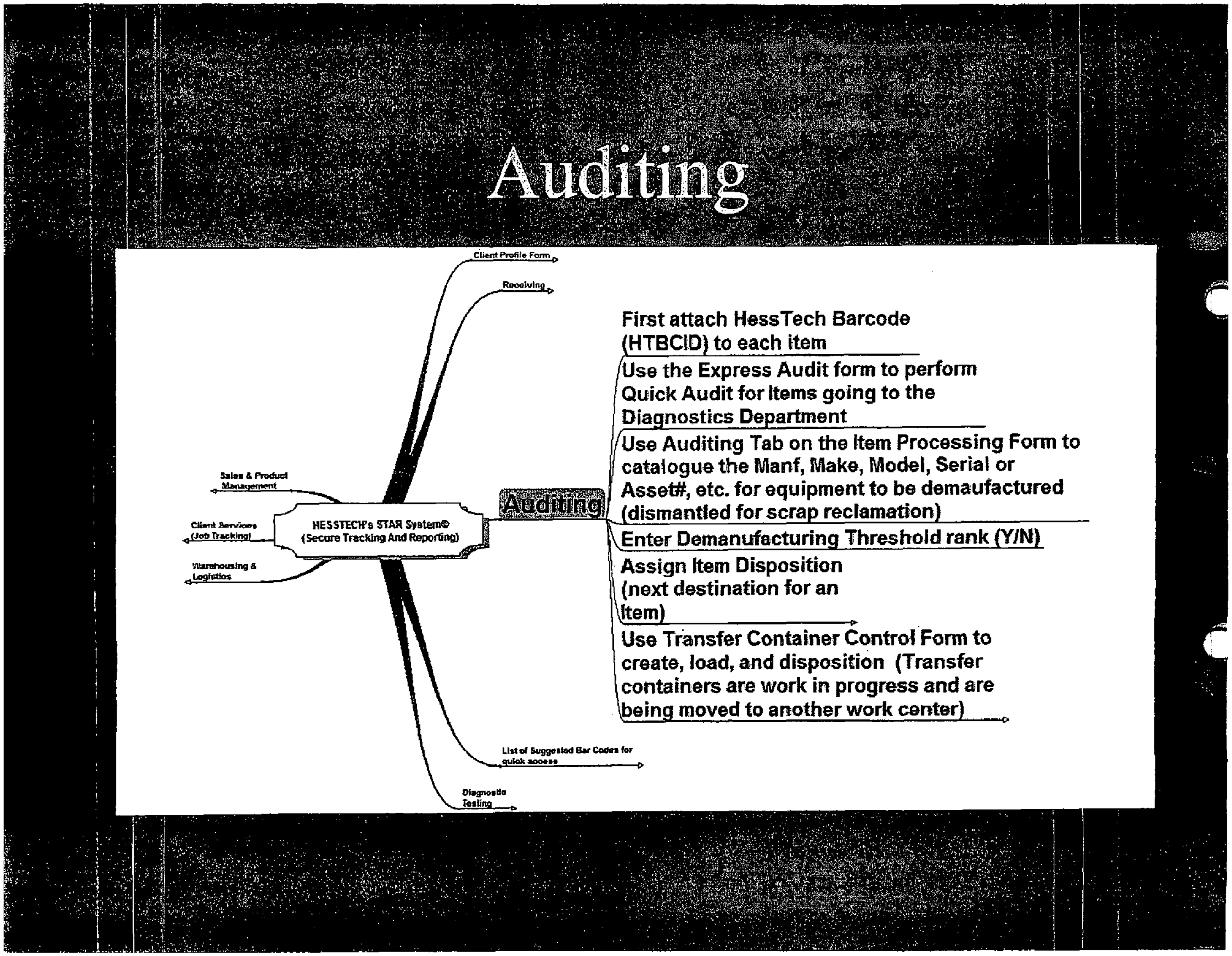
FIG. 67 is an hierarchical diagram depicting aspects of an auditing sub-hierarchy of the exemplary embodiment of FIG. 44.
Figure 68:
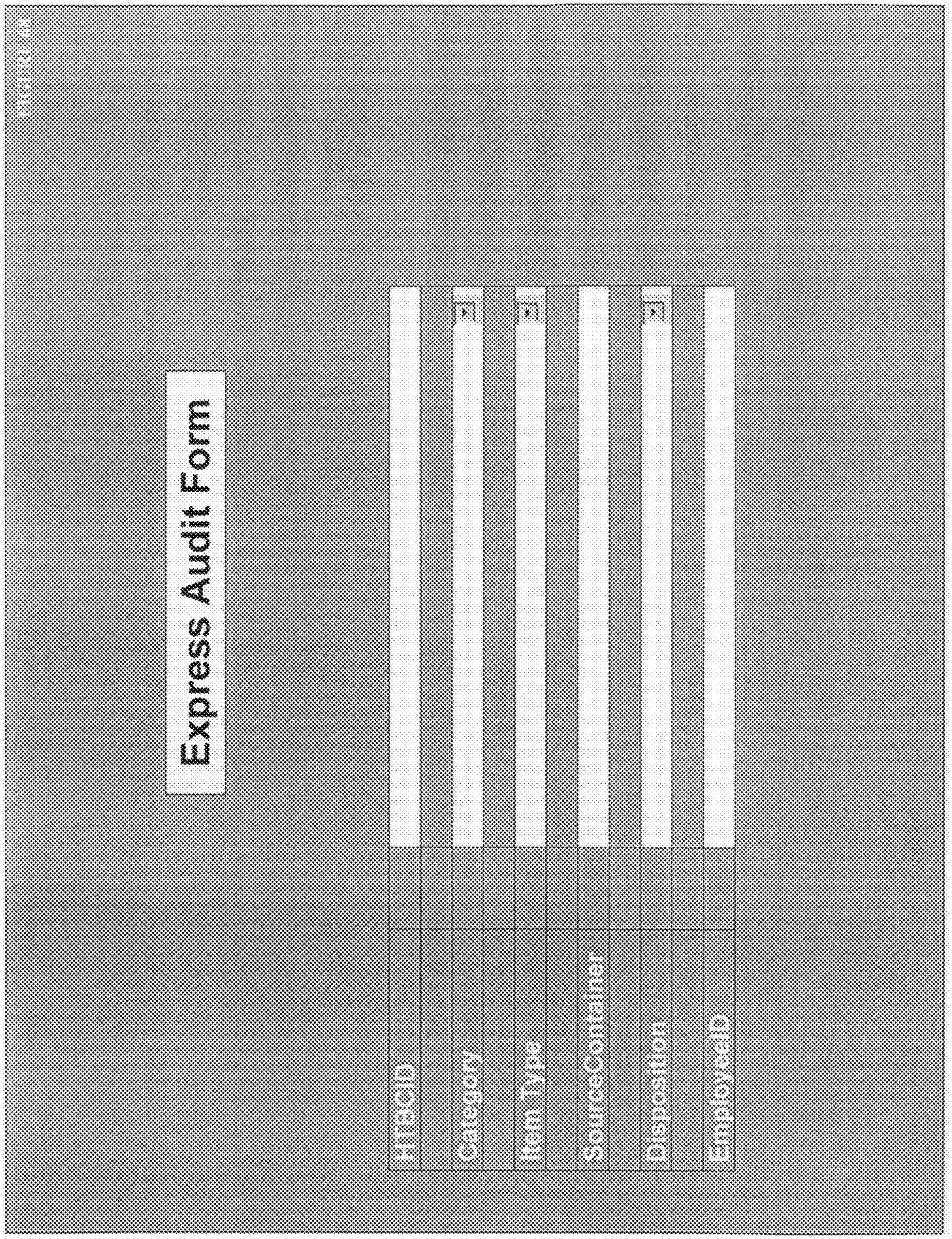
Figure 69:
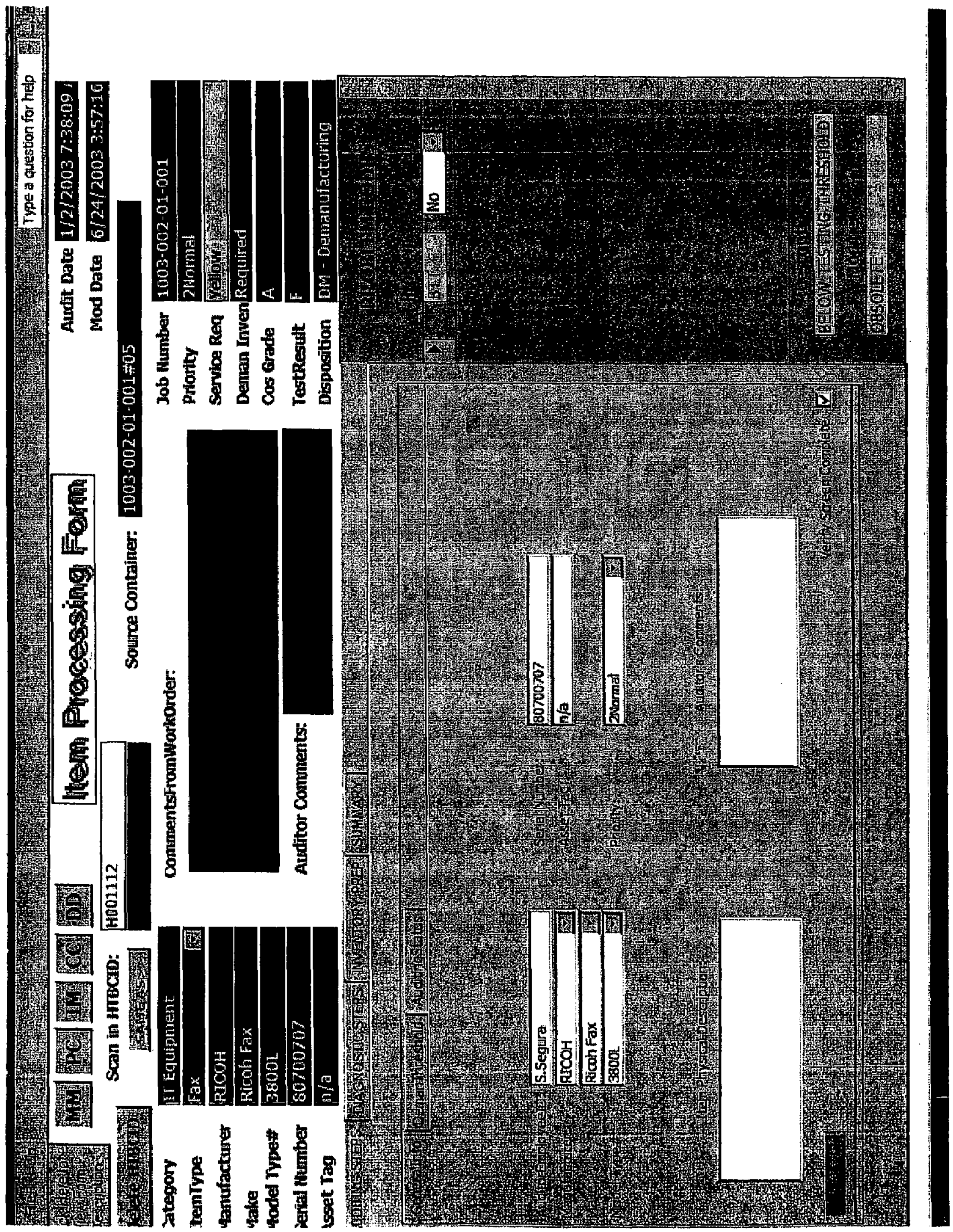
Figure 70:
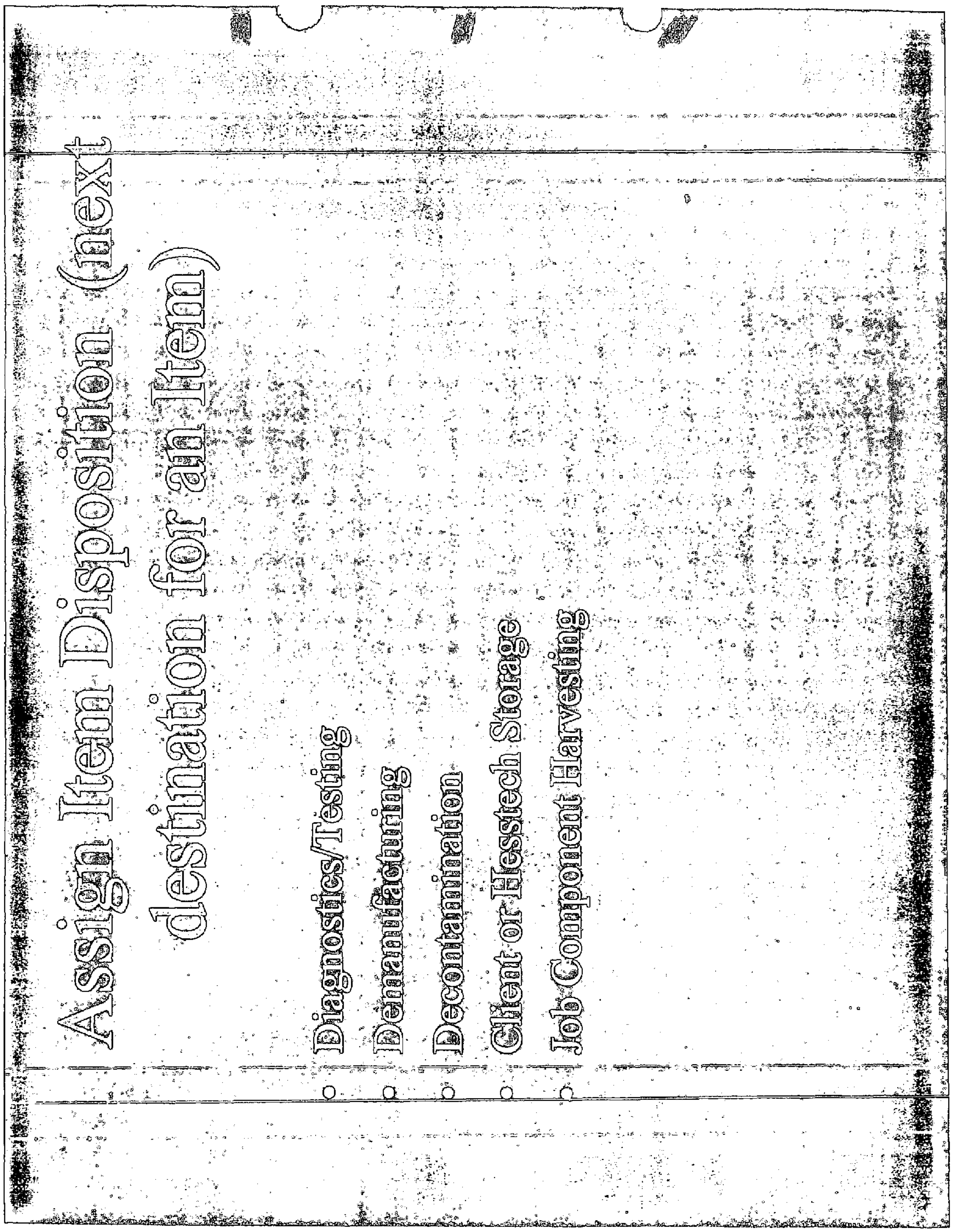
Figure 71:
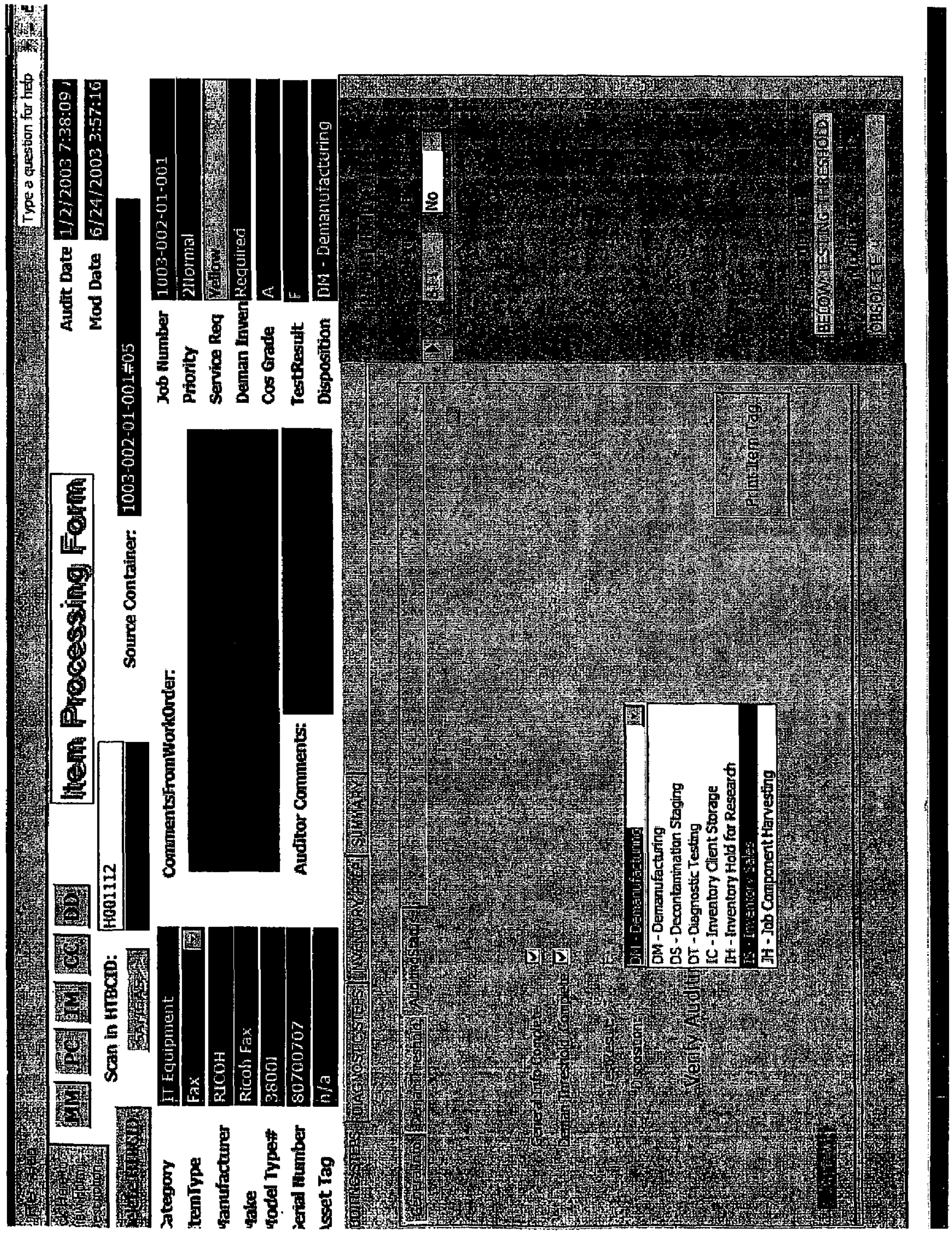
Figure 73:
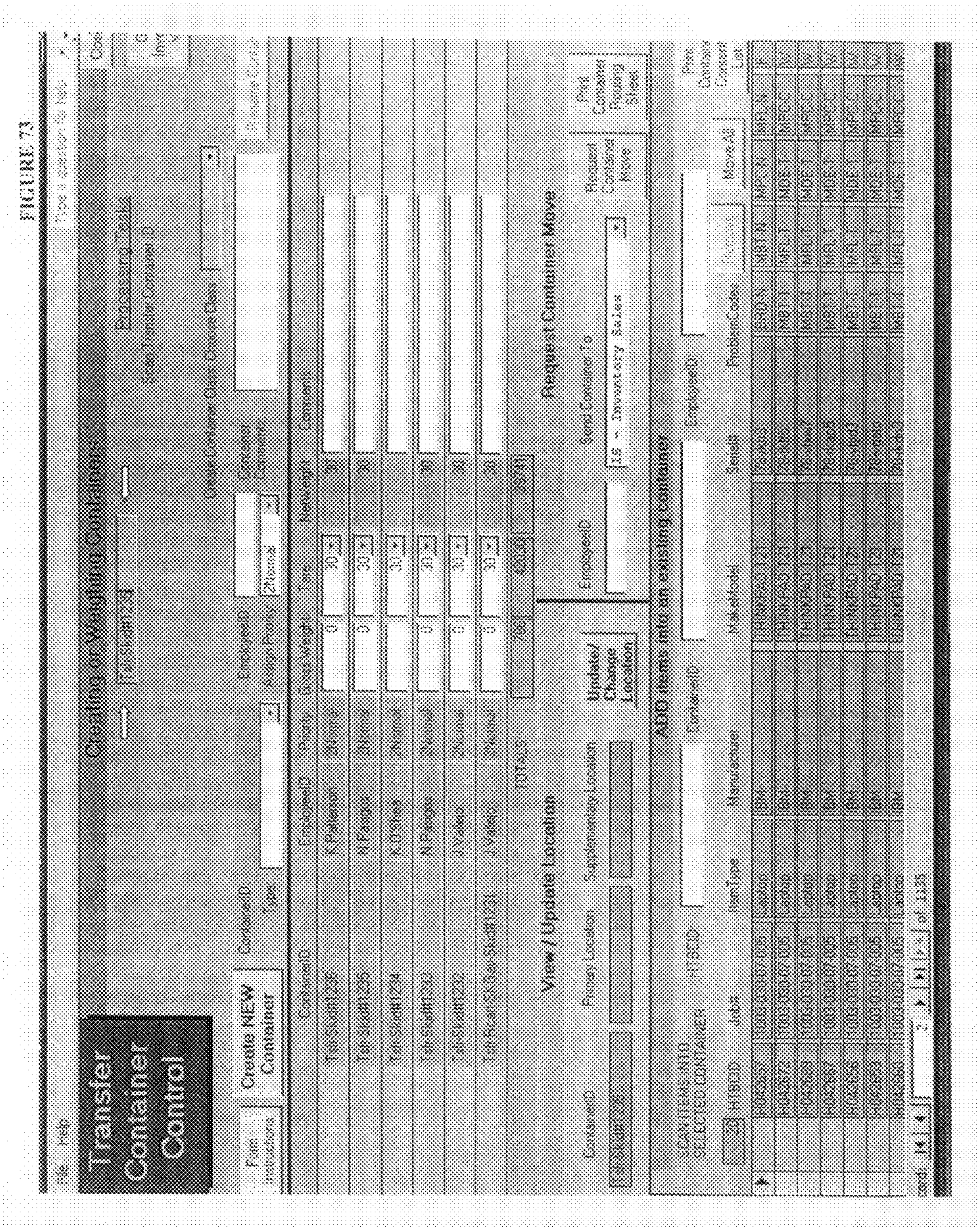
Figure 74:
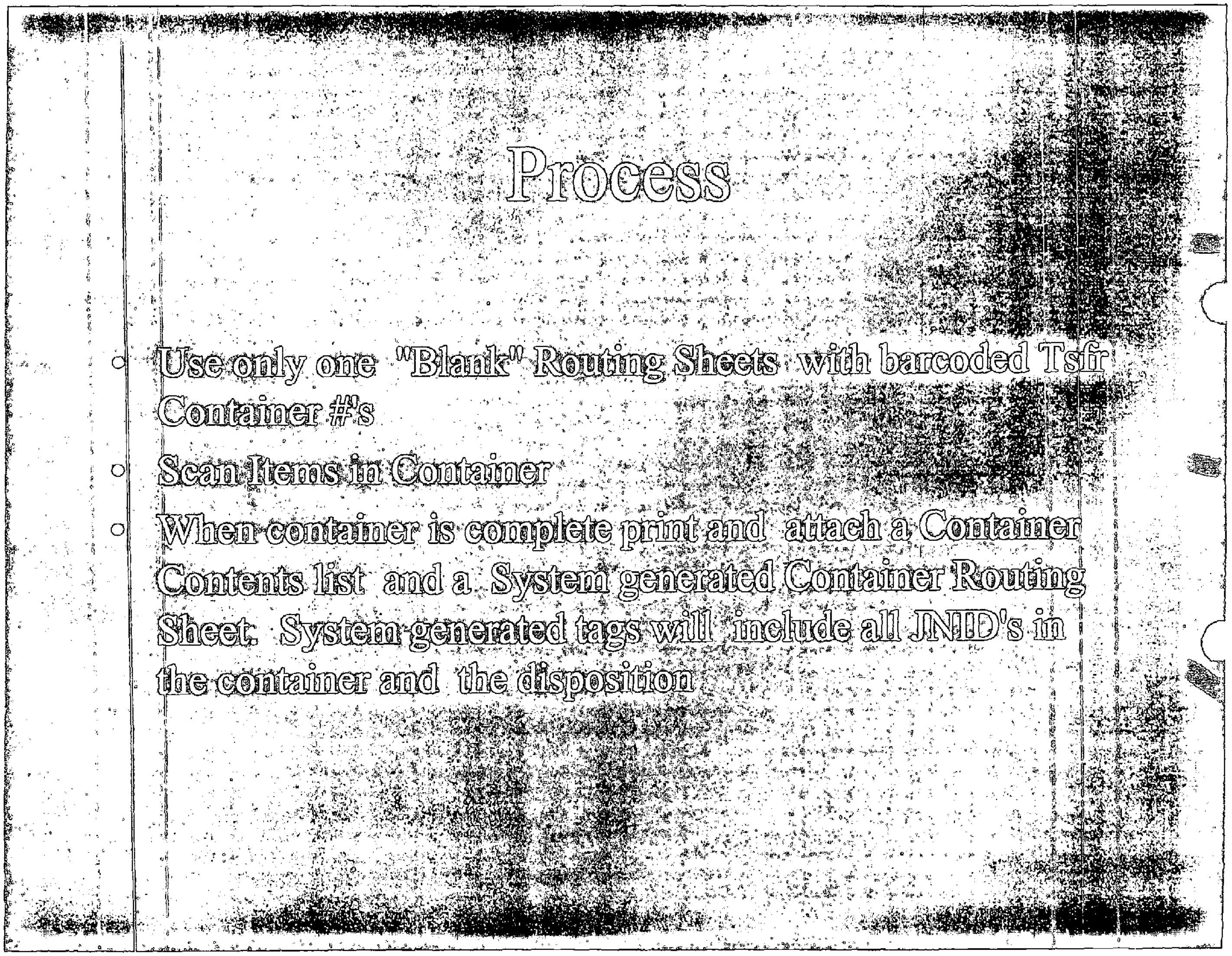
Figure 75:
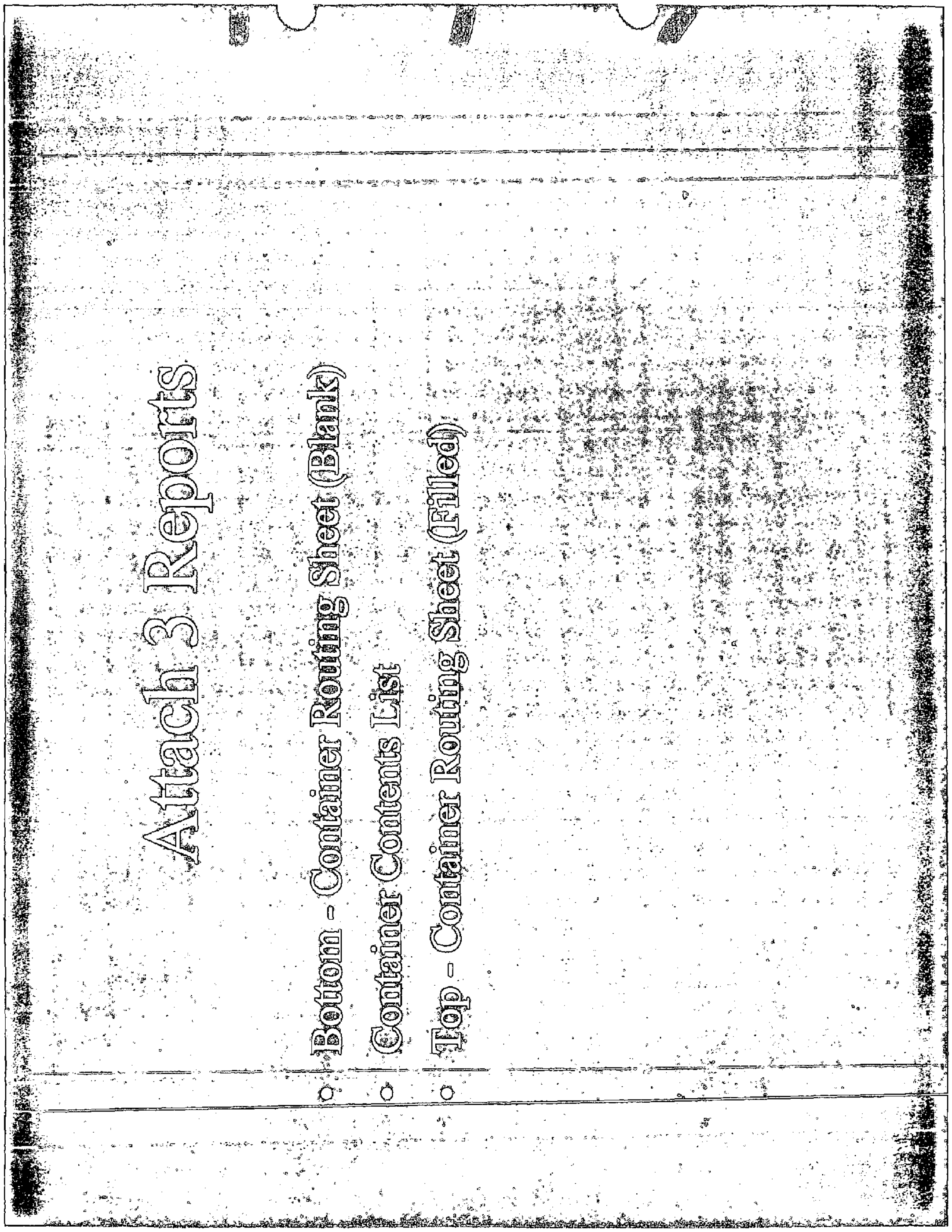
Figure 76:
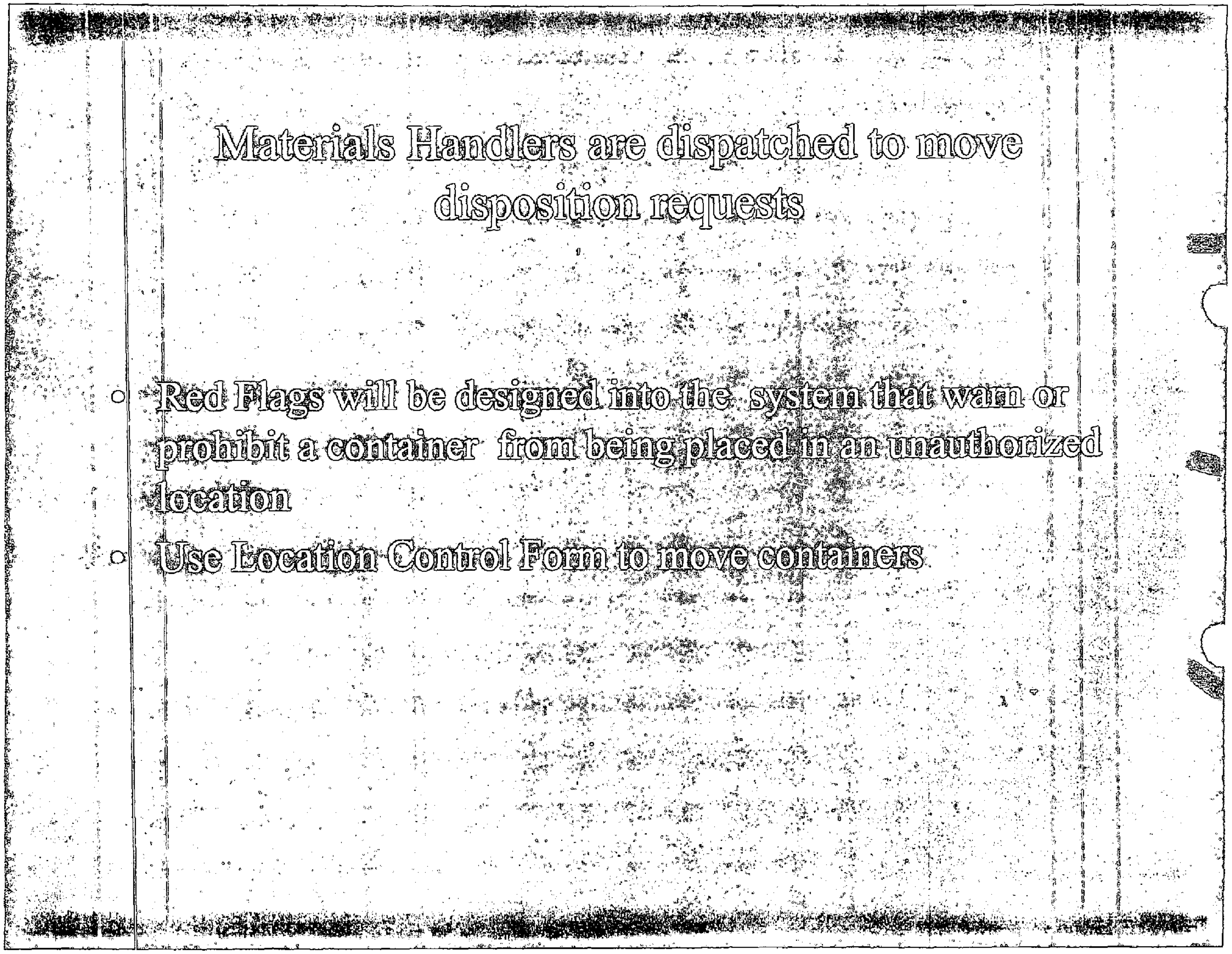
Figure 77:
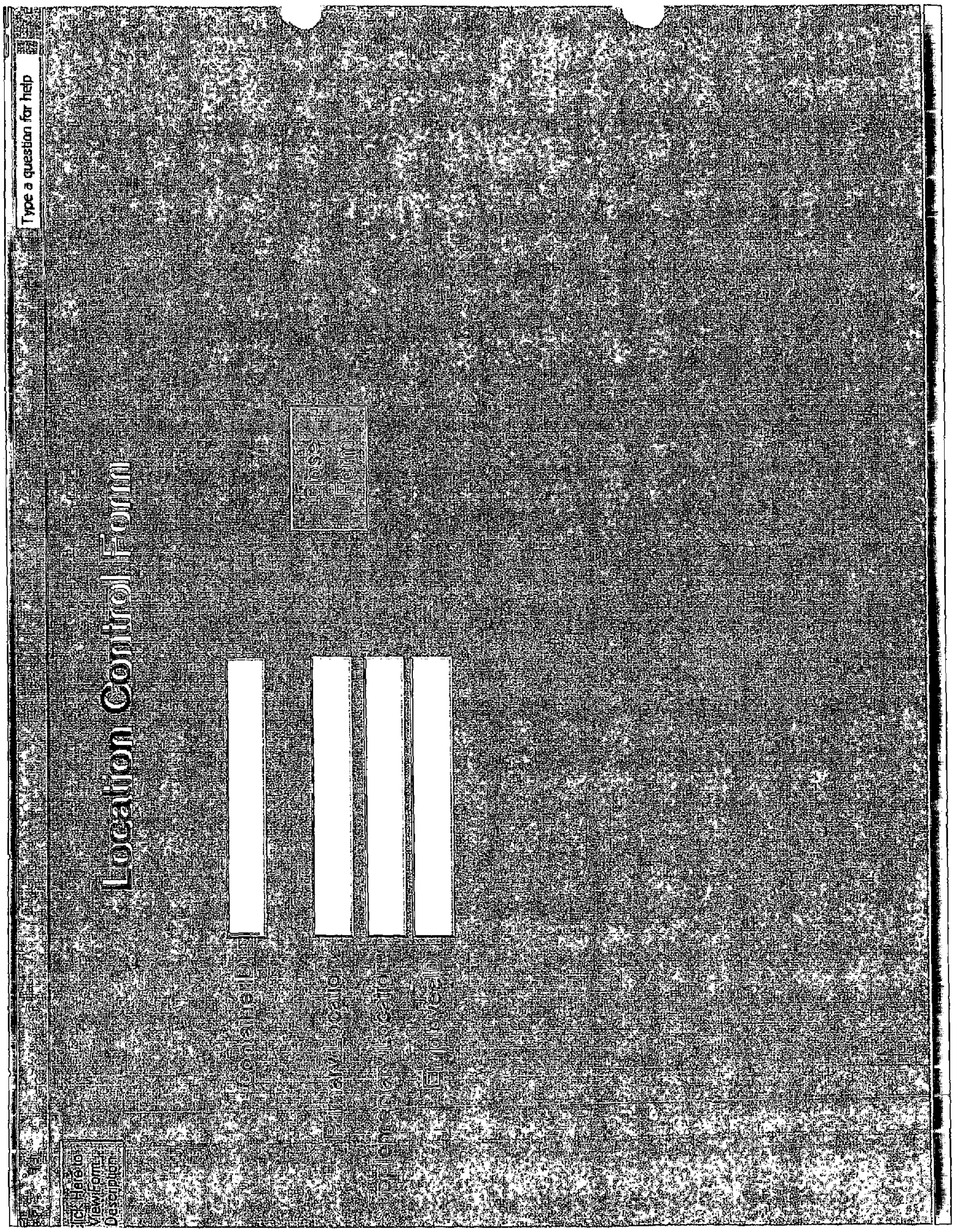

FIG. 44 illustrates an exemplary embodiment of the organizational hierarchy of the tracking and reporting features of the present invention, wherein client profile management, receiving, auditing, access, diagnostic testing, warehousing and logistics, client services Oob tracking), and sale and management sub-functionality are depicted. FIGS. 45-54 illustrate the input of various information regarding client profiles. FIGS. 55-66 illustrate the organizational sub-hierarchy of the receiving functionality of this embodiment of the present invention including entry of various inventory related information, including item and job information and processing.

FIGS. 67-77 illustrate the organizational sub-hierarchy of the auditing functionality of this embodiment of the present invention, including item tracking, exports auditing, item data management, demanufacturing thresholds, item disposition and transfer container control.

Figure 78:
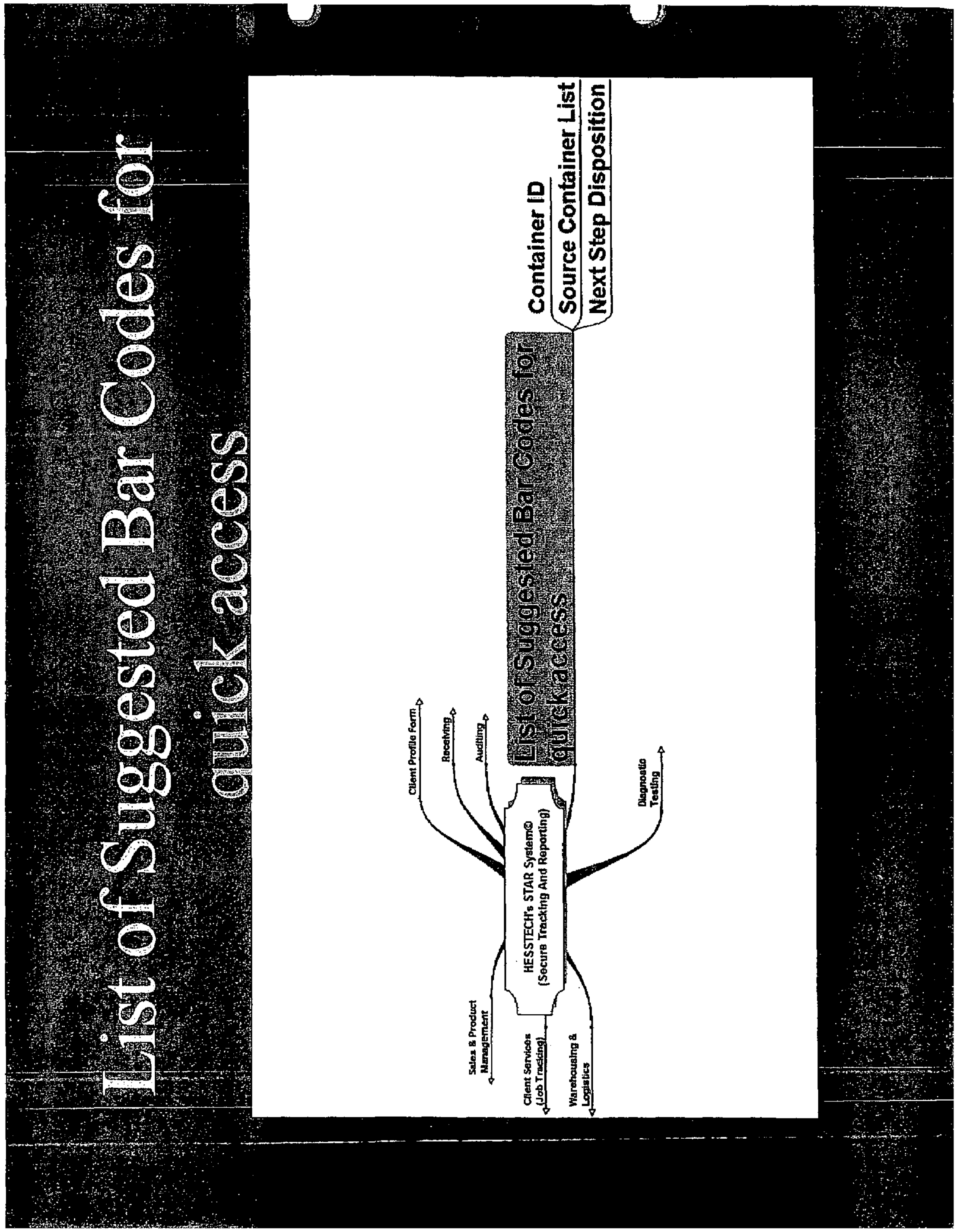
FIG. 78 is an hierarchical diagram depicting aspects of an access sub-hierarchy of the exemplary embodiment of FIG. 44.
Figure 79:
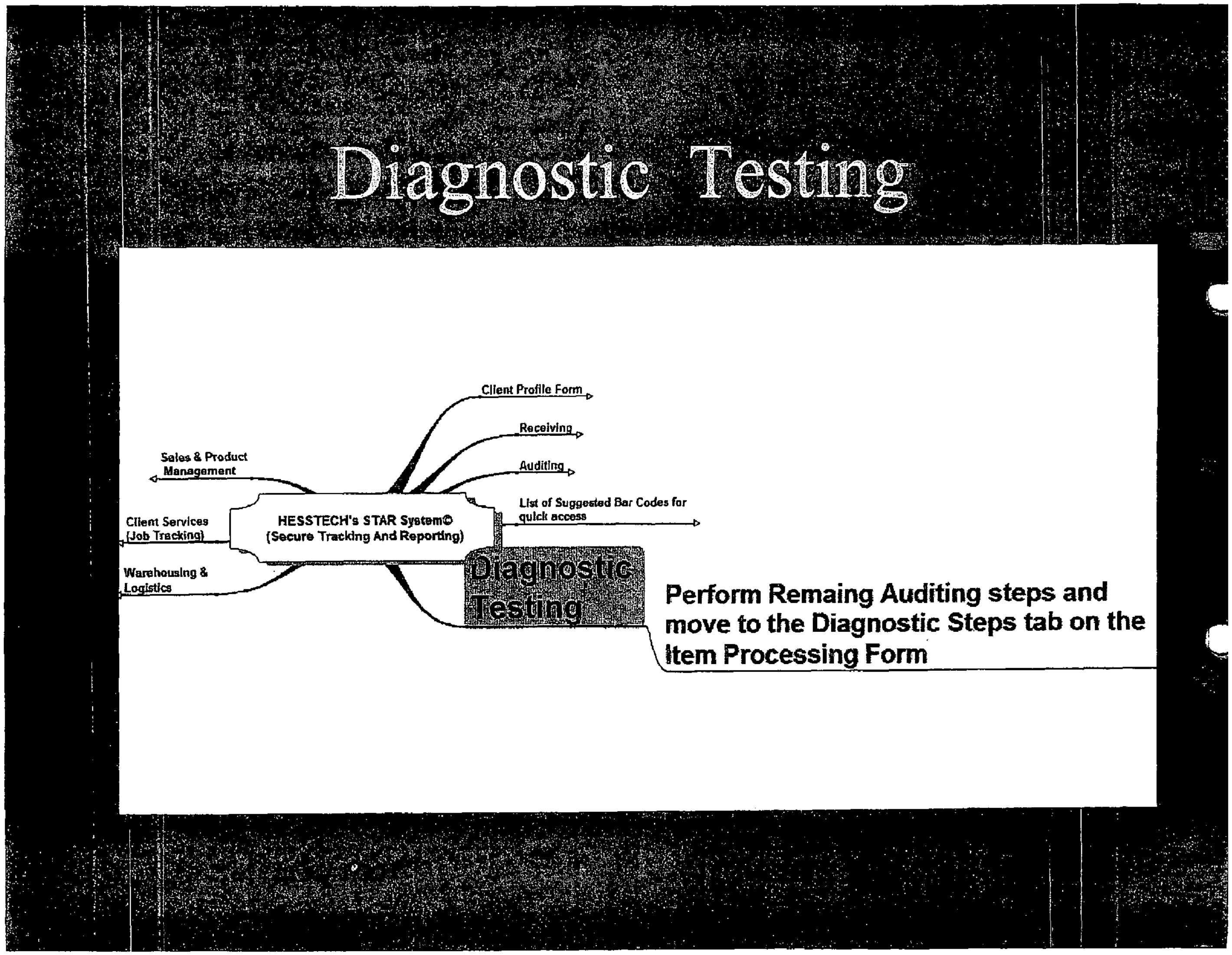
FIG. 79 is an hierarchical diagram depicting aspects of a diagnostic testing sub-hierarchy of the exemplary embodiment of FIG. 44.
Figure 81:
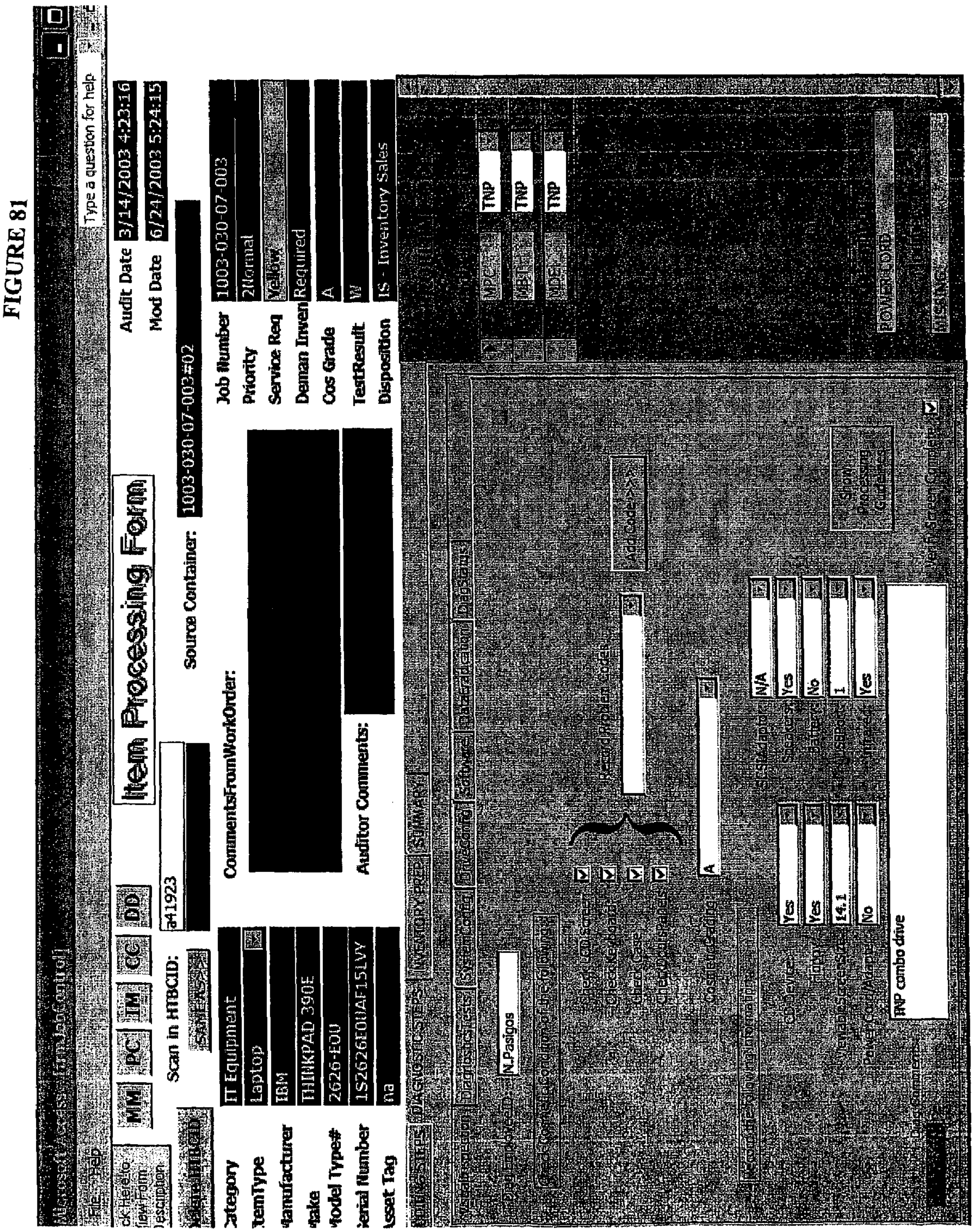
Figure 82:
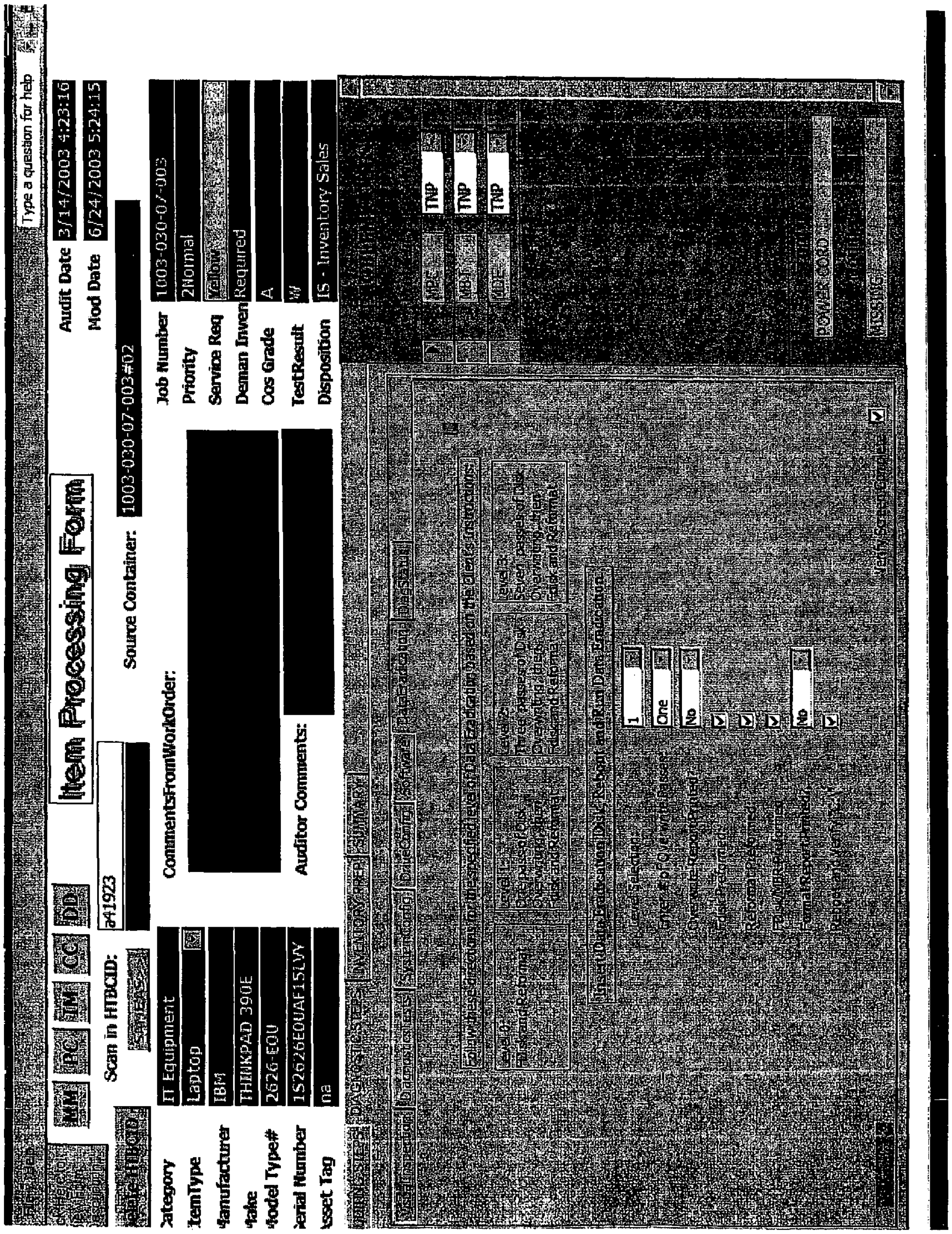
Figure 83:
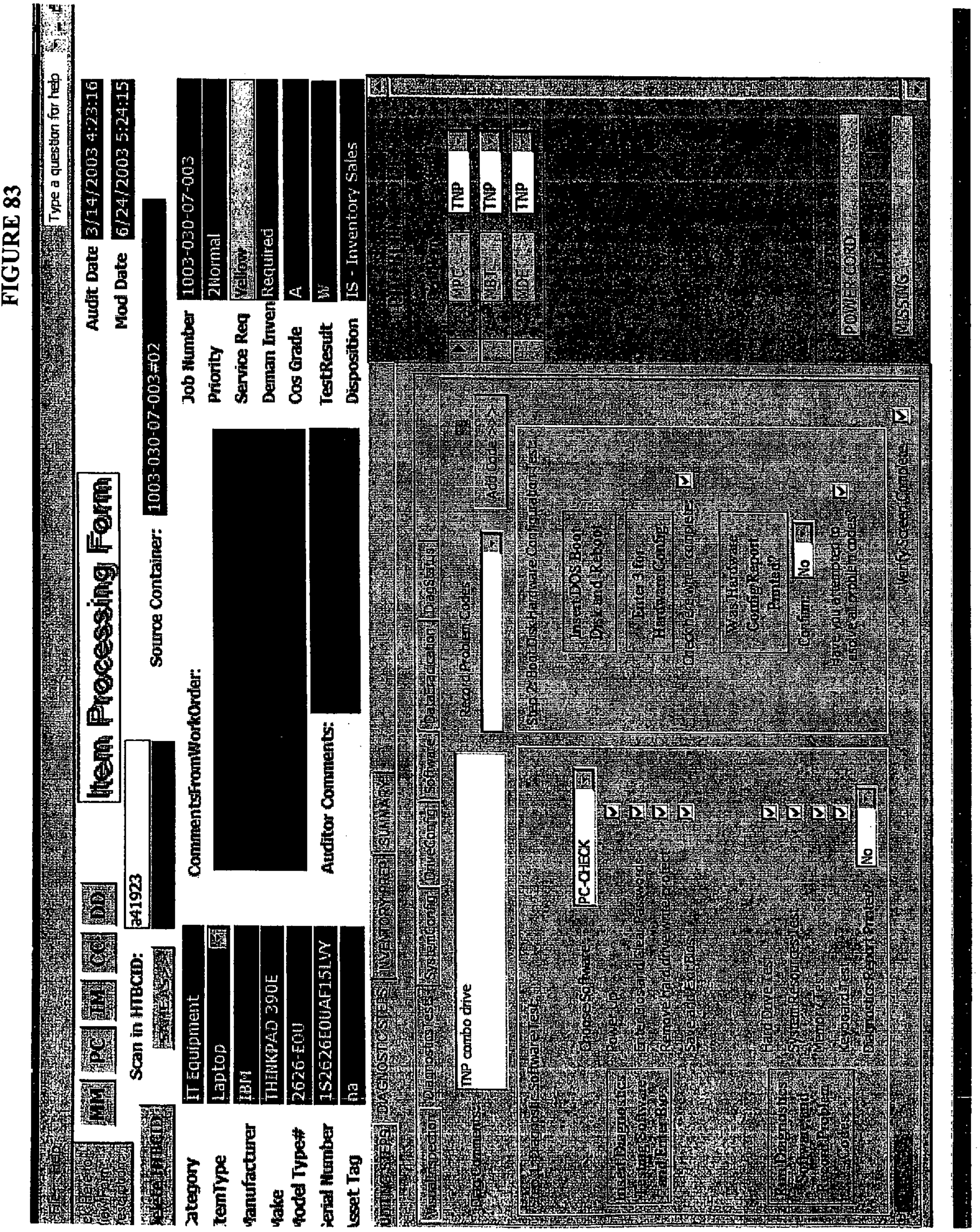
Figure 84:
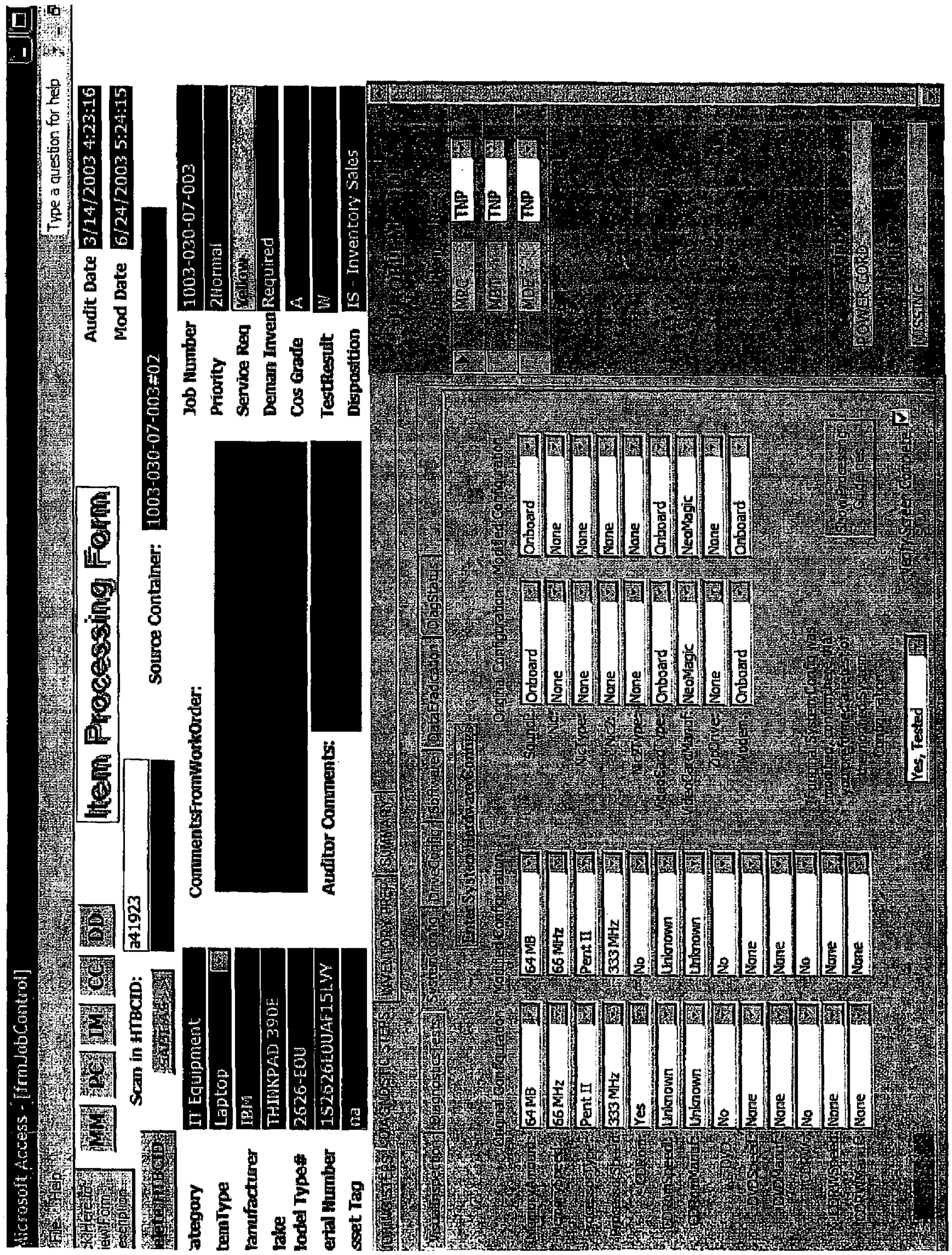
Figure 85:
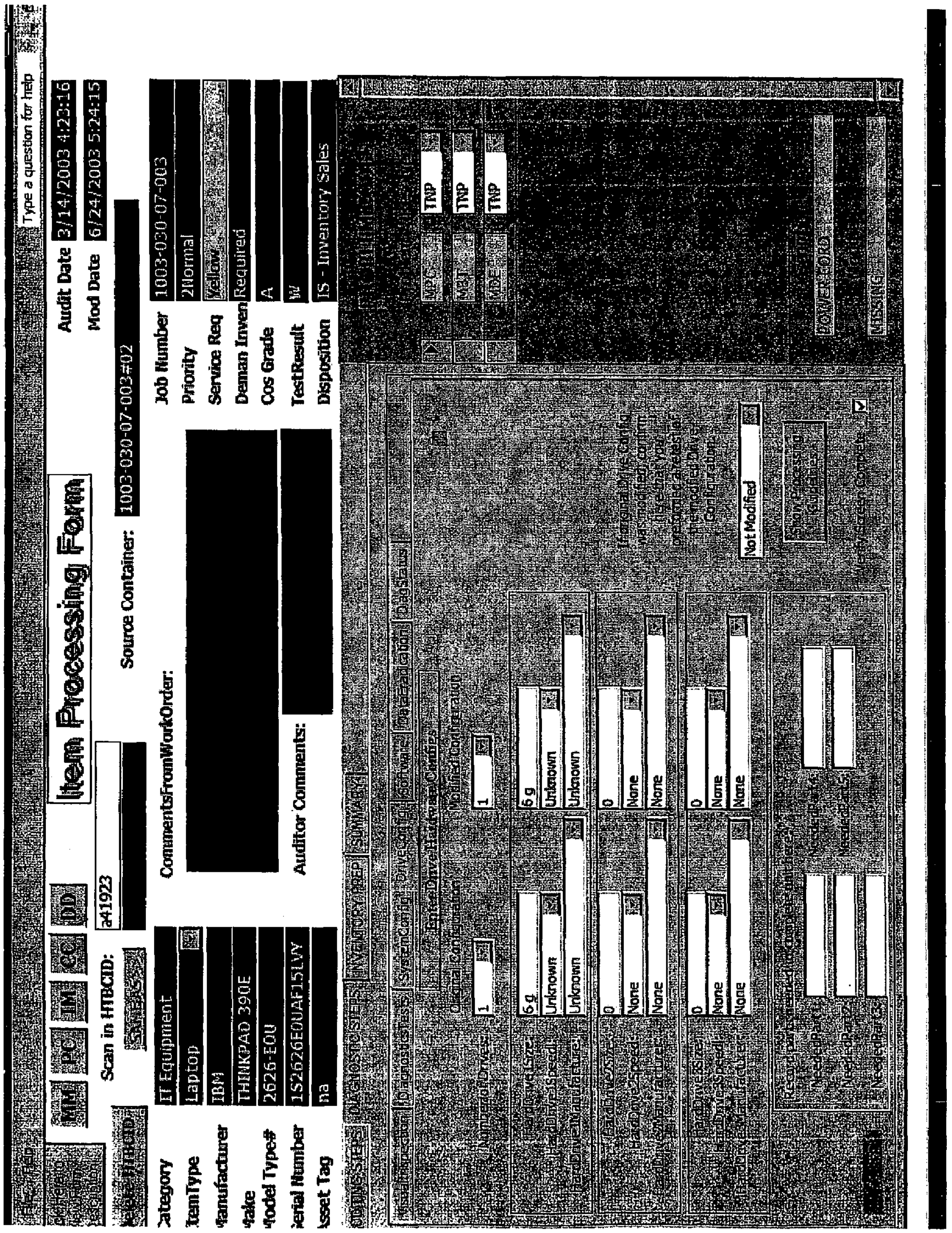
Figure 86:
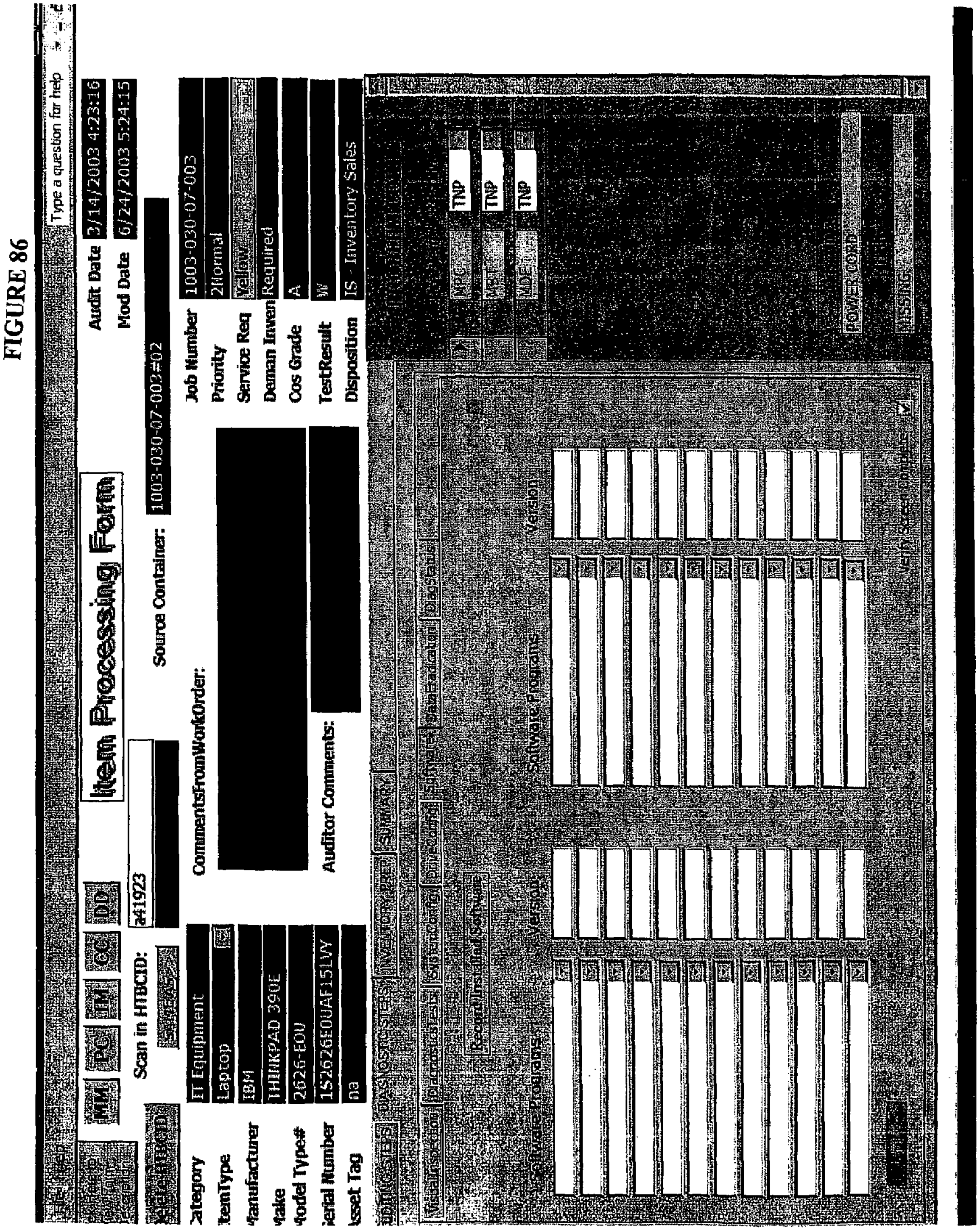
Figure 87:
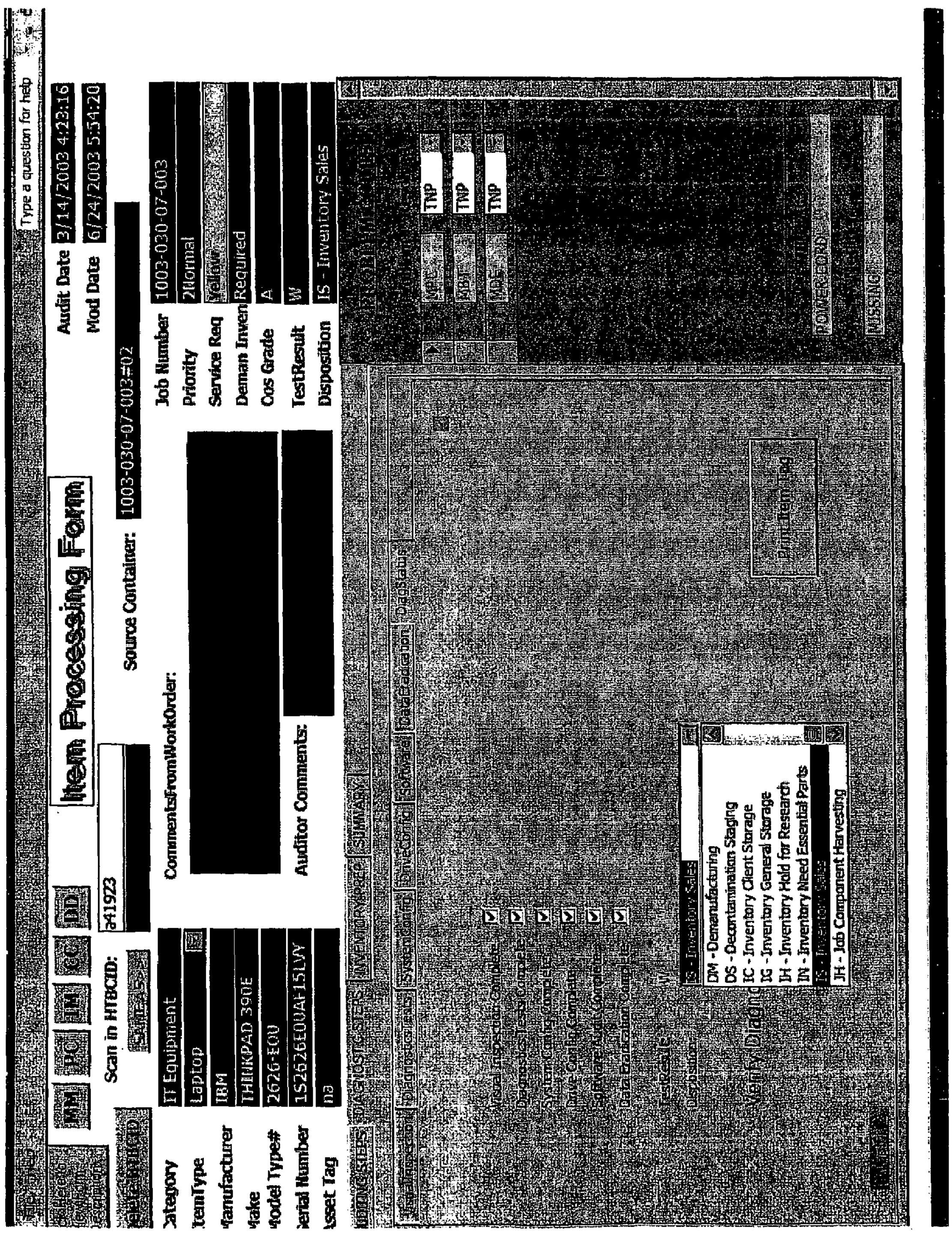
Figure 88:
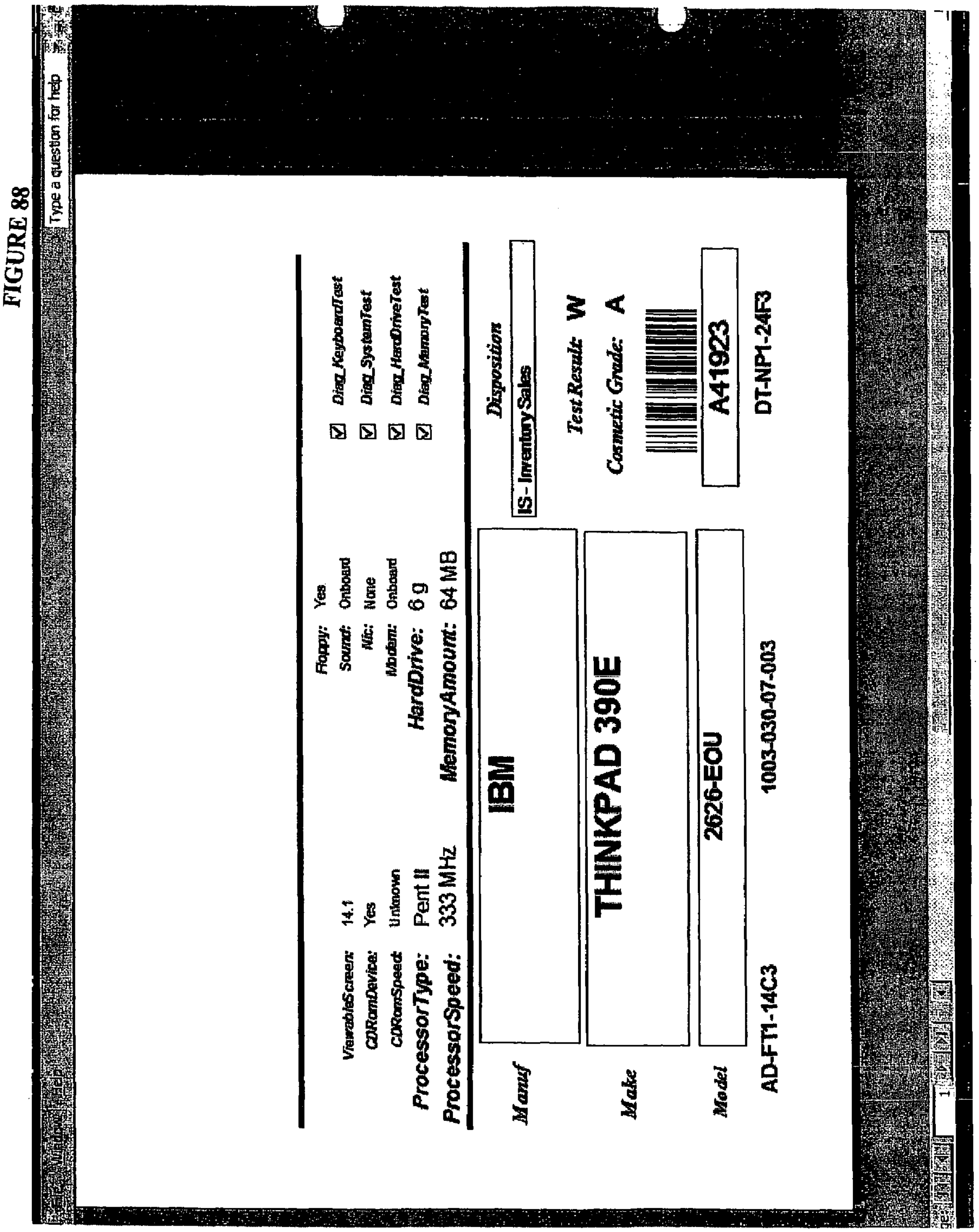
Figure 89:
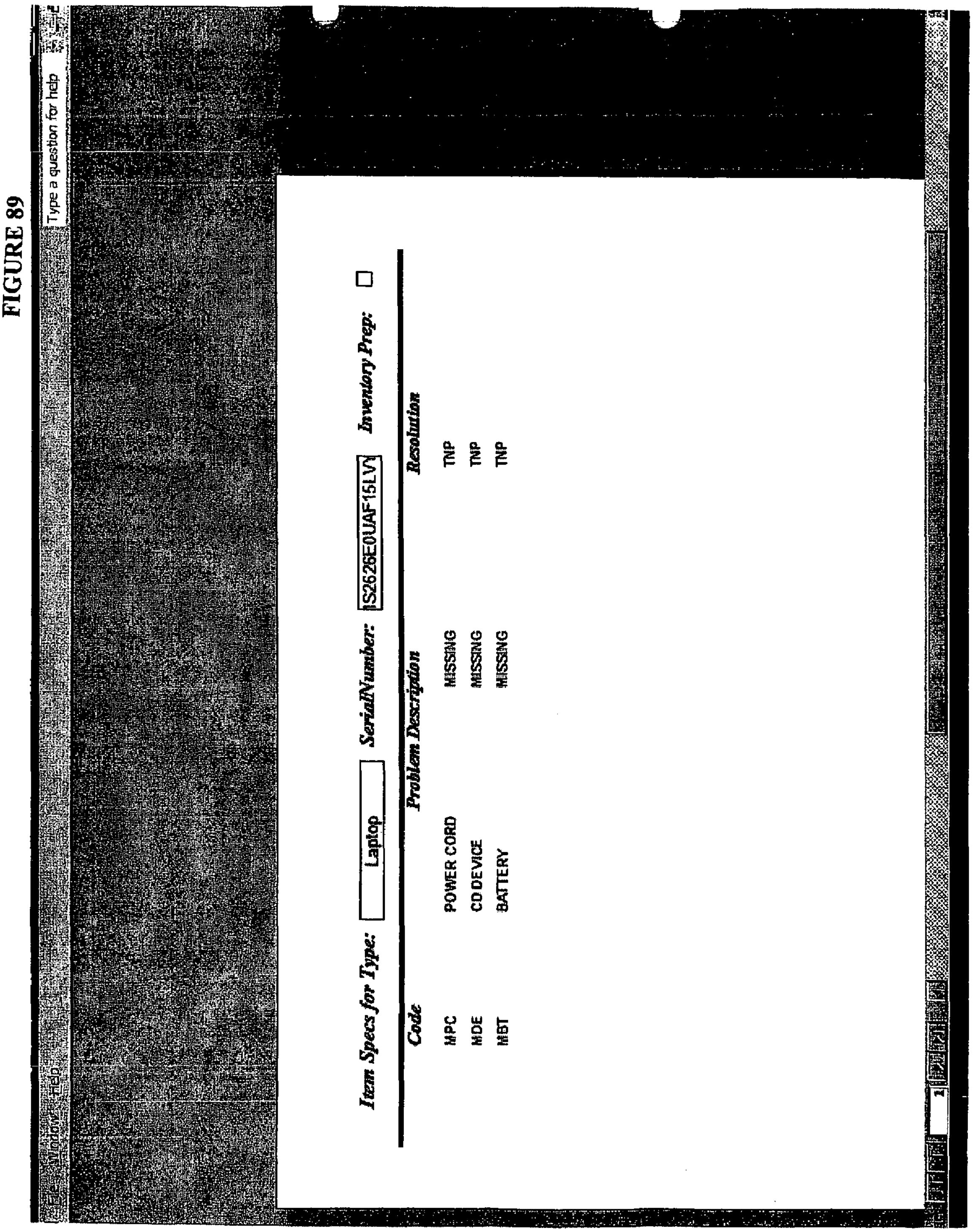

FIGS. 78 and 79 illustrate the organizational sub-hierarchy used in an exemplary embodiment of the present invention. The figures illustrate the use of suggested bar codes for quick inventory access, and the use of diagnostic testing.

FIGS. 79-89 illustrate the organizational sub-hierarchy of the diagnostic testing functionality of this embodiment of the present invention, including, the processing of items using item related information in the present invention.

Figure 90:
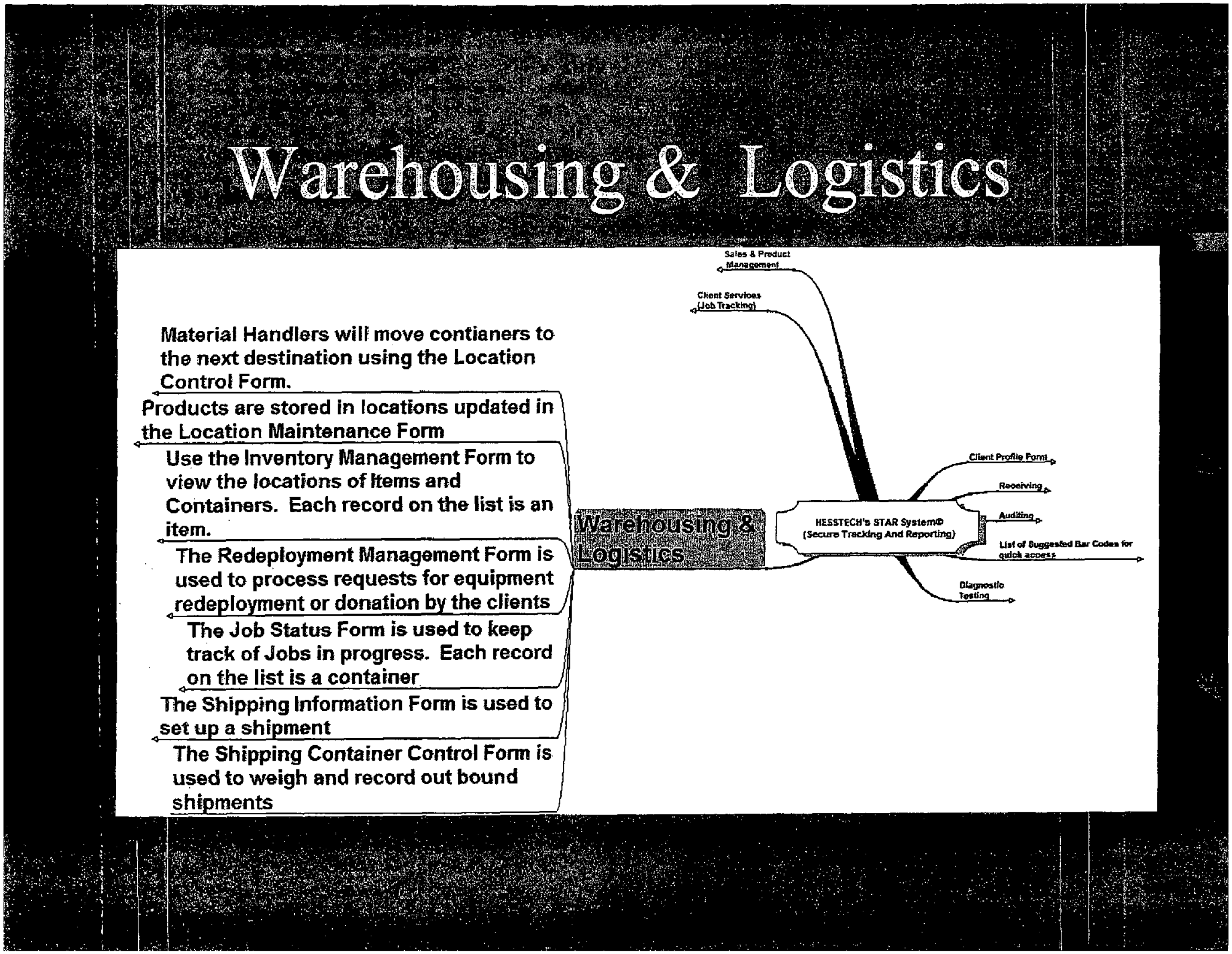
FIG. 90 is an hierarchical diagram depicting aspects of a warehousing and logistics sub-hierarchy of the exemplary embodiment of FIG. 44.
Figure 91:
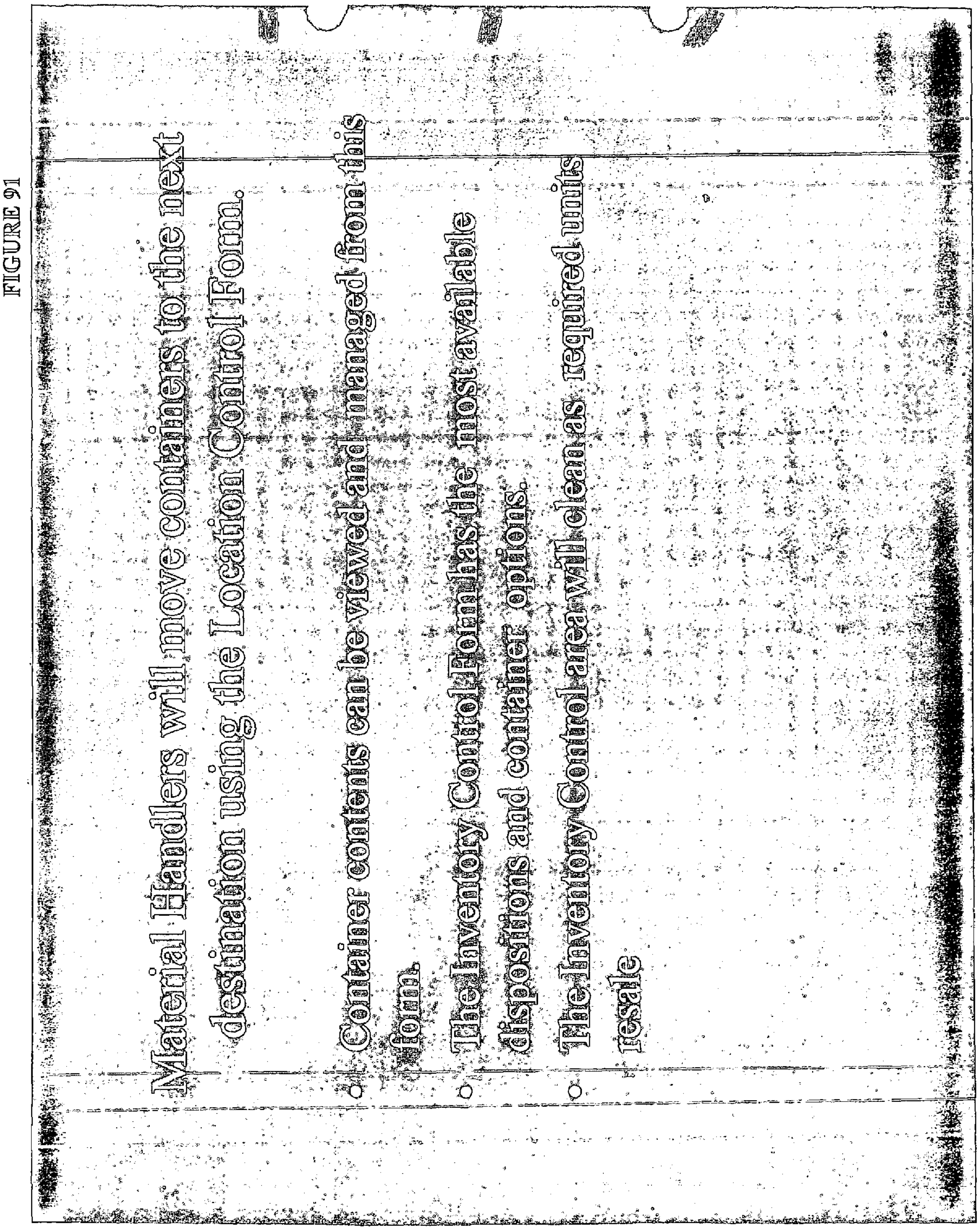
Figure 92:
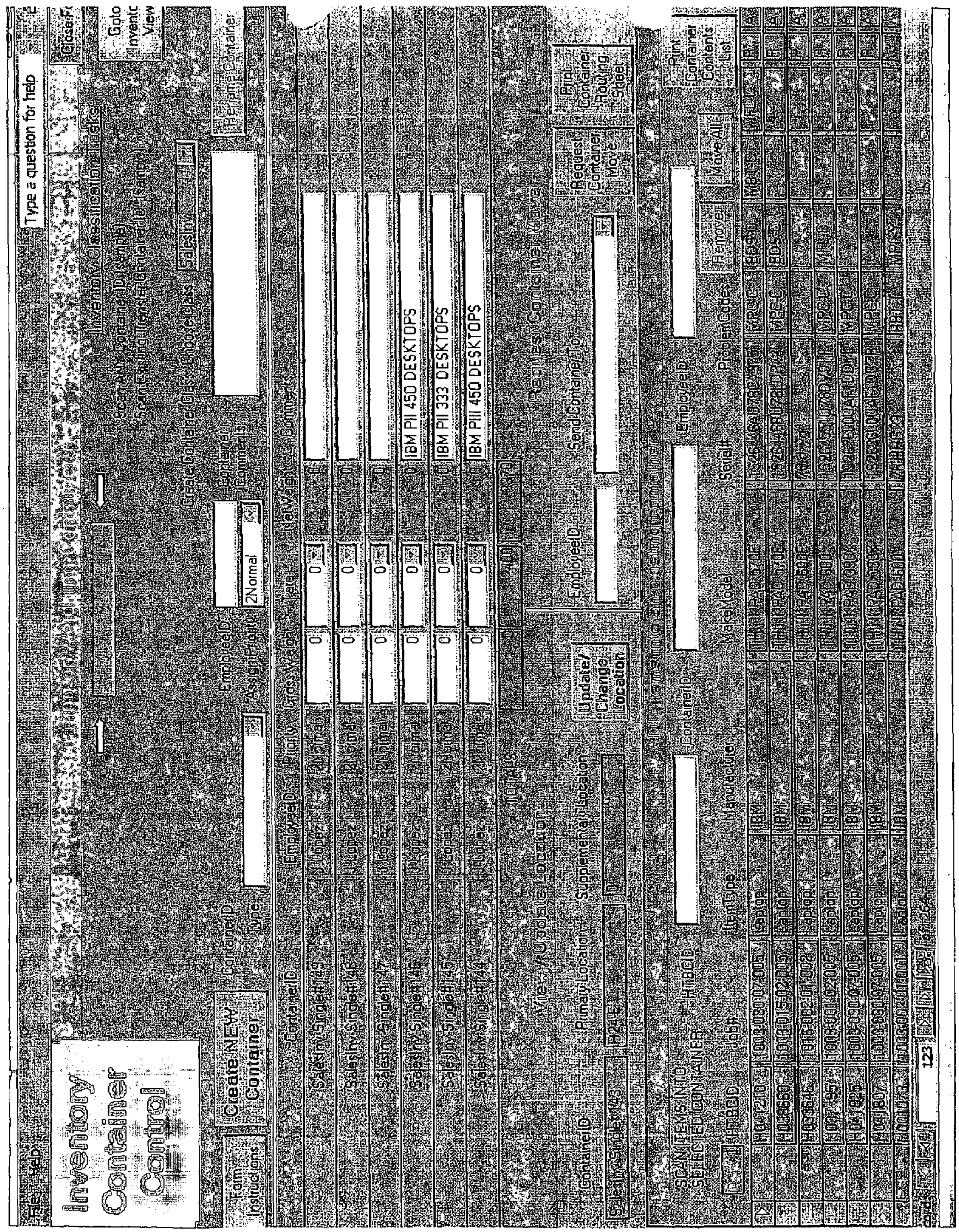
Figure 93:
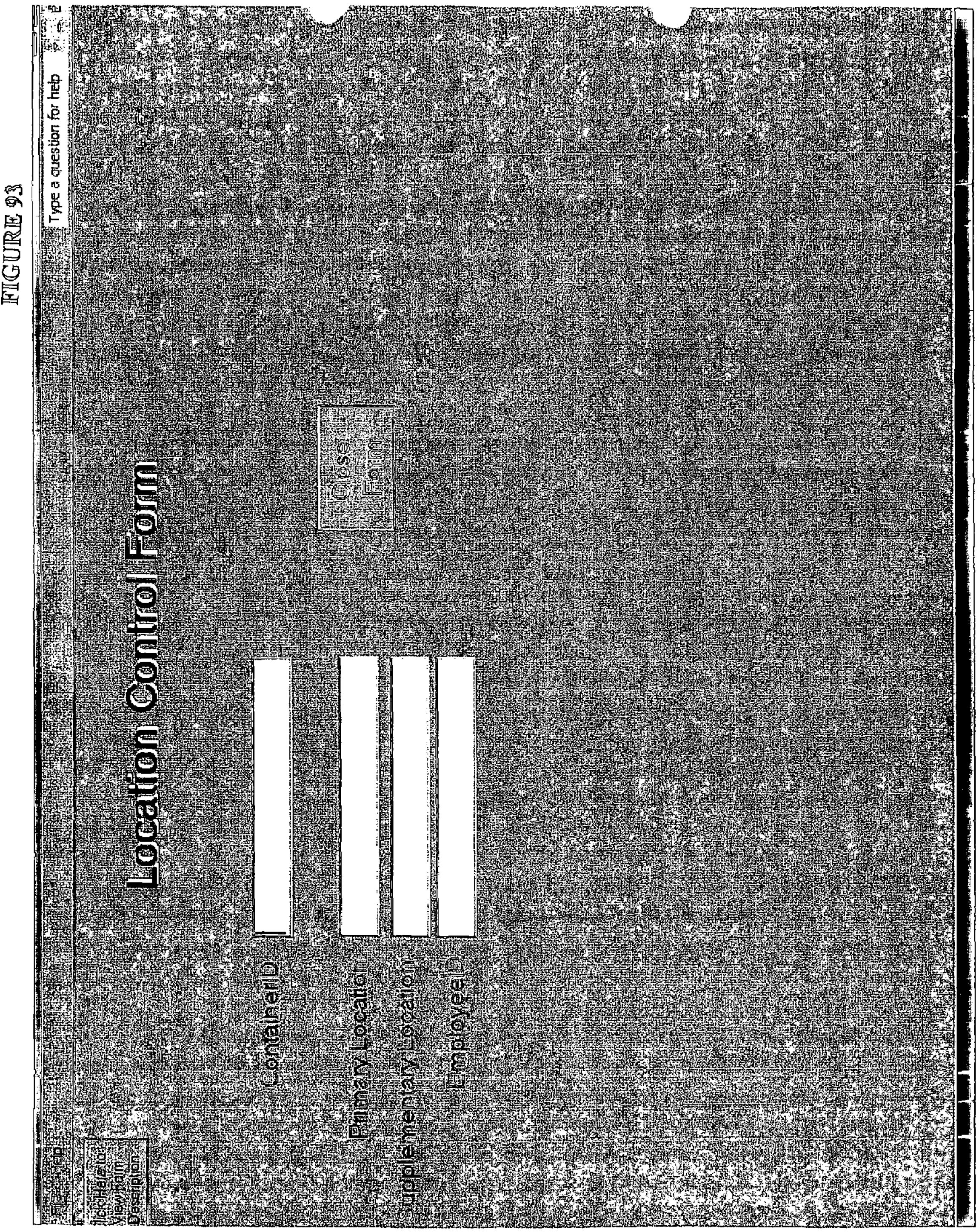
Figure 94:
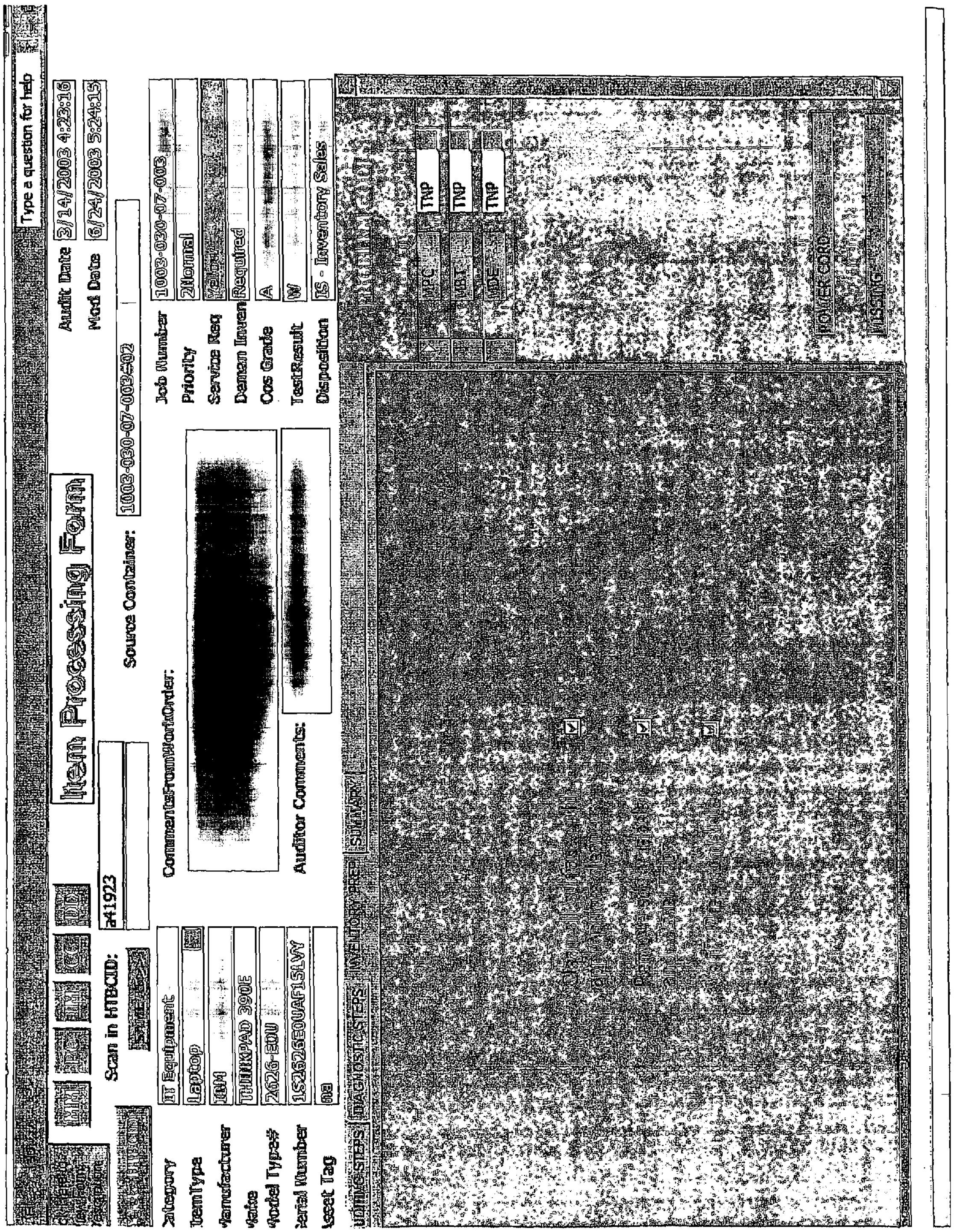
Figure 96:
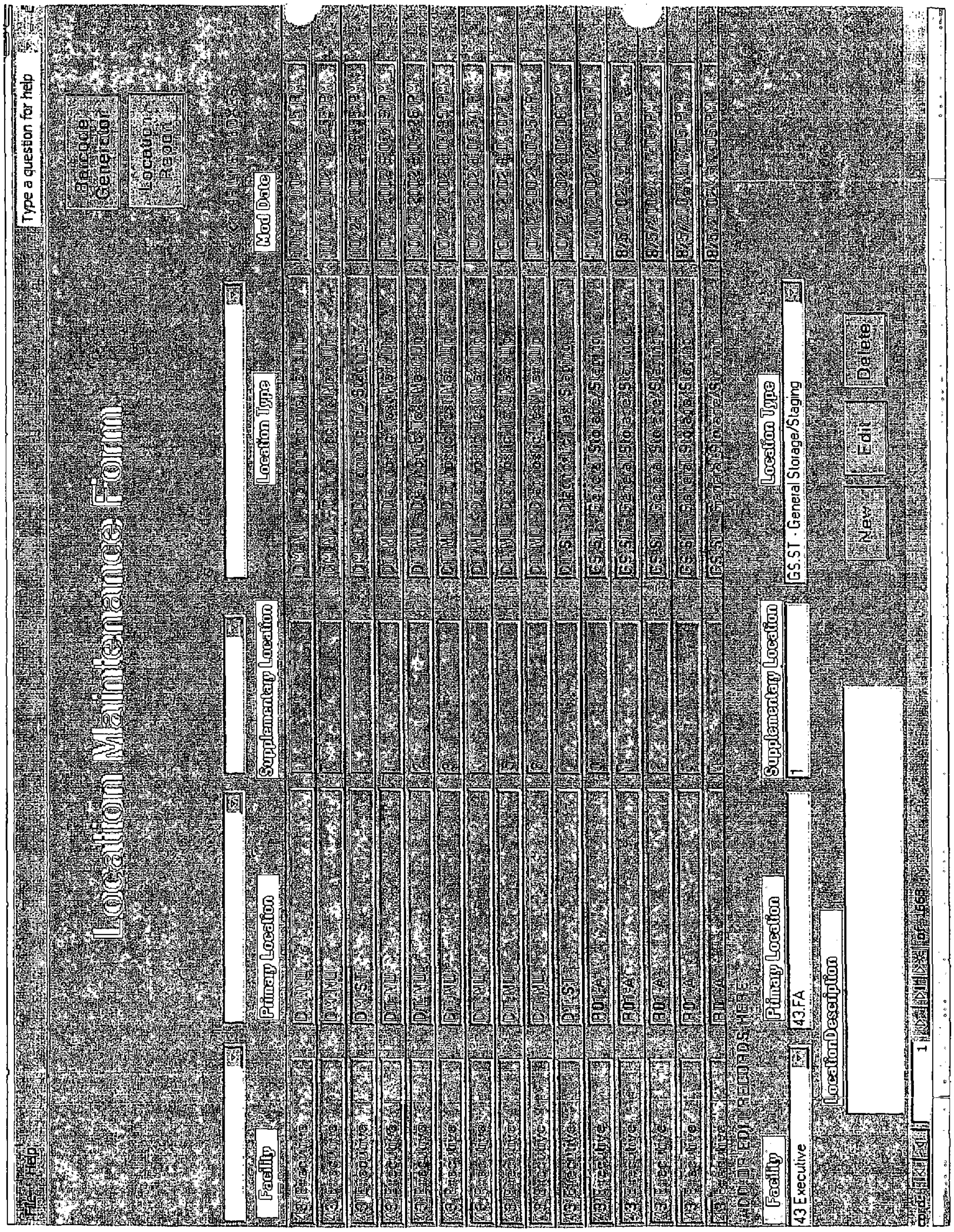
Figure 97:
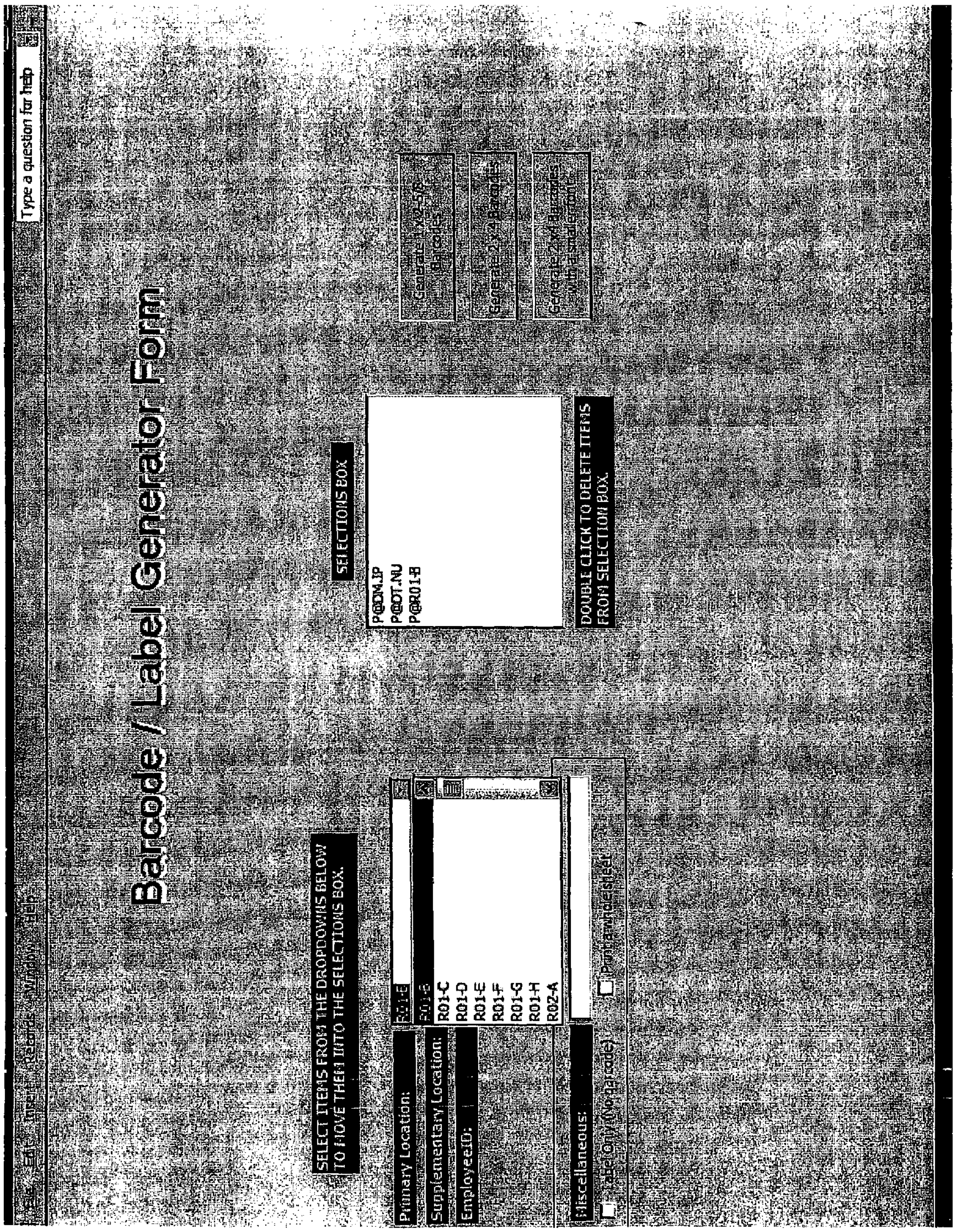
Figure 98:
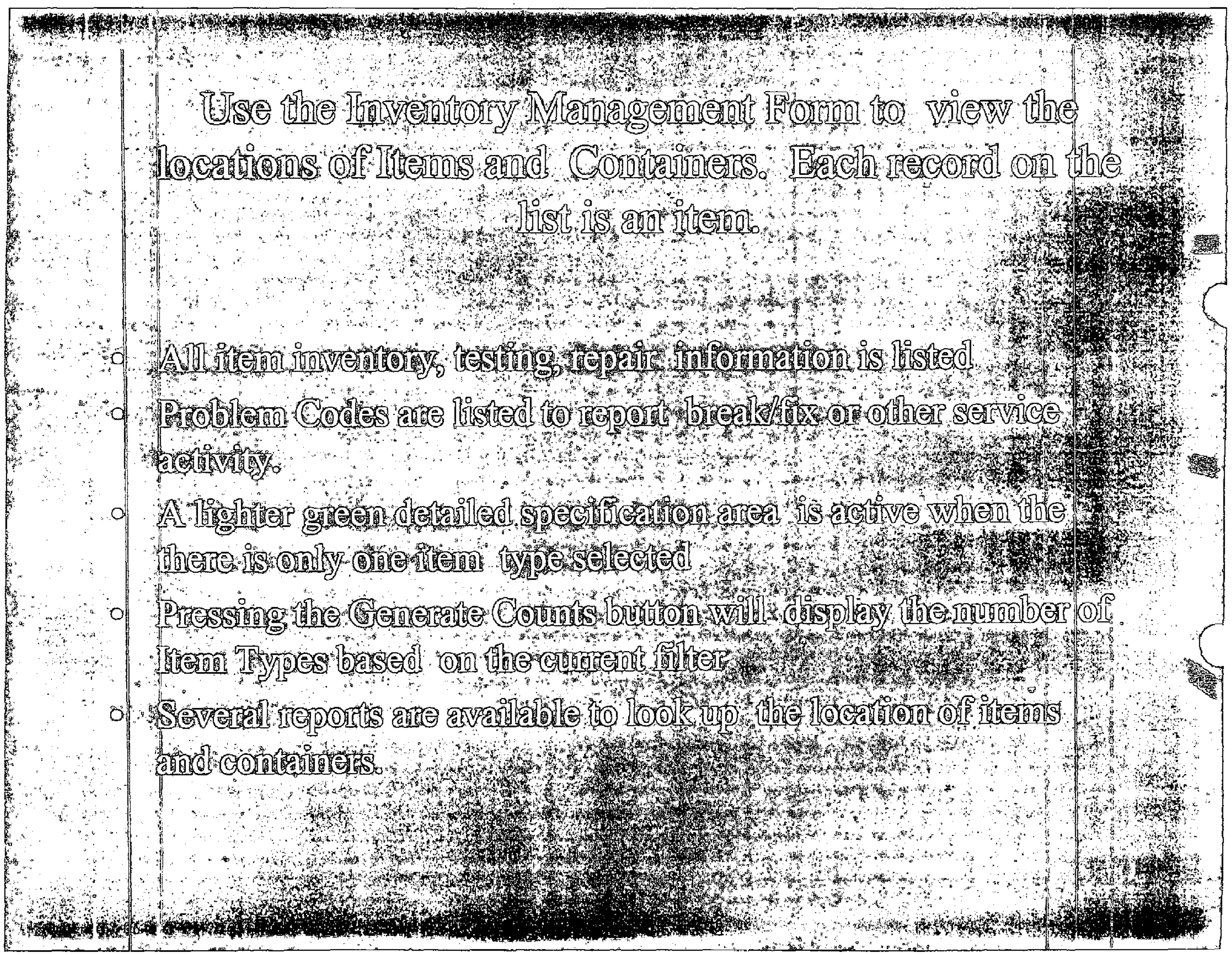
Figure 99:
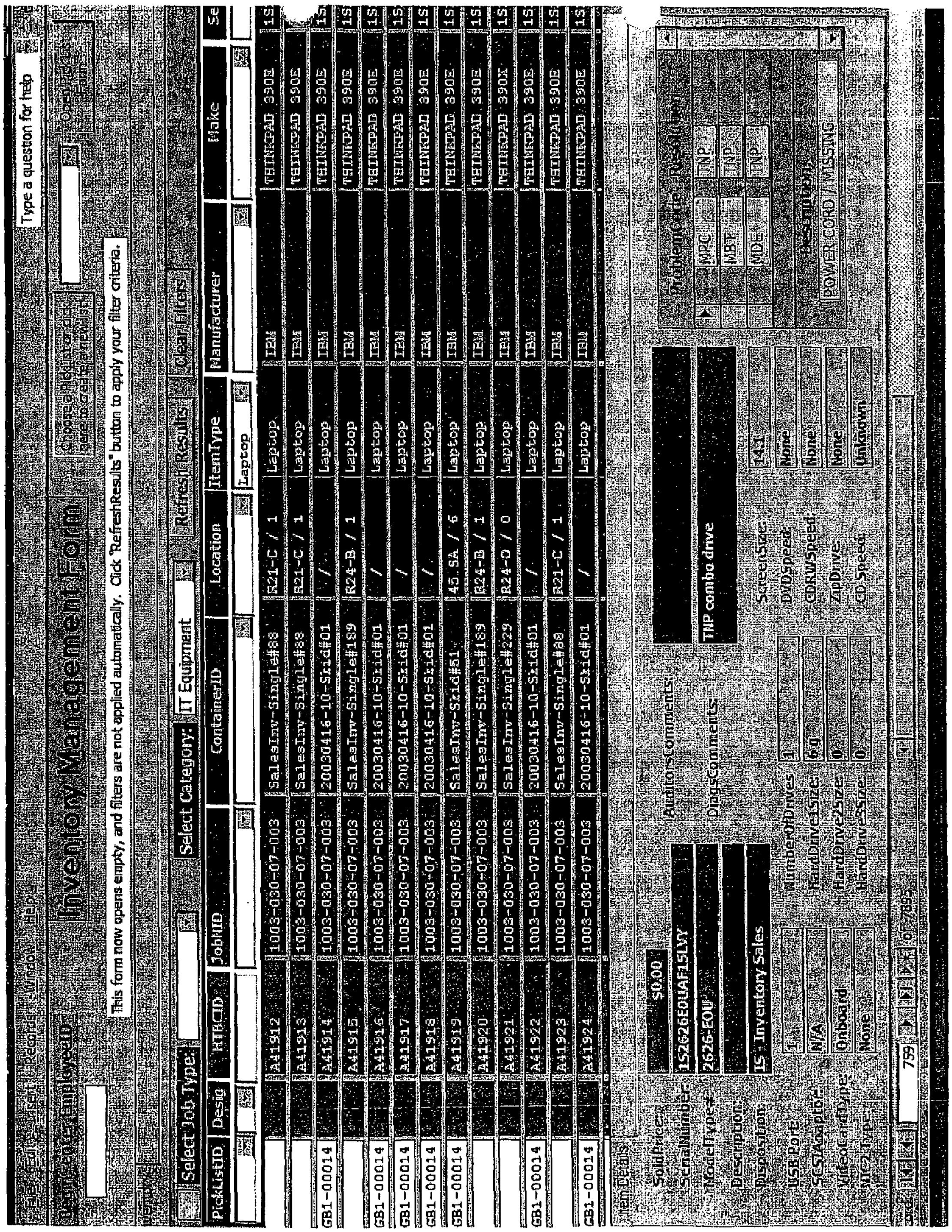
Figure 100:
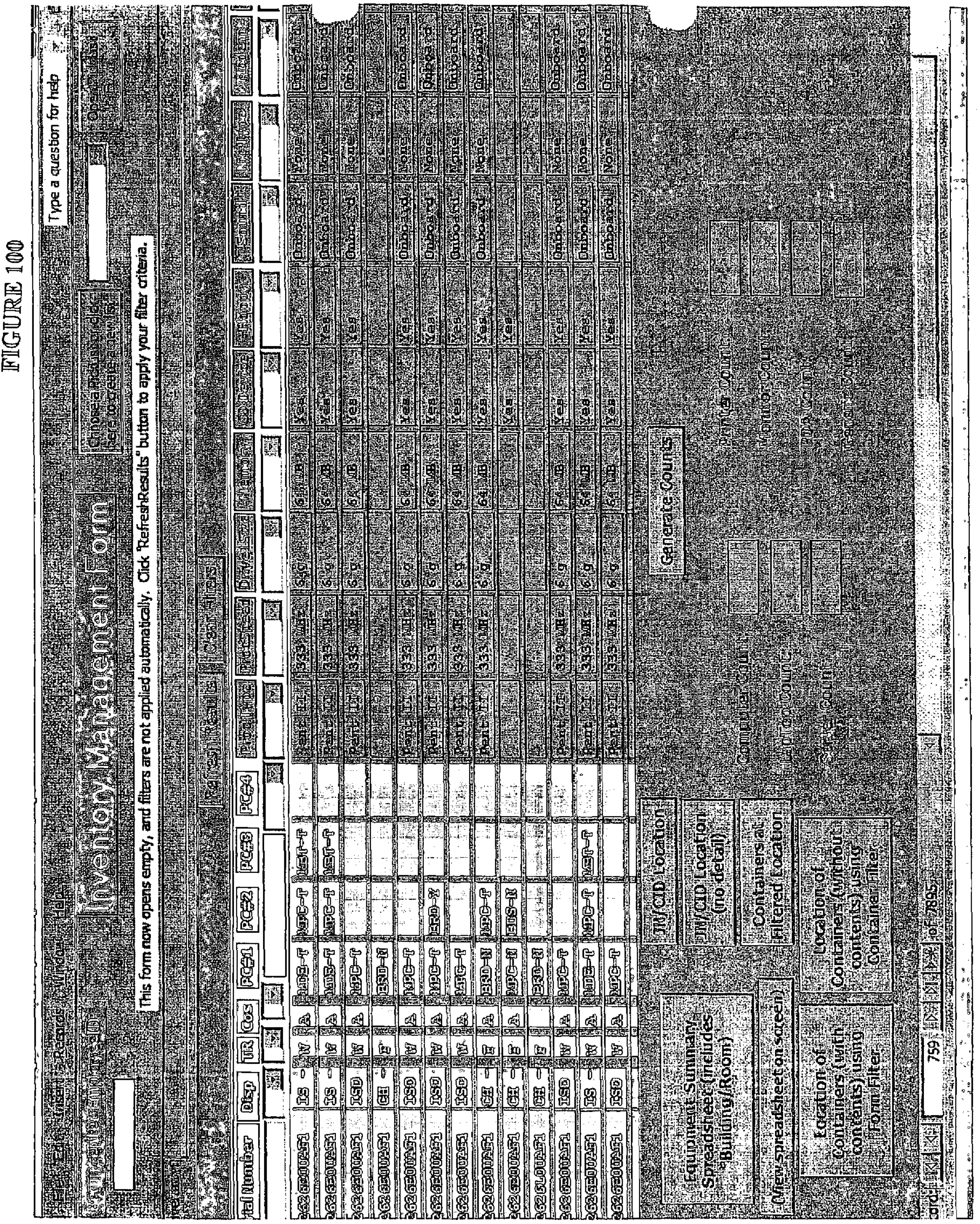
Figure 102:
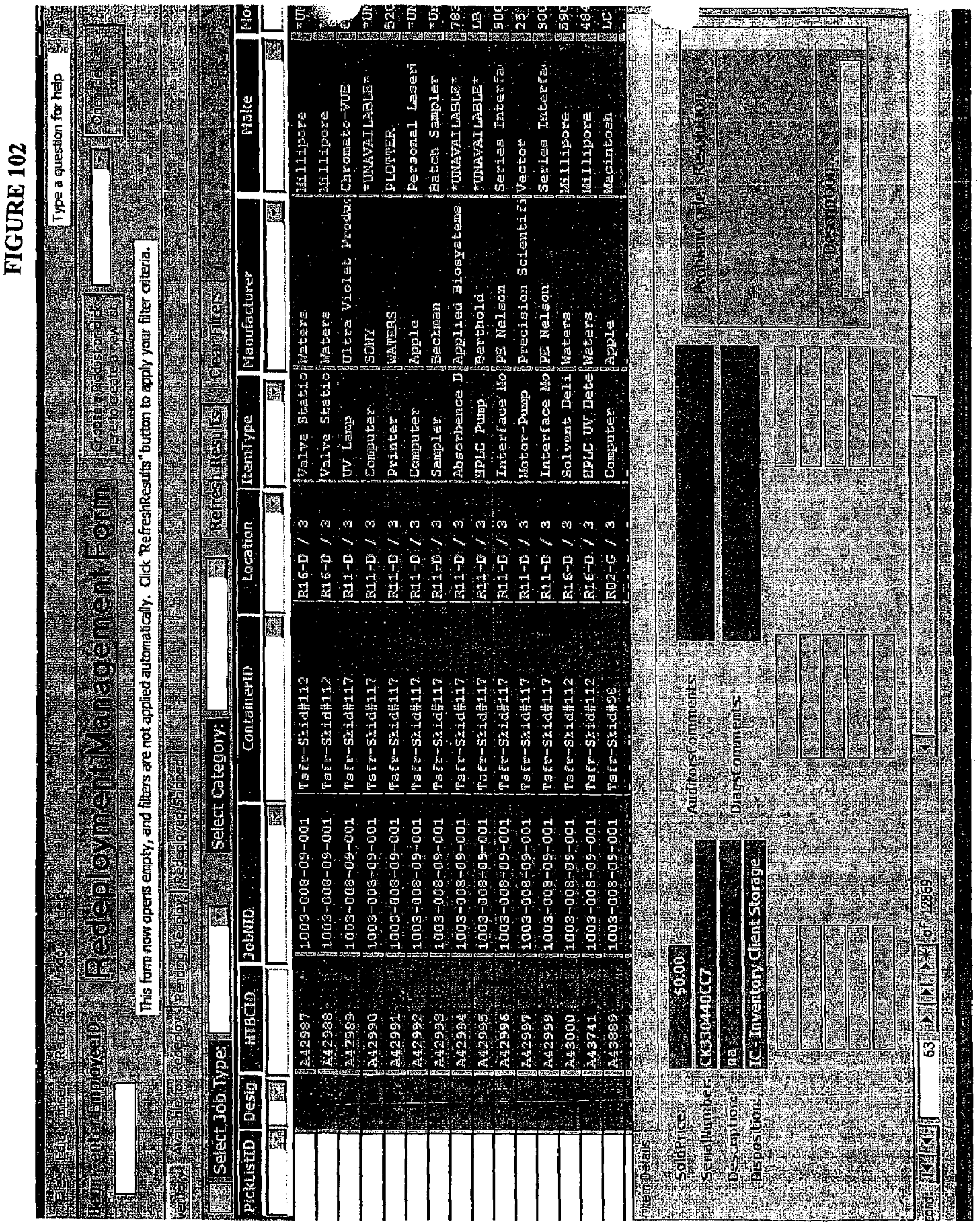
Figure 103:
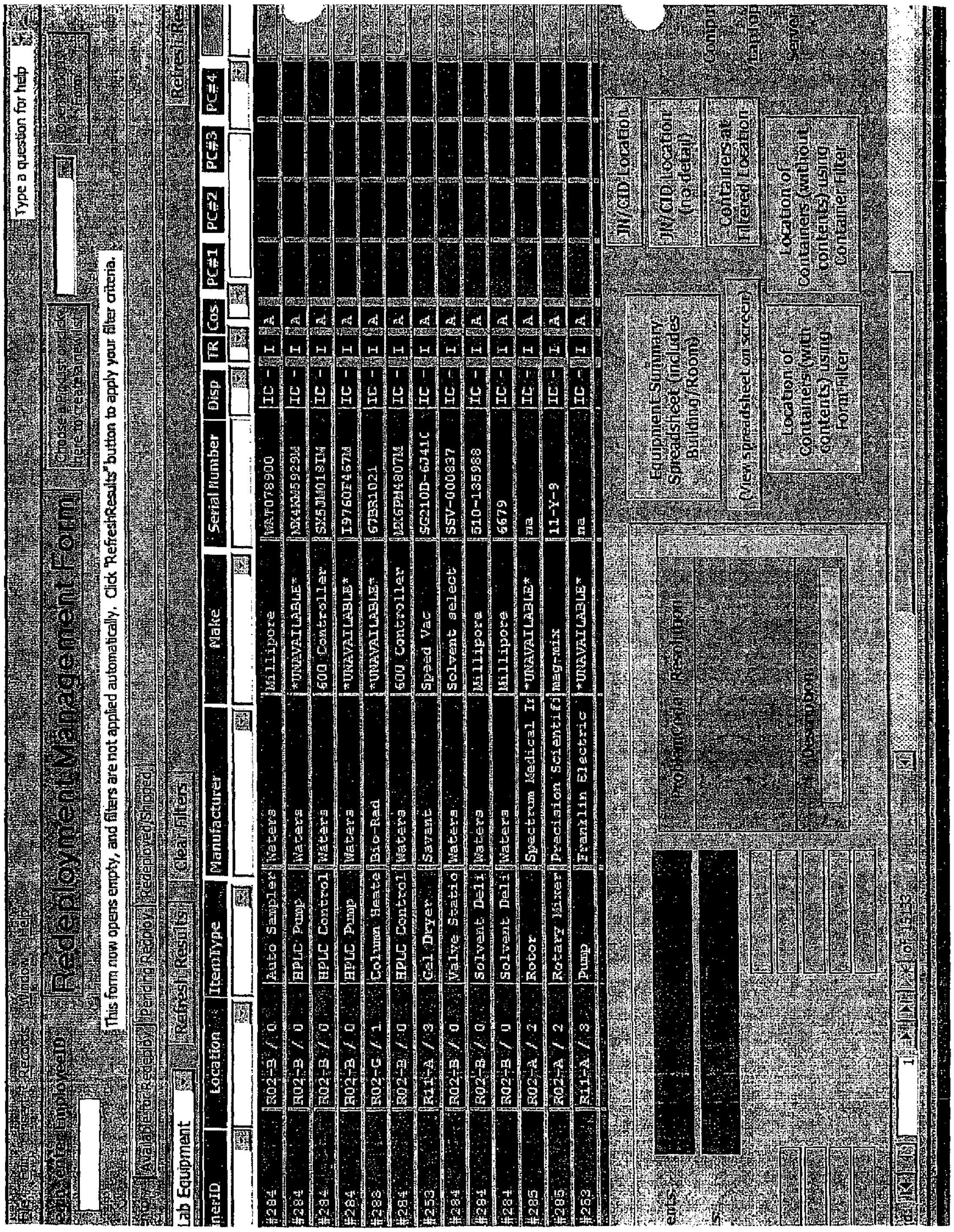
Figure 104:
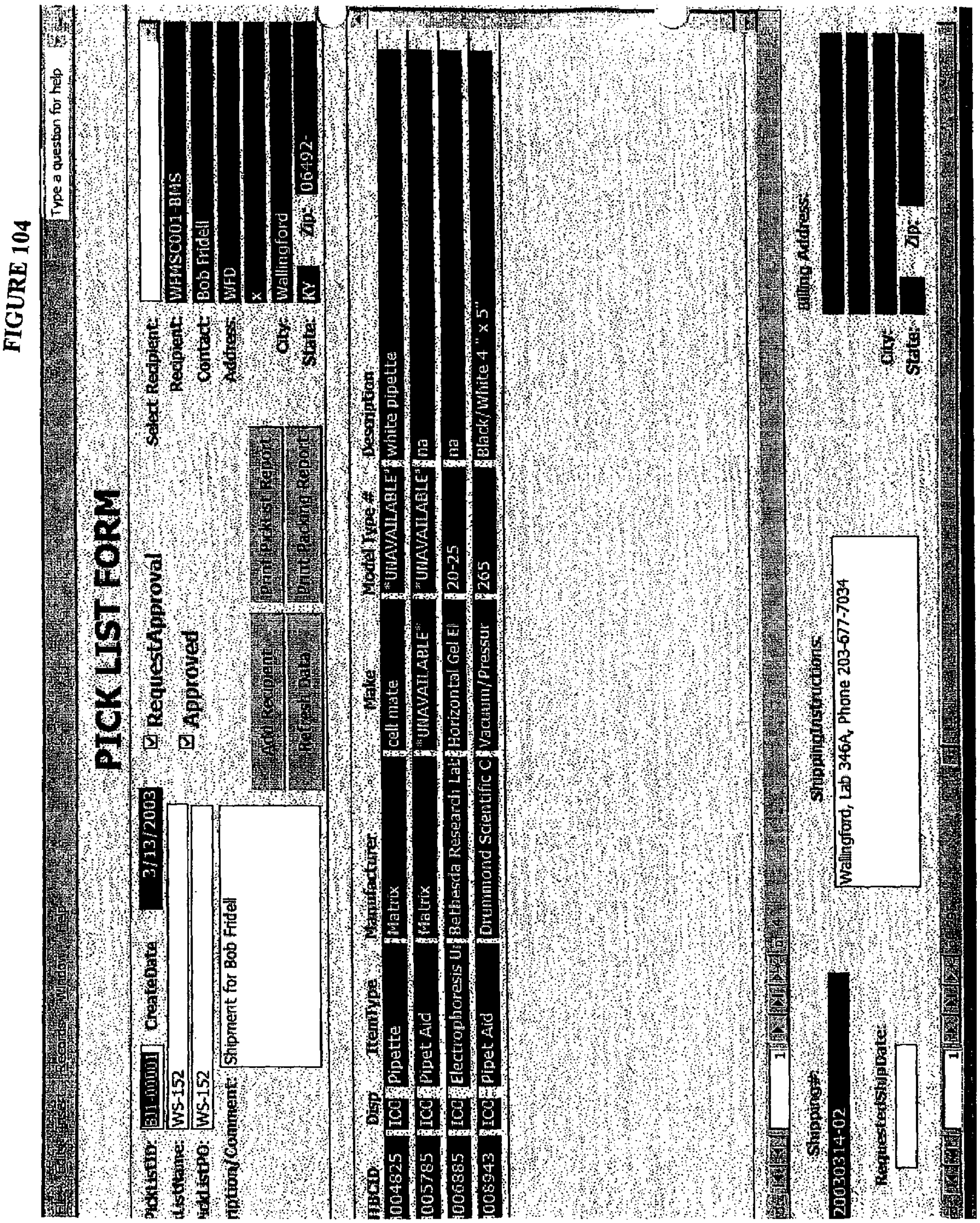
Figure 107:
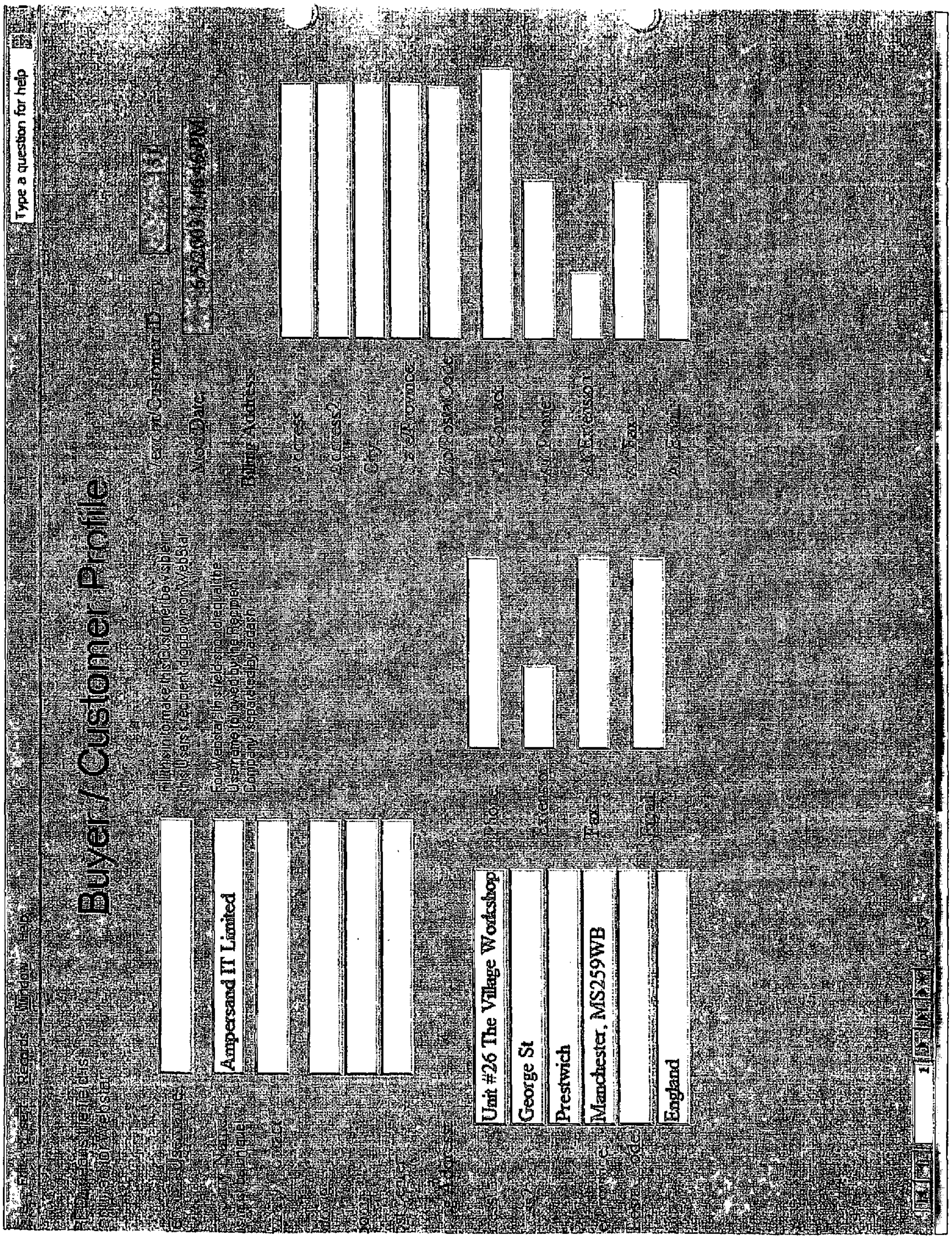
Figure 109:
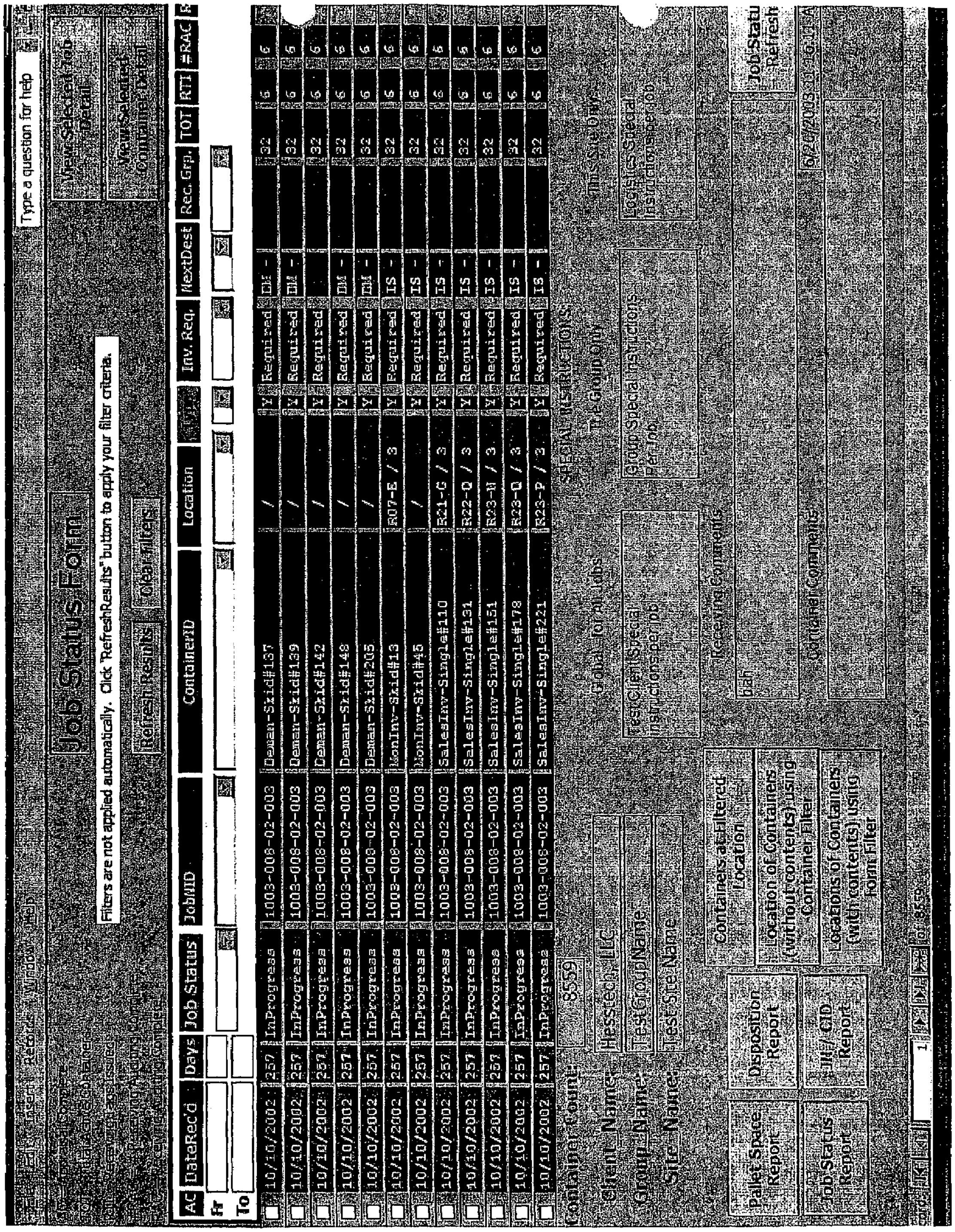
Figure 111:
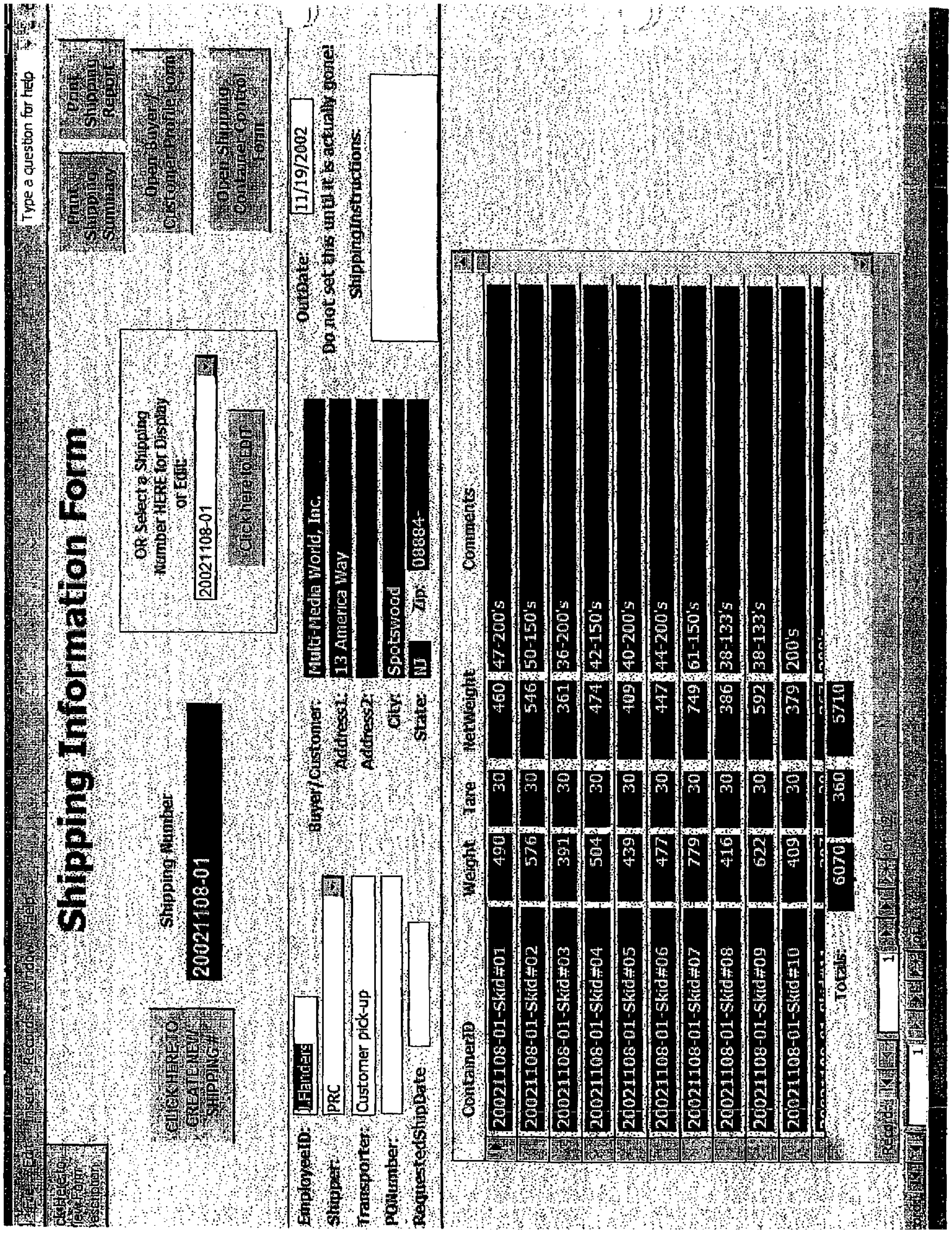
Figure 112:
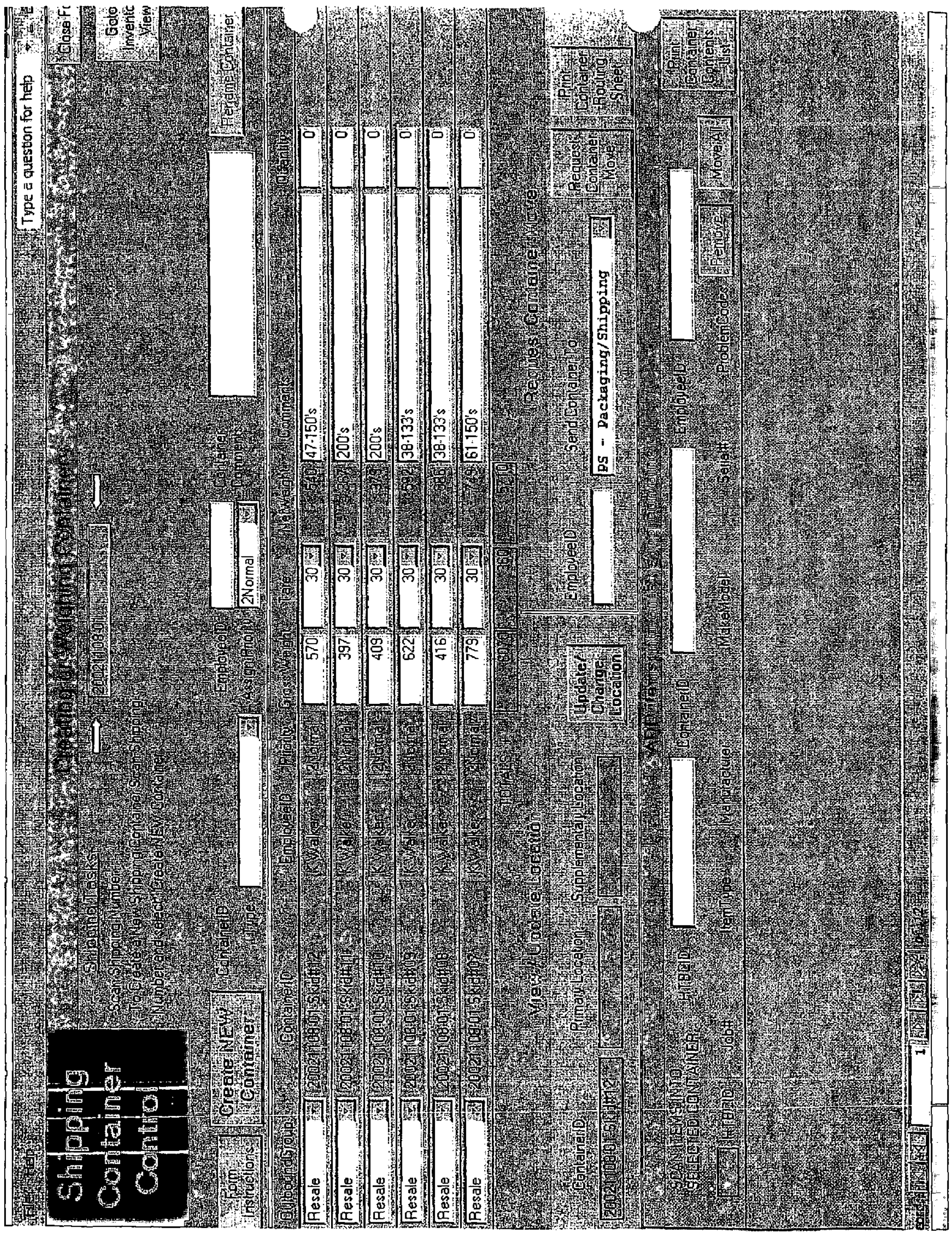
Figure 115:
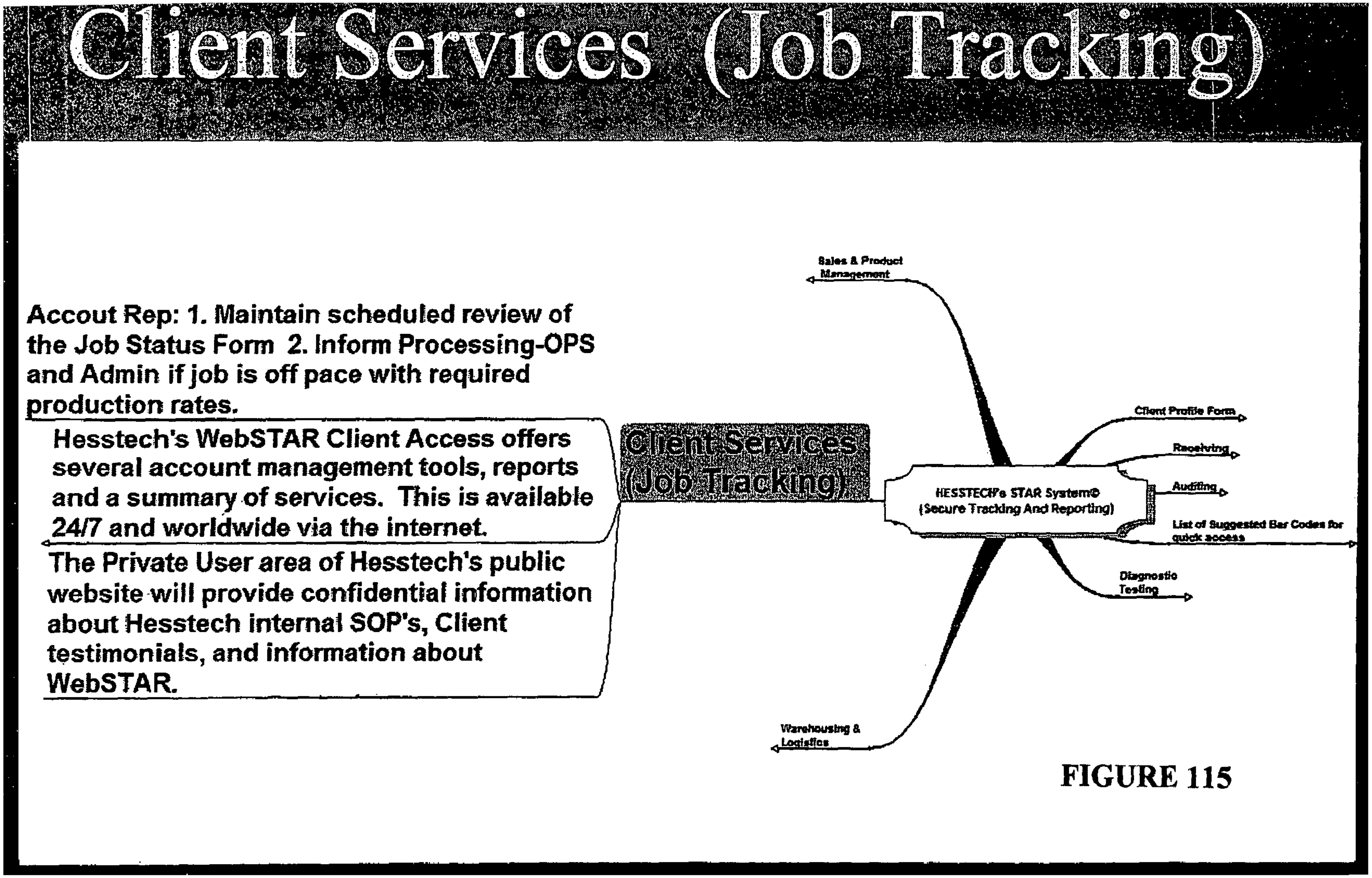
FIG. 115 is an hierarchical diagram depicting aspects of a client services (job tracking) sub-hierarchy of the exemplary embodiment of FIG. 44.
Figure 116:
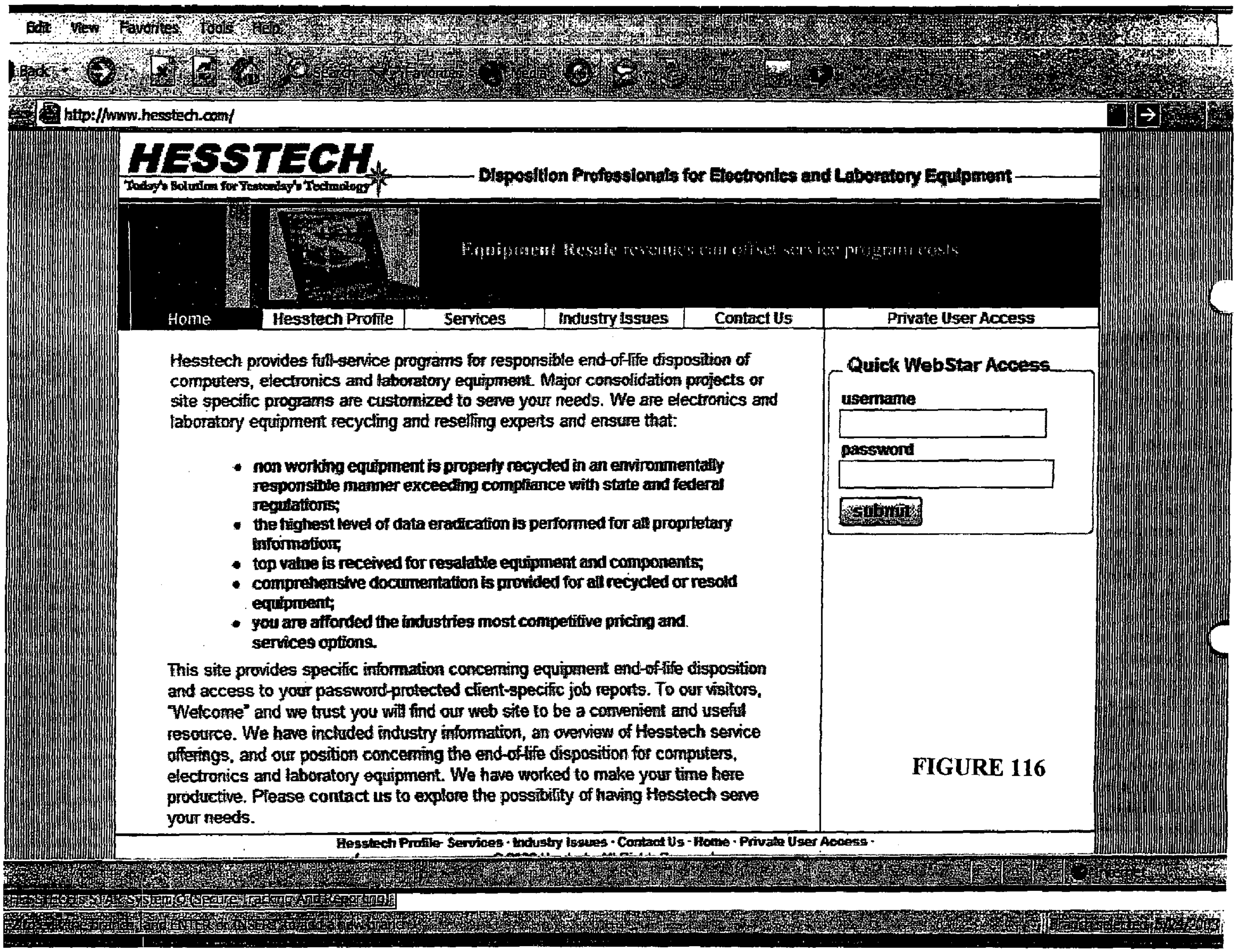
Figure 118:
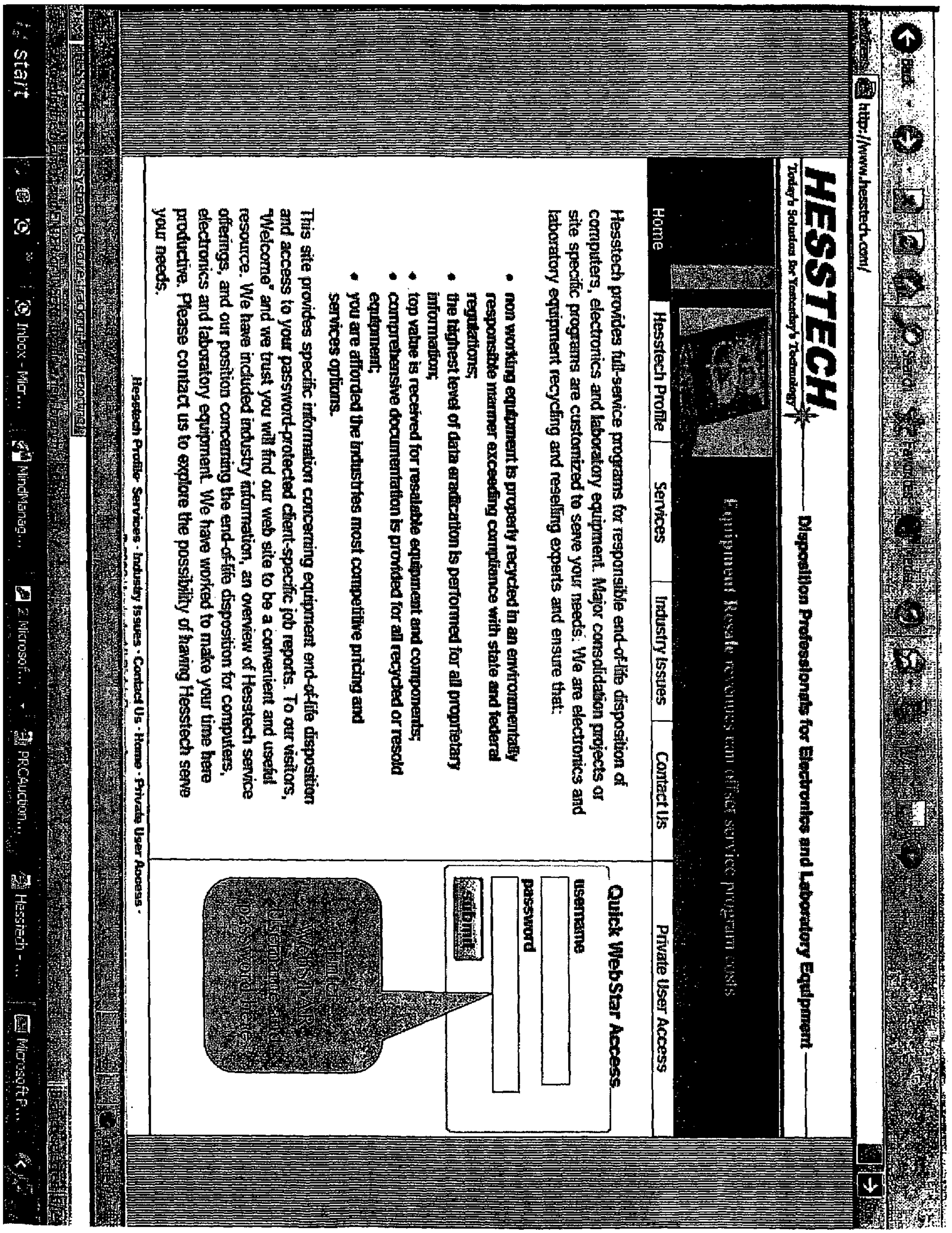
Figure 119:
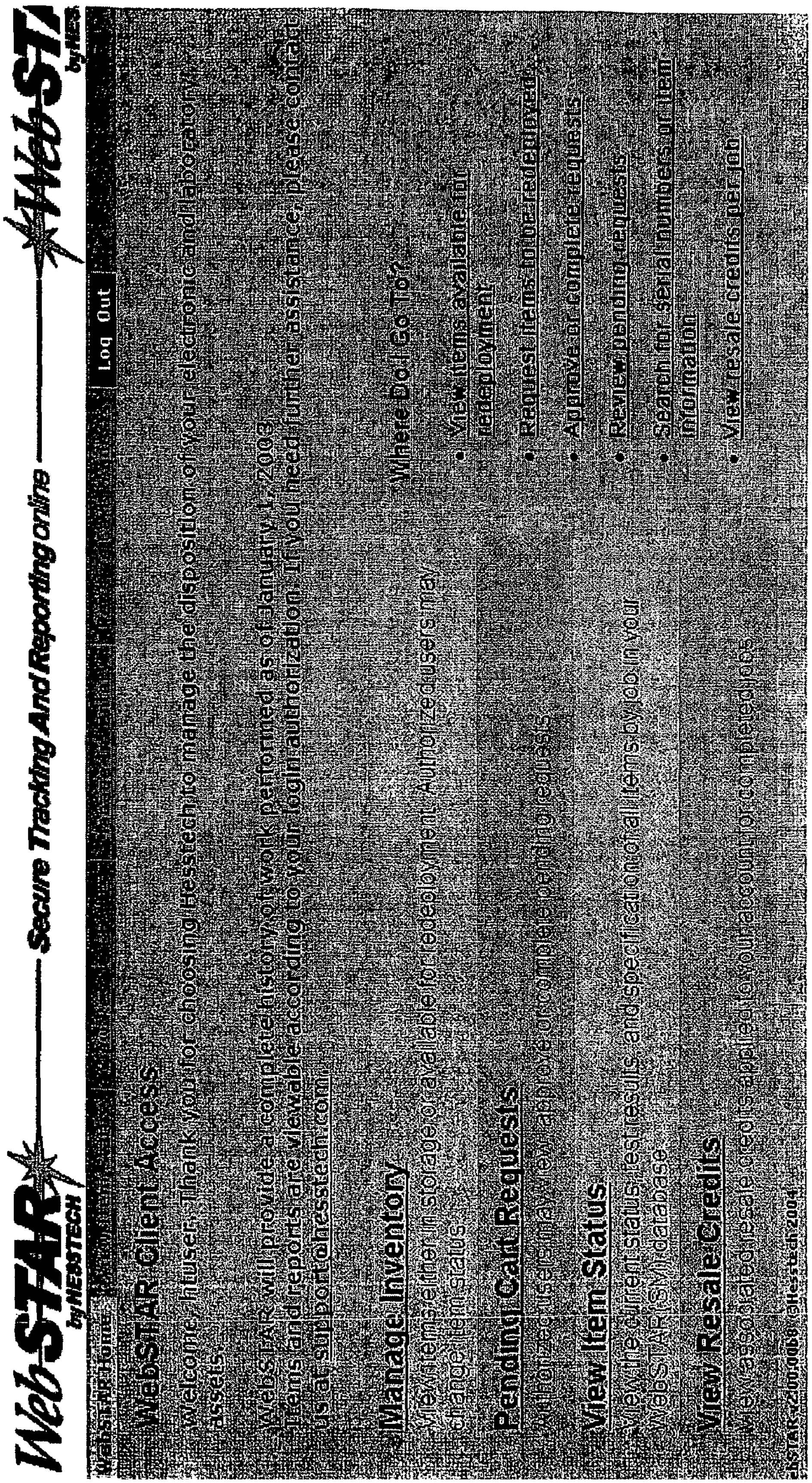
Figure 132:
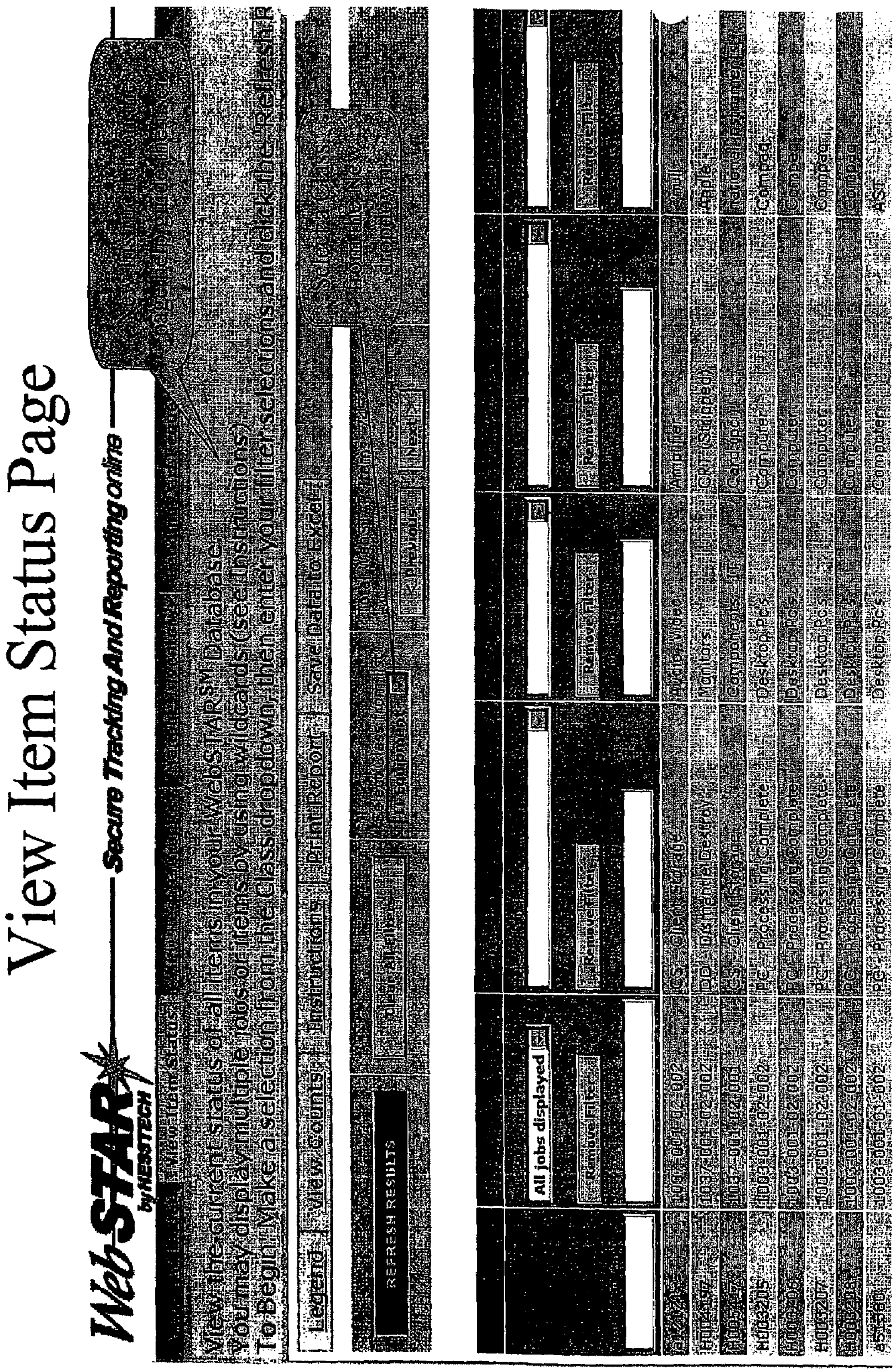
Figure 133:
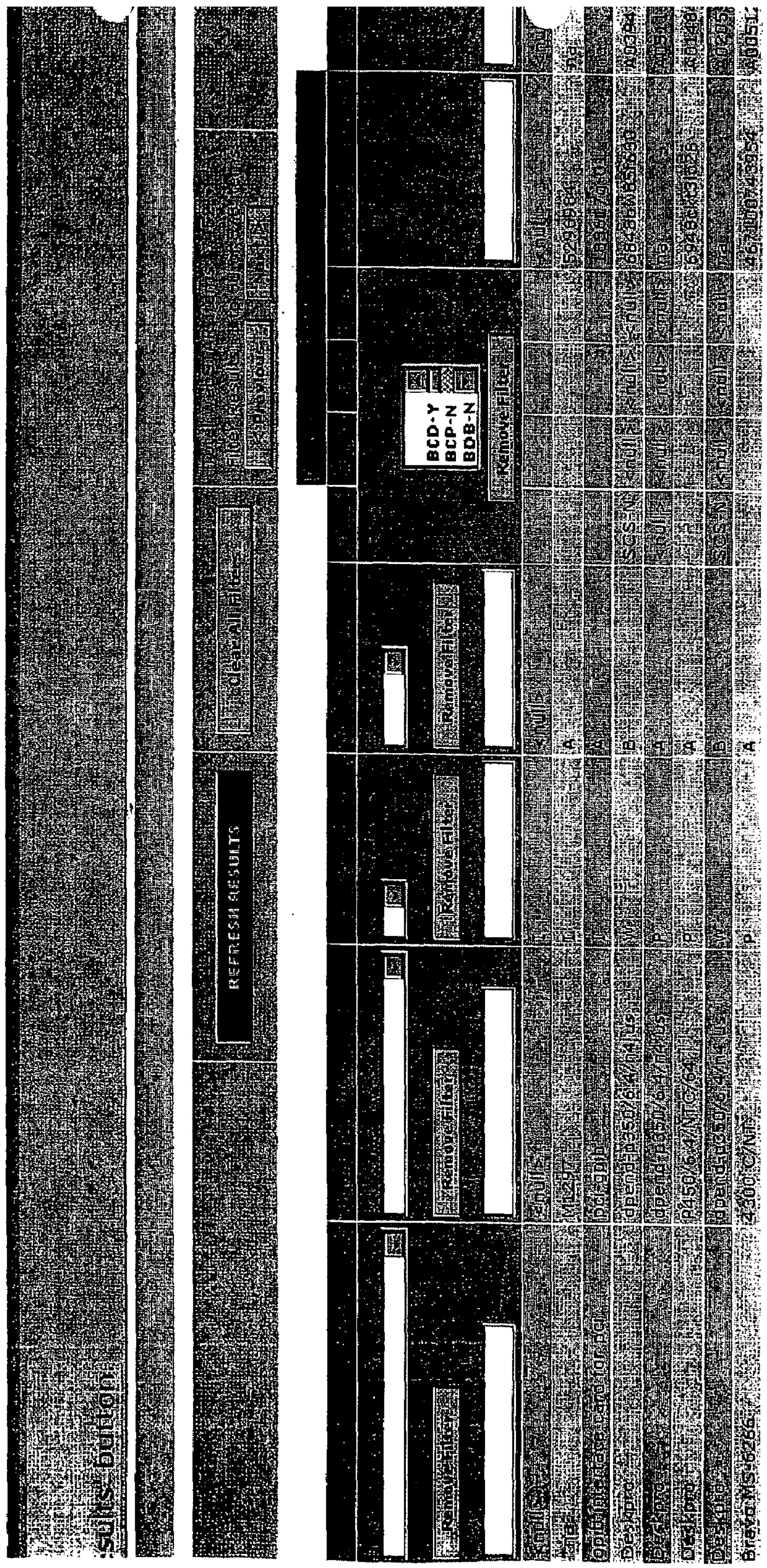
Figure 134:
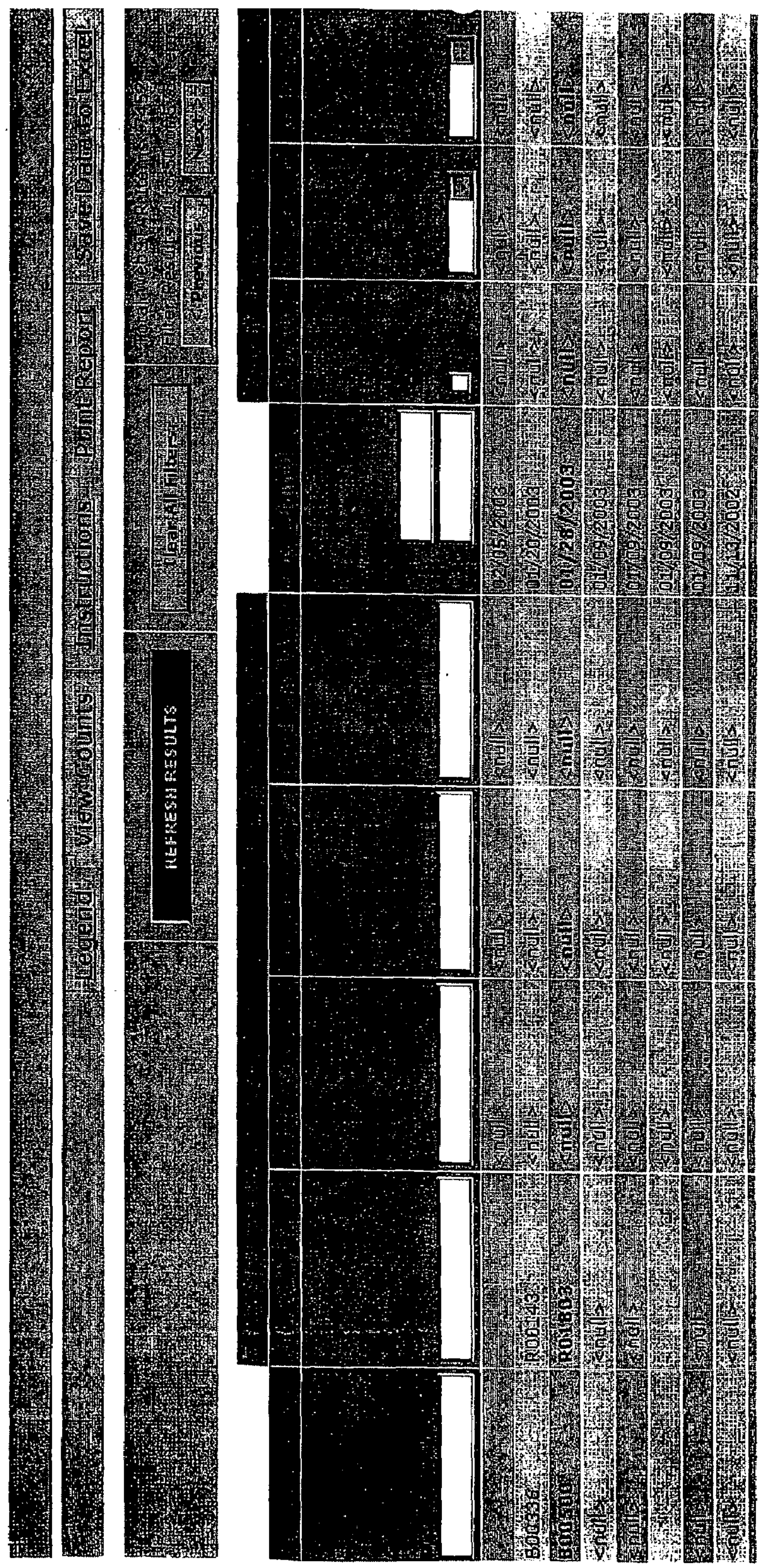
Figure 135:
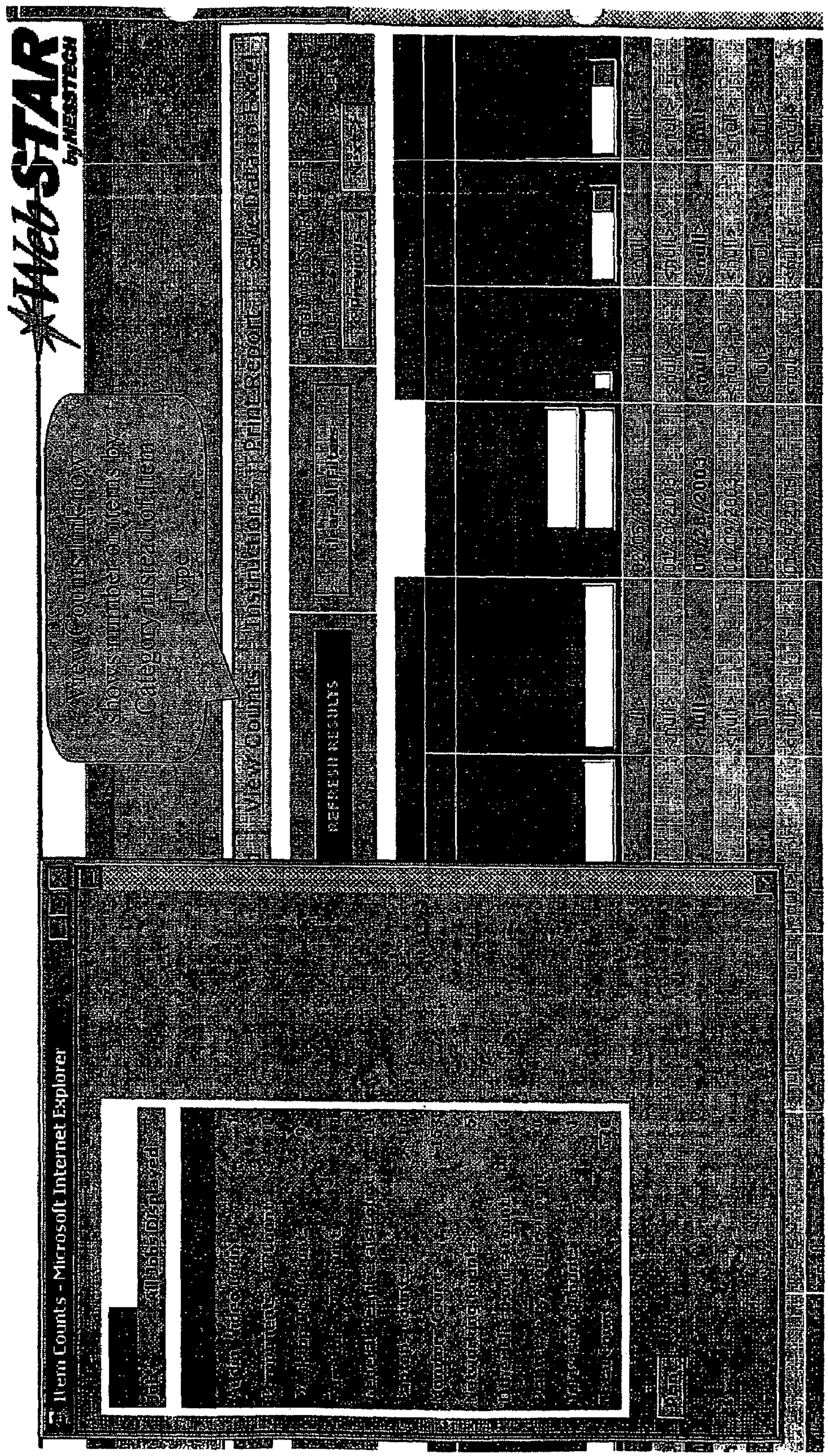
Figure 136:
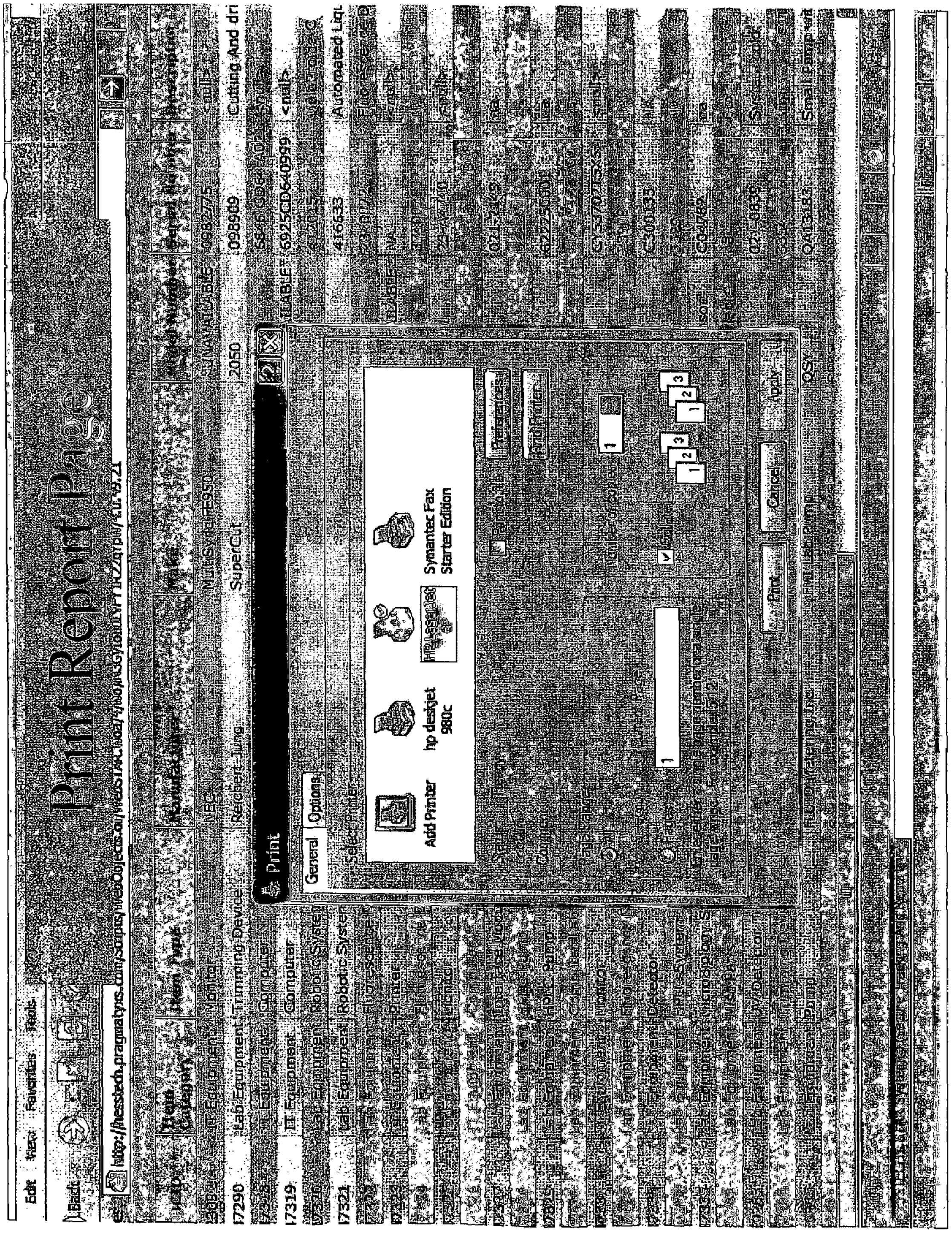
Figure 137:
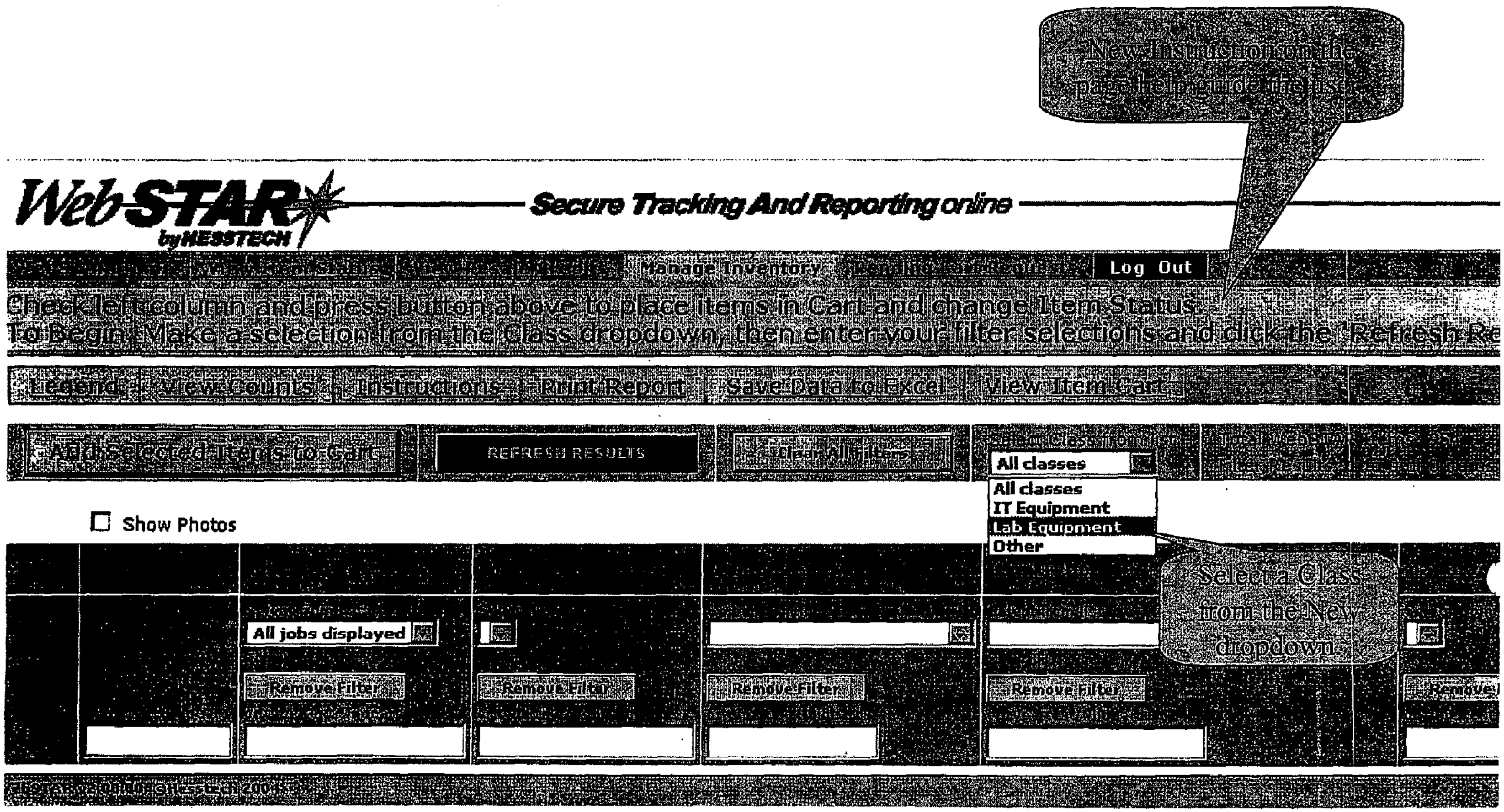
Figure 138:
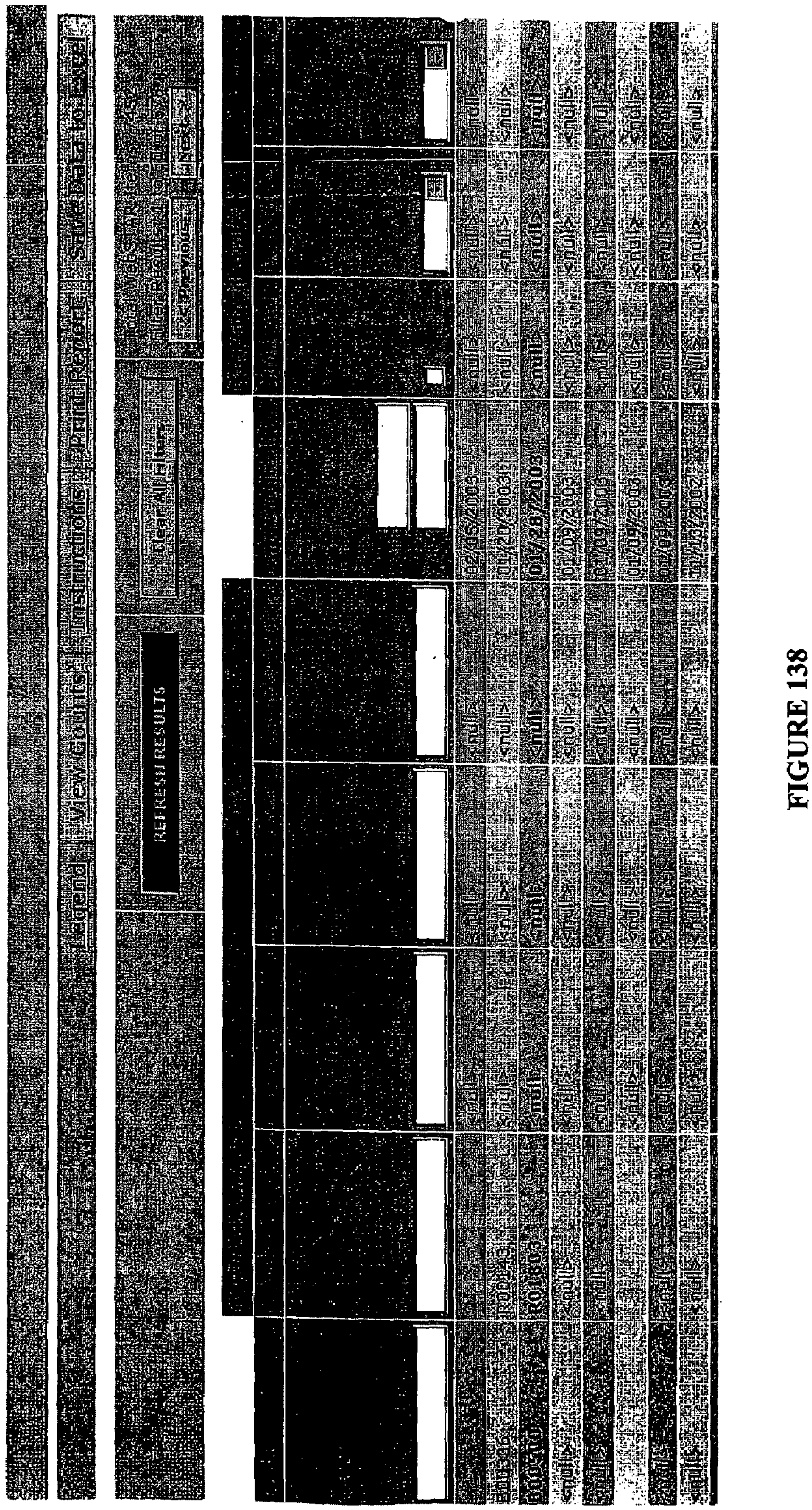
Figure 139:
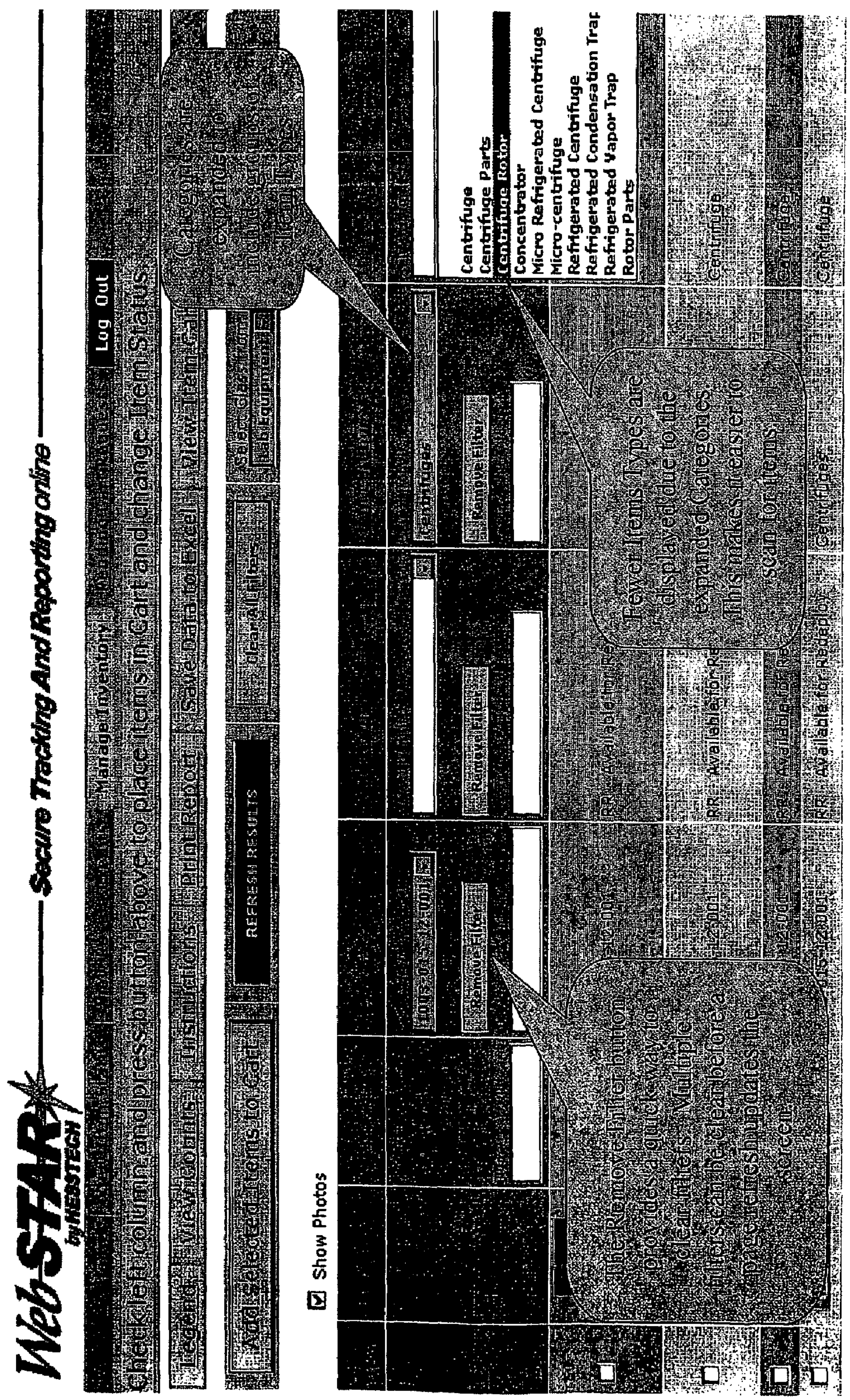
Figure 140:
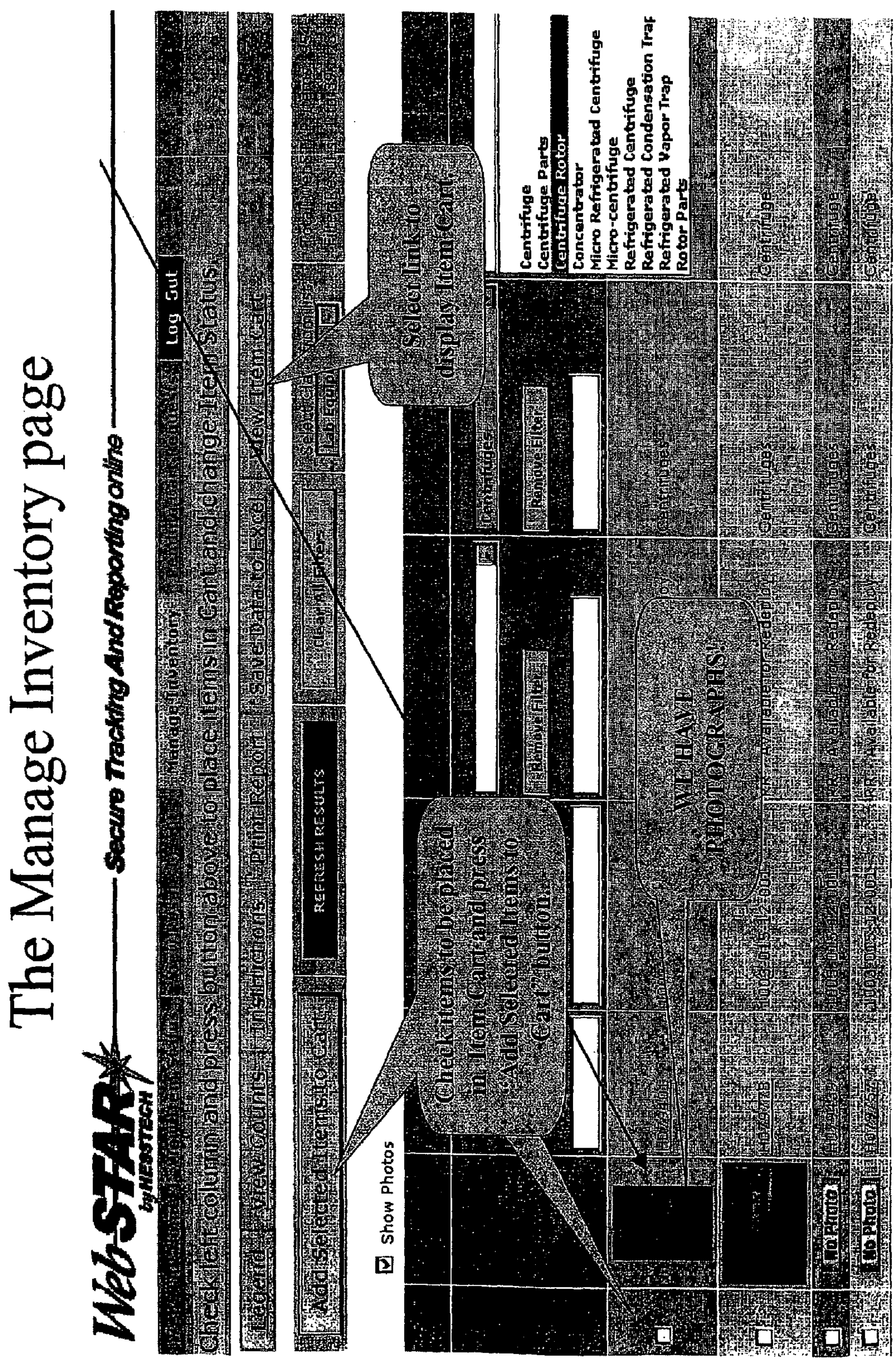
Figure 141:
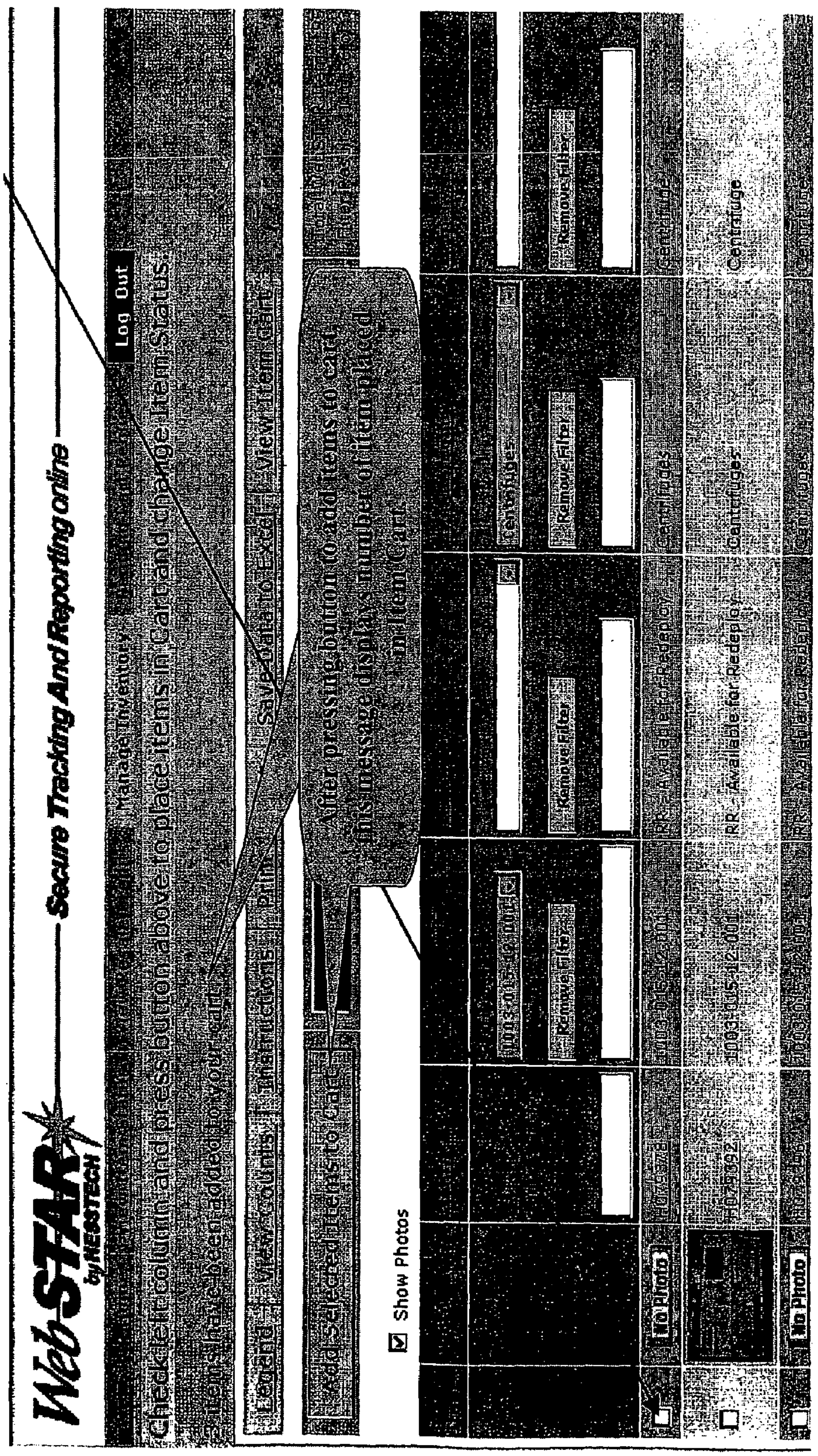

FIG. 90 illustrates a logistics and warehousing sub-hierarchy for use in the present embodiment of the invention. FIGS. 91-114 illustrate the tracking of inventory and jobs, including searching, discrete inventory items, containers, locations, redeployment and buyers and sellers of items in inventory. FIG. 115 illustrates a client services (job tracking) sub-hierarchy for use in the present embodiment of the invention. FIGS. 116-144 further illustrate the use of the reporting features, including client specific job reports, available through the use of the present invention. FIG. 145 illustrates a sales and product management sub-hierarchy for use in the present embodiment of the invention. FIGS. 146-155 further illustrate the use of the sales and product management functionality of the invention, including e-commerce and sales management tools.

FIGS. 156-163 illustrate an exemplary auction interface for use in the present embodiment of the invention, and may, for example, be used with the sales and product management tools depicted in FIGS. 146-155.

FIGS. 164-168 illustrate an exemplary resale interface for use in the present embodiment of the invention, and may, for example, be used with the sales and product management tools depicted in FIGS. 146-155.

FIGS. 169-176 illustrate an exemplary auction interface for use in the present embodiment of the invention, and may, for example, be used with the sales and product management tools depicted in FIGS. 169-176. The auction interface of FIGS. 169-176 may be used for small or large, public or private auctions.

Figure 176:
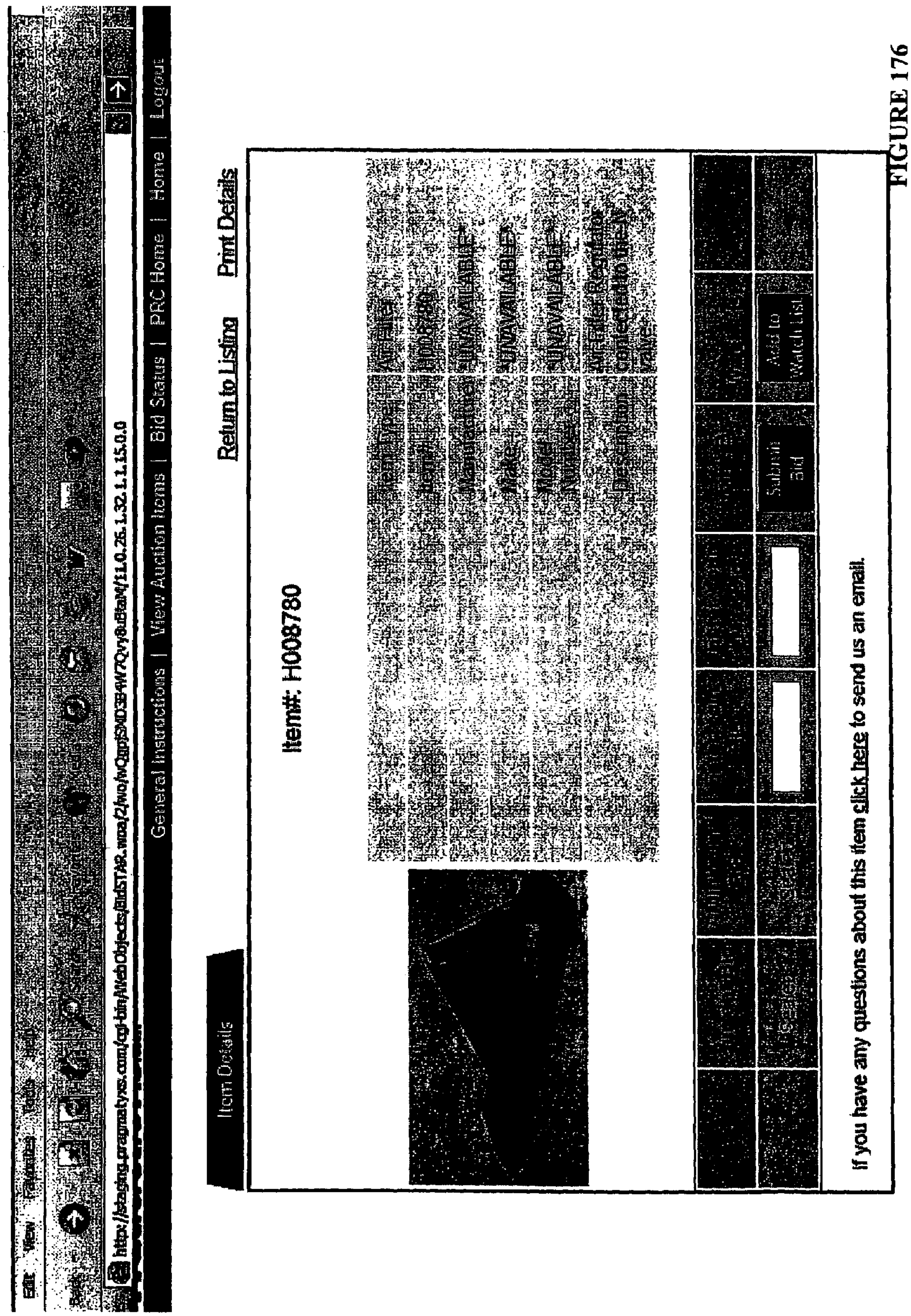

Turning again to FIGS. 25-176, additional teachings included in the present invention, and form a part hereof are shown and described. FIGS. 25-176, the present system may offer various features including account management tools and reports. For example, as depicted in FIGS. 115-144, the system may provide the ability to independently manage equipment stored locally, at a client's facilities, or satellite facilities without any third party intervention.

The View Item Status Page exemplified in FIGS. 132-135, may provide the current status, test results, and specification of all items by job within the database of the present system. The Manage Inventory Page, exemplified in FIGS. 137-141, may provide an interface designed to control the status of all, or substantially all, items and may enable the use of online requests to manage the status, including but not limited to disposal, resale, redeployment of equipment to authorized recipients. Further, the system may provide access control to prevent two users of the system from requesting the same item. The Manage Inventory Page may display equipment available for the client to change the status or make requests to have moved, redeployed, resold, destroyed, or any other disposition created within the system. Photographs may also be provided within the Manage Inventory Page.

The View Item Status Page may display all equipment processed as of a current date within the system. The system may maintain the capability of sorting by category. In this regard, a grouping of categories may be created and items may be searched by item type. Building, client site location, and cart information may be included to allow for the remote tracking and retrieval of assets for storage, redeployment, resale, or storage.

The view resale credits link may display all equipment authorized for resale. Further, cash credits for auction sales may be depicted in addition to appraised information.

Figure 142:
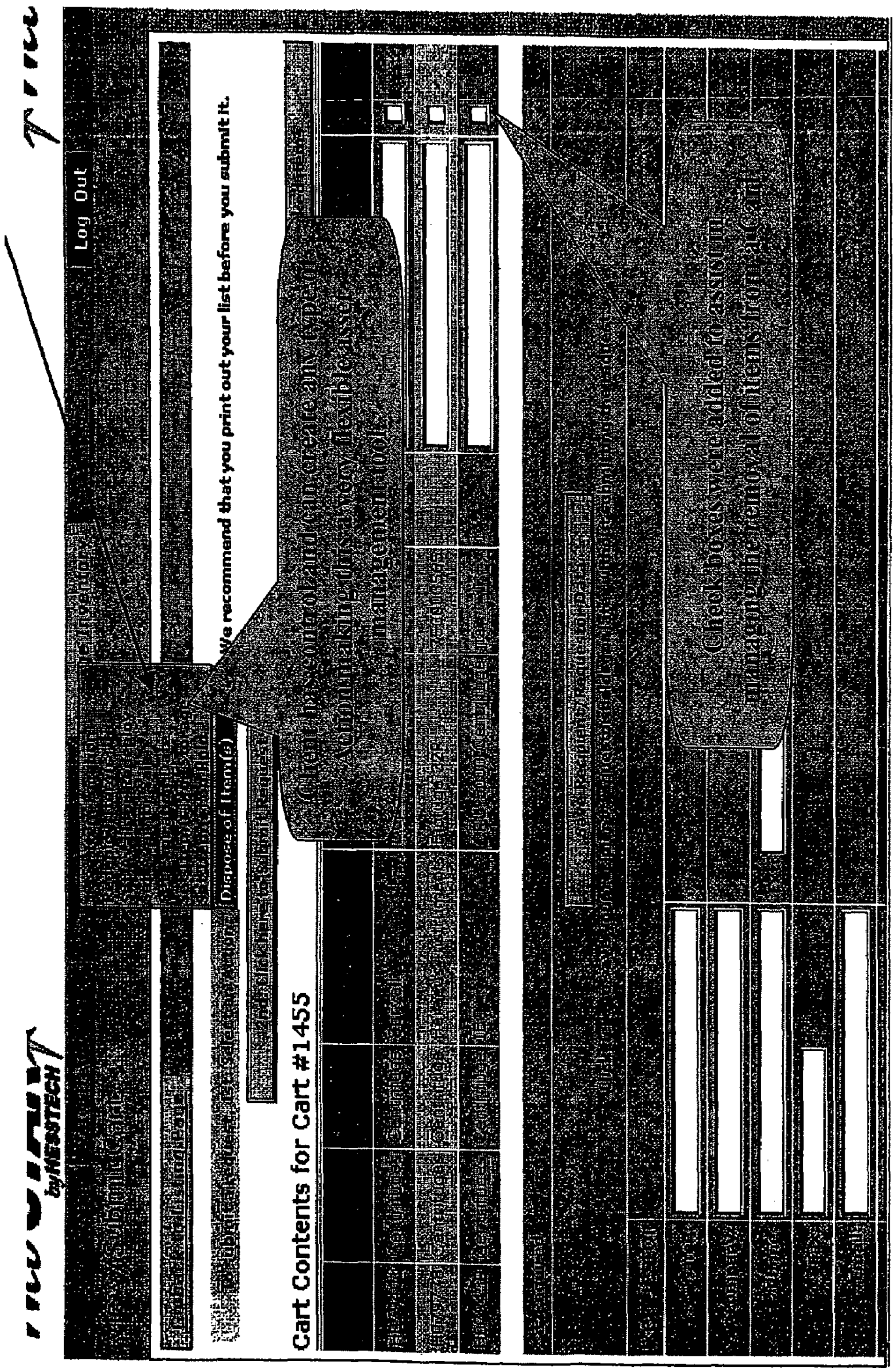
Figure 143:
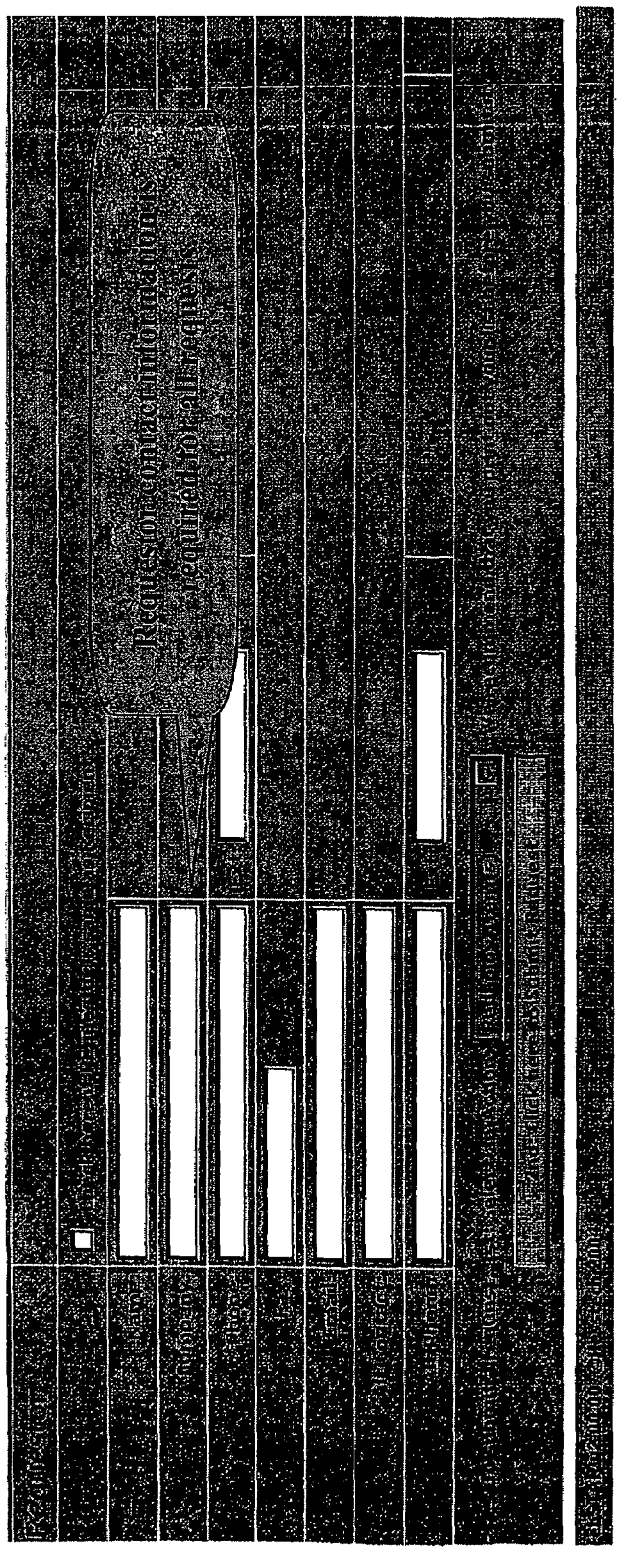
Figure 144:
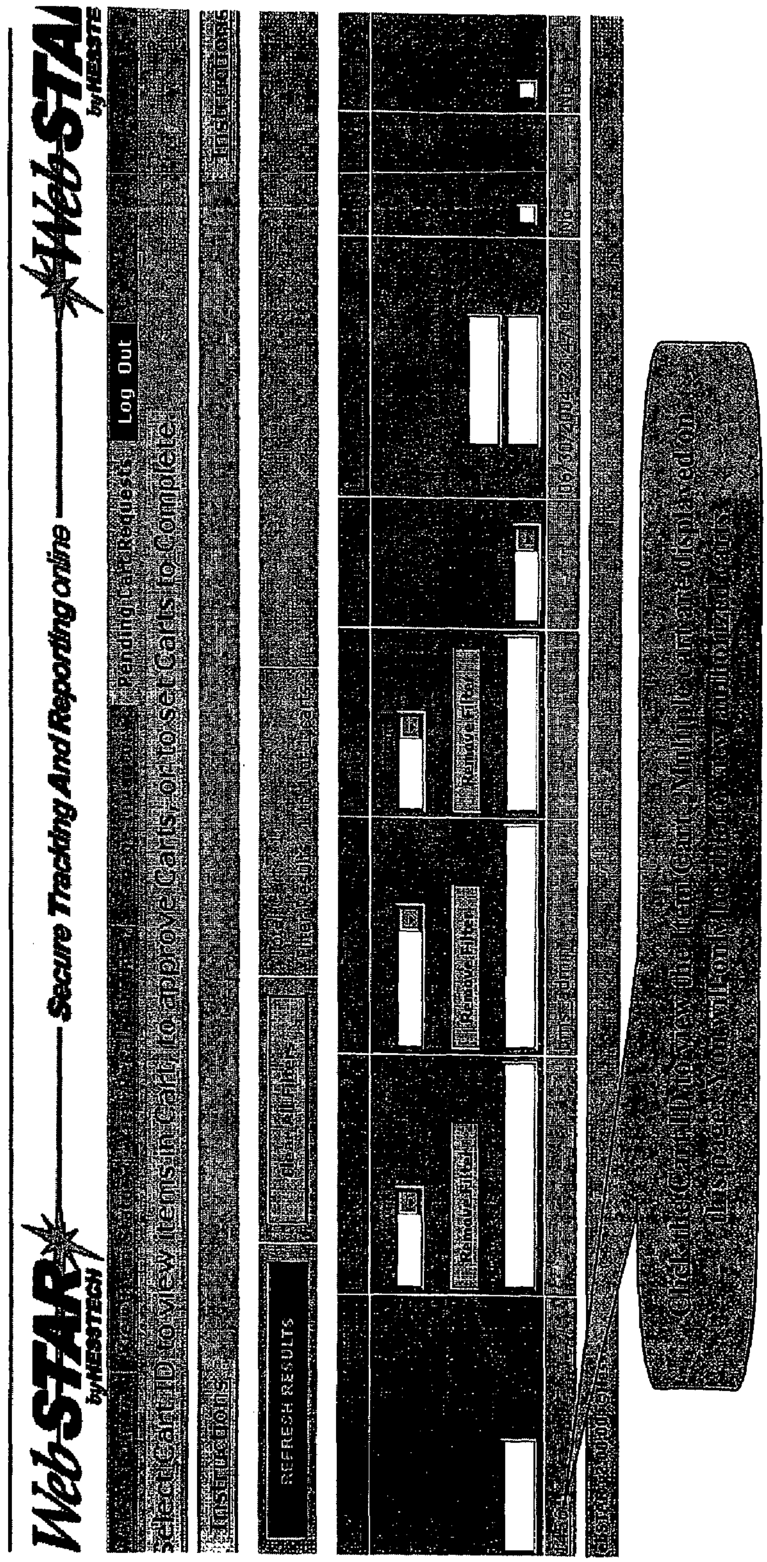
Figure 145:
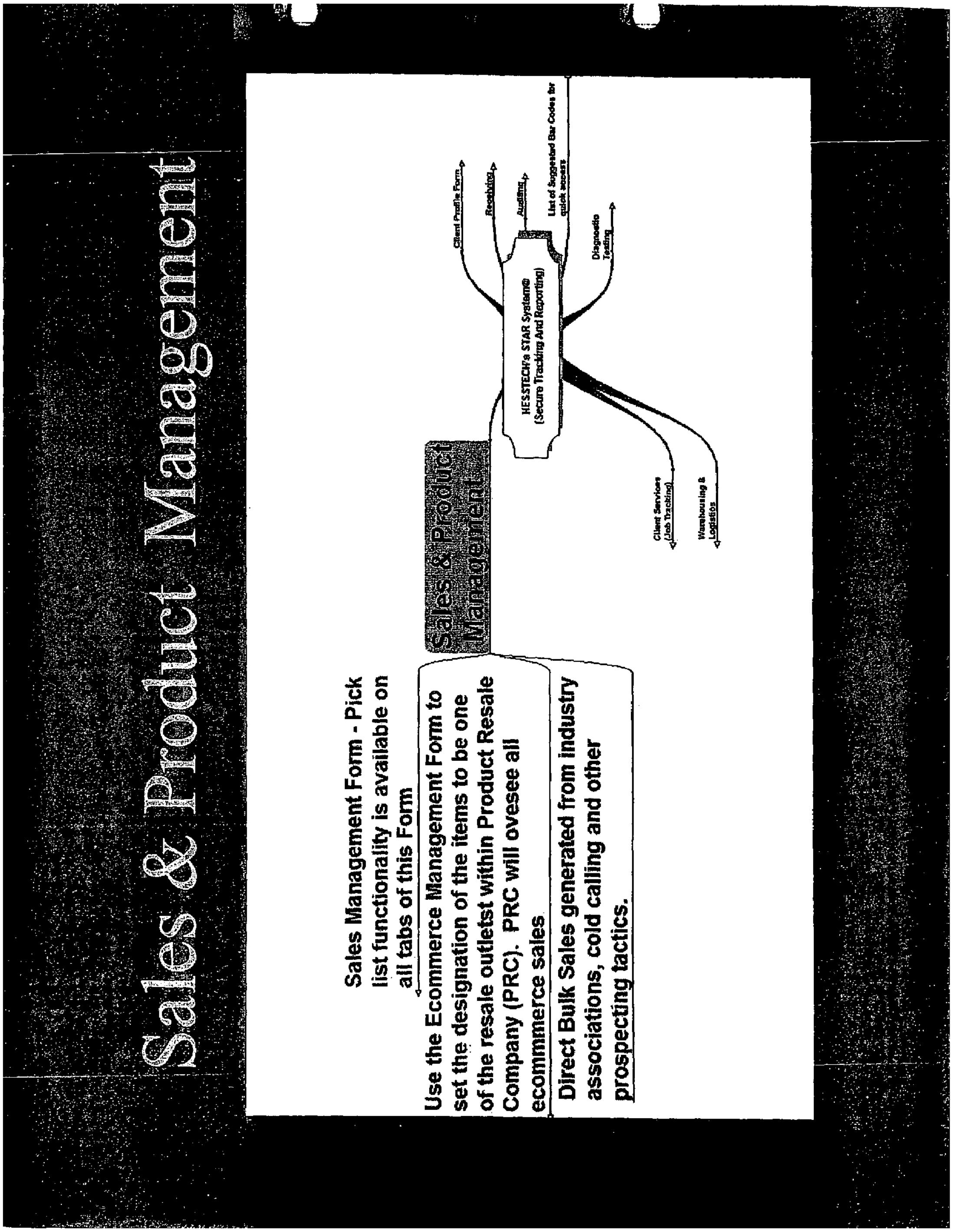
Figure 147:
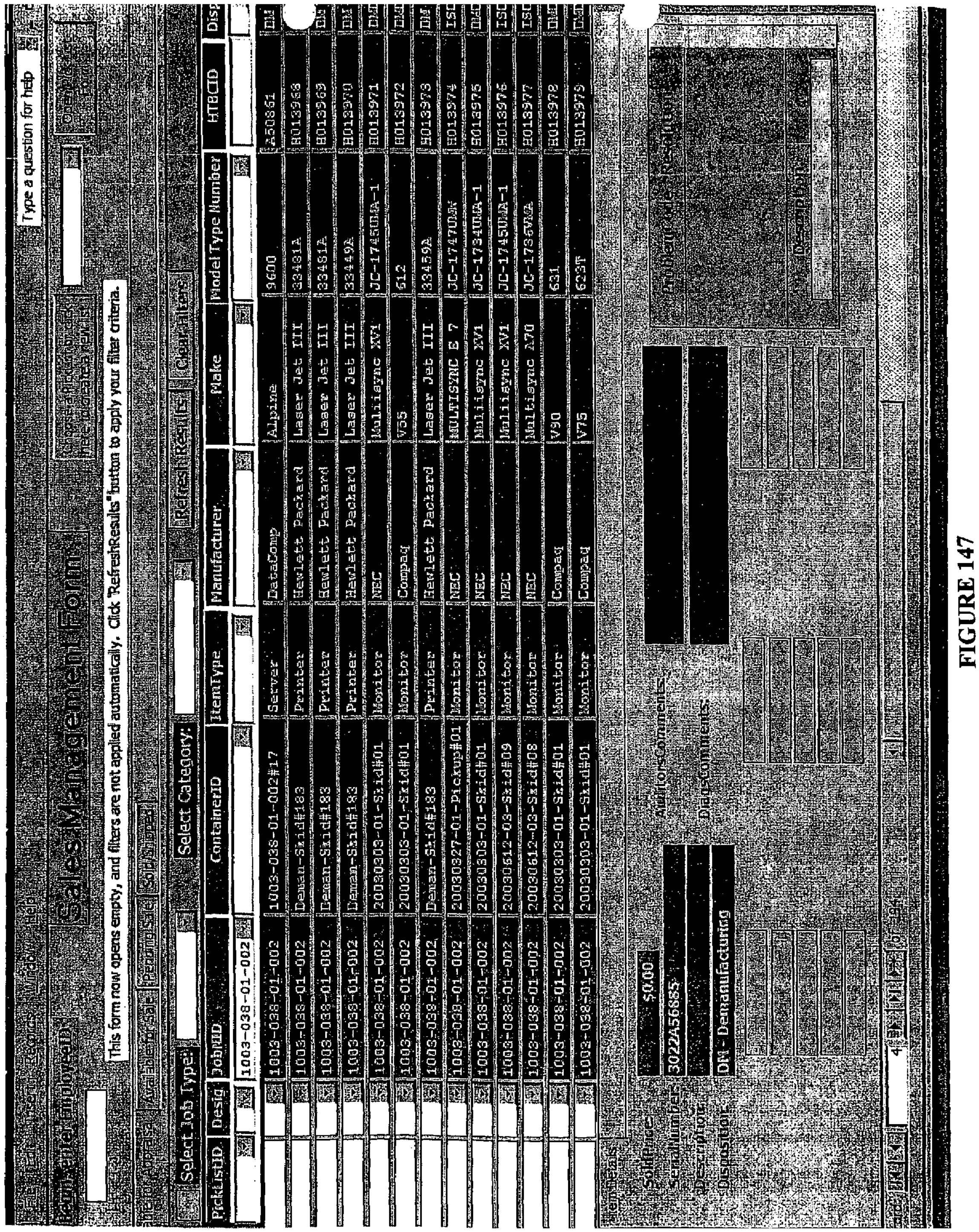
Figure 148:
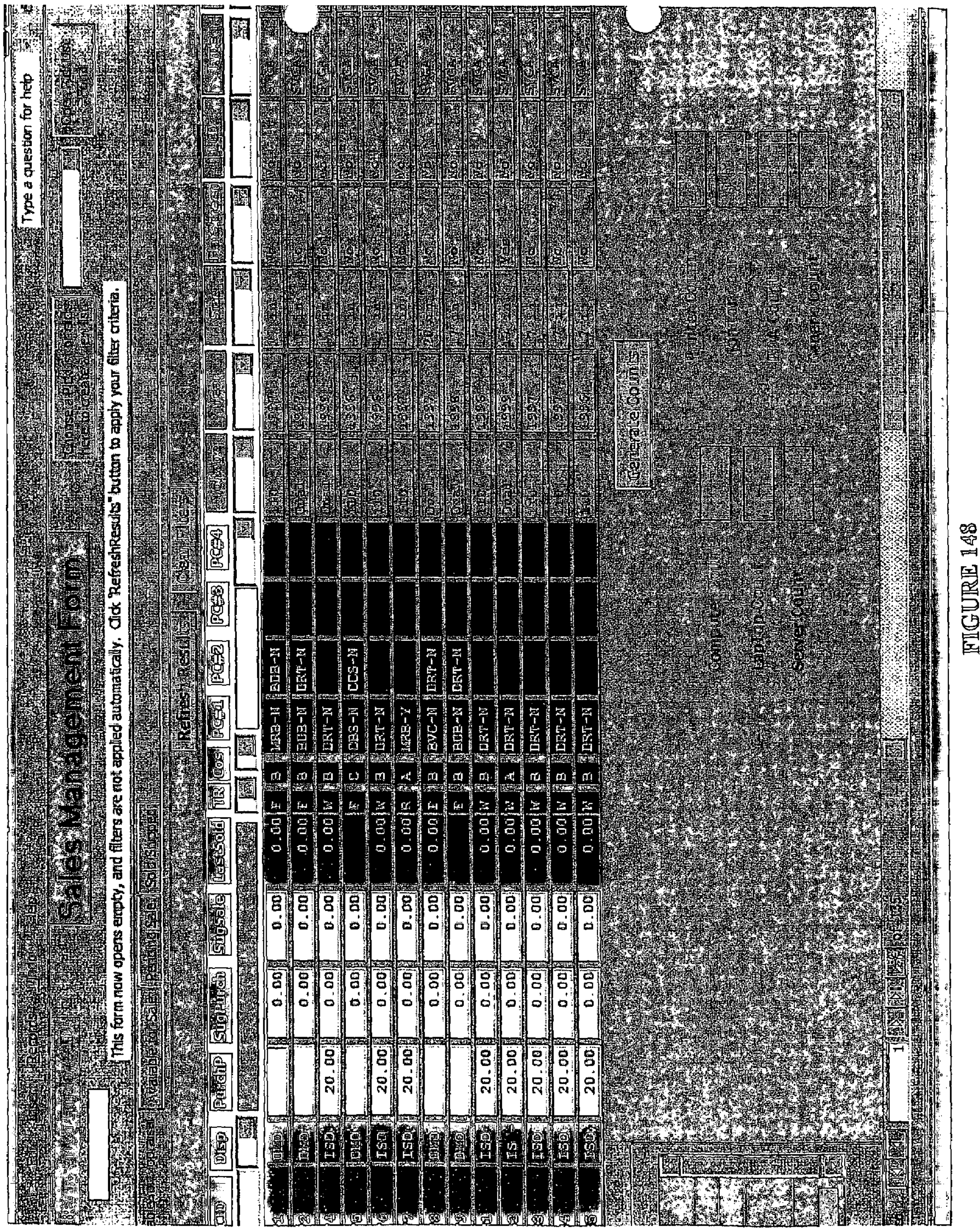
Figure 149:
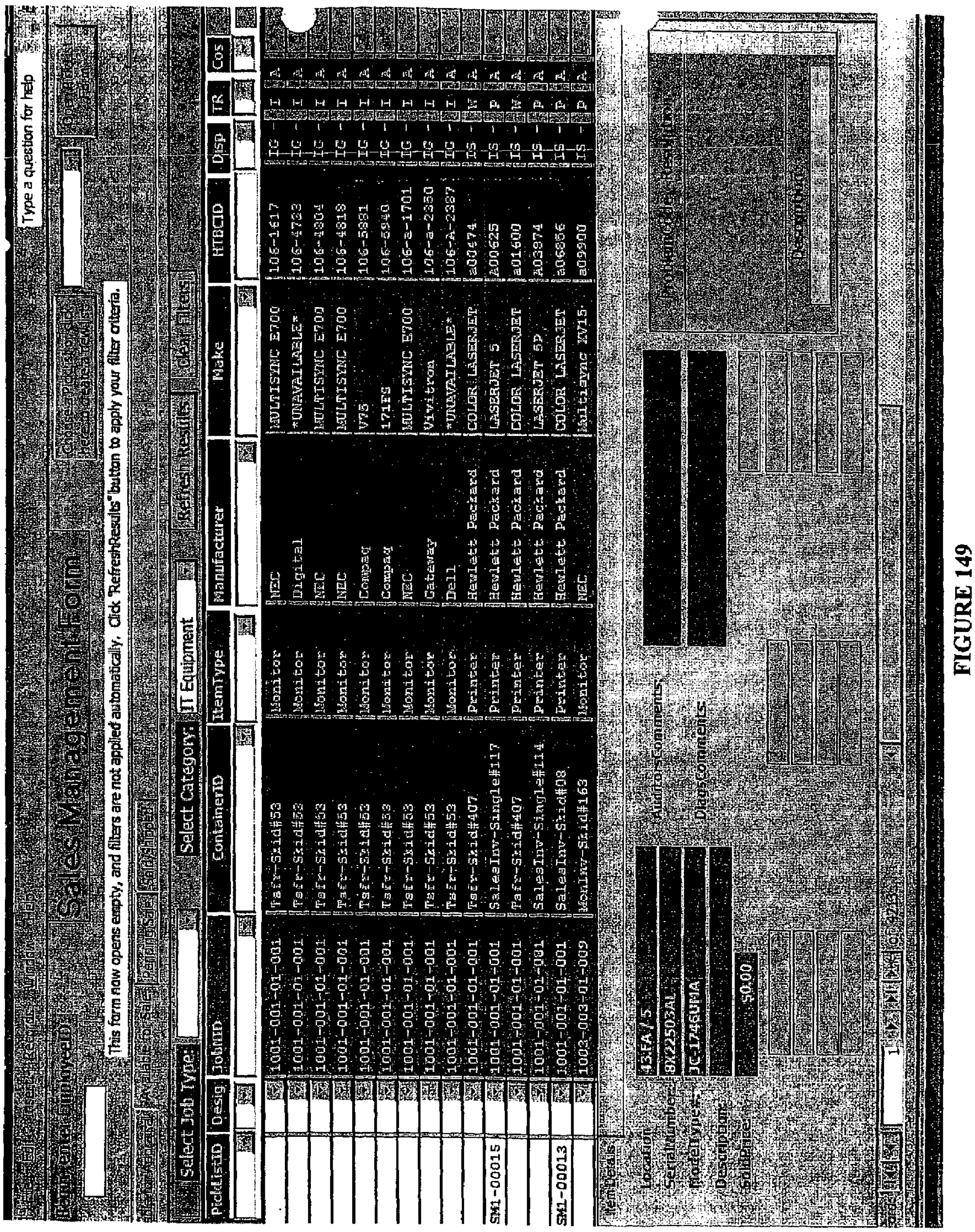
Figure 150:
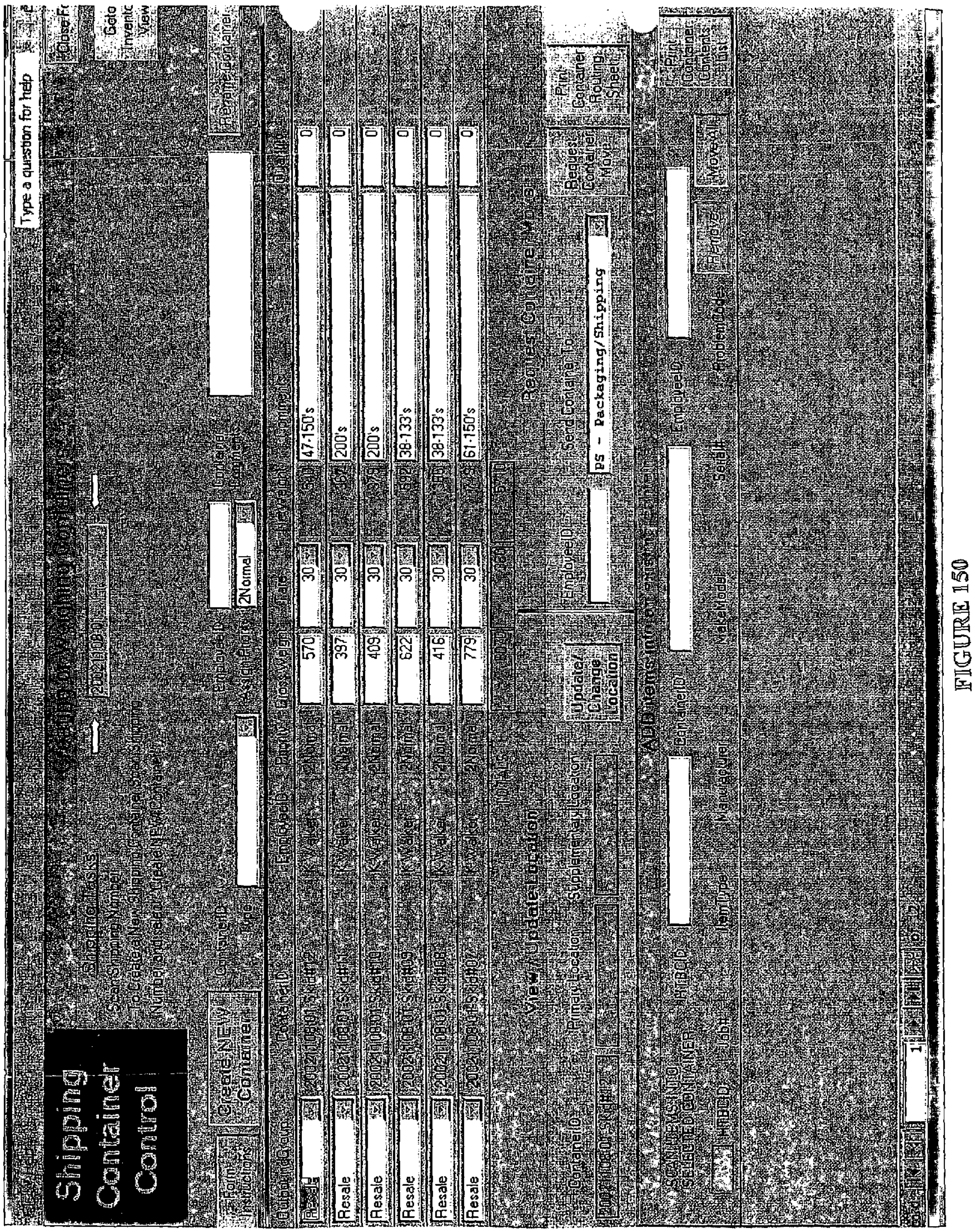
Figure 151:
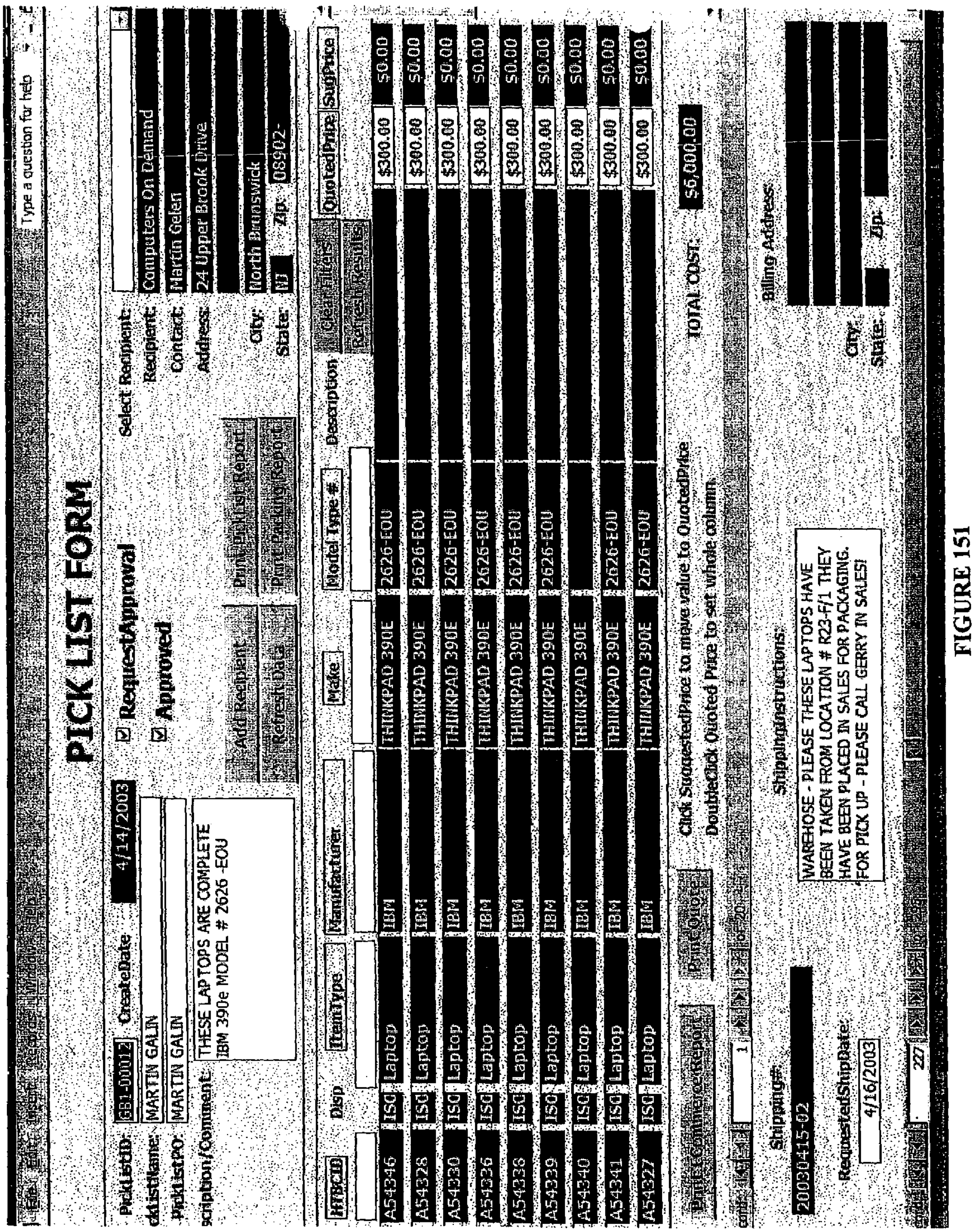
Figure 152:
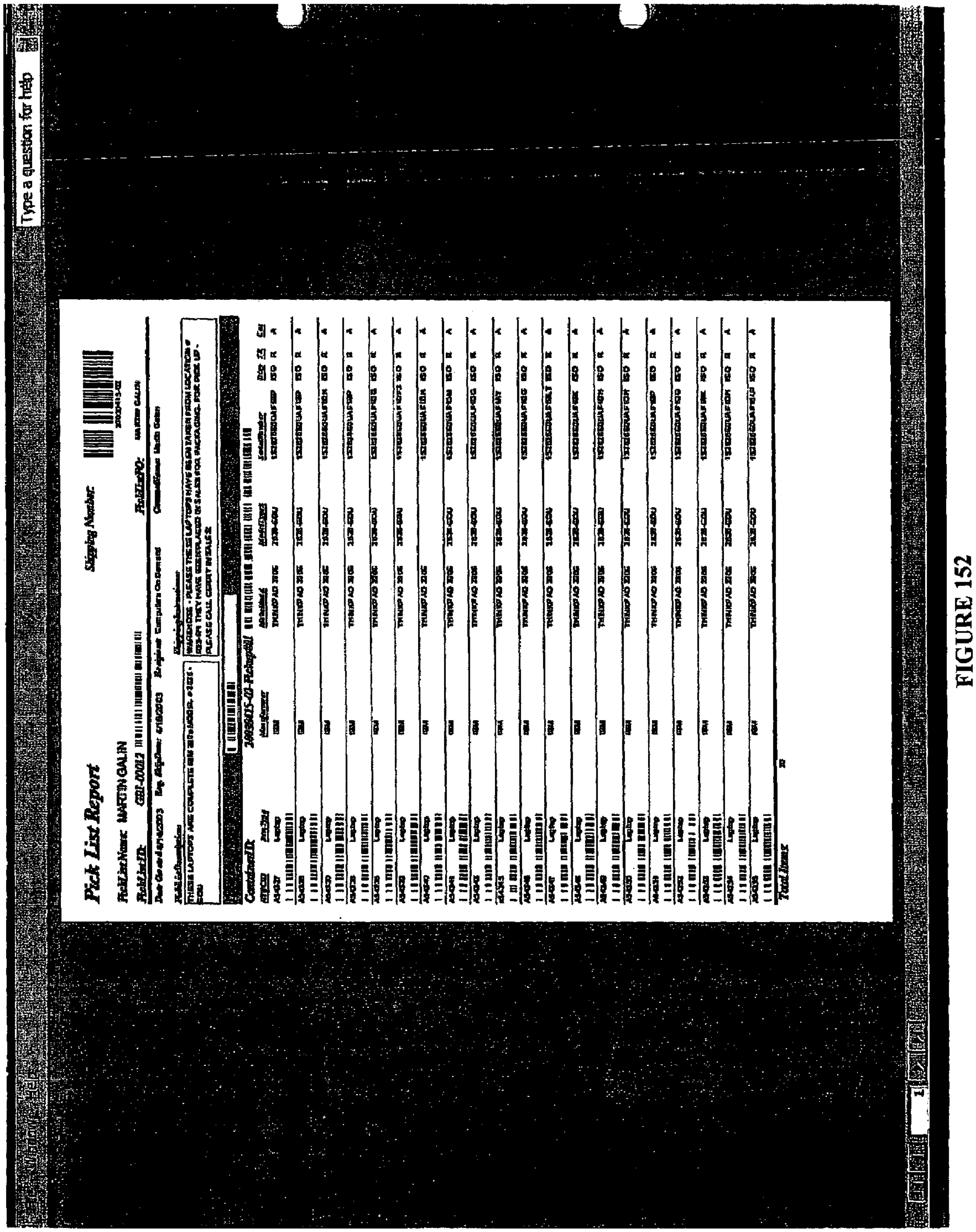
Figure 155:
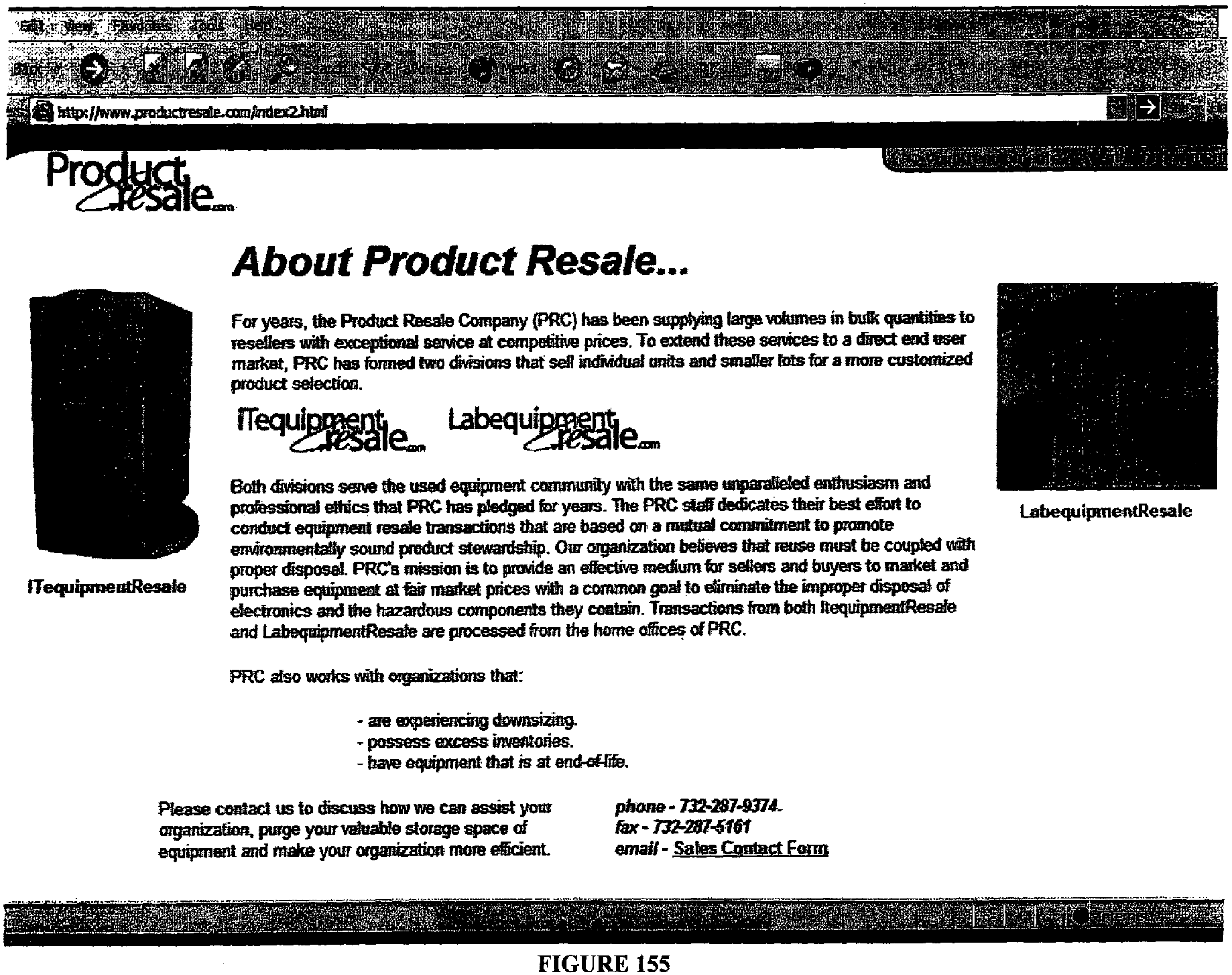
Figure 156:
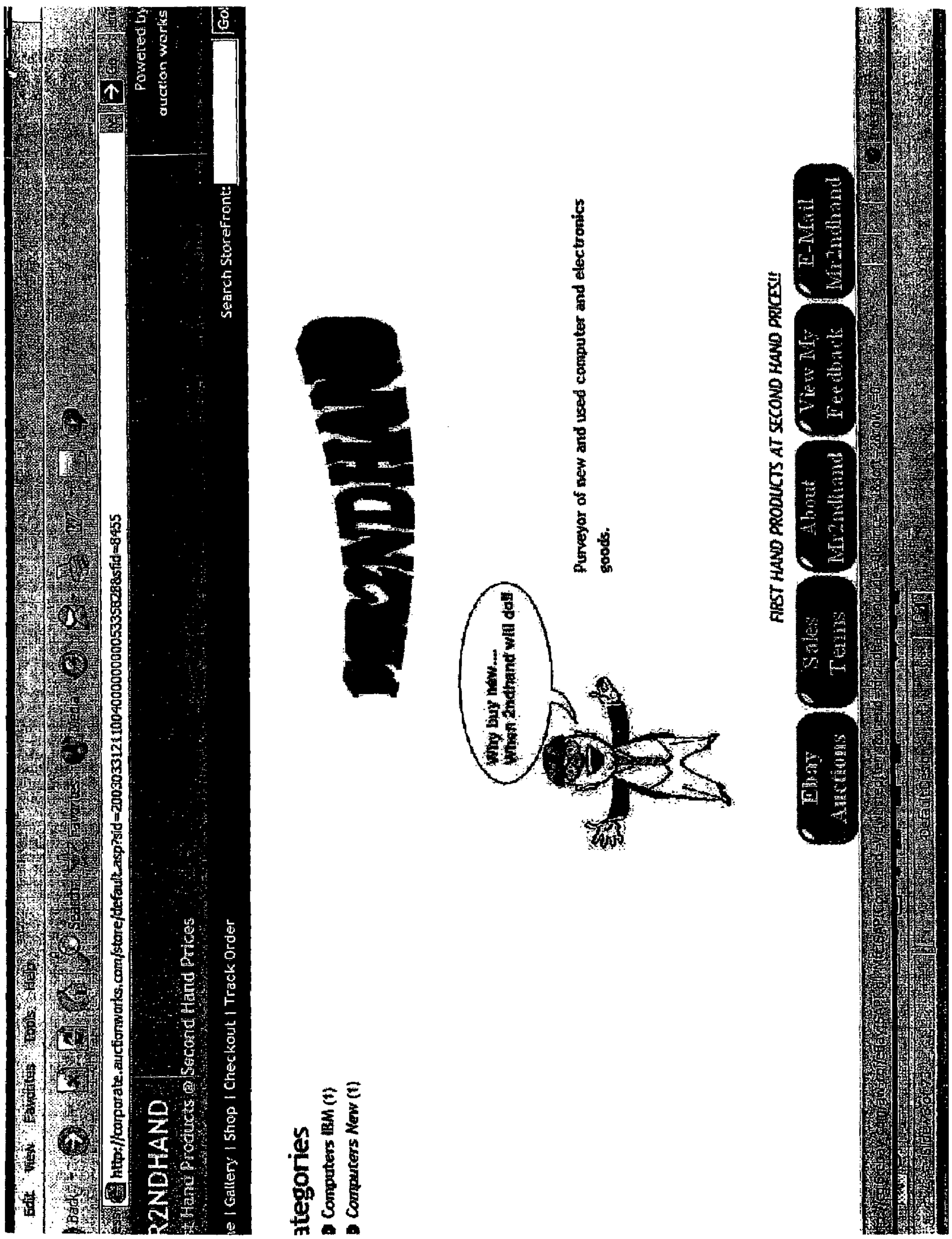
FIGS. 156-163 illustrate an exemplary auction interface for use in the present invention.
Figure 157:
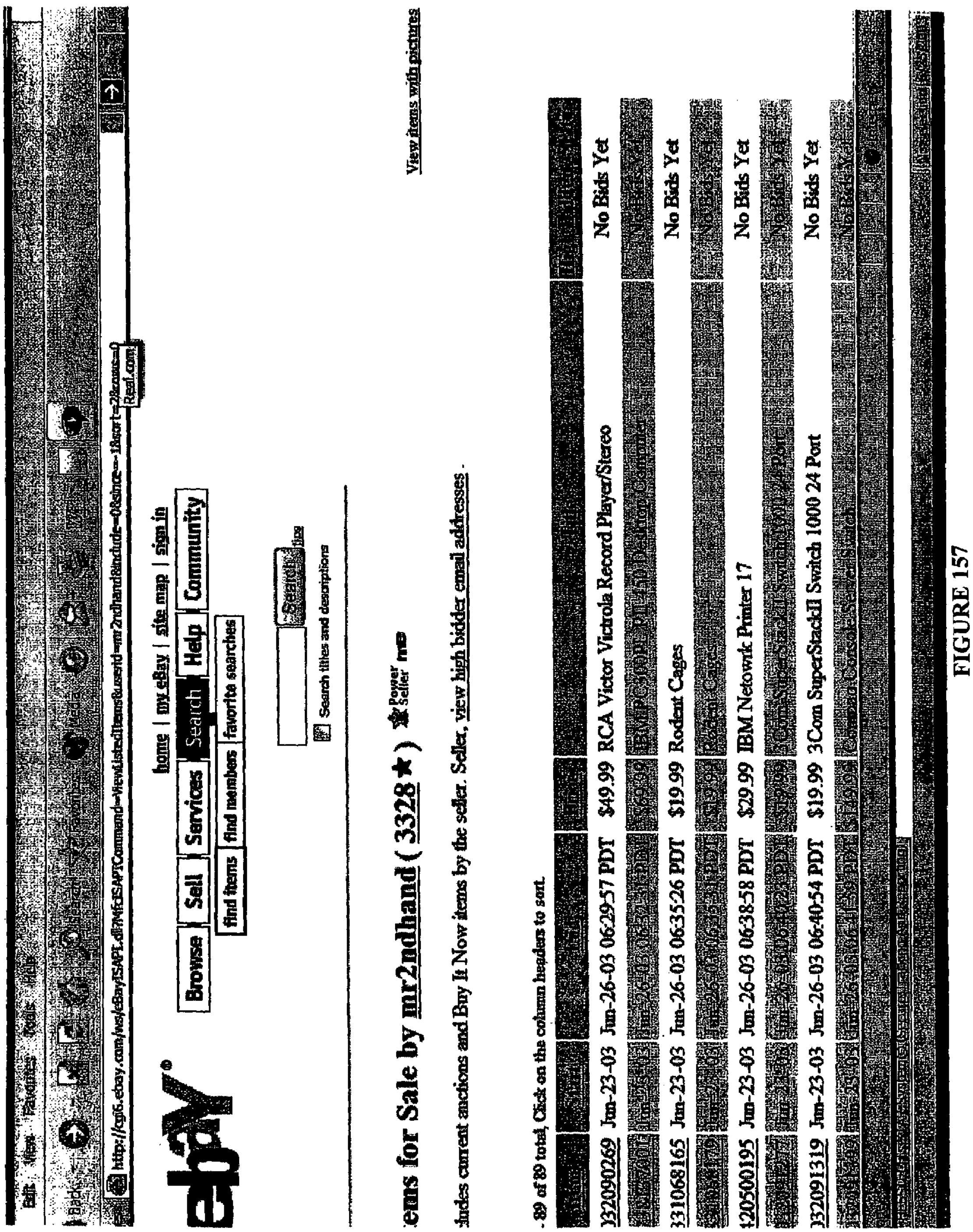
Figure 158:
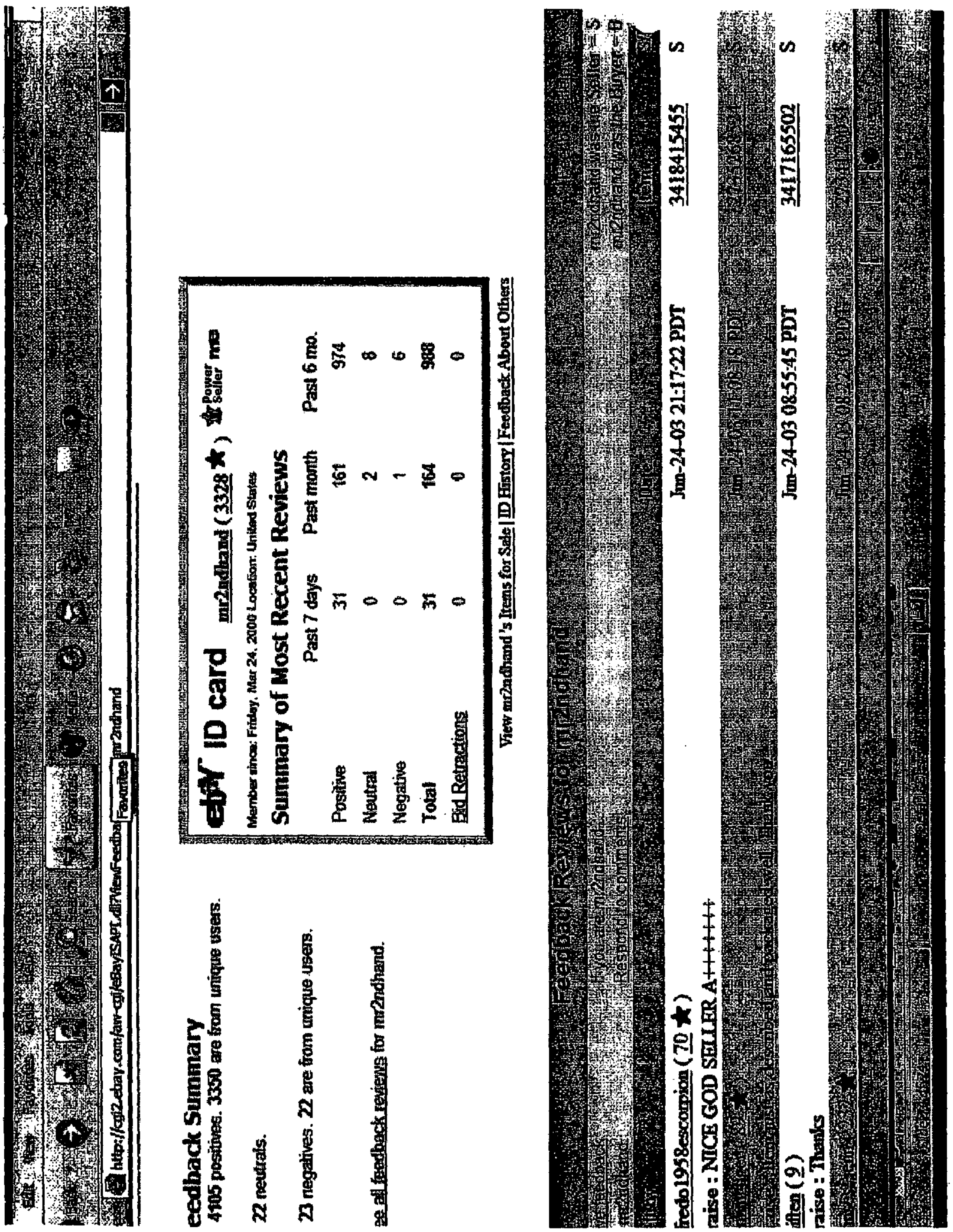
Figure 159:
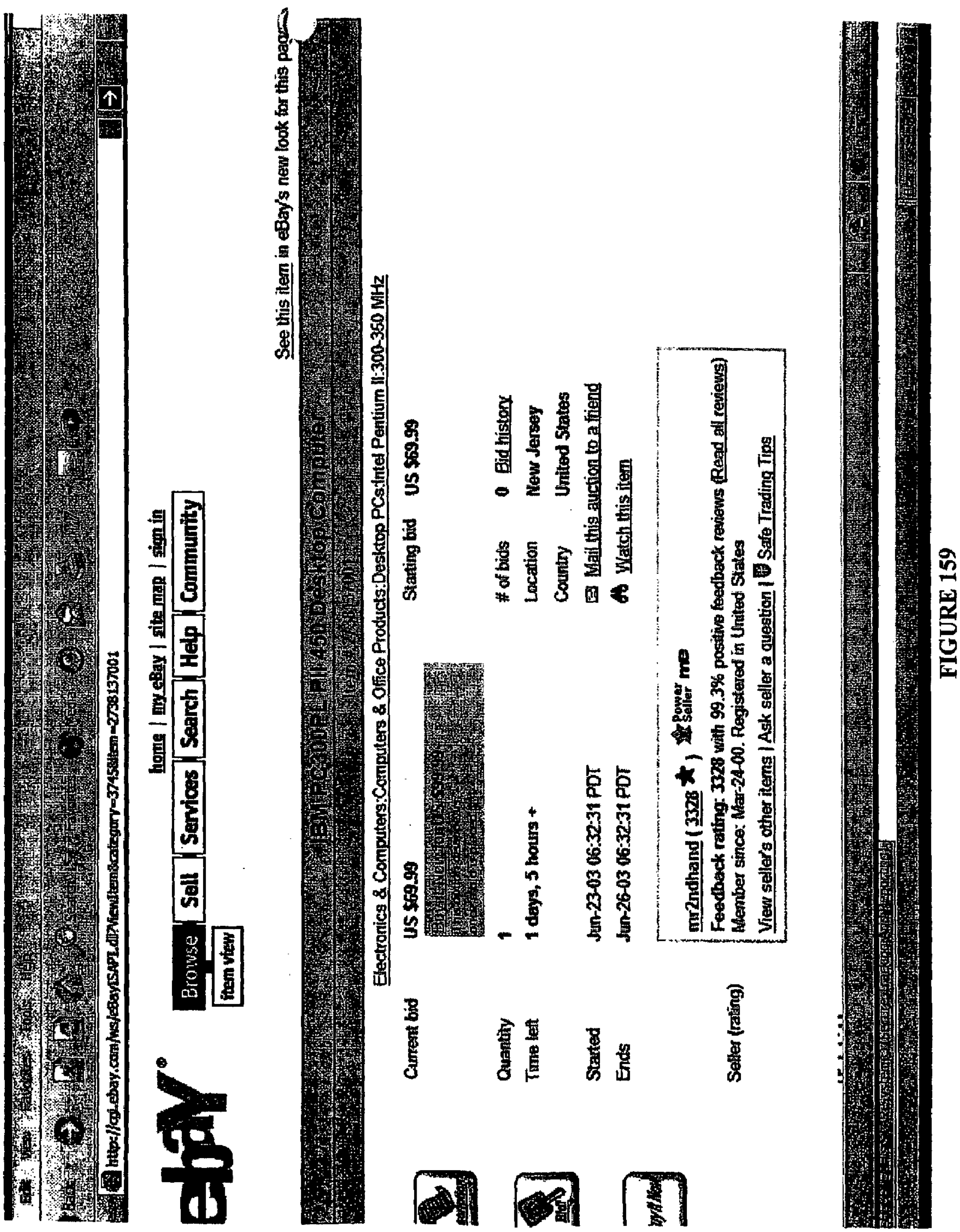
Figure 160:
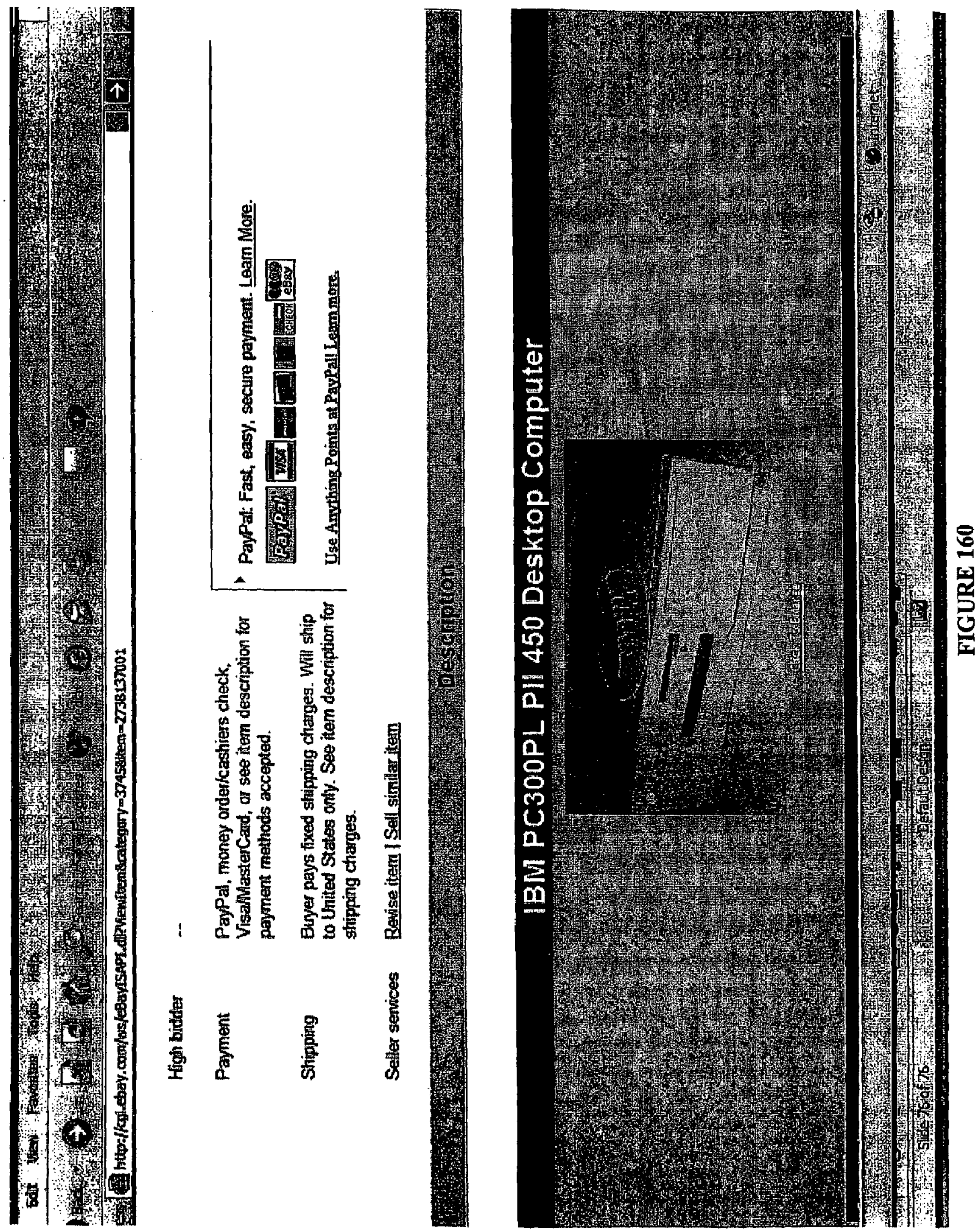
Figure 161:
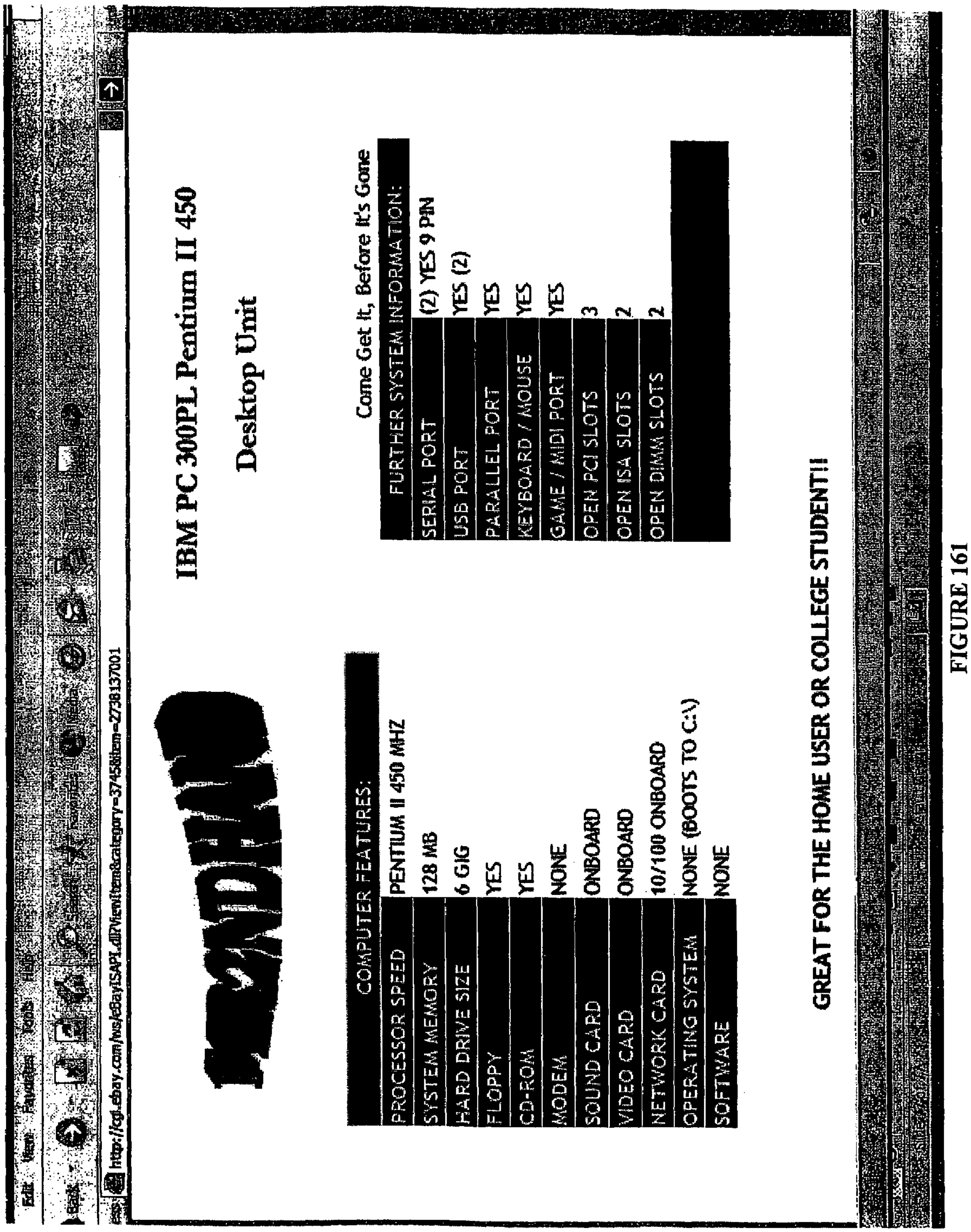
Figure 162:
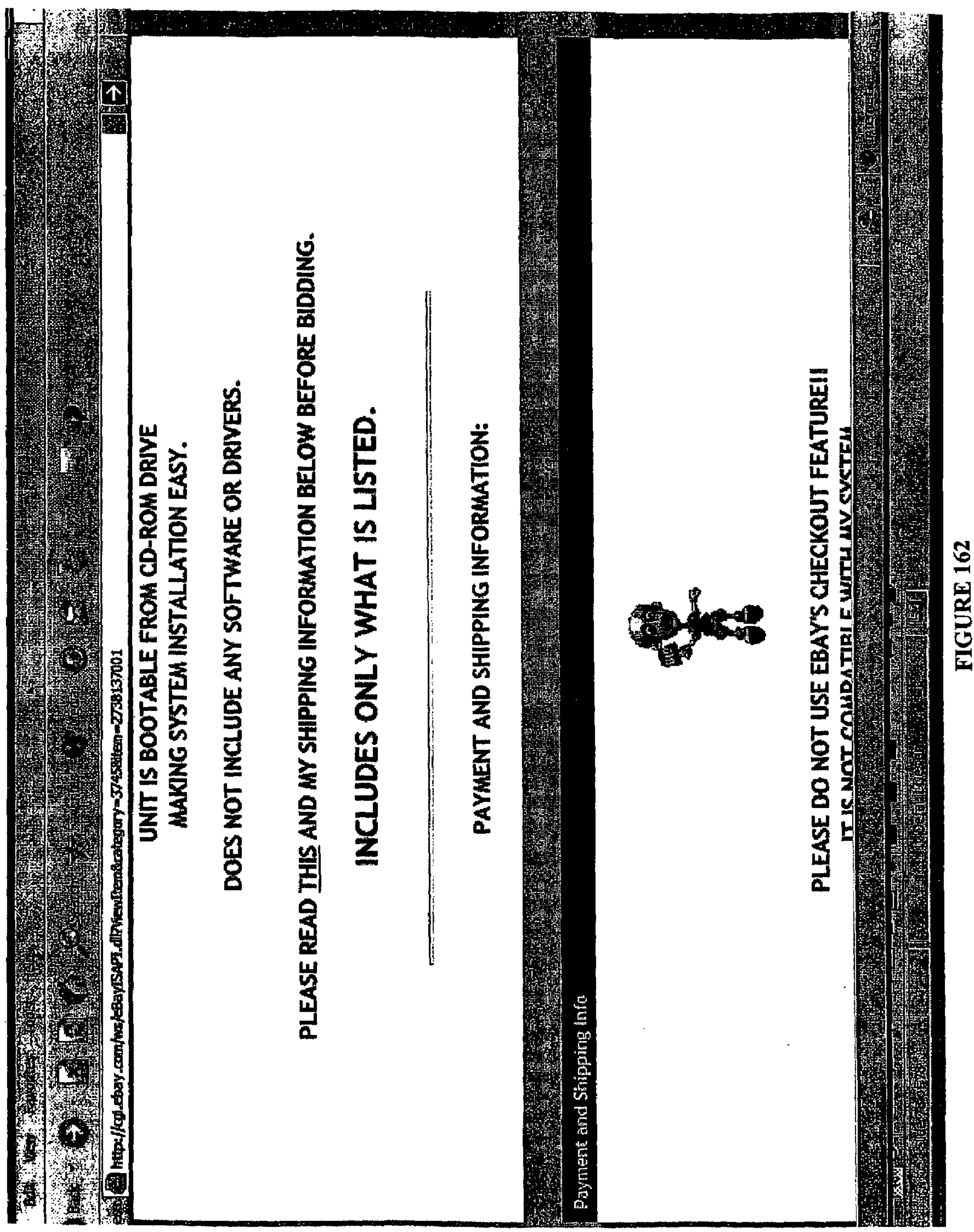
Figure 163:
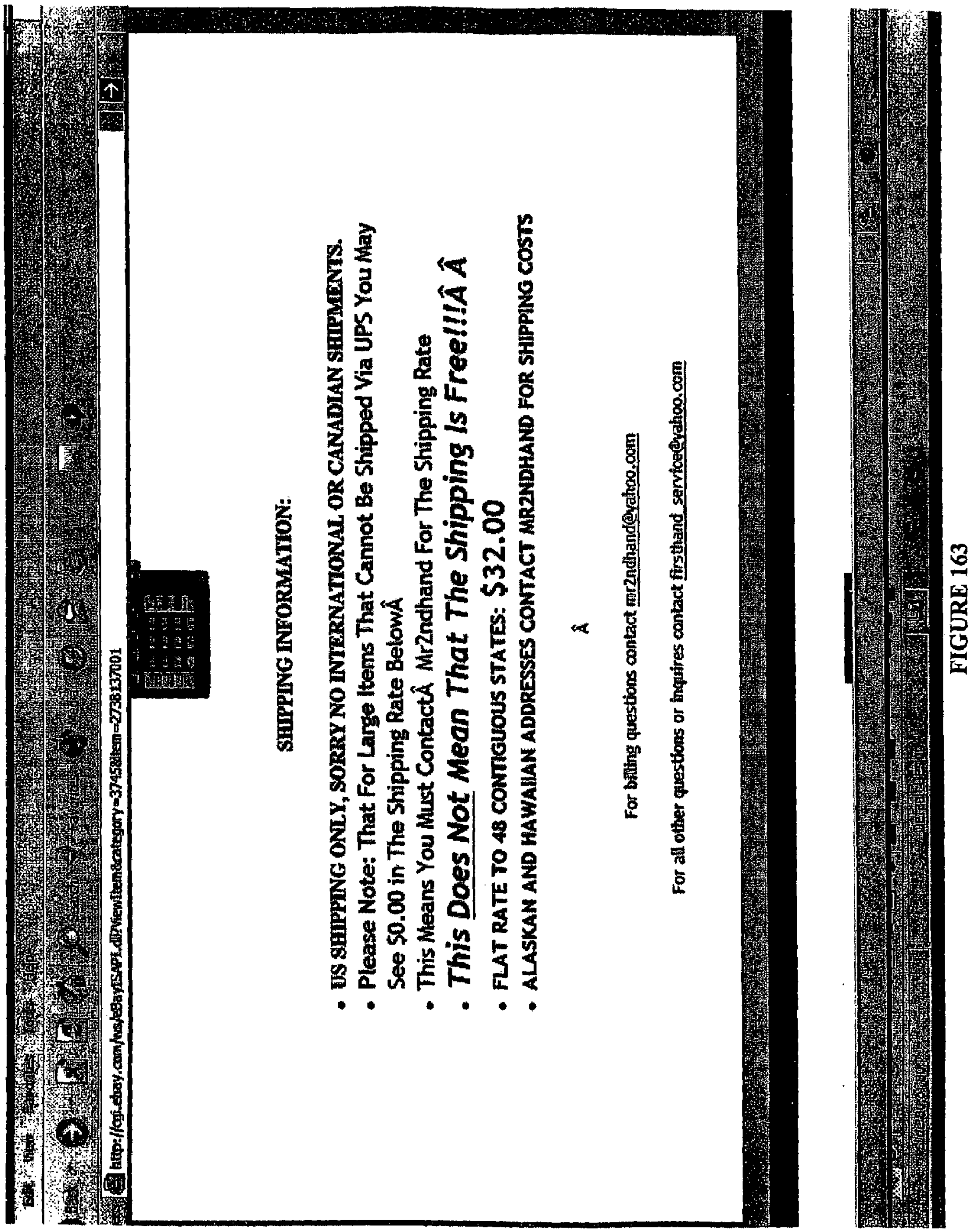
Figure 164:
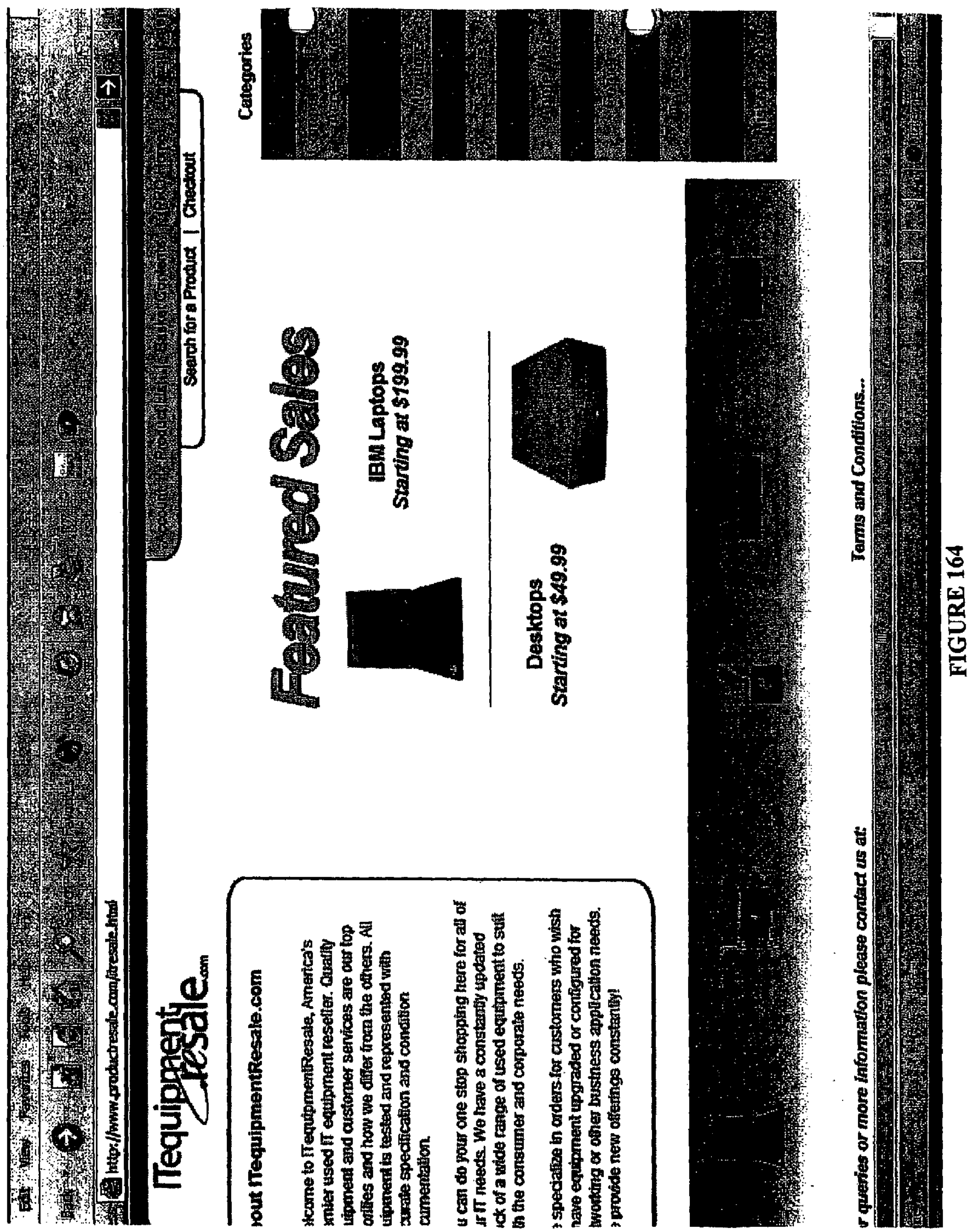
FIGS. 164-168 illustrate an exemplary resale interface for use in the present invention.
Figure 165:
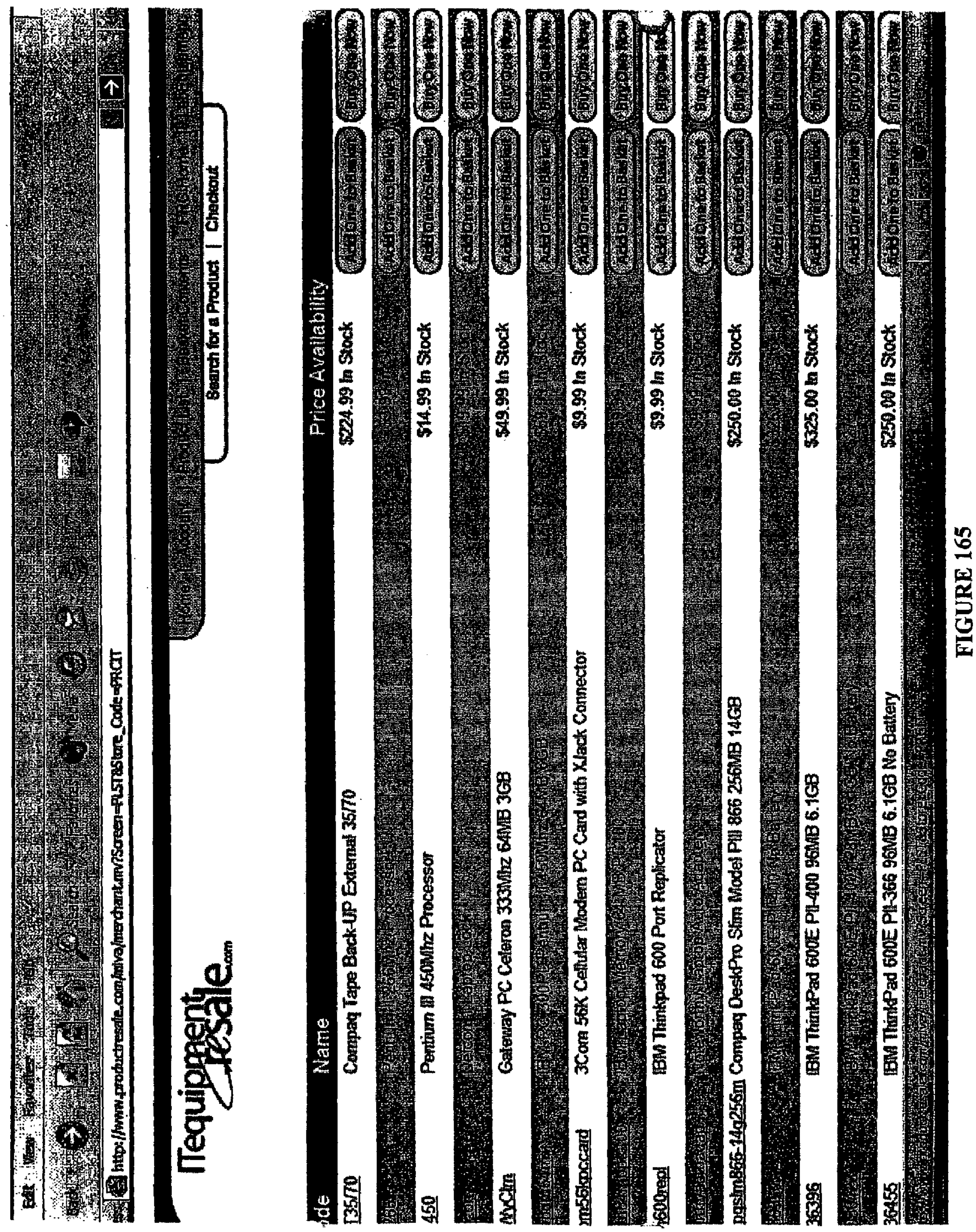
Figure 166:
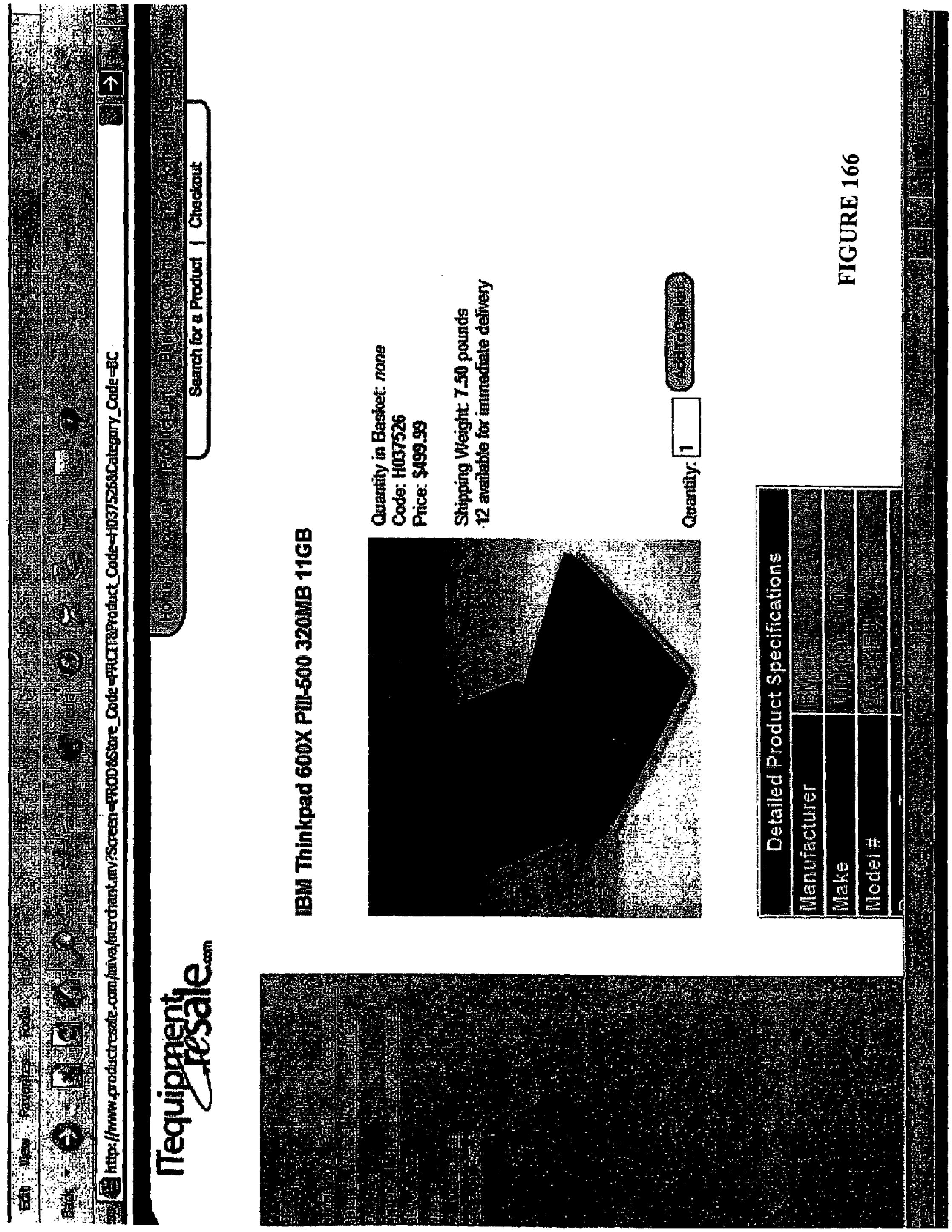
Figure 167:
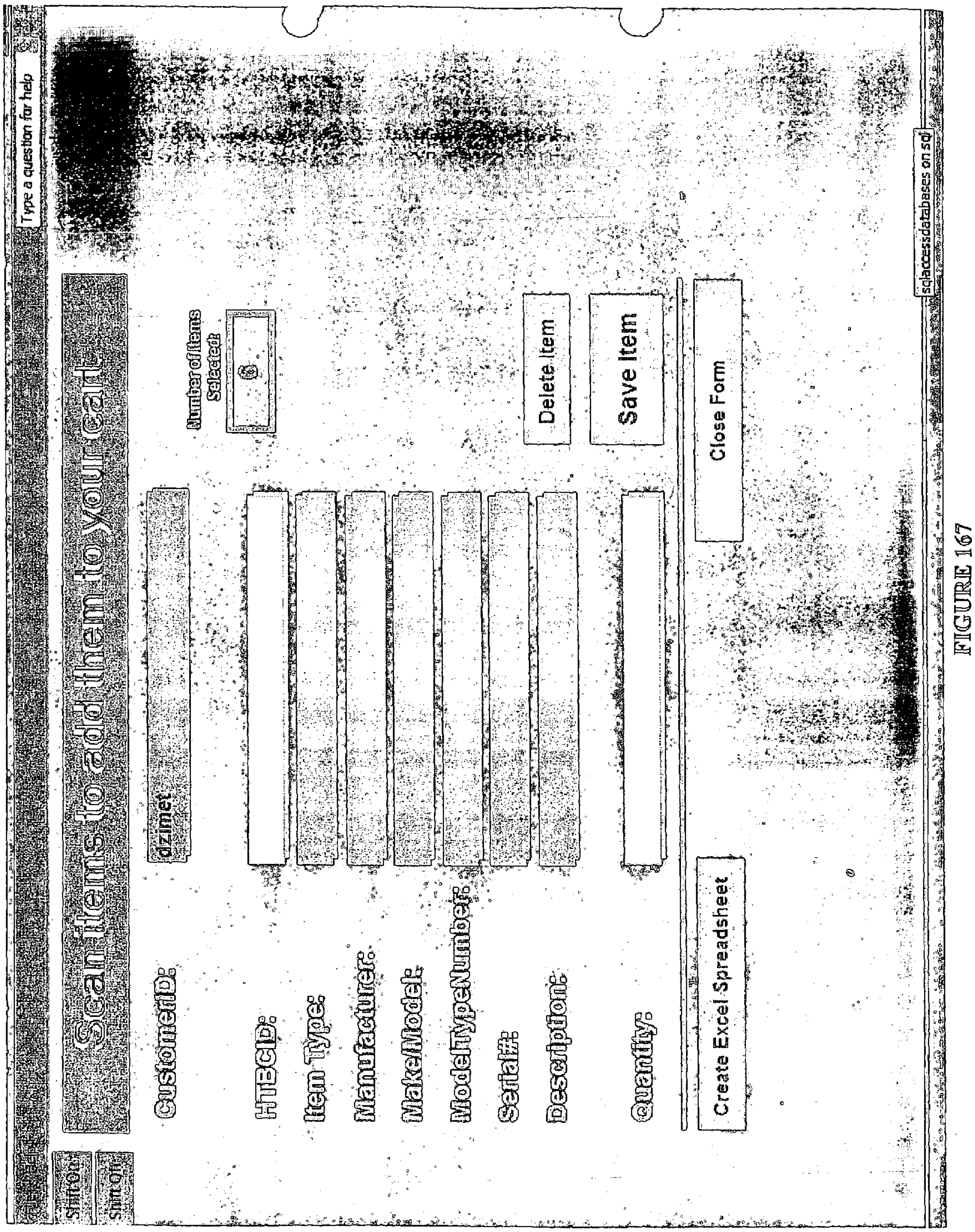
Figure 168:
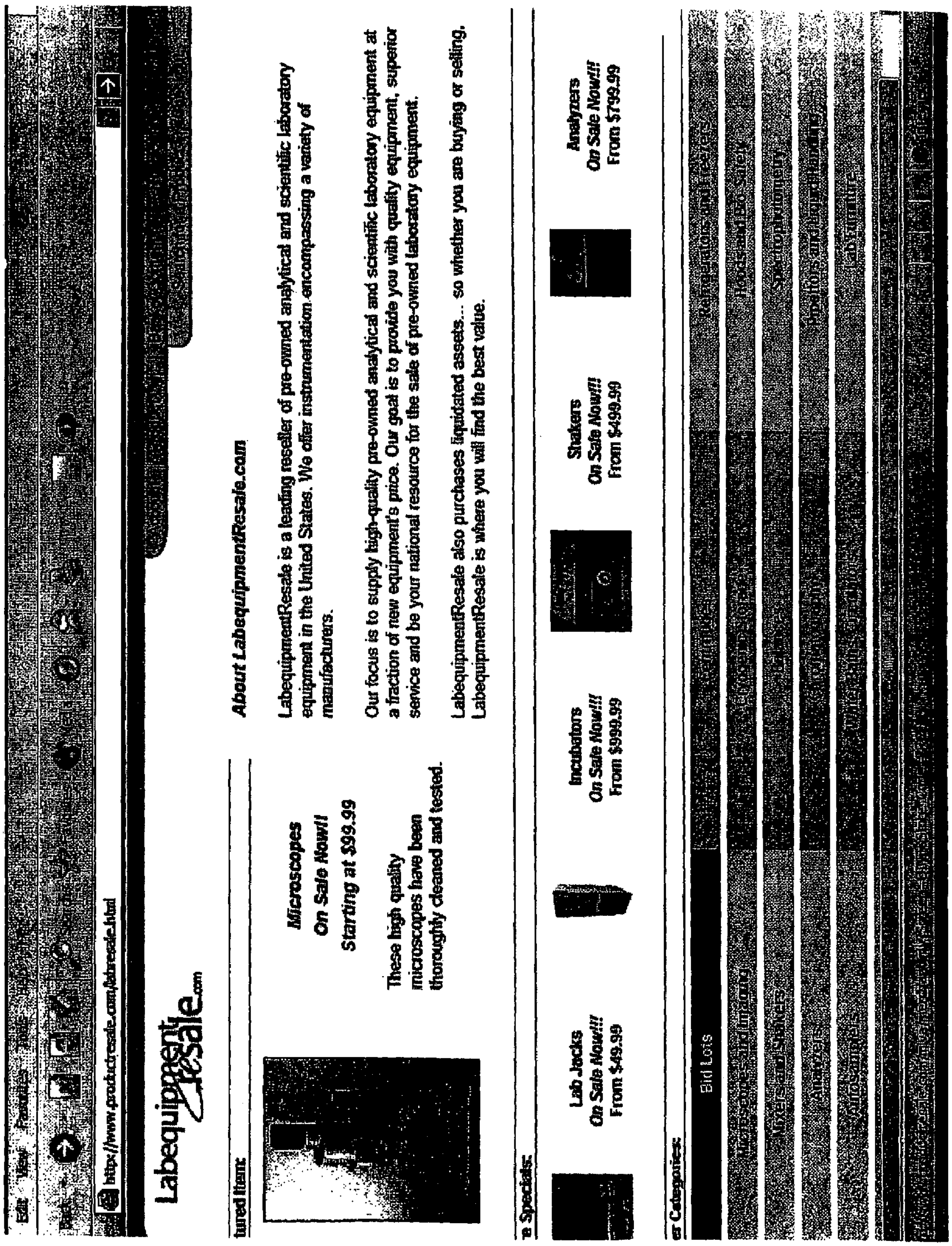
Figure 169:
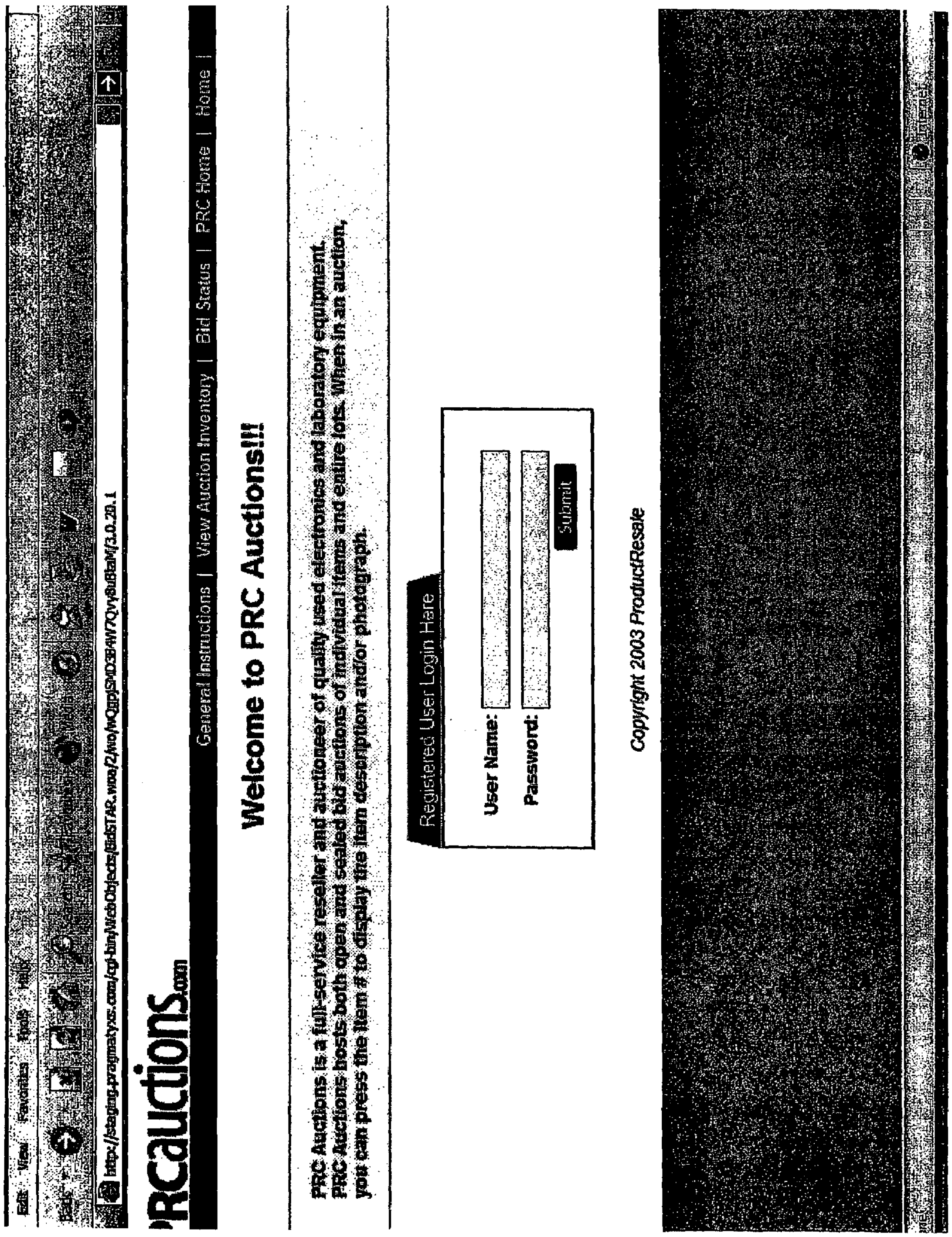
Figure 171:
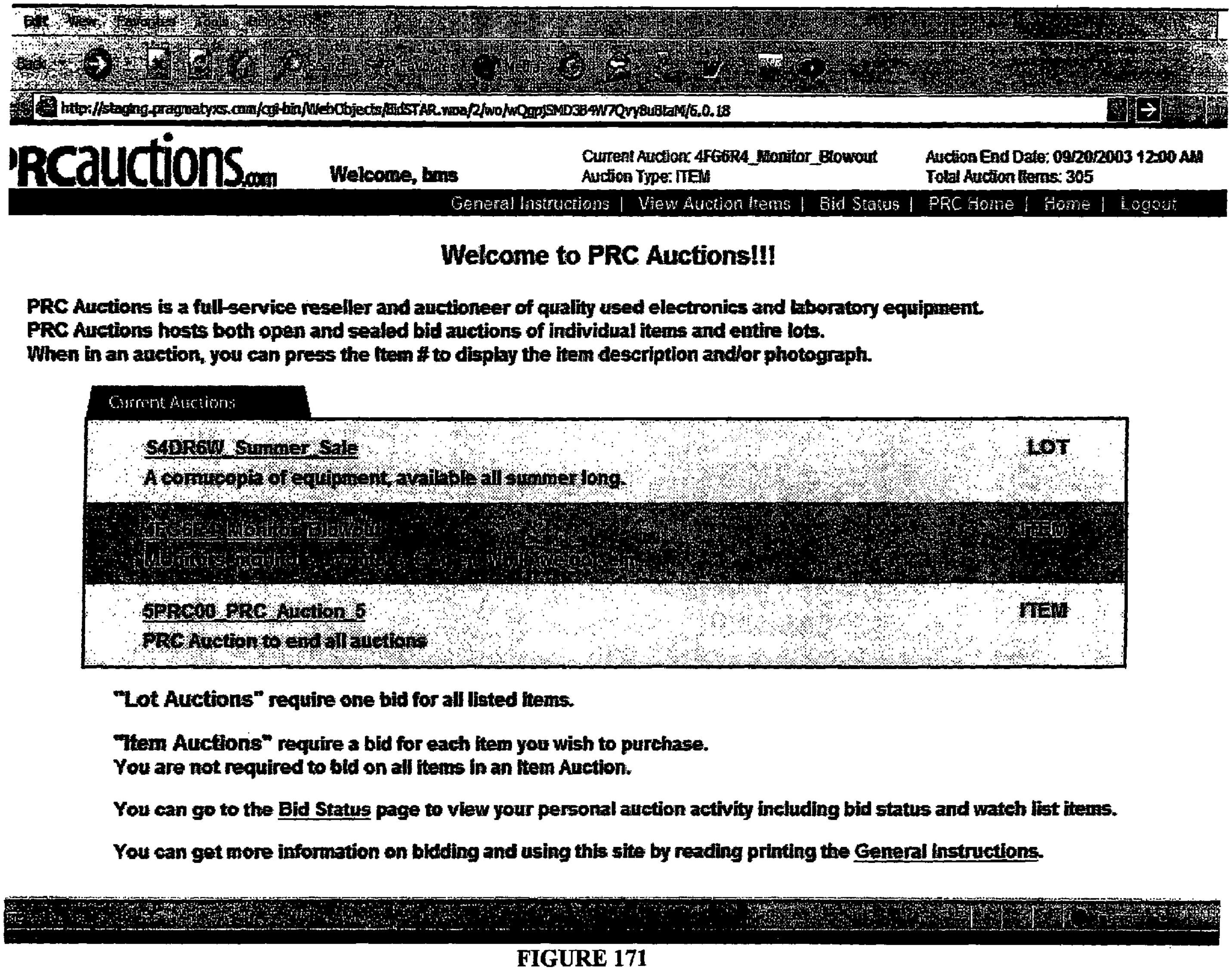
Figure 172:
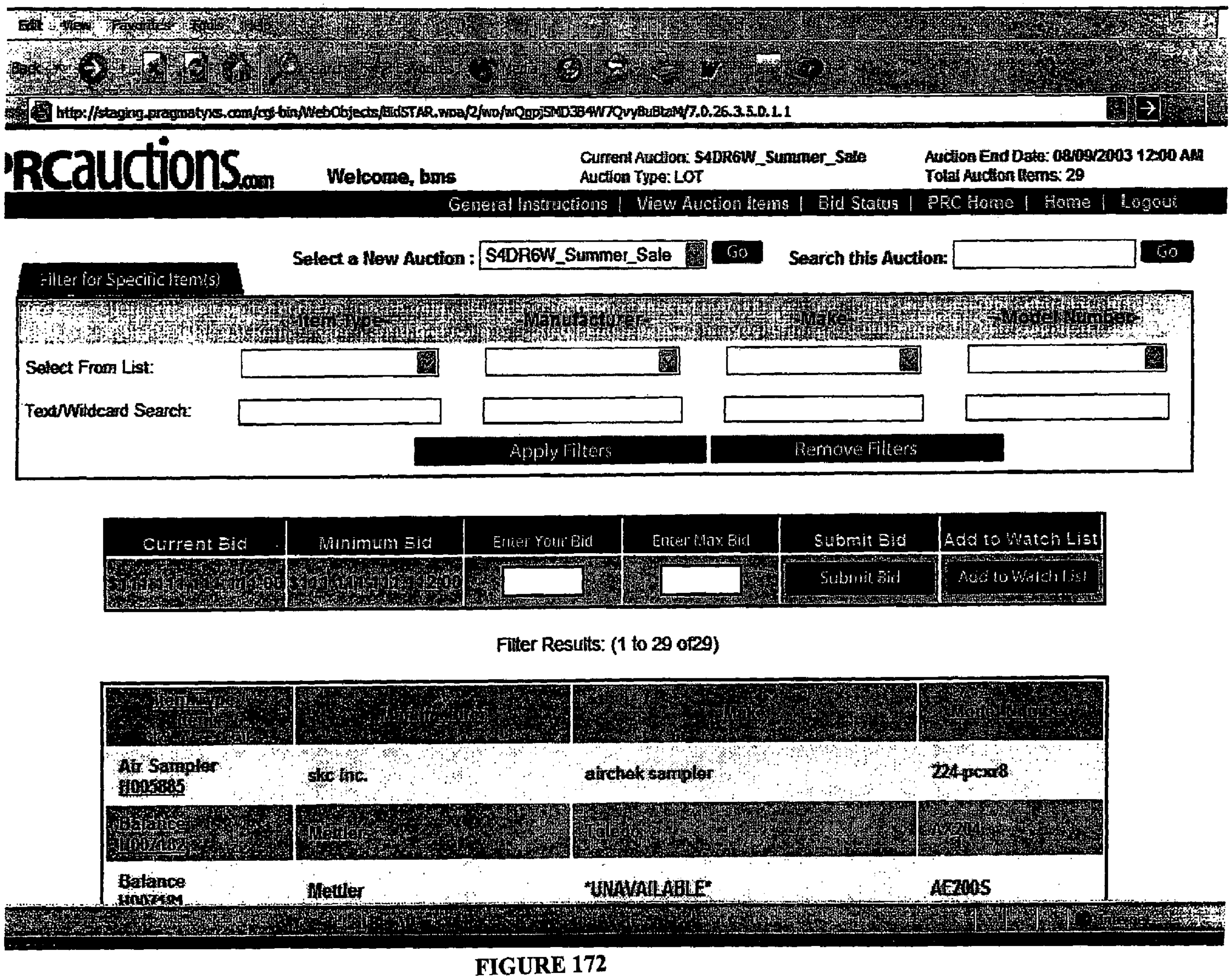
Figure 173:
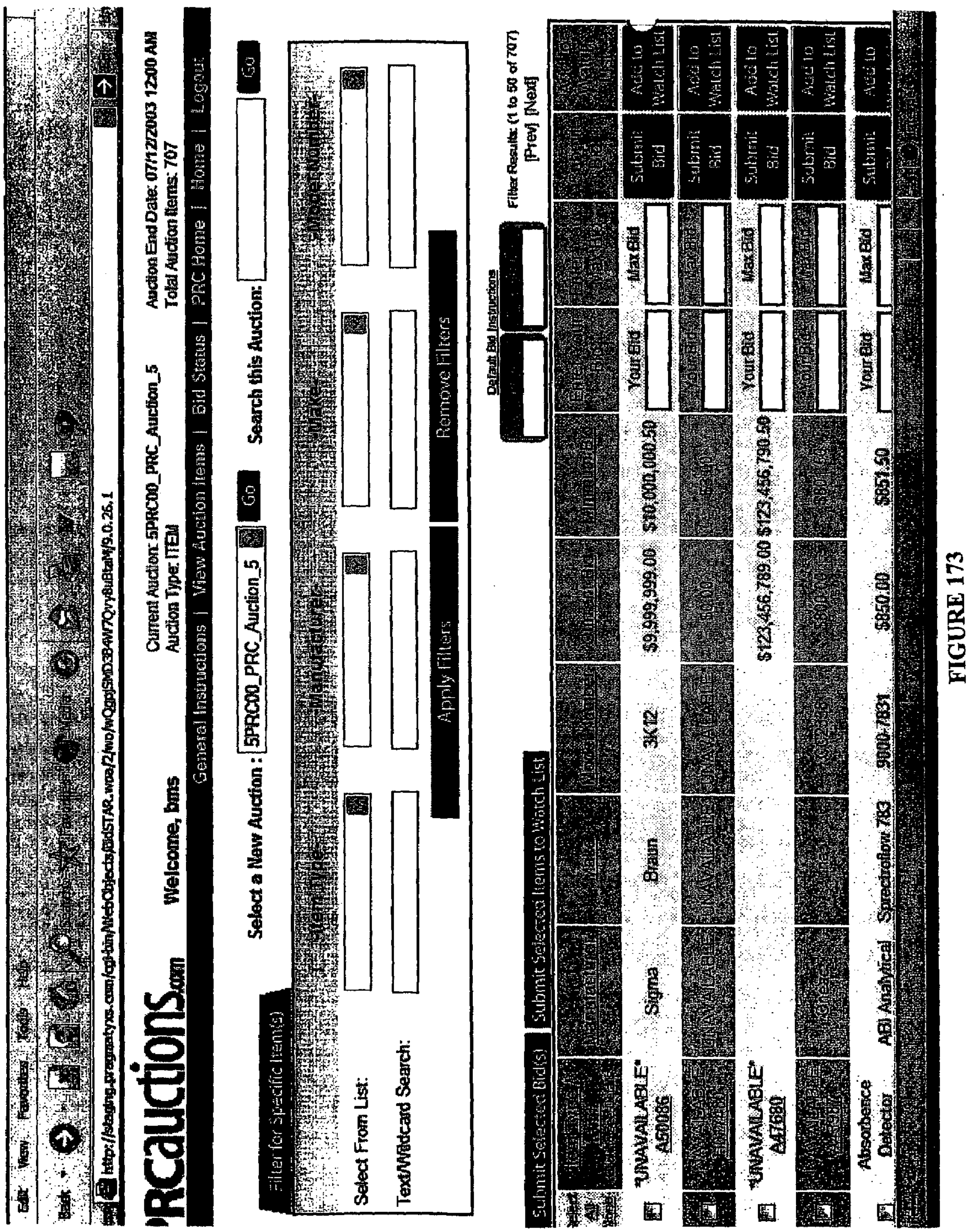
Figure 174:
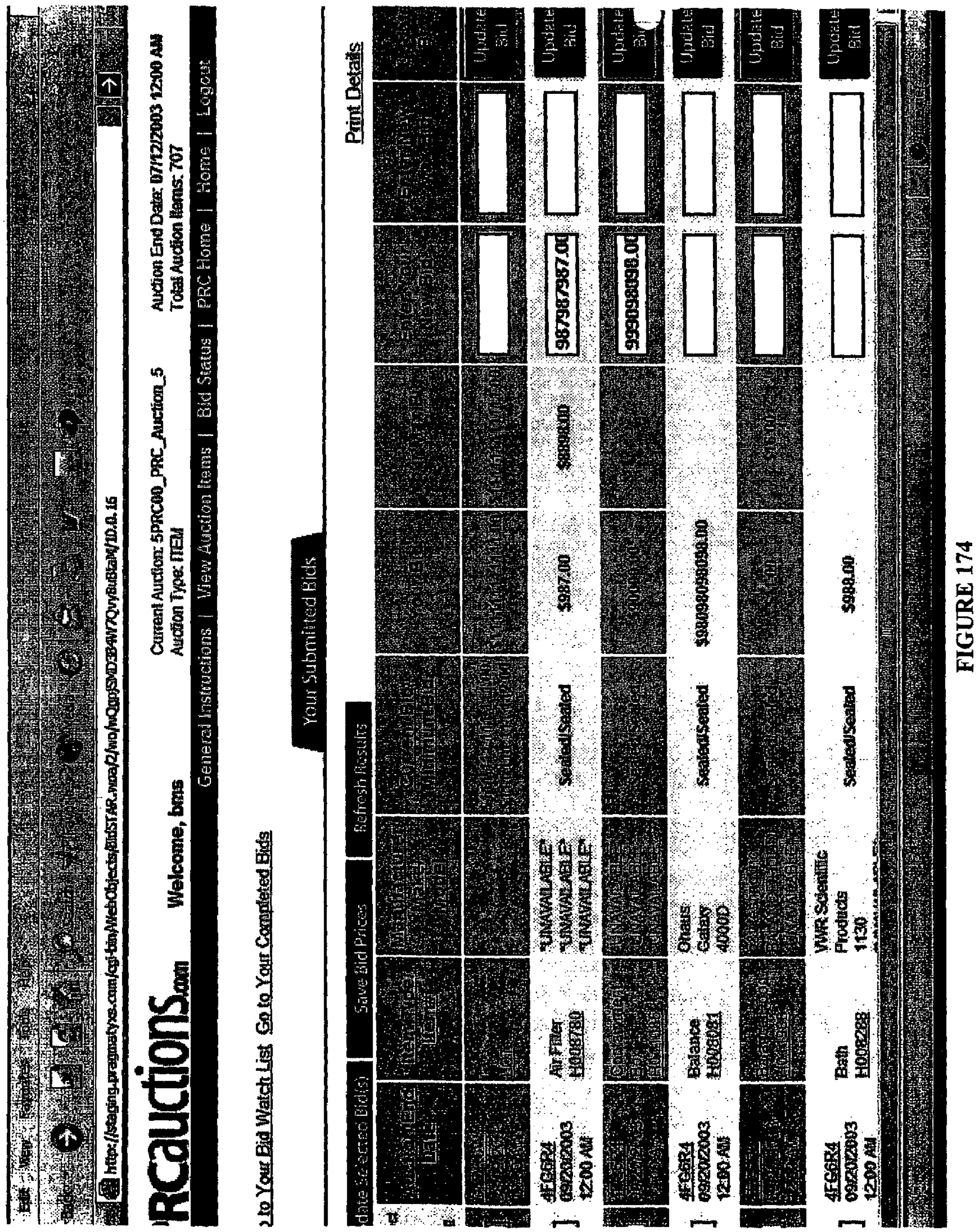
Figure 175:
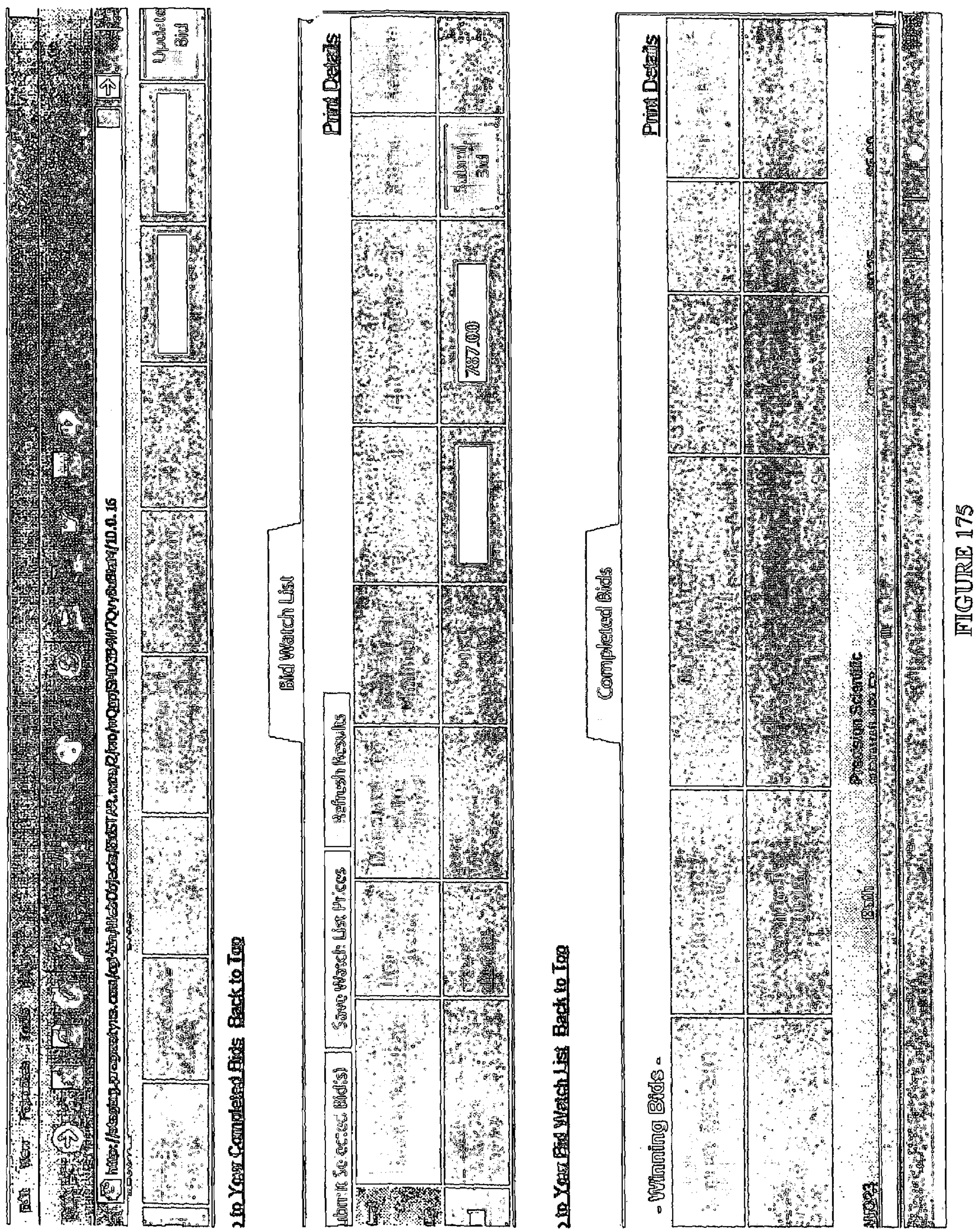

A Pending Cart Page, exemplified in FIG. 144, may report the status of Item Carts, created by authorized users through, for example, the screens shown in FIGS. 142-143, in order to select an Action to change the disposition or item status for all items in the cart. For example, some or all items in a cart may be requested to be redeployed to a particular recipient; or some or all items in the cart may be set to be disposed of, made available for resale, placed on hold for research or in storage.

The Item Cart may be used to set the expiration date for an item or items that may be available for redeployment, in storage or any other item status. The Pending Cart page may report the entity who created the cart, when the cart was created, the intended action or purpose of the cart, the creator contact information, and whether the cart was approved or completed. Based on the account profile, the user may or may not have the authority to view any or all Actions. A limitation on the number of manageable active carts may be employed. For example, a given user may manage one active cart and therefore, the cart must be submitted before another Cart can be created. Alternatively, users may be provided the ability to manage multiple active carts.

The Item Cart may allow users to make a request or perform an action related to changing the status of item or directing them to be redeployed to specific recipients. The actions available in the dropdown may be visible based on the users account profile. The account administrator may control the available actions. The user may have the ability to remove items from the Cart prior to Cart submission. For requests to redeploy items, both the Requestor information may be required and may be completed prior to submitting a request. Other requests, such as disposal, resale, move item, for example, may require only the Requestor information. When a follow-up procedure is required for a request, such as picking, packing and staging for redeployment or disposal, for example, an email or other notification may be sent, such as to previously arranged designated contacts. The email may provide details on how to manage the request. Once a follow-up procedure is complete, or if none was required, the Item Cart may be set to complete.

As exemplified in FIG. 117, Job Summary Reports may be identified with a multitude of Job Number printable electronic reports. Program Summary Reports may be posted each quarter and may include a list of services, total charges for processing and transportation expenses, and total resale credits applied.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A system for remotely tracking the disposition of inventoried items, said system comprising:

an inventory management database accessible only to authorized users, said database comprising data related to inventoried items, each inventoried item having an assigned manual audit code, an automated audit code, and an audited item status associated with each inventoried item;

an item status viewer for viewing the audited status of each inventoried item; and an inventory manager for managing at least one of the audited status and disposition of each said audited item.

2. The system for remotely tracking the disposition of inventoried items of claim 1, wherein said assigned manual audit code may be changed during the disposition of the inventoried item with which the manual audit code is associated.

3. The system for remotely tracking the disposition of inventoried items of claim 1, wherein said assigned manual audit code is updated at least once during the disposition of the inventoried item with which the assigned manual audit code is associated.

4. The system for remotely tracking the disposition of inventoried items of claim 1, wherein said inventory manager updates said assigned manual audit code at least once during the disposition of the inventoried item with which the assigned manual code is associated.

5. The system for remotely tracking the disposition of inventoried items of claim 1, wherein said assigned manual audit code is modified at least once during the disposition of the inventoried item with which the assigned manual audit code is associated.

6. The system for remotely tracking the disposition of inventoried items of claim 1, wherein said inventory manager modifies said assigned manual audit code at least once during the disposition of the inventoried item with which the assigned manual code is associated.

7. The system for remotely tracking the disposition of inventoried items of claim 1, wherein one or more of said items is disposed of through an auction.

8. The system for remotely tracking the disposition of inventoried items of claim 1, wherein one or more of said items is disposed of by direct sale.

9. A method for remotely tracking the disposition of inventoried items, said method comprising:

maintaining an inventory management database accessible only to authorized users, said database comprising data related to inventoried items, each inventoried item having an assigned manual audit code, an automated audit code, and an audited status associated with each inventoried item;

maintaining an item status viewer for viewing the status of each inventoried item; and maintaining an inventory manager for managing at least one of the audited status and disposition of each said audited item.

10. The method for remotely tracking the disposition of inventoried items of claim 9, wherein said assigned manual audit code may be changed during the disposition of the inventoried item with which the manual audit code is associated.

11. The method for remotely tracking the disposition of inventoried items of claim 9, wherein said manual audit code, maintained in the said inventory management database, is updated at least once during the disposition of the inventoried item with which the assigned manual audit code is associated.

12. The method for remotely tracking the disposition of inventoried items of claim 9, wherein said assigned manual audit code, maintained in the said inventory management database, is updated by the inventory manager at least once during the disposition of the inventoried item with which the assigned manual code is associated.

13. The method for remotely tracking the disposition of inventoried items of claim 9, wherein said inventory manager modifies said assigned manual audit code at least once during the disposition of the inventoried item with which the assigned manual code is associated.

14. A system for tracking the disposition of inventoried items, said system comprising:

an audit code assignor suitable for assigning a manual audit code and an automated audit code of the inventoried item;

an auditor that audits the incoming inventoried item to assess the incoming inventoried item as suitable for one or more of destruction, demanufacturing, resale, reconditioning, storage, and redeployment;

at least one of a redeployer, a demanufacturor, a reseller, a storer and a destructor associated with said auditor; and at least one updator suitable for manually updating the manual audit code at each of the audit code assignor, the auditor, and the at least one redeployer, demanufacturor, reconditioner, reseller, storer, and destructor.

15. The system for tracking the disposition of inventoried items of claim 14, wherein said assigned manual audit code, assigned by the audit code assignor, is updated at least once during the disposition of the inventoried item with which the assigned manual audit code is associated.

16. The system for tracking the disposition of inventoried items of claim 14, wherein the auditor modifies the manual audit code, assigned by the assignor.

17. The system for tracking the disposition of inventoried items of claim 16, wherein the auditor modifies the manual audit code, assigned by the assignor, based upon the auditors assessment of the incoming inventoried item.

18. The system for tracking the disposition of inventoried items of claim 14, wherein said at least one of a redeployer, a demanufacturor, a reseller, a storer and a destructor modifies the manual audit code, assigned by the assignor.

19. The system for tracking the disposition of inventoried items of claim 18, wherein said at least one of a redeployer, a demanufacturor, a reseller, a storer and a destructor modifies the manual audit code, assigned by the assignor, based upon the auditors assessment of the incoming inventoried item.

20. The system for tracking the disposition of inventoried items of claim 14, wherein said updator updates the manual audit code for each inventoried item, during the disposition of the inventoried item to which the manual audit code is assigned, at least once.

* * * * *